United States Patent
Fleskes

(12) 
(10) Patent No.: US 6,529,910 B1
(45) Date of Patent: Mar. 4, 2003

(54) APPARATUS AND METHOD FOR AUTOMATICALLY GENERATING WORLDWIDE WEB PAGES BASED ON REAL WORLD DOMAIN DATA

(76) Inventor: David E. Fleskes, 14817 Rocking Spring Dr., Rockville, MD (US) 20853

( * ) Notice: Subject to any disclaimer, the term of this patent is extended or adjusted under 35 U.S.C. 154(b) by 0 days.

(21) Appl. No.: 09/397,037

(22) Filed: Sep. 16, 1999

Related U.S. Application Data

(60) Provisional application No. 60/101,144, filed on Sep. 18, 1998.

(51) Int. Cl.[7] ............................................... G06F 17/30
(52) U.S. Cl. ......................................... 707/10; 707/102
(58) Field of Search ............................... 707/10, 9, 102, 707/103, 200, 501, 513, 100; 709/203, 217

(56) References Cited

U.S. PATENT DOCUMENTS

| | | | | |
|---|---|---|---|---|
| 5,894,554 A | * | 4/1999 | Lowery et al. | 709/203 |
| 5,940,834 A | * | 8/1999 | Pinard et al. | 707/102 |
| 6,026,433 A | * | 2/2000 | D'Arlach et al. | 709/217 |
| 6,105,027 A | * | 8/2000 | Schneider et al. | 707/9 |
| 6,185,587 B1 | * | 2/2001 | Bernardo et al. | 707/513 |
| 6,219,680 B1 | * | 4/2001 | Bernardo et al. | 707/501 |
| 6,263,352 B1 | * | 7/2001 | Cohen | 707/513 |
| 6,266,684 B1 | * | 7/2001 | Kraus et al. | 707/513 |

* cited by examiner

*Primary Examiner*—Sanjiv Shah
(74) *Attorney, Agent, or Firm*—Roylance, Abrams, Berdo, Goodman, L.L.P.

(57) ABSTRACT

A program is disclosed which allows a user to create a series of world wide web pages based on real world domain data. The program maintains configuration and content data and a series of web pages that act as templates. Accessing the program, the administrator of the organization creates custom web pages by inputting data about the organization and its members. The configuration and content data for the web pages are stored in a database, and different levels of security limit who can effect changes to different portions of the database. Different levels of access are also created to limit the information that can be viewed from the world wide web once the pages are made available. In this manner, different levels of members can view different levels of information about an organization, including events, meetings, budget, and the like. Additionally, members can enter data in fields as allowed by the administrator, such as updating membership information, acknowledging meetings, and sending e-mail to other members. Web pages can have varying levels of detail as selected by the administrator.

22 Claims, 148 Drawing Sheets

Jobs

Page 1 of 2

The XYZ Organization

— 60

Login: John E Doe
Page: Jobs

Previous Page  Member Page  Site Map  Login  My Link  Contact Us  Help ——— 88

After making any changes, click on either *Submit* or *Cancel* near bottom of the page.

 Jobs

- To view a Job, click on *View*.
- To modify a Job, click on *Modify*, followed by *Submit*.
- To delete a Job, click on *Delete*, followed by *Submit*.

— 64

Number of Items: 2

| | Title | City, State Zip Code | Date Posted Available Date | Summary |
|---|---|---|---|---|
| VIEW MODIFY DELETE | Landscaping 1570466170 | Rockville, MD 20853 | 04/29/1999 04/29/1999 | This job is available ee7b113e3727b54dcfe25d62 |
| VIEW MODIFY DELETE | Landscaping 368466303 | Rockville, MD 20853 | 04/29/1999 04/29/1999 | This job is available f09f113e3727b566cfe25d62 |

74 — VIEW
78 — MODIFY
80 — DELETE

*Commands*

66

- To find a specific item or items in the list, click on *Search*.
- To custom sort and display the list, click on *Sort*.
- To generate a report, click on *Generate Report*.
- To create a new item, click on *Create*.

96 — Display Display   Sort By   1st 2nd 3rd     90    102    76
       Summary Detail  Title:     ● ○ ○
       ○        ●      Type:      ○ ● ○     SORT  GENERATE  CREATE
   Search Forward Reverse Available ○ ○ ●           SORT
100      Sort     Sort   Date:
         92 ●    ○
                 94

*Search Criteria*
To find a specific item or set of items within the list, enter your search criteria and click on *Find/Search Now*:

- For a text filter, type a * to match zero or more characters, or a ? to match exactly one character.
- For a popup filter, select a value.
- For a date filter, use the mm/dd/yyyy format (e.g. 02/22/1991).

— 68

| Title: | | Is Hot?: | |
| City: | | Country: | |
| State: | | Zip Code: | |
| From Date Available: | | To Date Available: | |
| Employee Type: | | Job Code: | |
| Cost Center: | | Job Title: | |

FIG. 5A

Jobs
Back To Top
- To request more information, click on *Request More Information*.
- To save your changes, click on *Submit*.
- To undo your changes, click on *Reset*.
- To cancel your changes, click on *Cancel*.
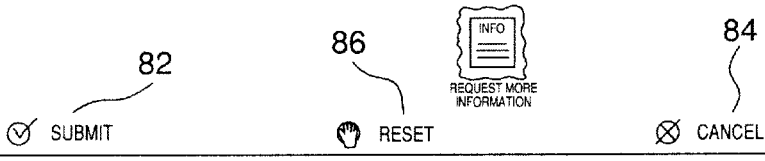
The XYZ Organization
12345 Main Street
Somewhere, Maryland 99999
123-456-7890
someone@somewhere.com
(Number of Visits: 1706) — 104
FIG. 5B

Job Information                                                                 Page 1 of 2

The XYZ Organization                     Login: John E. Doe
                                                             Page:  Job Information Previous Page  Member Page  Site Map  Login  My Link  Contact Us  Help ———— 88

After making any changes, click on either *Submit* or *Cancel* near bottom of the page.

Job Information

- The *Title* field is required.
- By setting the *is Hot Toggle*, the item is highlighted and searchable/indexed by that criteria.
- For date fields, use the *mm/dd/yyyy* format (e.g., 02/22/1991).

Title: [          ]            Is Hot?:        [ ]

Available Date: [          ]   Date Posted:    [ 04/29/1999 ]

Address Title: [          ]

Description

Summary:       | This job is available
               | ee7b113e3727b54dcfe25d62

Detail:        | This is a very long description.
               | The rest of this this is gibberish,
               | gibberish, gibberish, gibberish, gibberish,
               | gibberish, gibberish, gibberish, gibberish,
               | glbberish, gibberish, gibberish, gibberish,
               | glbberish, gibberish,
               | gibberish, gibberish, gibberish, gibberish,

Demographic Information

- By setting the *For Members Only* toggle, only members can view this item.
- By setting a value for the demographic field, the item is searchable/indexed by the demographic.
- By setting the associated *For ... Only* toggle, only members assigned the demographic can view this item.

For Members Only?: [ ]

Employee Type:  [       ][ ]     For Employee Type Only?:  [ ]

Job Code:       [       ][ ]     For Job Code Only?:       [ ]

Cost Center:    [       ][ ]     For Cost Center Only?:    [ ]

Job Title:      [       ][ ]     For Job Title Only?:      [ ]

Contact Information

Phone Number:  [ 301-871-8789 ]       Second Phone:    [            ]

Fax Number:    [              ]

Email Address: [ dfleskes@eobjects.com ] Second Address: [ dd ]

Web Address:   [ www.fleskes.com ]    Second Address:  [ dd ]

FIG. 6A

Job Information                                                                 Page 2 of 2

_____Back to Top_____

 Address

- The *Address Line 1*, *City*, *State*, and *Zip Code* fields are required.

| | | | |
|---|---|---|---|
| Address Line 1: | 14817 Rocking Spring Dr. | Address Line 2: | |
| City: | Rockville | Unit Number: | |
| State: | MD | County: | |
| Zip Code: | 20853 | Country: | dddd |

*Directions/Instructions*

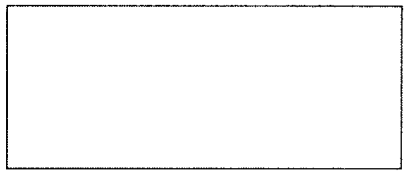

_____Back to Top_____

- To request more information, click on *Request More Information*.
- To save your changes, click on *Submit*.
- To undo your changes, click on *Reset*.
- To cancel your changes, click on *Cancel*.

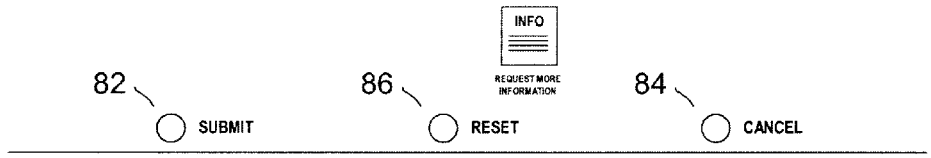

The XYZ Organization
12345 Main Street
Somewhere, Maryland 99999
123-456-7890
someone@somewhere.com
(Number of Visits: 1706)

FIG. 6B

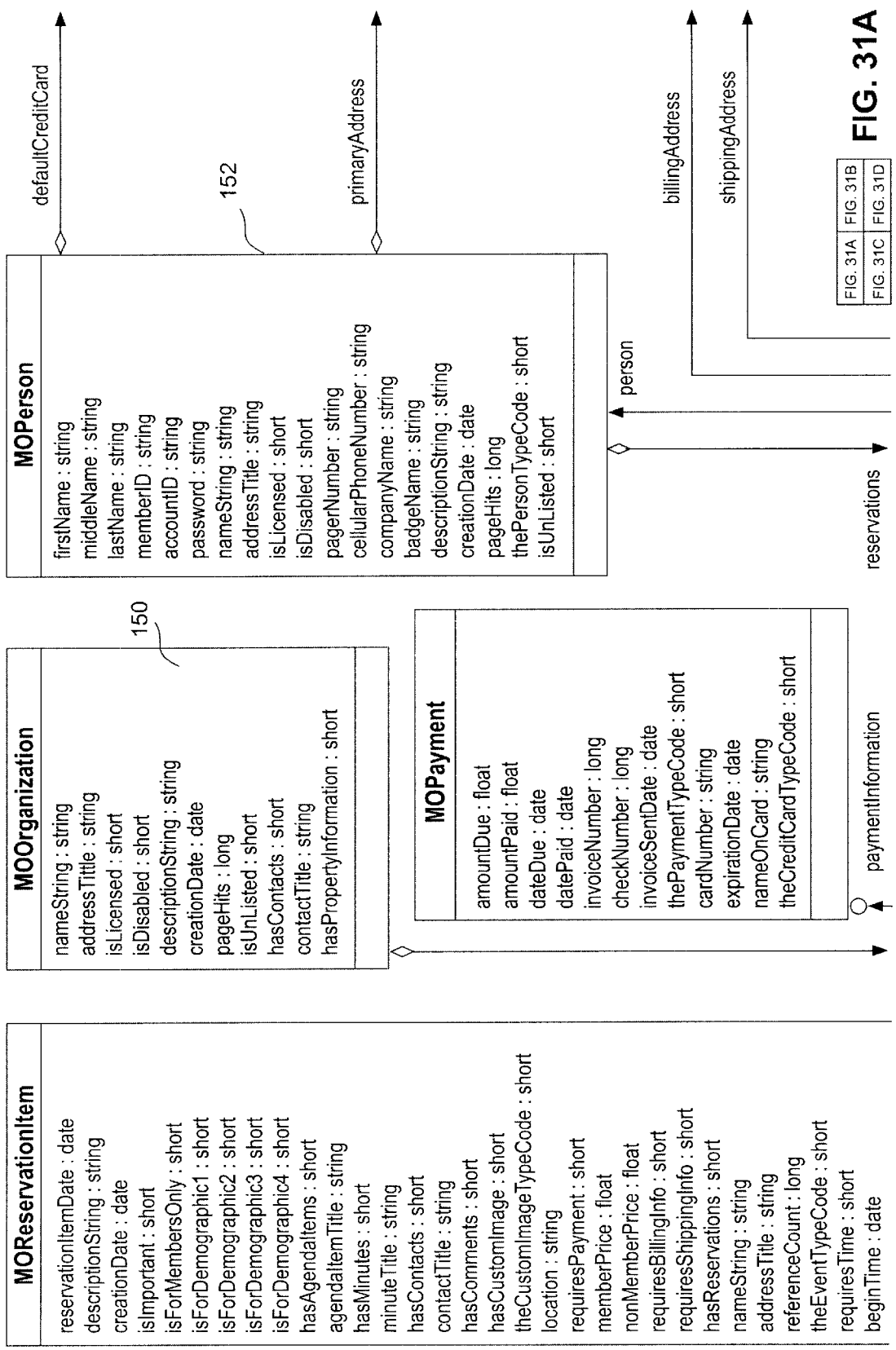

| ROReferenceType |  |
|---|---|
| typeCode : int<br>shortDescription : string<br>longDescription : string | |
| initialize( )<br>allInstances( )<br>allNonNullInstances( )<br>instanceForCode( )<br>shortDescriptionForCode( )<br>longDescriptionForCode( ) | |

126 — ROReferenceType
128 — typeCode : int
130 — shortDescription : string
132 — longDescription : string
134 — initialize( )
136 — allInstances( )
138 — allNonNullInstances( )
140 — instanceForCode( )
142 — shortDescriptionForCode( )
144 — longDescriptionForCode( )

FIG. 36

POPageCommandsDetailHelp isPageEditable : NSNumber *
displayView : NSNumber *
displayReport : NSNumber *
displayRequestMoreInformation : NSNumber *
displayCreateDonation : NSNumber *
displayCreateReservation : NSNumber *
displayCreateApplicationForm : NSNumber *
displaySubscribe : NSNumber *
displayUnsubscribe : NSNumber *

CAPageComandsHelp

POTableComponentHelp isPageEditable : NSNumber *
thePageTitle : NSString *
displayView : NSNumber *
displayModify : NSNumber *
displayCreate : NSNumber *
displayDelete : NSNumber *

POTableComponentDetailHelp isPageEditable : NSNumber *
thePageTitle : NSString *
displayView : NSNumber *
displayModify : NSNumber *
displayCreate : NSNumber *
displayDelete : NSNumber *
displayFilter : NSNumber *
displaySort : NSNumber *
displayReport : NSNumber *
displayRequestMoreInformation : NSNumber *
displaySendEmail : NSNumber *
displaySearch : NSNumber *

FIG. 42

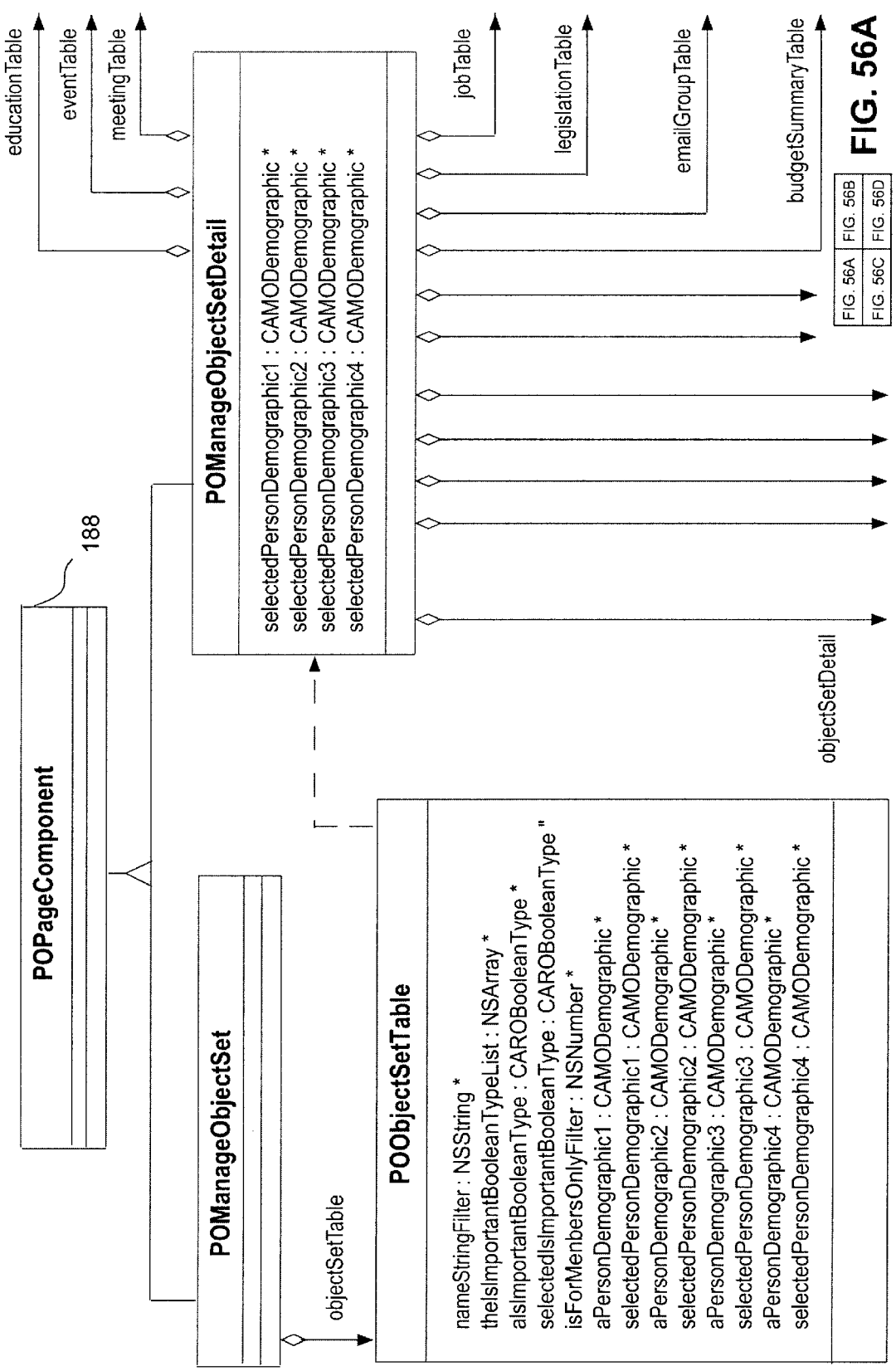

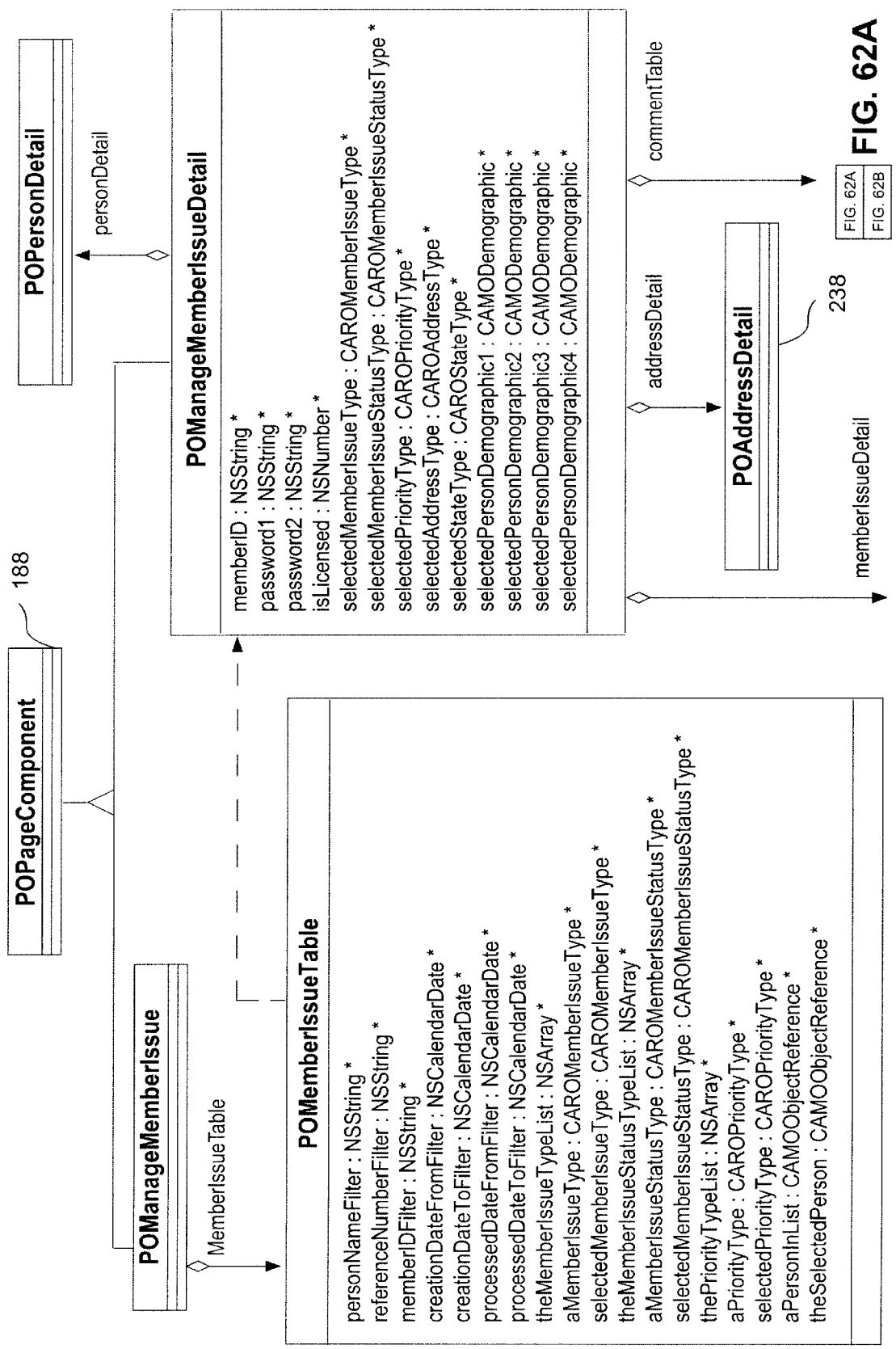

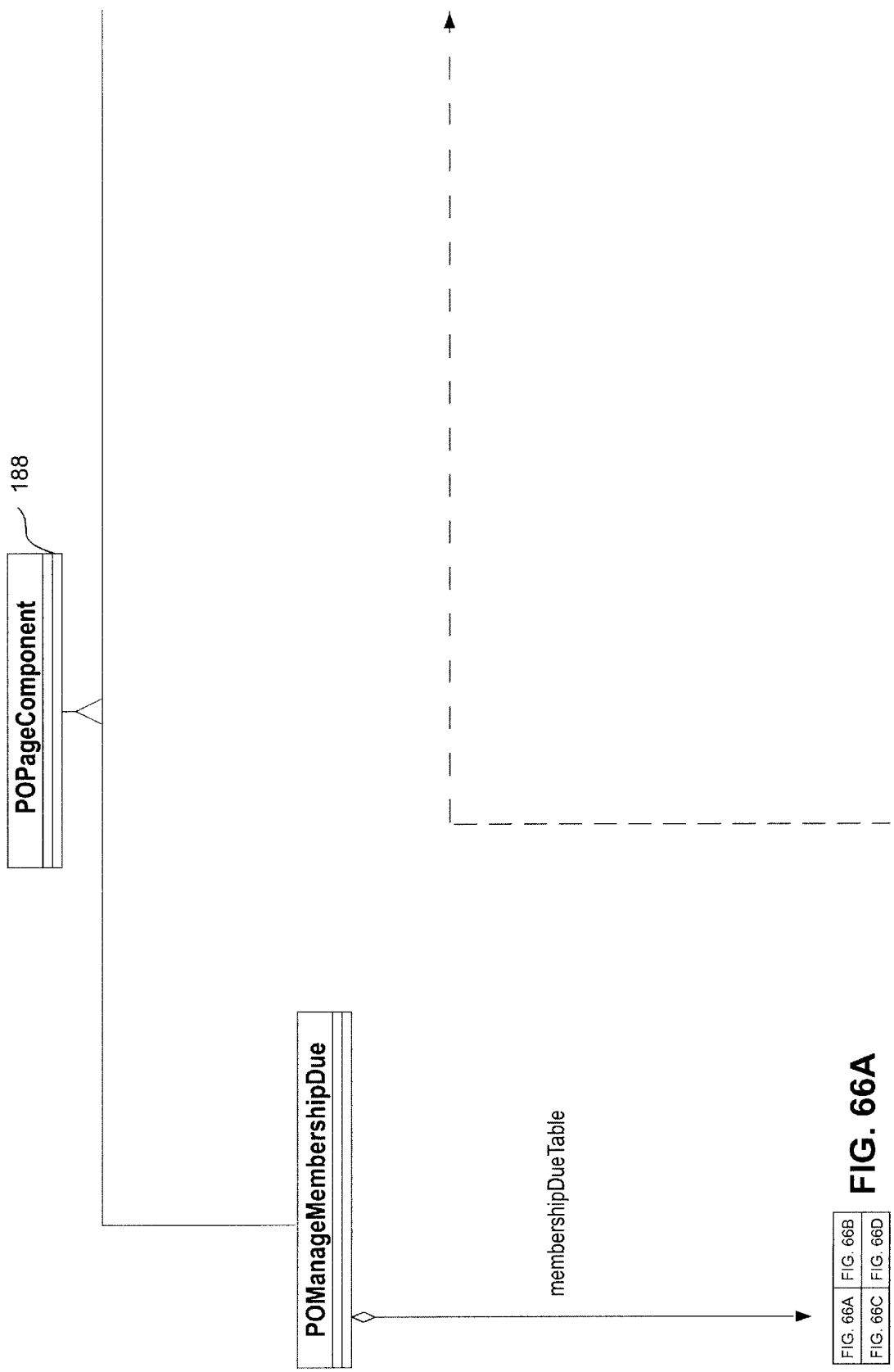

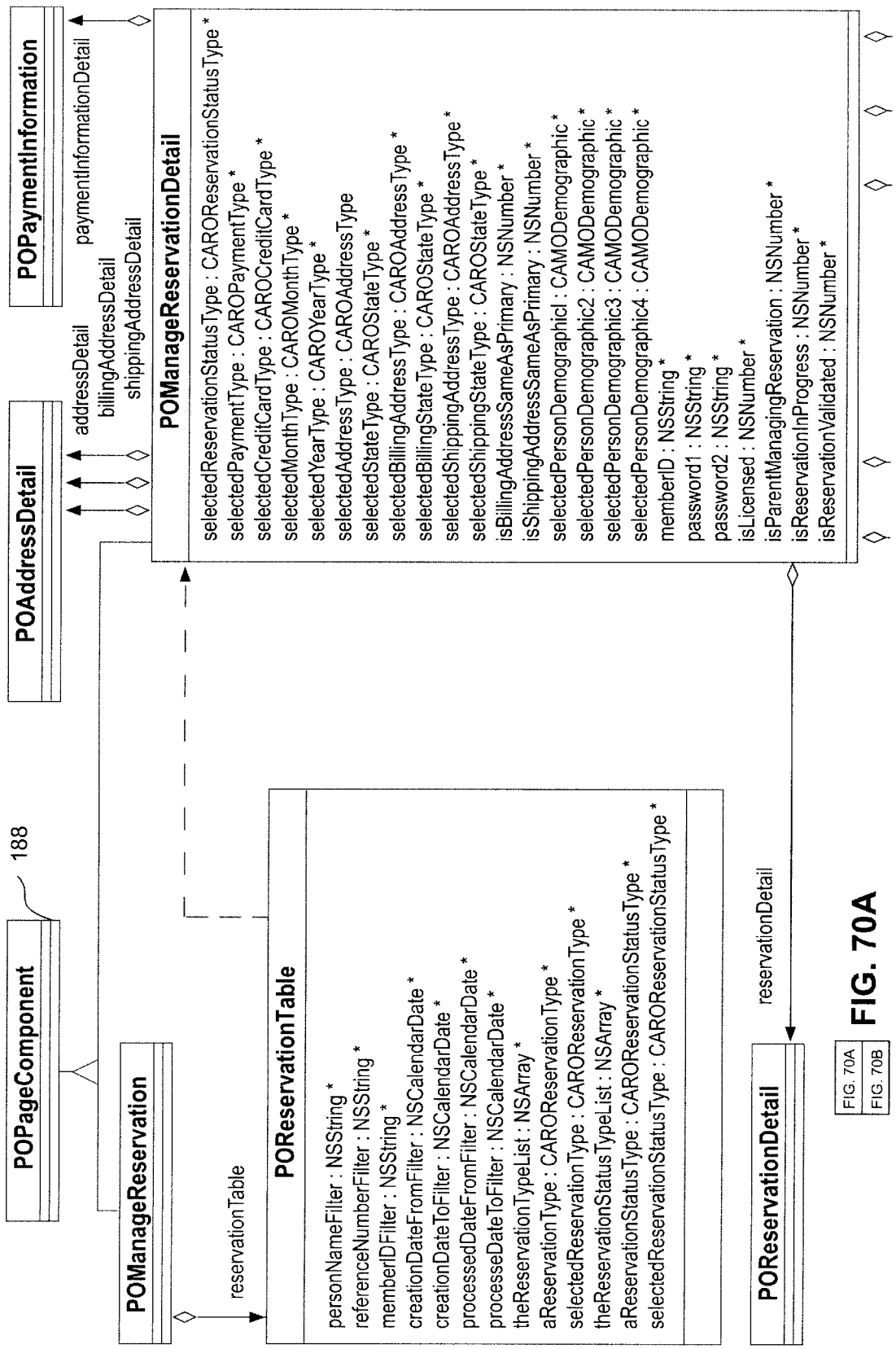

```
aOrganizationDemographic2 : CAMODemographic *
selectedOrganizationDemographic2 : CAMODemographic *
aOrganizationDemographic3 : CAMODemographic *
selectedOrganizationDemographic3 : CAMODemographic *
aOrganizationDemographic4 : CAMODemographic *
selectedOrganizationDemographic4 : CAMODemographic *
```

FIG. 82B

Login Page

Some Document
Click on the following hyperlink to download or link to the document or site.
Some Document
(Welcome visitor No. 1704)

— 246

[Continue to Home Page]   Login ID: [          ]
[Sign-up]                 Password: [          ]
                          [Login]  [Reset]

The XYZ Organization
12345 Main Street
Somewhere, Maryland 99999
123-456-7890
someone@somewhere.com
(Number of Visits: 1706)

Member Login                                                                 Page 1 of 1

The XYZ Organization                         Login: John E Doe
                                                                     Page: Login Previous Page  Member Page  Site Map  Login  My Link  Contact Us  Help
───────────────────────────────────────────────────────────────────────

Login

If you have a Login ID, enter it and your password in the Login ID and Password fields and click on the Login button below.

— 248

LoginID: [          ]

Password: [          ]

[ Login ]  [ Reset ]

───────────────────────────────────────────────────────────────────────

The XYZ Organization
12345 Main Street
Somewhere, Maryland 99999
123-456-7890
someone@somewhere.com
(Number of Visits: 1706)

FIG. 88

Home Page

| | | | |
|---|---|---|---|
|  | Email Groups<br>Sign up for our email list groups. |  | Individuals<br>View our individual members. |
|  | Organizations<br>View our organizations members. |  | Committees<br>Get involved by joining a committee. |
|  | Sponsors<br>Visit our sponsors. |  | Affiliates<br>Information about and links to our partners and affiliates. |
|  | Staffers<br>Our staff is available to you. |  | Contacts<br>Contacts to help you get what you need. |

— 250

Login    Site Map

The XYZ Organization
12345 Main Street
Somewhere, Maryland 99999
123-456-7890
someone@somewhere.com
(Number of Visits: 1706)

FIG. 89B

Member Page

The XYZ Organization
Welcome Back John E. Doe

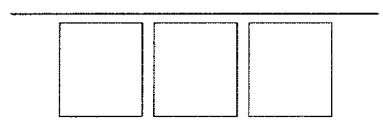

— 252

What's New & Hot
Find everything that is new or important on our site.

Property Information
Information on the property.

Events
What is currently happening.

Education
Education opportunities.

Services
Our services we can offer to you.

Publications
Publications available online.

Testimonials
Your feedback is welcome.

Resources
Where to get more information.

Legislative Issues
Current issues of importance to you.

Discussion Groups
Participate in ongoing discussions.

Email Groups
Sign up for our email list groups.

Organizations
View our organizations members.

Memberships
Sign up for membership now.

Property Units
Our property units.

Meetings
Upcoming meetings.

Products
Products we have to offer.

Donations
If you would like to create a donation....

Announcements
For immmediate release.

Questions
Your questions are answered.

Jobs
What about our jobs opportunities?.

Budgets
Where we stand financially.

Member Issues
If you have an issue.

Individuals
View our individual members.

Committees
Get involved by joining a committee.

FIG. 90A

Member Page
 Sponsors
Visit our sponsors.
 Affiliates
Information about and links to
our partners and affiliates. ⟵ 252
 Staffers
Our staff is available to you.
 Contacts
Contacts to help you get what
you need.
---
Site Map
---
The XYZ Organization
12345 Main Street
Somewhere, Maryland 99999
123-456-7890
someone@somewhere.com
(Number of Visits: 1707)
FIG. 90B

Web Site Configuration Information                                                                    Page 1 of 6

| | The XYZ Organization | Login: John E Doe |
|---|---|---|
| | | Page: Web Site Configuration Information |

Previous Page   Member Page   Site Map   Login   My Link   Contact Us   Help

Click on the links below to view different sections of this page
What We Offer Menu   Resources Menu   Links Menu   Login Page   All Sections

*After making any changes, click on either Submit or Cancel near the bottom of the page.*

☐ Web Site Configuration Information                                         ／― 260

- Choose which components you want on your site:
  - Set the *Component*'s toggle to enable the component.
  - The components are grouped into three menus: What We Offer, Resources, and Links.
  - To read a detailed description of a component, click on Help near the bottom of the page.

- Enter a title for the component in the *Title* text field:
  - The value you provide is used throughout the site.
  - Enter a title that represents the plural form.
  - For instance, you can rename Event to Powwow.

- Decide which audience(s) can access the component in the *Display on Menu* section:
  - By setting the Home toggle, the component can be accessed from the Home Menu.
  - By setting the Member toggle, the component can be accessed from the Members Menu.
  - By setting the Staff toggle, the component can be accessed from the Staff Menu.

- Check the *Can Members Create* button if:
  - Members can create new items with the component (members will not be able to modify or delete existing items).

- Enter a number in the *Order of Display* field to:
  - Customize in which order the components are displayed on the *Home* and *Member* pages.

- Set the *Use Categories* toggle to enable categories within the component:
  - Categories allow you to arbitrarily group items.
  - For instance, within Events, you can have separate event groupings such as Conferences, Seminars, ...

- Enter a description for the component in the Description text field:
  - The value you provide is displayed on the *Home* and *Member* pages.

What We Offer Menu

- The following options affect the display of the *What We Offer* Menu:

| Include Component? | Title | Display on Menu | | | Can Members Create? | Order of Display | Use Categories? | Display Shopping Cart? |
|---|---|---|---|---|---|---|---|---|
| | | Home | Member | Staff | | | | |
| ☒ Memberships?: | Memberships | ☒ | ☒ | ☒ | NA | 1 | NA | NA |
| Description: | | | | | | | | |
| ☒ Property Info?: | Property Information | ☒ | ☒ | ☒ | NA | 2 | NA | NA |
| Description: | | | | | | | | |
| ☒ Property Units?: | Property Units | ☒ | ☒ | ☒ | ☒ | 3 | NA | NA |

FIG. 91A

Web Site Configuration Information                                                      Page 2 of 6

260

| | Description: | Our property units. | | | | | | | |
|---|---|---|---|---|---|---|---|---|---|
| ☒ | Events?: | Events | ☒ | ☒ | ☒ | ☐ | 4 | ☒ | NA |
| | Description: | What is currently happening. | | | | | | | |
| ☒ | Meetings?: | Meetings | ☒ | ☒ | ☒ | ☐ | 5 | ☒ | NA |
| | Description: | Upcoming meetings. | | | | | | | |
| ☒ | Education?: | Education | ☒ | ☒ | ☒ | ☐ | 6 | ☒ | NA |
| | Description: | Education opportunities. | | | | | | | |
| ☒ | Products?: | Products | ☒ | ☒ | ☒ | ☐ | 7 | ☒ | ☐ |
| | Description: | Products we have to offer. | | | | | | | |
| ☒ | Services?: | Services | ☒ | ☒ | ☒ | ☐ | 8 | ☒ | ☒ |
| | Description: | Our services we can offer to you. | | | | | | | |
| ☒ | Publications?: | Publications | ☒ | ☒ | ☒ | ☐ | 10 | ☒ | ☒ |
| | Description: | Publications available online. | | | | | | | |
| ☒ | Donations?: | Donations | ☒ | ☒ | ☒ | NA | 9 | NA | NA |
| | | If you would like to create a donation ... | | | | | | | |

<u>Back To Top</u>

Resources Menu

- The following options affect the display of the *Resources* Menu:

| Include Component? | Title | Display on Menu | | | Can Members Create? | Order of Display | Use Categories? |
|---|---|---|---|---|---|---|---|
| | | Home | Member | Staff | | | |
| ☒ Announcements?: | Announcements | ☒ | ☒ | ☒ | ☐ | 11 | NA |

FIG. 91B

Web Site Configuration Information
Page 3 of 6

⟵ 260

| | | | | | | | | |
|---|---|---|---|---|---|---|---|---|
| | Description: | For immediate release. | | | | | | |
| ☒ | Testimonials?: | Testimonials | ☒ | ☒ | ☒ | ☐ | 12 | NA |
| | Description: | Your feedback is welcome. | | | | | | |
| ☒ | Questions?: | Questions | ☒ | ☒ | ☒ | ☐ | 13 | NA |
| | Description: | Your questions are answered. | | | | | | |
| ☒ | Resources?: | Resources | ☒ | ☒ | ☒ | ☐ | 14 | NA |
| | Description: | Where to get more information. | | | | | | |
| ☒ | Jobs?: | Jobs | ☒ | ☒ | ☒ | ☐ | 15 | NA |
| | Description: | What about our job opportunities?. | | | | | | |
| ☒ | Legislation?: | Legislative Issues | ☒ | ☒ | ☒ | ☐ | 16 | NA |
| | Description: | Current issues of importance to you. | | | | | | |
| ☒ | Budgets?: | Budgets | ☒ | ☒ | ☒ | NA | 17 | NA |
| | Description: | Where we stand financially. | | | | | | |
| ☒ | Discussion Groups?: | Discussion Groups | ☒ | ☒ | ☒ | ☐ | 18 | NA |
| | Description: | Participate in ongoing discussions. | | | | | | |
| ☒ | Email Groups?: | Email Groups | ☒ | ☒ | ☒ | ☐ | 20 | NA |
| | Description: | Sign up for our email list groups. | | | | | | |
| ☒ | Member Issues?: | Member Issues | ☒ | ☒ | ☒ | NA | 19 | NA |

FIG. 91C

Web Site Configuration Information  Page 4 of 6

| Description: | If you have an issue. |

260

Links Menu

- The following options affect the display of the *Links* Menu:

| Include Component? | Title | Display on Menu | | | Can Members Create? | Order of Display | Use Categories? |
|---|---|---|---|---|---|---|---|
| | | Home | Member | Staff | | | |
| ☒ Individuals?: | Individuals | ☒ | ☒ | ☒ | NA | 21 | ☒ |
| Description: | View our individual members. | | | | | | |
| ☒ Organizations?: | Organizations | ☒ | ☒ | ☒ | NA | 22 | ☒ |
| Description: | View or organizations members. | | | | | | |
| ☒ Committees?: | Committees | ☒ | ☒ | ☒ | NA | 23 | NA |
| Description: | Get involved by joining a committee. | | | | | | |
| ☒ Sponsors?: | Sponsors | ☒ | ☒ | ☒ | NA | 24 | NA |
| Description: | Visit our sponsors. | | | | | | |
| ☒ Affiliates?: | Affiliates | ☒ | ☒ | ☒ | NA | 25 | NA |
| Description: | Information about and links to our partners and affiliates. | | | | | | |
| ☒ Contacts?: | Contacts | ☒ | ☒ | ☒ | NA | 27 | NA |
| Description: | Contacts to help you get what you need. | | | | | | |
| ☒ Staffers?: | Staffers | ☒ | ☒ | ☒ | NA | 26 | NA |
| Description: | Our staff is available to you. | | | | | | |

FIG. 91D

Web Site Configuration Information

<u>Back To Top</u>

*Login Page*

- Set the *Display Login Page* toggle if you want:
  - The *Login Page* is displayed before the Home Page.
  - The *Login Page* allows the user to immediately enter his or her login id.
  - If not set, the *Home Page* is the first page a user sees.

⟵ 260

 Display Login Page?:

- Set the *Display Login Page Image* toggle if you want:
  - An image you upload displayed near the top of the *Login Page*.
  - To upload the custom image, click on the *Upload Image*.

 Display Login Page Image?:  [ Upload Image ... ]

- Set the *Display Login Page Image 2* toggle if you want:
  - A second image you upload displayed underneath the firts image on the *Login Page*.
  - To upload the custom image, click on the *Upload Image*.

☐ Display Login Page Image 2?:  [ Upload Image ... ]

- Set the *Display Login Page* toggle if you want:
  - A custom page to be displayed on the *Login Page*.
  - Enter the name for the page in the *Login Page Title* field.
  - A custom page can either be an inline html or ascii file or a downloadable document.
  - To upload the page, click on the *Upload Page*.

 Display Login Page Content?:   Content Title:   [ Some Document ]

[ Upload Page ... ]

- Set the *Continue to External URL* toggle if you want to link to an external site from the *Login Page*:
  - When the user clicks on the *Continue To Home Page* button, the user is taken to the external URL.
  - Enter the external URL in the *External URL* field.
  - If not set, when the user clicks on the *Continue To Home Page* button, the user is taken to the *Home Page*.

☐ Continue to External URL?:   External URL:   [                    ]

- Set the *Display Sign-up Button* toggle if you want:
  - A sign-up button appears on the *Login Page* and takes a user to your site's membership section.
  - If not set, the button does not appear on the *Login Page*.

 Display Sign-up Button?:

- Set the *Display Member Menu* toggle if you don't support members in any way:
  - Only staff and the administrators can login to your site.
  - If not set, members may also log in to your site.

 Display Member Menu?:

<u>Back To Top</u>

- To save your changes, click on Submit
- To undo you changes, click on Reset.
- To cancel your changes, click on Cancel.

FIG. 91E

Web Site Configuration Information

○ SUBMIT     ○ RESET     ○ CANCEL

The XYZ Organization
12345 Main Street
Somewhere, Maryland 99999
123-456-7890
someone@somewhere.com
(Number of Visits: 1706)

Page & Image Configuration Information                                                          Page 1 of 4

The XYZ Organization                    Login: John E Doe
                                                         Page: Page & Image Configuration Information Previous Page  Member Page  Site Map  Login  My Link  Contact Us  Help Click on the links below to view different sections of this page Description and Logos  Color/Icon Theme  Site Preferences  Custom Pages  All Sections After making any changes, click on either *Submit* or *Cancel* near the bottom of the page.

 Page & Image Configuration Information                    — 262

*Descriptions and Logos*

- Set the *Display Small Logo* toggle if you want:
  - An image you upload to be displayed next to your name.
  - To upload the logo, click on the *Upload Image*.

☒ Display Small Logo?                                     [ Upload Image ... ]

- Set the *Display Home Page Content* toggle if you want:
  - A custom page to be displayed on the *Home Page*.
  - A custom page can either be an inline html or ascii file or a downloadable document.
  - To upload the page, click on the *Upload Page*.

☒ Display Home Page Content?          [ Custom Page ]     [ Upload Page ... ]

- Set the *Display Home Page Image* toggle if you want:
  - An image you upload to be displayed near the top of the *Home Page*.
  - To upload the image, click on the *Upload Image*.

☐ Display Home Page Image?                                [ Upload Image ... ]

- Set the *Display Home Page Image 2* toggle if you want:
  - An image you upload to be displayed underneath the first image on the *Home Page*.
  - To upload the image, click on the *Upload Image*.

☐ Display Home Page Image 2?                              [ Upload Image ... ]

- Set the *Display Address Page Content* toggle if you want:
  - A custom page to be displayed on the *Addresses* page.
  - A custom page can either be an inline html or ascii file or a downloadable document.
  - To upload the page, click on the *Upload Page*.

☒ Display Address Page Content?   Content Title: [ Address Info ]   [ Upload Page ... ]

Back To Top

*Descriptions and Logos*

- Set the Foreground Color from the selection list:
  - This changes the color of ....
- Set the Background Color from the selection list:
  - This changes the color of ....

Foreground Color:  [ Light Blue ▾ ]       Background Color:  [ Medium Blue ▾ ]

FIG. 92A

Page & Image Configuration Information

Page 2 of 4

- View the color demos if you need to see examples of the color options.

Color Demos:  Dark Blue  Medium Blue  Light Blue  Teal  Green  Tan  Gold

- Set the Icon Theme from the selection list to change the icons displayed throughout the site:
    - The Picasso theme is colorful and modem.
    - The People theme is more traditional and photograhpy oriented.
    - Other themes will be available soon.

Icon Theme:  | Picasso |

/— 262

Back To Top

Site Preferences

- Set the *Display Menu in Frame* toggle if you want:
    - To display a frame containing all menu options on the left hand side of the page.
    - If not set, frames are not used and the menu options are available via a hyperlink at the top of each page.

☒ Display Menu in Frame?

- Set the *Display Pages in Sections* toggle if you want:
    - To display pages with more than component as a series of separate sections.
    - If not set, all components will be display at the same time.

☒ Display Pages in Sections?

- Set the *Display Default Help Text* toggle if you want:
    - To display a brief procedural help description on each page.
    - If not set, no help text is displayed until the user clicks on Help.

☒ Display Default Help Text?

- Set the *Display EO Footer* toggle if you want:
    - To display Enterprise Objects small logo and email information at the bottom of each page.
    - If not set, the information is not displayed.

☒ Display EO Footer?

- Set the *Display Site Visits* toggle if you want:
    - To display the number of visits to your site on the Home and Login pages and at the bottom of each page.
    - If not set, the information is not displayed.

☒ Display Site Visits?

- Enter a value for the *# Records per Table* if you want:
    - To display only that number of records in any table at one time.
    - *Note : this isn't working currently.*

| 10 |  # Records per Table

Back To Top

Custom Pages

If you want a Virtual Tour on the Home Menu:

- Set the *Display Virtual Tour* toggle.
- Enter a value in the *Title field* for title of the Virtual Tour.
- Enter a value in the URL field of the URL for the Virtual Tour.

FIG. 92B

Page & Image Configuration Information　　　　　　　　　　　　　　　　　　　　　　　　　　　Page 3 of 4

☒ Display Virtual Tour?　　Title: | Visual Tour |　　URL: | www.netscape.com |

If you want any one of four custom pages that you can either upload or link to:

- Set the *Custom Page X* toggle.
- Enter a value in the *Title* field for title of the custom page.
- To upload the custom page, click on the *Upload Page*.
- Set the *Display Image* toggle if you want:
  - To display an image on the page.
  - To upload the image, click on the *Upload Image*.
  - If not set, an image is not displayed on the page.
- Set the Display Icon toggle if you want:
  - To display an icon that the user can click representing the custom page.
  - To upload the custom icon, dick on the Upload Icon.
  - If not set, the custom page is displayed as a hyperlink.
- Set the Link to Custom Page toggle if you want to provide an external link to the page(s) in3tead of uploading the page:
  - If set, the user is directed to an external URL.
  - Enter a value in the URL field of the URL for the page.
  - If not set, the custom page is displayed within the site.
- Set the Display on Public Menu if anyone can access the page.
  - The page is displayed on the *Home Page*.
  - A link to the page is displayed on the *Home Menu*.
- Set the Display on Members Menu if only members can access the page.
  - The page is displayed on the *Member Page*.
  - A link to the page is displayed on the *Menu Menu*.

— 262

☒ Custom Page 1?　　Title: | About us |　　　　　Upload Page ...
　　　　　　　　　　　☒ Display Image?　　　　　　Upload Image ...
　　　　　　　　　　　☐ Display Icon?
　　　　　　　　　　　☒ Link to Custom Page?　　　Upload Icon ...
　　　　　　　　　　　☒ Display on Public Page/Menu?　URL: | |
　　　　　　　　　　　☒ Display on Members/Page/Menu?

☒ Custom Page 2?　　Title: | Our History |　　　Upload Page ...
　　　　　　　　　　　☐ Display Image?　　　　　　Upload Image ...
　　　　　　　　　　　☒ Display Icon?
　　　　　　　　　　　☐ Link to Custom Page?　　　Upload Icon ...
　　　　　　　　　　　☒ Display on Public Page/Menu?　URL: | |
　　　　　　　　　　　☒ Display on Members/Page/Menu?

☒ Custom Page 3?　　Title: | Our Future |　　　Upload Page ...
　　　　　　　　　　　☐ Display Image?　　　　　　Upload Image ...
　　　　　　　　　　　☒ Display Icon?
　　　　　　　　　　　☐ Link to Custom Page?　　　Upload Icon ...
　　　　　　　　　　　☒ Display on Public Page/Menu?　URL: | |
　　　　　　　　　　　☒ Display on Members/Page/Menu?

☐ Custom Page 4?　　Title: | |　　　　　　　　Upload Page ...

FIG. 92C

Page & Image Configuration Information                                                          Page 4 of 4

☐ Display Image?
☐ Display Icon?
☐ Link to Custom Page?
☒ Display on Public Page/Menu?        URL: [          ]
☒ Display on Members/Page/Menu?

[Upload Image ...]
[Upload Icon ...]

_____ Back to Top _____

- To save your changes, click on *Submit*.
- To undo your changes, click on *Reset*.
- To cancel your changes, click on *Cancel*.

○ SUBMIT           ○ RESET            ○ CANCEL

The XYZ Organization
12345 Main Street
Somewhere, Maryland 99999
123-456-7890
someone@somewhere.com
(Number of Visits: 1706)

Party Information  Page 1 of 4

The XYZ Organization  Login: John E Doe
  Page: Party Information

Previous Page  Member Page  Site Map  Login  My Link  Contact Us  Help

Click on the links below to view different sections of this page
Party  Agenda Items  Minutes  Comments  Contacts  All Sections After making any changes, click on either *Submit* or *Cancel* near the bottom of the page.

Party Information  ─ 264

- The *Title* field is required.
- By setting the *Is Hot* toggle, the item is highlighted and searchable/indexed by that criteria..
- Select a value from the *Type* and *Frequency* popups as needed.
- Enter an external web address in the URL field to provide an external link to more information.

| Title: | Birthday | Is Hot?: | ☐ |
| Type: | Other | URL: | |

Description

Summary:  A humdinger.

Detail:

Demographic Information

- By setting the *For Members Only* toggle, only members can view this item.
- By setting a value for a demographic field, the item is searchable/indexed by the demographic.
- By setting the associated *For ... Only* toggle, only members assigned the demographic can view this item.

For Members Only?:  ☐

| Employee Type: | | For Employee Type Only?: | ☐ |
| Job Code: | | For Job Code Only?: | ☐ |
| Cost Center: | | For Cost Center Only?: | ☐ |
| Job Title: | | For Job Title Only?: | ☐ |

Time/Place Information

- By setting the *Requires Time/Place* toggle, the information will be displayed to the user.
- For date fields, use the *mm/dd/yyyy* format (e.g., 02/22/1991).
- For time fields, use the *HH:MM AM/PM* format (e.g., 12:15 PM).

FIG. 93A

Party Information    Page 2 of 4

| | | | |
|---|---|---|---|
| Requires Time/Place?: | ☒ | Location: | ☐ |
| Date: | | Date Posted: | 06/24/1999 |
| Begin Time: | | End Time: | |

*Registration/Payment Information*

- By setting the *Registration Required* toggle, the user can register online for the item.
- By setting the *Payment Required* toggle, the user can pay online for the item.
- Members will be charged the *Member Price*.
- Non-members will be charged the *Non-Member Price*.
- For money fields, use the #,###.## format (e.g., 1,150.29).

— 264

| | | | |
|---|---|---|---|
| Registration Required?: | ☒ | | |
| Payment Required?: | ☒ | | |
| Member Price: | 44.00 | Non-Member Price: | 55.00 |
| Billing Address Required?: | ☒ | Shipping Address Required?: | ☒ |

*Optional Components*

Check the following toggles if you want to include the following components:

- A list of agenda items (note: provide a title that represents the plural form).
- A list of minutes (note: provide a title that represents the plural form).
- A list of contacts (note: provide a title that represents the plural form).
- A list of comments.
- A custom image:
    1. To upload the custom image, click on *Upload Image*.
- A cusom page:
    1. To upload the custom page, click on *Upload Page*.
    2. Alternatively, set the *Link to Custom Page* toggle and enter a web address in the URL field.

| | | | |
|---|---|---|---|
| Display Agenda Items?: | ☒ | Agenda Item Title: | Agenda Items |
| Display Minutes?: | ☒ | Minute Title: | Minutes |
| Display Contacts?: | ☒ | Contact Title: | Contacts |
| Display Address?: | ☐ | Address Title: | Address |
| Display Comments?: | ☒ | | |
| Display Custom Image?: | ☐ | [ Upload Image ... ] | |
| Display Custom Page?: | ☒ | Custom Page Title: | More Information |
| | | | [ Upload Page ... ] |
| Link to Custom Page?: | ☒ | URL: | |

*More Information*

Click on the following hyperlink to download the document:

<p align="center">More Information</p>

<p align="center"><u>Back To Top</u></p>

Agenda Items

*Number of Items:* 0

FIG. 93B

Party Information

Commands

- To create a new item, click on *Create*.

CREATE

264

Back To Top

 Minutes

*Number of Items:* 0

Commands

- To create a new item, click on *Create*.

CREATE

Back To Top

 Comments

- To view a comment, click on *View*.
- To modify a comment, click on *Modify*, followed by *Submit*.
- To delete a comment, click on *Delete*, followed by *Submit*.

*Number of Items:* 2

|  | Author<br>Date Posted | Comment |
|---|---|---|
| VIEW<br>MODIFY<br>DELETE | David E Fleskes<br>08/27/1999 | xdasfdad |
| VIEW<br>MODIFY<br>DELETE | David E Fleskes<br>08/27/1999 | Section3 |

Commands

- To find a specific item or items in the list, click on *Search*.
- To custom sort and display the list, click on *Sort*.
- To create a new item, click on *Create*.

SORT    CREATE

Back To Top

 Contacts

FIG. 93C

Party Information

*Number of Items:* 0

*Commands*

- To find a specific item or items in the list, click on *Search*.
- To create a new item, click on *Create*.

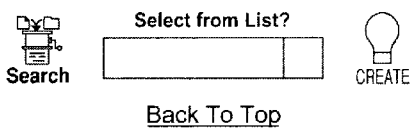

Search    Select from List?    CREATE

Back To Top

- To register, click on *Register*.
- To request more information, click on *Request More Information*.
- To save your changes, click on *Submit*.
- To undo your changes, click on *Reset*.
- To cancel your changes, click on *Cancel*.

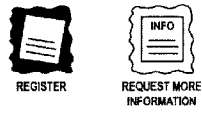

REGISTER    REQUEST MORE INFORMATION

SUBMIT    RESET    CANCEL

The XYZ Organization
12345 Main Street
Somewhere, Maryland 99999
123-456-7890
someone@somewhere.com
(Number of Visits: 1706)

Demographic Configuration Information

The XYZ Organization  
Login: John E Doe  
Page: Organization Demographic Information Previous Page  Member Page  Site Map  Login  My Link  Contact Us  Help Click on the links below to view different sections of this page  
Organization Demographic  Individual Demographic  All Sections After making any changes, click on either *Submit* or *Cancel* near the bottom of the page.

 Organization Demographic Information ⟵ 266

Provide information about your site's demographics (custom types/values) for the organization members.

- Set the Demographic X toggle if you want:
    - To display a list of values ed to assign to or search for an organization.
    - The list of values is displayed whereever organization information is displayed.

- Enter a value in the *Title* field:
    - The Title is used as the demographic name.
    - For instance, you might enter the title, *Chapter Type* or *Business Type*.

- To add a new demographic value:
    - Enter a value to the left of the *Add Value* button.
    - Click on the *Add Value* button.
    - For instance, you might enter the value, *National* or *Computer Store*.

- To remove an existing demographic value:
    - Select a value from the list to the left of the *Remove Value* button.
    - Click on the *Remove Value* button.

 Demographic1?:                     Title: Business Type  
                                                     [       ] Add Value  
                                                     [       ] Remove Value

 Demographic2?:                     Title: Property Type  
                                                     [       ] Add Value  
                                                     [       ] Remove Value

 Demographic3?:                     Title: Association Type  
                                                     [       ] Add Value  
                                                     [       ] Remove Value

 Demographic4?:                     Title: Chapter Type  
                                                     [       ] Add Value  
                                                     [       ] Remove Value

Organization Demographic Information

Provide information about your site's demographics (custom types/values) for the individual members.

FIG. 94A

Demographic Configuration Information                                                                                 Page 2 of 2

- Set the Demographic X toggle if you want:
    - To display a list of values ed to assign to or search for an individual.
    - The list of values is displayed whereever individual information is displayed.
    - You can also assign the demographic values to components, such as meeting or events.

- Enter a value in the *Title* field:
    - The Title is used as the demographic name.
    - For instance, you might enter the title, *Employee Type* or *Job Code*.

- To add a new demographic value:                                                                         ╱— 266
    - Enter a value to the left of the *Add Value* button.
    - Click on the *Add Value* button.
    - For instance, you might enter the value, *Manager* or *888*.

- To remove an existing demographic value:
    - Select a value from the list to the left of the *Remove Value* button.
    - Click on the *Remove Value* button.

☒ Demographic1?:                                            Title: | Employee Type |
                                                                       | Add Value     |
                                                                       | Remove Value  |

☒ Demographic2?:                                            Title: | Job Code      |
                                                                       | Add Value     |
                                                                       | Remove Value  |

☒ Demographic3?:                                            Title: | Cost Center   |
                                                                       | Add Value     |
                                                                       | Remove Value  |

☒ Demographic4?:                                            Title: | Job Title     |
                                                                       | Add Value     |
                                                                       | Remove Value  |

<u>Back To Top</u>

- To save your changes, click on *Submit*.
- To undo your changes, click on *Reset*.
- To cancel your changes, click on *Cancel*.

 SUBMIT          RESET          CANCEL

The XYZ Organization
12345 Main Street
Somewhere, Maryland 99999
123-456-7890
someone@somewhere.com
(Number of Visits: 1706)

FIG. 94B

APPARATUS AND METHOD FOR AUTOMATICALLY GENERATING WORLDWIDE WEB PAGES BASED ON REAL WORLD DOMAIN DATA

This application claims the benefit of U.S. Provisional Application No. 60/101,144, filed Sep. 18, 1998.

FIELD OF THE INVENTION

The present invention relates generally to an apparatus and method for providing users with web pages for use on the internet. More particularly, the present invention relates to an apparatus and method for entering entity information into a database and generating web pages, and for the updating of information appearing on the generated web pages. The web pages and associated databases may have restricted access or unlimited access.

BACKGROUND

Web page development for individuals and organizations is generally performed on an as-needed basis by individuals knowledgeable in the available programming languages commonly used to assemble web pages. Each developer creates web pages having a look and feel unique to the developer or contracting organization. Consistency among web pages and web sites is strictly a function of the developer or contracting organization and whether the look and feel of another series of web pages or web sites were copied.

An organization desiring a web page may end up with a web page, or series of web pages, having the look and feel of another site, but data unique to the user must be incorporated in order for the web page to be useful. For example, the look and feel of a web site for a local volunteer fire station may be copied for use by a volunteer organization to feed the hungry, but different data about the organization and its behavior and efforts will still need to be input. While a volunteer fire station solicits volunteers and monetary donations, the organization to feed the hungry, solicits volunteers, monetary donations and food items. The data appearing on the web page requires updating, and since the two organizations have different variables and requirements, different data formats and/or presentation formats may be required. This can be labor intensive for a web page developer having many such organizational clients and web pages.

Likewise, the cost to an organization desiring its own web page for web page development and/or hosting is not reduced by the repetitive nature of the web page because significant work must still be performed by the developer. That is, regardless of whether the web page is custom built or copied and modified, someone knowledgeable in web page programming and design must still determine and incorporate the necessary programming changes.

SUMMARY OF THE INVENTION

The program of the present invention allows a user to input data about an object, an entity, an organization, or group of related units, and automatically creates a series of web pages presenting the data. These web pages may be used for public access of the input data, private access of the input data, or both. The resulting web pages can also be used to update the data the pages represent, preferably using a Graphical User Interface (GUI).

The same dynamically generated page can be used in a view-only fashion when the user does not have sufficient security access rights, or can be used to update the information or trigger some behavioral action when the user does have sufficient access rights. In general, some parts of the pages may be editable, or expose features or functionality based on who is using the application, the applications' state, or the type of information being managed. Authorization and authentication is designed in the model as this is part of the real world problem domain.

In order to allow a user to input data about an organization from which web pages can be generated, a model of a specific, real world domain such as organization management, including its business, property, and individual members, league management (golf, soccer, and the like), or shopping malls is created. The model can be applied to any real world problem, even problems that do not directly include organizations, businesses, properties and people. Other real world problems can include, for example, classified advertising systems in newspapers or other medium, auction systems, home video rental systems, personal medical history systems, inventory systems, or any other system where the tracking of individual units or groups of units is desirable. The creation of such a "meta" model of a real world domain is only possible if characteristics and behavior of the instances of the domain are mostly homogeneous. For example, a model and application that implements the concepts and behavior of classified ads can be fabricated. Classified ads in newspapers generally have the same look and feel, so an instance or incarnation of the model can be used by or provided to every newspaper organization with no or minimal additional development. In this manner, the problem is solved once, but many instances of the model can be initiated.

From such a model, an infrastructure can be built in which many instances of the real world domain are created. Such infrastructure includes components such as network communications, and servers to run such processes as databases, https, and web based applications.

Depending on the model, instances may or may not be related to each other. Identification of places in the model and infrastructure in which instances can be customized is based on some characteristic, such as type, usage, and behavior. An instance can be customized, such as including customer provided information in Hyper Text Mark-up Language (HTML) pages or other document types such as Word, Excel, PDF, and graphics, a configuration panel in which functionality and/or security access may be dynamically enabled or disabled, or by allowing labels or types to be dynamically defined per instance.

Information of a model includes the primary objects and their relationships with each other, defining characteristics and types, formatted reports of information, and links to static information such as articles or images.

The behavior of the model includes searches based on qualified queries, interactive data management (modify data, create or delete objects, add or remove objects to and from relationships), calculations, summaries, online ordering/payment, bi-directional communication (eg. questions, comments, chat room, or electronic mail), information tracking and notification of changes, reminders, and others.

Maintenance of data of an instance of the domain is performed by an administrator of the instance or users of the instance. Alternatively, the creator of the model or maintainer of the infrastructure, such as an internet service provider, or ISP, can perform maintenance of the domain.

Using a model of entities, data can be utilized to generate web pages for multiple organizations within the same application such that the web pages have a similar look and feel. For example, if a group of homeowners associations have similar looking web pages containing similar information in a similar format, users can quickly and efficiently maneuver through the accessible information. Development costs to instantiate a new instance of the homeowner association is minimized or altogether eliminated.

An object of the present invention is to create web pages for entities based on models and predetermined templates or designs and incorporation of data about the entity into the web pages. The information displayed on the web pages can be text information, graphic information or a combination of text and graphic information, and the information may be static or animated. Additionally, the data may be input by the user when responding to queries, or the data may be drawn from a database created in response to queries or input separately.

The present invention further provides an apparatus and method that allows a user to alter the web pages created in response to the user supplied data.

Another object of the present invention is to store both the data used to create the web pages and the generated web pages, thereby reducing cycle time.

A still further object of the present invention is to allow rapid user updates of web pages.

Another object of the present invention is the generation of web pages for a variety of organizations based on models of organizations, wherein the data about the organization is entered or edited via a graphical user interface, or GUI.

Links to other web pages from the pages created may or may not be present, that is, a user is able to incorporate hyperlinks into the pages. Similarly, hyperlinks may be inserted into the web pages by the model in order to link all organizations having the same type of web page produced by the same development tool supported by this invention.

While the program of the present invention may be installed on a server for access by remote clients, the program may be operated on any computer such that a user can use the application on the user's local system in a stand-alone fashion, that is, not connected to the internet, WAN, LAN, or other network, in order to solve the problems for which the application was designed.

These and other features and advantages of the present invention are described in or are apparent from the following detailed description of the preferred embodiments.

BRIEF DESCRIPTION OF THE DRAWINGS

The preferred embodiments of the present invention will be described in detail, with reference to the following figures, wherein:

FIGS. 5A and 5B are a master web page created in accordance with an embodiment of the invention that is displayable on a visual display device;

FIGS. 6A and 6B are a detail web page created in accordance with an embodiment of the present invention that is displayable on a visual display device;

FIGS. 36–40 shows class diagrams for the classes in the ReferenceObject framework shown in FIG. 35;

FIGS. 42–86 show class diagrams for the Presentation framework classes shown in FIG. 41;

FIG. 88 is a member login web page created in accordance with an embodiment of the present invention that is displayable on a visual display device;

FIGS. 89A and 89B are a main home page created in accordance with an embodiment of the present invention that is displayable on a visual display device;

FIGS. 90A and 90B are a member home page created in accordance with an embodiment of the present invention that is displayable on a visual display device.

FIGS. 91A–91F are a web site configuration page created in accordance with an embodiment of the present invention that is displayable on a visual display device;

FIGS. 92A–92D are a page and image configuration page created in accordance with an embodiment of the present invention that is displayable on a visual display device;

FIGS. 93A–93D are a party information page created in accordance with an embodiment of the present invention that is displayable on a visual display device; and FIGS. 94A–94B are a demographic information page created in accordance with an embodiment of the present invention that is displayable on a visual display device.

Throughout the drawings, like reference numerals will be understood to refer to like parts and components. Additionally, since web-based pages vary in size, multiple figures of a web-based page can represent a single web page.

DETAILED DESCRIPTION OF THE PREFERRED EMBODIMENT

Figure 1:
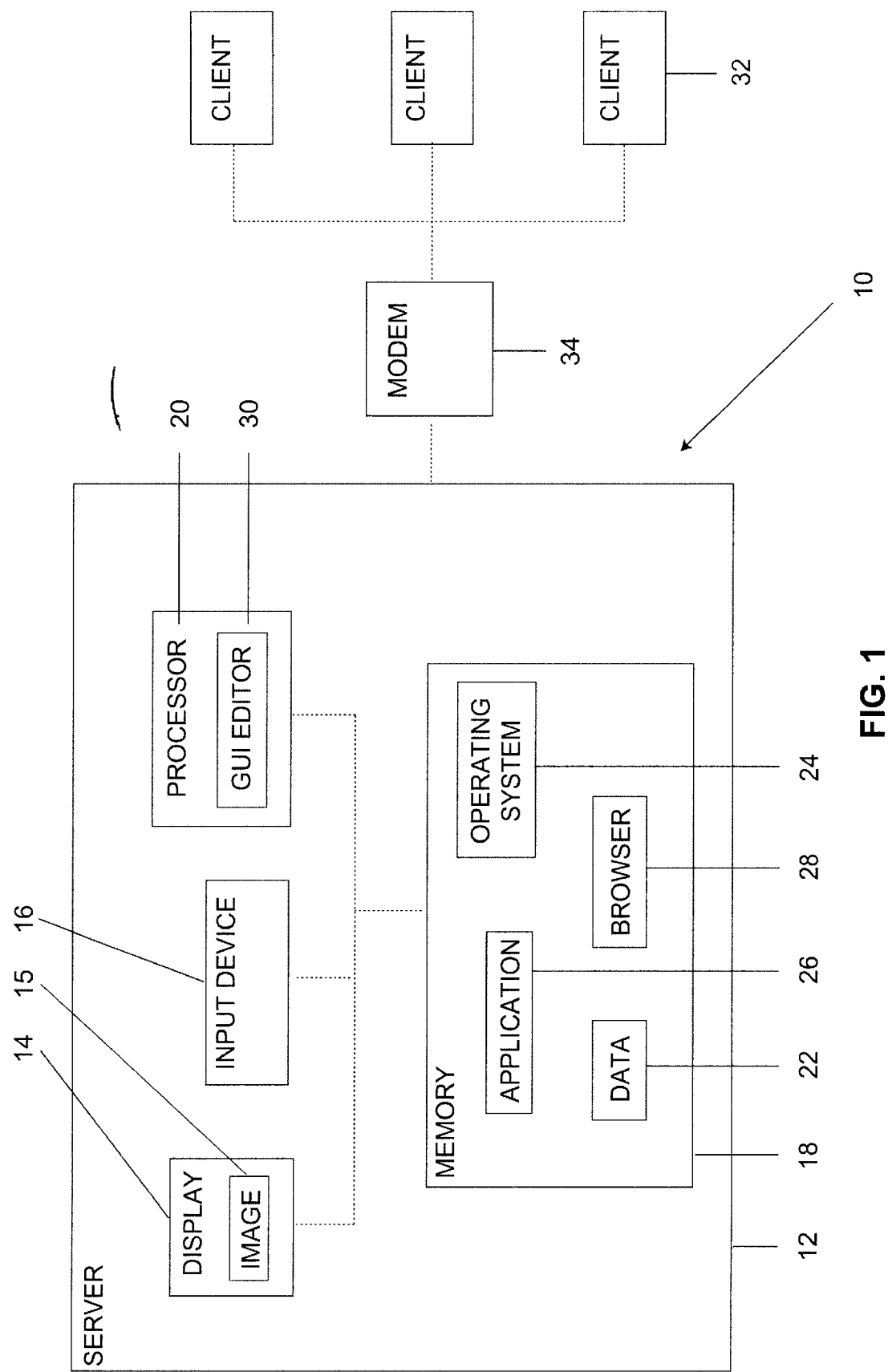
FIG. 1 is a functional block diagram of a system for generating world wide web pages based on real world data in accordance with an embodiment of the invention.

FIG. 1 is a block diagram of a system 10 for generating world wide web pages based on information input to or taken from a database. The system 10 includes a server 12. The server 12 includes a display device 14, a user input device 16, and a memory 18 connected to a processor 20. The display device 14 can be a visual display device such as a CRT monitor, an LCD monitor, a projector and screen, a printer, or any other device that allows a user to visually observe images or data.

The user input device 16 can be a keyboard, a pointing device such as a mouse, a touch screen, a visual interface, an audio interface such as a microphone with an analog-to-digital audio converter, a scanner, a tape reader, or any other device that allows a user to input information to the system 10.

The memory 18 is preferably implemented using static or dynamic RAM. However, the memory 18 can also be implemented using a floppy disk and disk drive, a writeable optical disk and disk drive, a hard drive, flash memory, and the like.

The processor 20 is preferably implemented on a programmed general purpose computer. However, the processor can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing the apparatus, flowcharts and diagrams shown in FIGS. 1–90, can be used to implement the processor.

In the preferred embodiment, the system 10 for generating World Wide Web pages includes a computer software program installed on a personal computer having an INTEL PENTIUM processor. It will be understood by one skilled in the art that the computer software program can be installed and executed on many different kinds of personnel computers, minicomputers and mainframe computers, having different processor architectures, for example, x86-based, including INTEL 486, INTEL PENTIUM, INTEL PENTIUM II, INTEL PENTIUM III, Advanced Micro Devices AMD K-6, and CYRIX CIII, MACINTOSH G3 MOTOROLA processor based computers, and workstations based on SPARC and ULTRA-SPARC architecture, and all of their respective clones.

The processor 20 is connected to memory 18 and can retrieve and process data stored in a database 22 in the memory 18. The processor 20 can also retrieve and execute other items stored in memory 18, including an operating system 24, an application program 26, and a browser 28. It will also be understood by one skilled in the art that computer software can be executed in many different operating system environments, for example, DOS-based, WINDOWS-based, MACINTOSH OS-based, UNIX-based, SOLARIS-based, LINUX-based, and other proprietary and nonproprietary operating systems as may be available. WINDOWS and MACINTOSH OS are advanced graphical user interfaces (GUI). The use of an object-oriented GUI will be specifically addressed below. The server 12 may also call web helper applications, called "applets", such as those produced with Sun Microsystem's JAVA programming language or other programming languages, to provide additional interface functions. The application program 26 is the application program that implements the present invention. The browser 28 may be any browser known in the art, for example, NETSCAPE NAVIGATOR or MICROSOFT EXPLORER.

The processor 20 includes a Graphical User Interface (GUI) editor 30 which allows a user to edit an image displayed on the display device 14. The image may be generated from the data 22 by the processor 20, or may be input through the user input device 16. The image displayed on the visual display device 14 may take the form of any image output by the application program 26 of the present invention, and may be the result of data input by the user, or a combination of computer-generated images and user-input data.

One preferred implementation of an apparatus and method according to the present invention is based on object-oriented Graphical User Interface (GUI) toolkits known in the art. The GUI toolkits are designed to support the rapid construction of application GUIs. Since GUIs and GUI toolkits are known in the art of graphical user interfaces, including design and implementation of GUIs, a detailed description of GUI performance is not necessary. In general, however, most GUIs are event driven. An event may be the click of a mouse button or the touch of the screen on a visual interface. When a GUI receives an event, the event is delivered to the relevant elements. Event handler code for the selected element is executed in response to the delivered event. The selected element passes the event to its parent if the event needs processing by the parent element. The response to an event may change the state of the selected element, its parent, its children, and so on. When the element tree is changed in this manner, the GUI toolkit tracks where the modifications have occurred and which elements have had their appearances changed.

The image 15 is, for example, a representation of a page display for use on the World Wide Web or other client/server image sharing relationship, including, for example, a local area network (LAN), a wide area network (WAN), another type of network, the internet, an intranet, a direct network connection, and the like.

The image 15 that is displayed is a GUI having various features common to computer generated windows known in the art. For example, the displayed web-type page or image 15 is movable about the visual display device 14 using the same methods in the art of moving computer generated windows.

From the image 15, the user can review data retrieved from the database 22, input new data, edit existing data, upload a file, or download a file or report. The user can provide a data file in a well-defined format that will load file contents into a database 22. For example, the file can be in ASCII format, HTML, or any other known data format. A utility program within the application 26 interprets the file format, and creates, deletes, or modifies objects, such as rows in a database, based on the file format. Similarly, large data sets can be extracted to a file with a well-defined format and returned to the user. File uploads are useful when the user desires to input large amounts of like-kind data. File downloads are useful when the user needs to extract data, such as extracting data to be used as input data for an external system, or if the user desires raw data in ASCII file format. An example of a file download is when membership dues are extracted and input into the user's accounting system.

After data is input to a database 22, the application program 26 in accordance with the present invention can generate images that can be displayed as web pages, visible to a user on a display device 14 with the use of a web browser 28 or other web page viewing program. The web pages for a particular data set may be retrieved via the World Wide Web by users 32 remote from the processor 20. When the processor 20 is located, for example, on a server 12, clients 32 may access the server 12 via a modem 34. A modem 34 according to the present invention may be any communications interface device common to computer communications, and may include conventional modems known in the art, which may be wired or wireless. Similarly, clients 32 may be on a LAN or WAN with the server 12, using methods known in the art, or clients 32 may access the application 26 locally on a system via a browser 28. The system 10 illustrated in the preferred embodiment is merely exemplary and is not intended to limit the scope of the present invention. However, the Internet and World Wide Web provide existing capabilities between computers sufficient to provide the necessary connections.

Communications over the Internet and operation of the Internet are well known, and need not be discussed. Transfer of information over the Internet and World Wide Web is also well known, for example, using protocols such as HTTP, MIME and HTML, and need not be discussed in detail.

In the preferred embodiment, the application 26 is an object-oriented computer program. The application can be written using any object-oriented programming language known in the art. The use of software objects and object-oriented databases or relational databases with object-oriented semantics, and in particular their ability to encapsulate data and methods for operating on that data in a single structure, provide certain degrees of freedom and functionality for the storage, transfer, and processing of information. By using objects for the transmission of the control files, and an object-oriented database for storage of these files, independent storage of the data by the user is avoided, and the data and methods of the object can be made available to other objects in the database or program for further processing. Object oriented data structures, databases, programs, and processing are generally discussed in Grady Booch, *Object-Oriented Analysis and Design With Applications*, ($2^{nd}$ ed. 1994), incorporated herein by reference. The following description of the preferred embodiment will discuss the use of objects. Other methods for storing, transferring, and processing information, such as the use of relational databases, binary files, or procedural programs can also be used, either as part of or as a substitute for portions of the disclosed application program 26.

Figure 2:
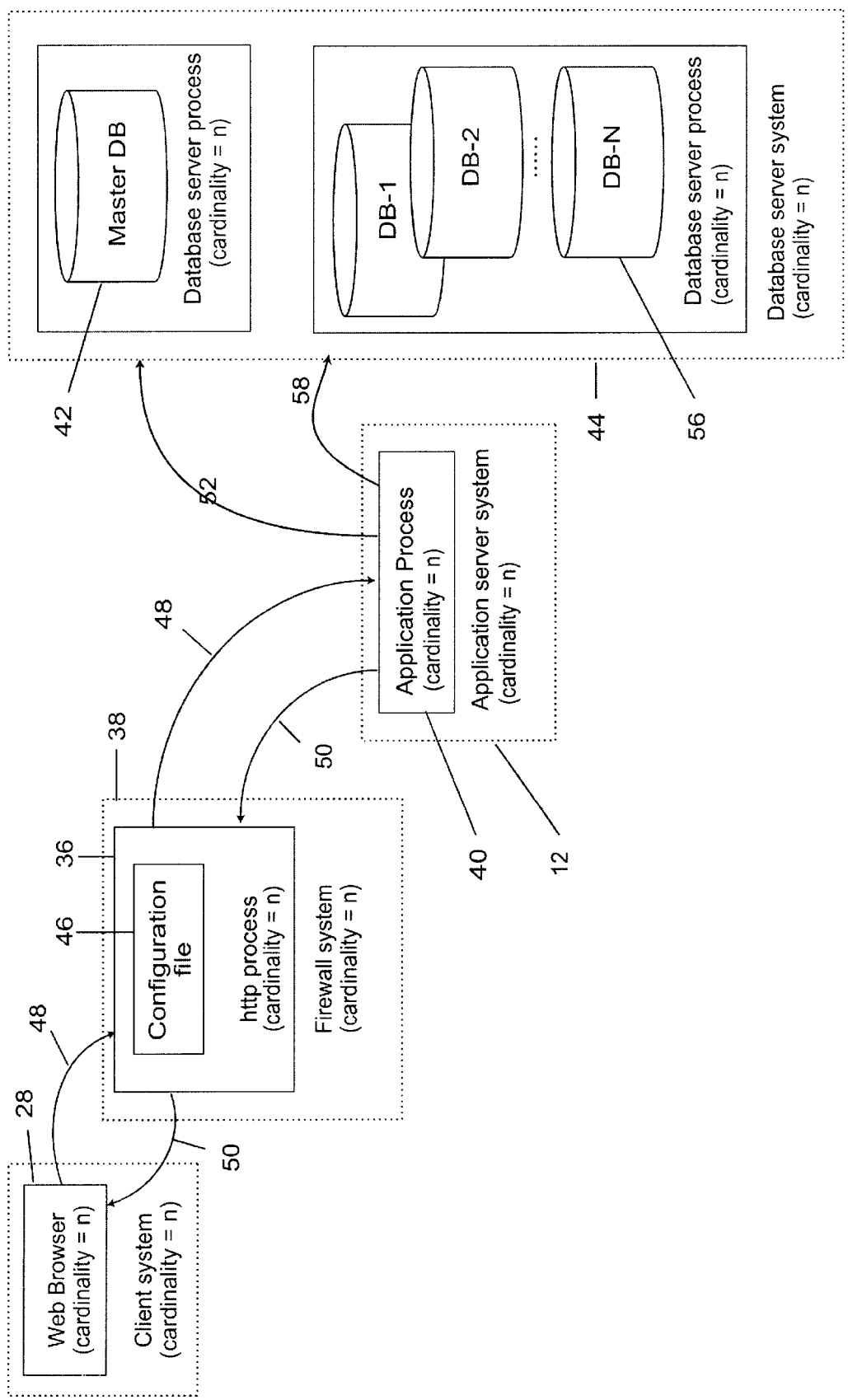
FIG. 2 is a preferred system architecture diagram of a system for generating world wide web pages based on real world data in accordance with an embodiment of the invention.

FIG. 2 illustrates the system and process architecture of the preferred embodiment of the present invention. Four processes are directly involved in any round trip transaction initiated by an end-user, or client 32. These are web browsers 28, http daemon processes (httpd) 36 at a firewall 38, application processes 40 on an application server 12, and databases 42 which can be stored in server 12 or in a separate database server 44.

The system design allows any number of application processes 40 to run concurrently on any number of systems 10. In order to provide scale in terms of the number of transactions that can be maintained, there are no restrictions on the number of application processes 40 running except those limited by the physical resources of the system 10 and network hardware itself, in which case more or faster hardware can be added.

Each of the application processes 40 is configured to run on a set of computer systems 10. The following configuration provides an example of one of many such configurations. This information is provided to understand some of the operational considerations of the preferred embodiment.

The firewall server 38 can have a 400 MHz processor, 256 MB ECC SDRAM, a 4 GB Ultra Wide SCSI 3 hard drive and a 100 MB Ethernet card for running the http daemon processes 36 while functioning as a security firewall. The firewall server 38 runs the Solaris operating system. The firewall system 38 is the only system that is externally network addressable. The primary role of the firewall server 38 is to forward http requests to the application server 12 via the http daemon processes 36.

Most http daemons 36, which are known in the art, provide functionality to rewrite an incoming universal resource locator, URL, into some other URL. The URL that the application 26 expects is of the form:

http://server/cgi-bin/WebObjects/
EOMemberCenter?name=www.somesite.com&type=Organization.

In contrast, the external URL that a client 32 would most likely use is of the form:

www.somesite.com.

The http daemon process 36 performs a translation between a external URL and the URL expected by the application 26.

When a new entity, organization, individual or client 32 wishes to be Internet addressable, it is necessary to modify the http daemon process configuration file 46 to first recognize the external URL, and also provide the translation.

The secondary role of the firewall system 38 is to protect the server 12 from security breaches from an external network, which, for example, can take the form of an individual client 32 or a WAN. With appropriate security features enabled, the server 12 can be reasonably protected from unwanted intrusion, for example, by hackers, viruses, and other destructive forces.

The application server 12 can have a 400 MB processor, 256 MB ECC SDRAM, a 4 GB Ultra Wide SCSI 3 hard drive and a 100 MB Ethernet card. The application server 12 preferably runs the OpenStep 4.2 operating system.

The primary role of the application server 12 is to receive http requests 48 from the http daemon processes 36, process the requests 48, and return a response 50, first through the firewall system 38, then to the client 32. The typical response 50 is in the form of an HTML page. The application process 40 may make database calls 52 to a database server 54, where additional databases 56 reside, in order to fulfill the client's 32 request. Typically, the database 56 resides on server 12.

The database server 54 can have dual 400 MHz processors, 256 MB ECC SDRAM, 4-4 GB Ultra Wide SCSI 3 mirrored hard drives and a 100 MB Ethernet card. Database server 54 preferably runs the Solaris 2.6 operating system configured with an Oracle 8.0.4 database server.

The primary role of the database server 54 is to store database 56, receive database requests 52 from the application processes 40, process the requests 52, and return a response 58 to the calling process 40.

Figure 3:
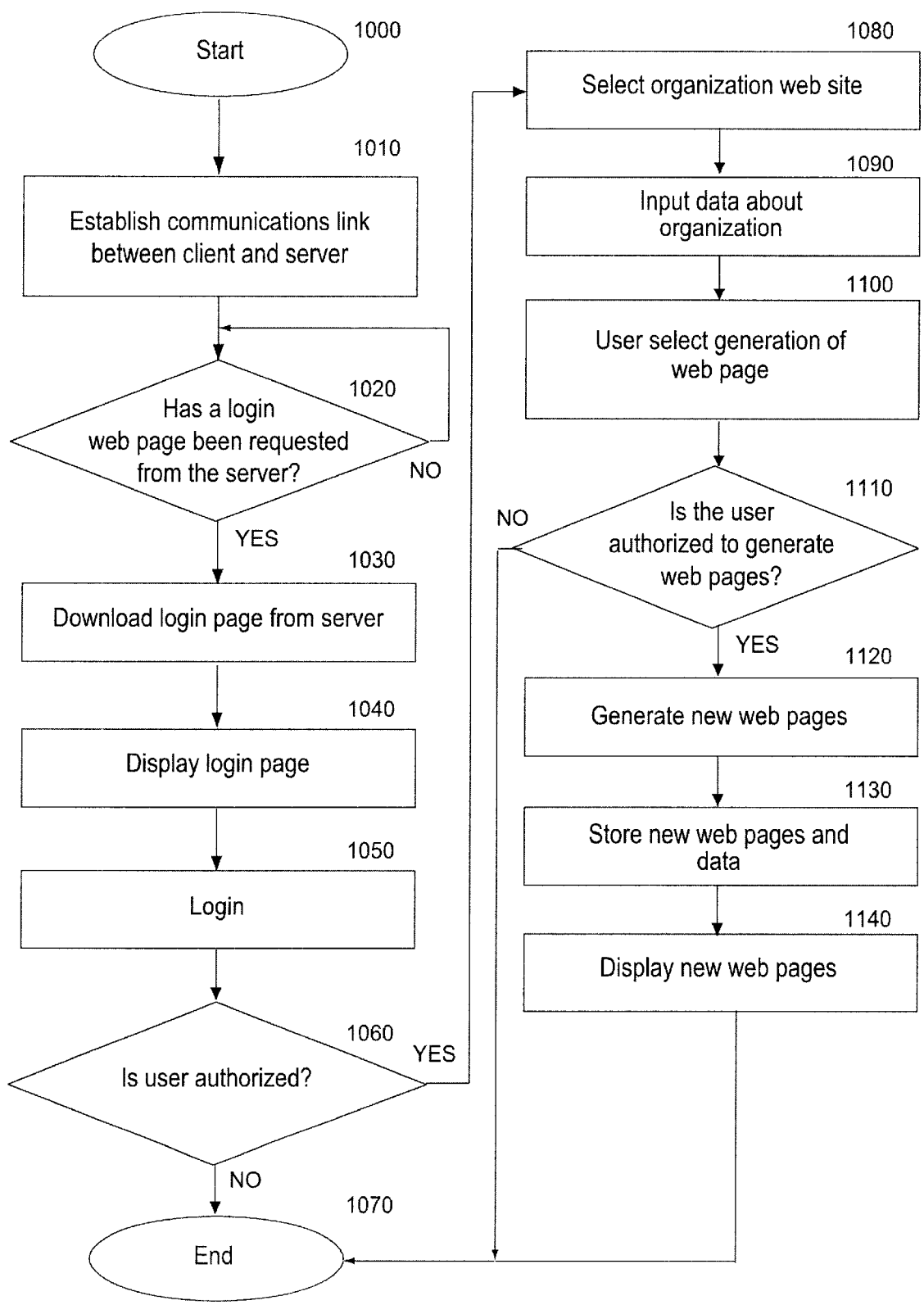
FIG. 3 is a flow chart showing a preferred method for automatically generating world wide web pages in accordance with an embodiment of the invention.

FIG. 3 outlines one preferred method for generating custom web pages according to the present invention. The method begins in step 1000, and continues to step 1010. In step 1010, a communications link is established between the client and the server, and continues to step 1020. In step 1020, the application determines if a login web page has been requested from the server. If no page has been requested, the process returns to step 1010. If a login page has been requested, the process continues to step 1030. Next, in step 1030, a login web page is requested from the database in the distributed network. Next, in step 1040, the requested login page is downloaded from the database and displayed.

In step 1050, the user login is entered and verified by the application. If the user is not authorized in step 1060 to view an organization's web pages, the process ends at step 1070. If the user is authorized, then the process continues to step 1080.

In step 1080, the user selects an organization's web site, and continues to step 1090. In step 1090, the user enters data about the organization into the web site, and continues to step 1100. In step 1100, the user elects to generate new web pages. In step S1110, the application determines whether the user is authorized to alter web pages. If the user is not authorized, the process ends at step 1070. If the user is authorized to generate new web pages, the process continues to step 1020.

In step 1120, the application generates new web pages for the organization based on user input data. Next, in step 1130, the new web pages that were dynamically generated and the data are stored. Next, in step 1140, the new web pages are displayed and the process in step 1070.

Figure 4:
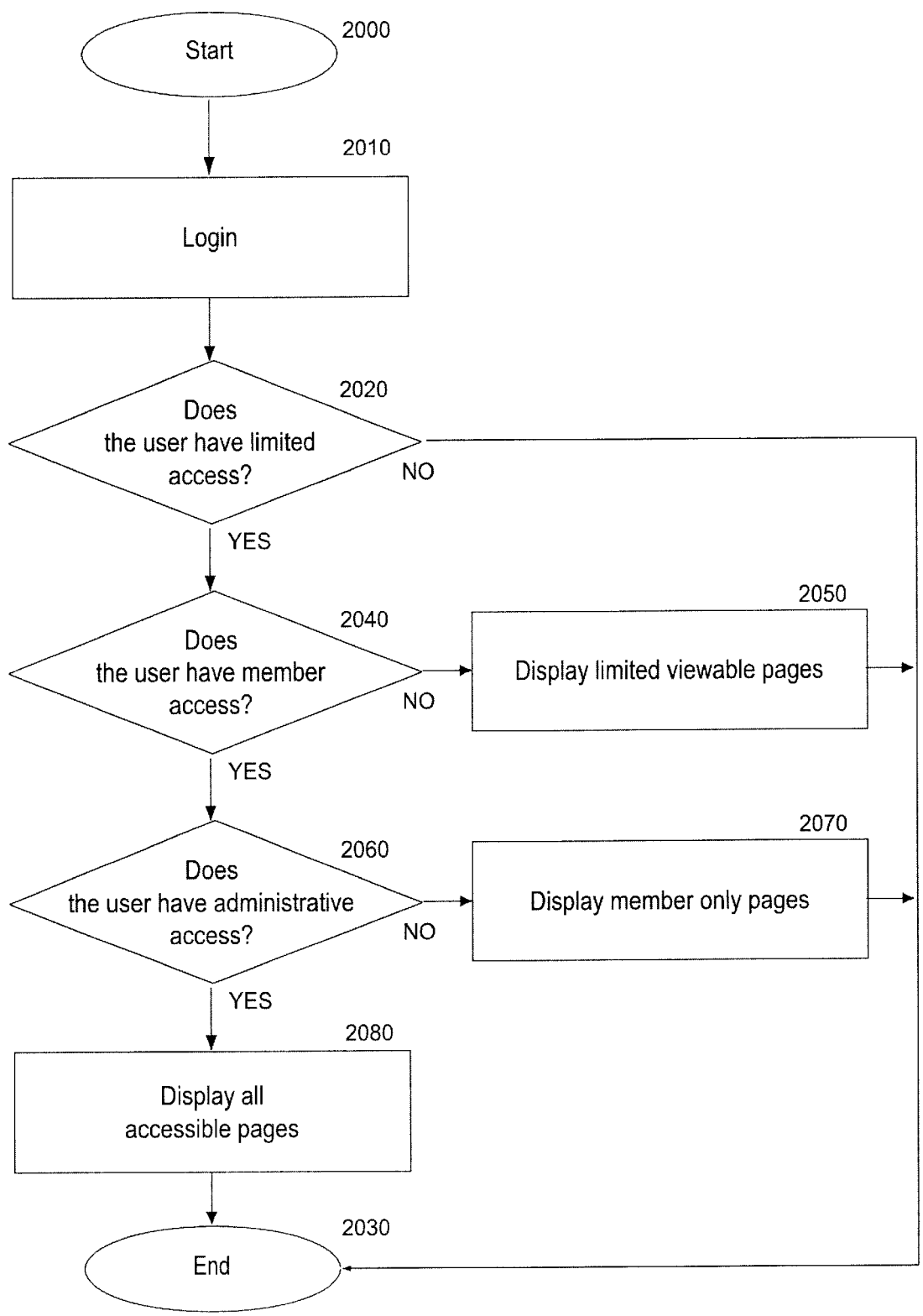
FIG. 4 is a flow chart showing a preferred login sequence for accessing the world wide web page generator in accordance with an embodiment of the invention.

FIG. 4 outlines one login method for determining the level of authorization of a user. The method begins in step 2000, and continues to step 2010. In step 2010, the users enters a login character sequence, and proceeds to step 2020. In step 2020, the application compares the user login to user identification data in the database and determines whether what level of access the user is entitled. If the user is not authorized for any access, the process ends at step 2030. If the user has limited access, the proceeds to step 2040. In step 2040, the application determines whether the user has member access. If the user does not have member access, the process proceeds to step 2050. In step 2050, the user has restricted access to view certain pages of the organization, and the process ends at step 2030.

If the user has member access, the process proceeds to step 2060. In step 2060, the application determines whether the user has administrative access. If the user does not have administrative access, the process proceeds to step 2070. In step 2070, the user is given member only access to the organization's web site, and the process ends at step 2030.

If the user has administrative access, the process proceeds to step 2080. In step 2080, the application grants the user full administrative access, which can include the ability to enter data for any field, update the database and generate revised or new web pages. The process ends at step 2030.

In this manner, a user 32 can have different privileges. For example, a user 32 who is not a member of the organization may only be allowed to view certain pages. A member can be allowed to view additional pages, plus have the ability to enter or change certain information. A staff user can have still additional privileges, such as accounting, and the ability to update certain web pages. A chief administrative user can have access to all pages and all data, and can create and delete information and web pages.

In the preferred embodiment, the application 26 is a web page generator. The web page generator is an Internet based application that manages a variety of information about a hierarchical organization and its members, for example, associations, businesses, properties, and their respective members.

Each page or image 15 of the application is a GUI page that navigates and/or manages some part of the object model is either a Master or a Detail. A Master page contains a list of items from which a user 32 can select and open up a second page to view the details of the selected item.

FIGS. 5A and 5B show a representative Master page 60 displayed by the processor 20 on display 14. The Master page 60 contains filtering criteria, such as types 62, selection lists 64, buttons 66 or text fields 68. Wild cards that match zero or more characters can be used within the text fields 68. The filtering criteria correspond to attribute values of the objects to be fetched. When the user selects a search button 70, the database 56 is queried for the objects that match the search criteria. A list of matching objects is presented in a list, table, or the like. The user may then perform some operation, for example, view, modify, delete, or report on, or perform some custom action on the list.

An example of a Detail page 72 is shown in FIGS. 6A and 6B. The Detail page 72 contains the detail information of one of the objects selected from a Master page 60. The Detail page 72 may represent some portion of the instance graph rooted at the selected object. For example, depending on the needs and design of the organization, the Detail page 72 can be configured to display only the attributes of the selected object, or it may display the attributes of the children of the selected object by traversing relationships to those children. A user can go from one Detail page to another Detail page per application design. Thus, it is not necessary to arrive at a Detail page 72 from a Master page 60. Ancillary pages may also be available, for example, help pages and other user-provided pages that can be arrived at from Master or Detail pages as the administrator desires.

Each Master or Detail page can have links to each Detail section within the page, data entry or usage errors, Online help, Master or Detail sections, or page commands and footer information.

Clicking on the View button 74 next to an item, an image rendering the Detail is returned. If the Master page 60 is editable, then Create 76, Modify 78, and Delete 80 buttons are also available. By clicking on the Create button 76, a new item is created and rendered in the Detail page 72. By clicking on the Modify button 78, the existing item is rendered and editable in the Detail page 72. By clicking on the Delete button 80, the item is deleted.

The display of an item's detail is separated into logical groups of information. For example, primary information, description information, optional components such as custom page or image, or a list of comments, and the like.

Near the bottom of each window, page or image 15, are commands that affect the entire page, for example Submit button 82. After changes are made by a user 32, clicking on the Submit button 82 commits the changes to the database 56. Clicking on the Cancel button 84 or Reset button 86 roll backs any changes. Help on the page is available by clicking on the Help button 88 in any image 15.

Lists 64 in a Master page can have options to sort the items 90, forward 92 or reverse 94 sort the items, display a summary 96 or Detail view 98 of the items, search and filtering options 100 to find a single or set of specific items, create a summary or Detail report of the items, or send email 104 to every item in the list if the items have an email address.

The program disclosed herein, for example, allows a user to input data about an organization, or group of related units, and automatically creates a series of web pages. These web pages may be used for public access of the input data, private access of the input data, or both. The resulting web pages can also be used to update data about which the page represents, preferably using a GUI.

The same dynamically generated web page or image 15 in FIG. 1 can be used in a view-only fashion when the user does not have sufficient security access rights, or can be used to update the information or trigger some behavioral action when the user does have sufficient access rights. In general, some parts of the pages may be editable, or expose features or functionality based on who is using the application, the application's state, or the type of information being managed. Authorization and authentication is designed into the model as this is part of the real world problem domain. The dynamically generated web pages can be customized based on access rights, administrator-defined configuration, or administrator-defined labels. Access rights are based on security measures. Administrator-defined configuration may be, for example, when one entity needs events, whereas another entity does not. An administrator can use a configuration panel to customize itself by setting, for example, a Boolean variable for whether to display the event component. Administrator-defined labels on page displays may be, for example, attached to icons in a page 60 in FIG. 5 that the administrator changes the first label to read "local area map", the second label to read "site layout", and the third to read "picture of our building".

Updates to the information occur online, that is, when the client 32 is connected to the server 12 of FIG. 1. Any inputted information is validated, for example by checking for correct or allowable length, type, value, or not empty as appropriate for the application 26. If multiple users are updating the same information/data at the same time, logic is in place in the application process 40 that detects if a first user has saved the changes in the database 56 of FIG. 2. If the first user has saved the corrections/changes, a warning message is returned to the second user, alerting the second user that another user has updated the data since it was last fetched from the database 56, and the second user is queried as to whether to continue, retrieve the updated data, or abort the editing process.

Users can enter arbitrary web addresses to the web page when in edit mode. The result is that in view mode, a hyperlink to another web site is apparent. Users can also enter an entity name/identifier, for example where the entity is some object class in the model, while in edit mode. In view mode, the entered entity name/identifier appears as a hyperlink, which returns a generated page that contains the information about that entity.

Help pages, or help screens, can also be generated using the application disclosed herein. For example, help pages can be generated using the current real page as a template. In most internet browsers known in the art, there is a "view source" or equivalent menu option that can be used to print out the HTML for the real page being viewed. When selected for a web page generated by the application disclosed herein, the HTML of the dynamically generated page will be output, displayed or printed. To create a help page for the real page, the output HTML is saved to a file, where it can be edited. Descriptive and explanatory verbiage can be added as desired by a user at selected places in the image, and may be in a color suitable to the level of importance. Controls, labels, value fields, buttons, and the like may be turned into hyperlinks which can jump to some section of the page which contains a description of what the component is, does, means, or is used for, for example. In the application on the real page, a help button is added which hyperlinks to the help page. The help page can look like the real page, but with the annotated help information displayed. Other methods can be used to generate online help using various other tools and methods known in the art.

The web page generator application 26 of FIG. 1 defines any number of associations, organizations, businesses, sports teams, or any collection or grouping of people, places or things. Within an association many types of businesses, organizations and properties, for example apartments, homes, vacation rental units, are supported. Links between associations, businesses, properties, and person are also supported. Associations can be managed horizontally or vertically, for example, according to national, regional, state or local levels. Associations, businesses, and properties may be defined and managed independently of each other or in a hierarchical structure.

The web page generator 26 supports many types of associations, including, for example, Professional Societies, Trade Organizations, Chambers of Commerce, Property Management Organizations such as home owners, realtors and business parks, Unions, Alumni Associations, Greek Organizations such as fraternities and sororities, Association Management Companies, and families.

Each association has membership entities, or membership types, such as Regular, Full, Prospective, Voting, Nonvoting, Affiliate, Honorary, Student, and Special.

For an association, or business, information can be interactively managed. Information that can be managed by the application 26 includes:

---

Budget Summary Work Sheets (both custom and user defined)
Web Site Configuration and Security
Membership Types, Benefits, Requirements
Reminder Notices (e.g. payment, event, etc.)

| | |
|---|---|
| Name, description, types | Addresses and contact information |
| Events and Event Registration | Available Jobs |
| Publications, Products, | Publication, Product, Service |
| Services | Orders |
| Membership information | Membership Application Form |
| Properties and information | Comments |
| Events and Event Registration | Announcements |
| Committees | Education |
| Resources | Legislation |
| Lists of Prospective Members | Membership Dues |
| Membership Information Requests | Membership Applications |
| User provided, arbitrary HTML pages | Calendars |
| Personal Notes | Document Archives |
| Problem and Enhancement Reporting | Image Collages |
| Email groups | Inventory Management |
| News Wire Services | Time Management |
| Donation management | Voting/Polling |
| Virtual Tours | |

---

The web page generator application 26 supports custom information, descriptions and logos, photo images of site, site layout, local area map, bylaws, declarations, rules and procedures, user defined pages, user defined budgets and user defined labels/tags. Additional custom HTML pages/ images may be integrated and tailored to customer needs.

A master index of all associations, businesses, properties, people, and available jobs of interest is maintained in the database 42 of FIG. 2. This allows users of the internet to search, navigate, and report on information based on various criteria, using a search engine application known in the art. The search engine may be provided with the generated web page, or hyperlinked from the web page. For example, using a search engine, a user 32 in FIG. 1 may search to find available jobs or properties based on geography or type. Navigation and reporting is integrated at all levels of association, business, and property.

Electronic mail messages may be sent to tailored lists of associations, businesses or properties. E-mail accounts can be maintained for associations, businesses or properties without other access to electronic mail.

Many different web pages, or images 15 can be generated. For example, A "What's New" web page can be generated that allows users to quickly find out what is new about the association, business or property of interest. A "What's Important" web page can also be generated listing only the information an administrator has marked as important. Additionally, any list of information can be dynamically sorted, reverse sorted, and filtered by type or value to quickly view items of interest.

A reporting subsystem reduces the need for printed material by producing, on demand, print quality formatted files of customized information. The format for these print files is preferably PDF or HTML, but may be any other generic or specific print file type, for example, ASCII, RIF, Word, WordPerfect, and the like. Summary and detail reports are available for all types of information. Special reports, such as name placards, are also supported.

The management of association or business data is oriented to an unsophisticated user by making the application 26 of FIG. 1 easy to use. An online help system is integrated throughout the application 26 to provide information to complete any task.

The number of accesses by client 32, also known as page hits, to each association, business, property, person, or job, may also be recorded in the database 42 of FIG. 2.

An online organization membership application form can also be generated on a web page and used to add new members and track their membership information. Members may pay dues, subscriptions, and items for sale via check, or credit card, debit card, or other available financial transaction protocol.

An association, business, or property may have a unique World Wide Web domain address, or URL, such as "www.myAssociation.com", though a domain address is not required in order to create or host one's own web page content. The web page generator application 26 of FIG. 1 is self-defining, customized per organization type and supports user defined types where appropriate.

Configurable and functional security allows the member entities, for example associations and businesses, to mark information as visible only to staff and administrators, visible only to members, or approved for public access. Different logins can be used to distinguish different access types.

Figure 7:
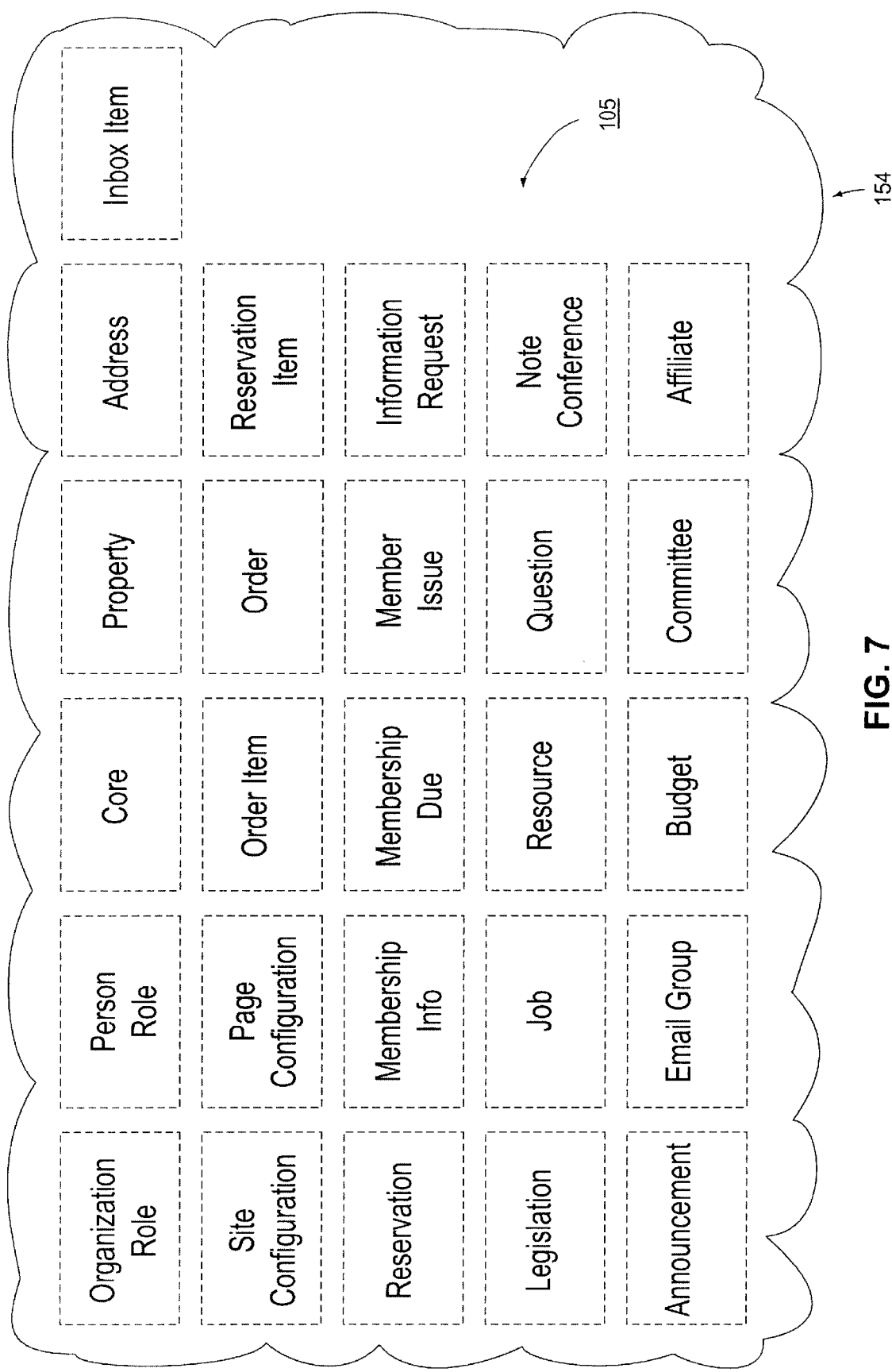
FIG. 7 is a top level class diagram for the preferred persistent object model needed to implement web page generation based on real-world domain data in accordance with an embodiment of the present invention.
Figure 8A:
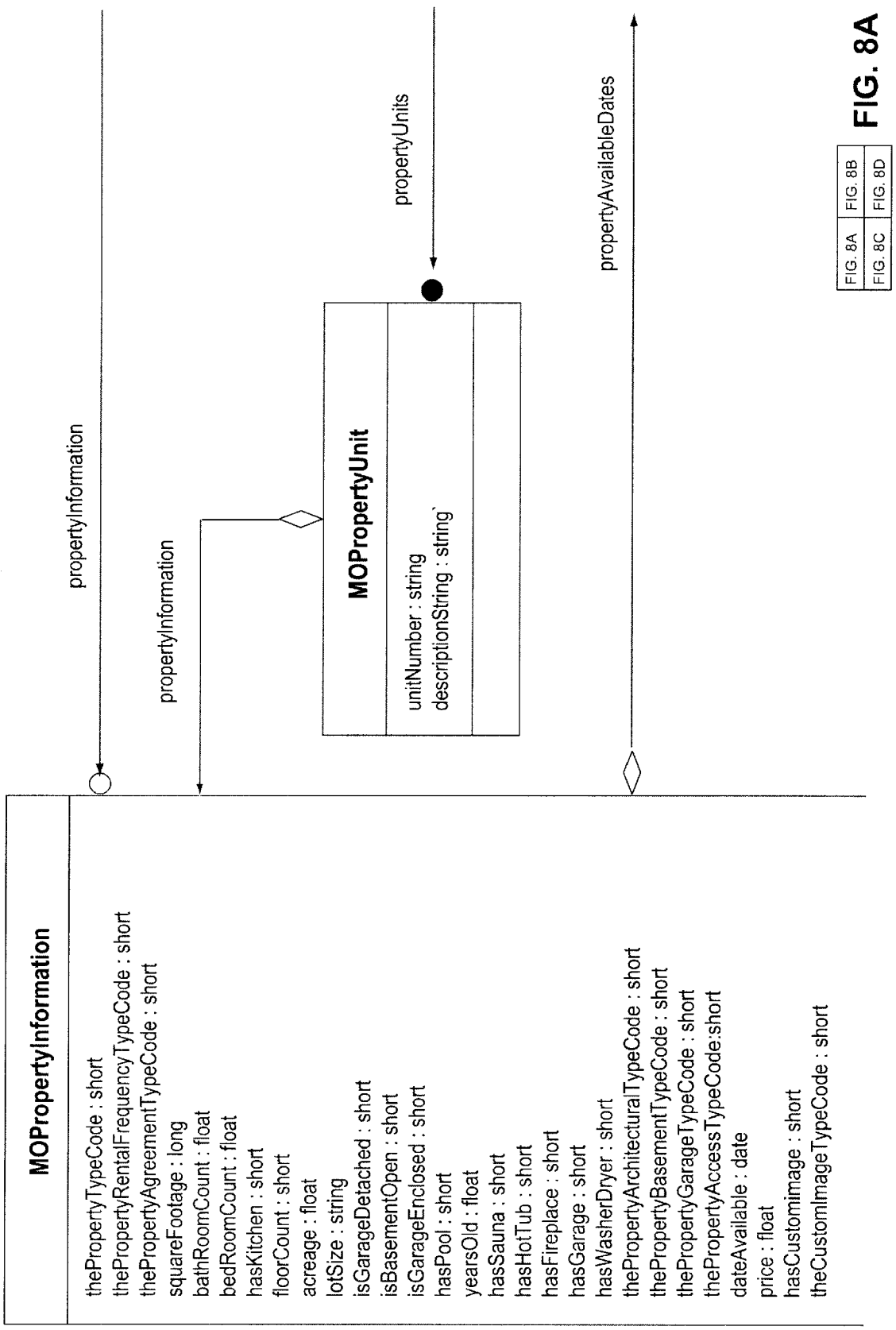
FIGS. 8–33 are class diagrams for the preferred classes shown in FIG. 7.
Figure 8B:
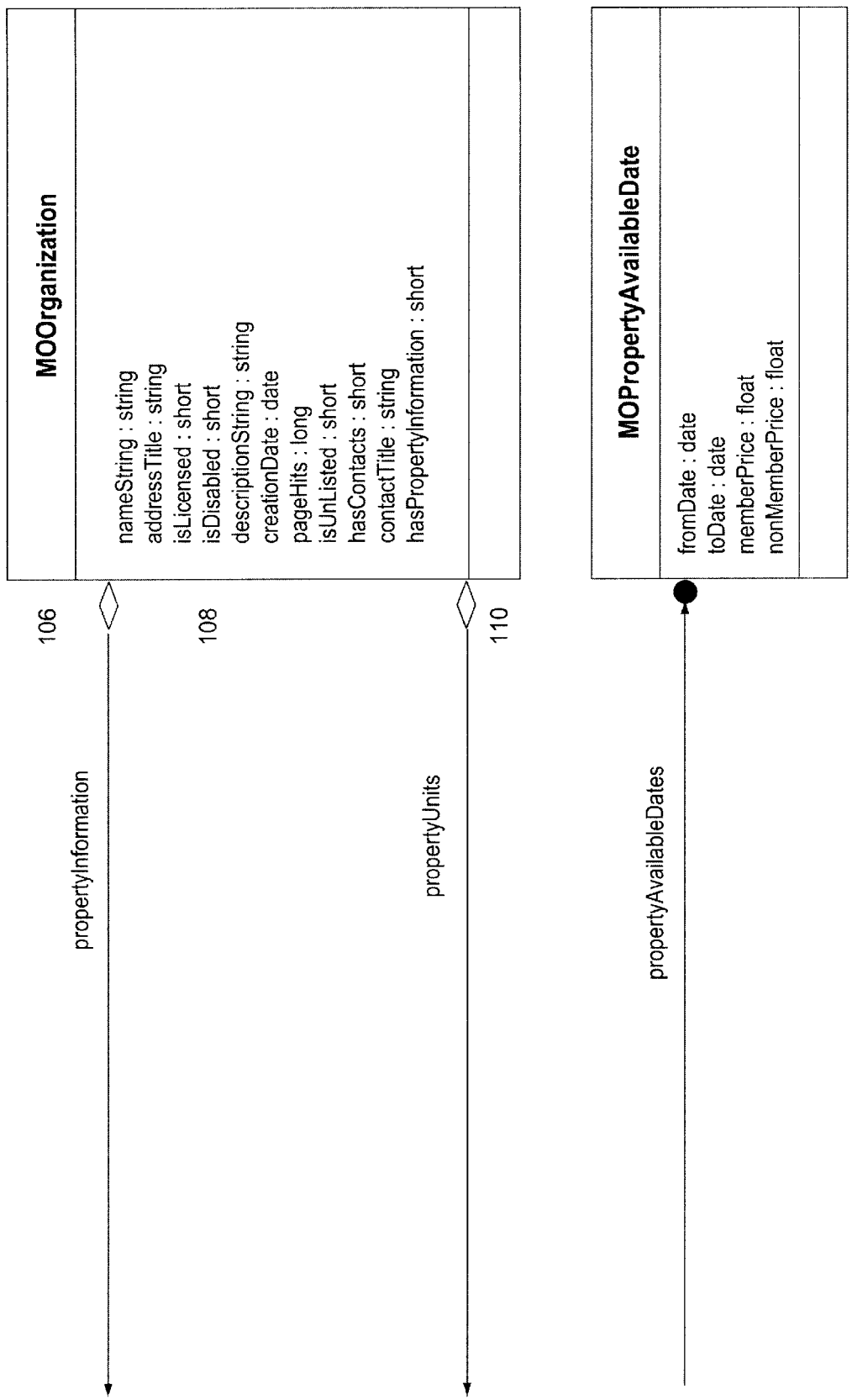
Figure 8C:
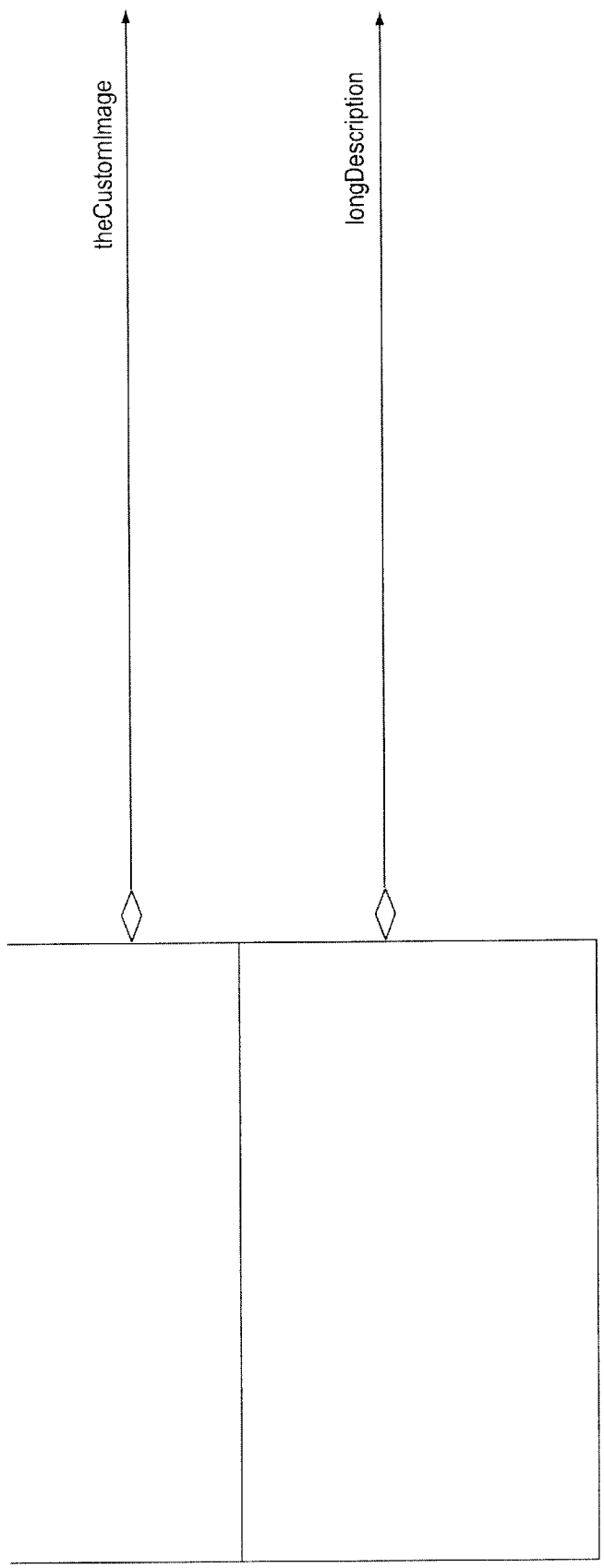
Figure 8D:
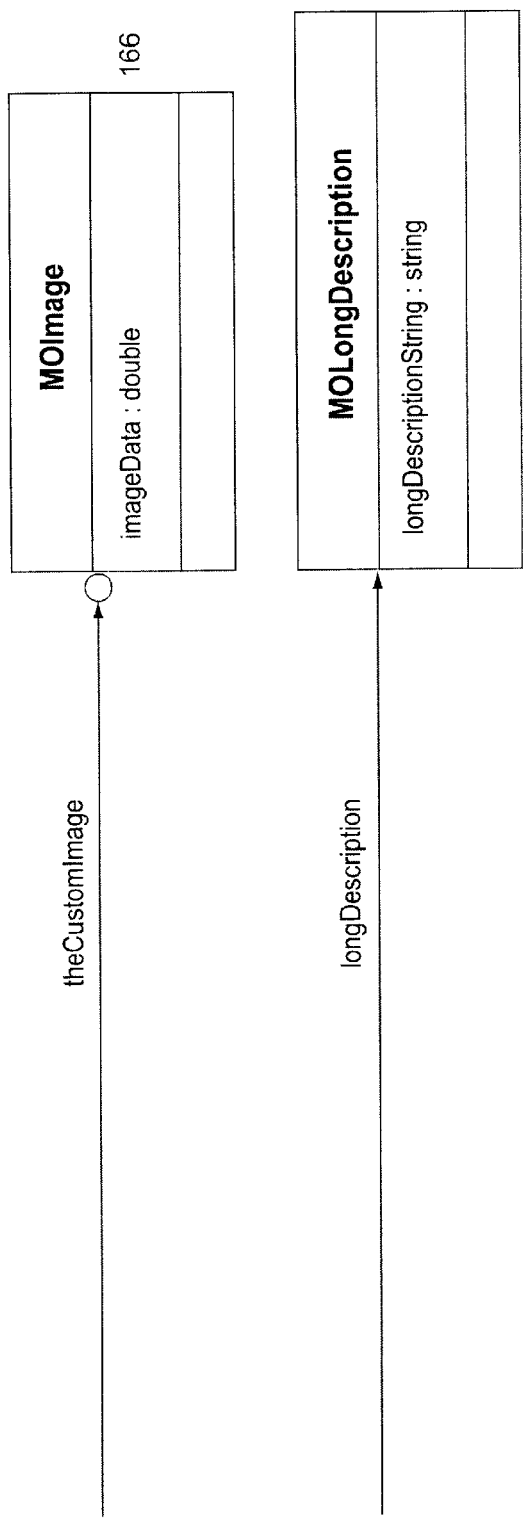
Figure 9A:
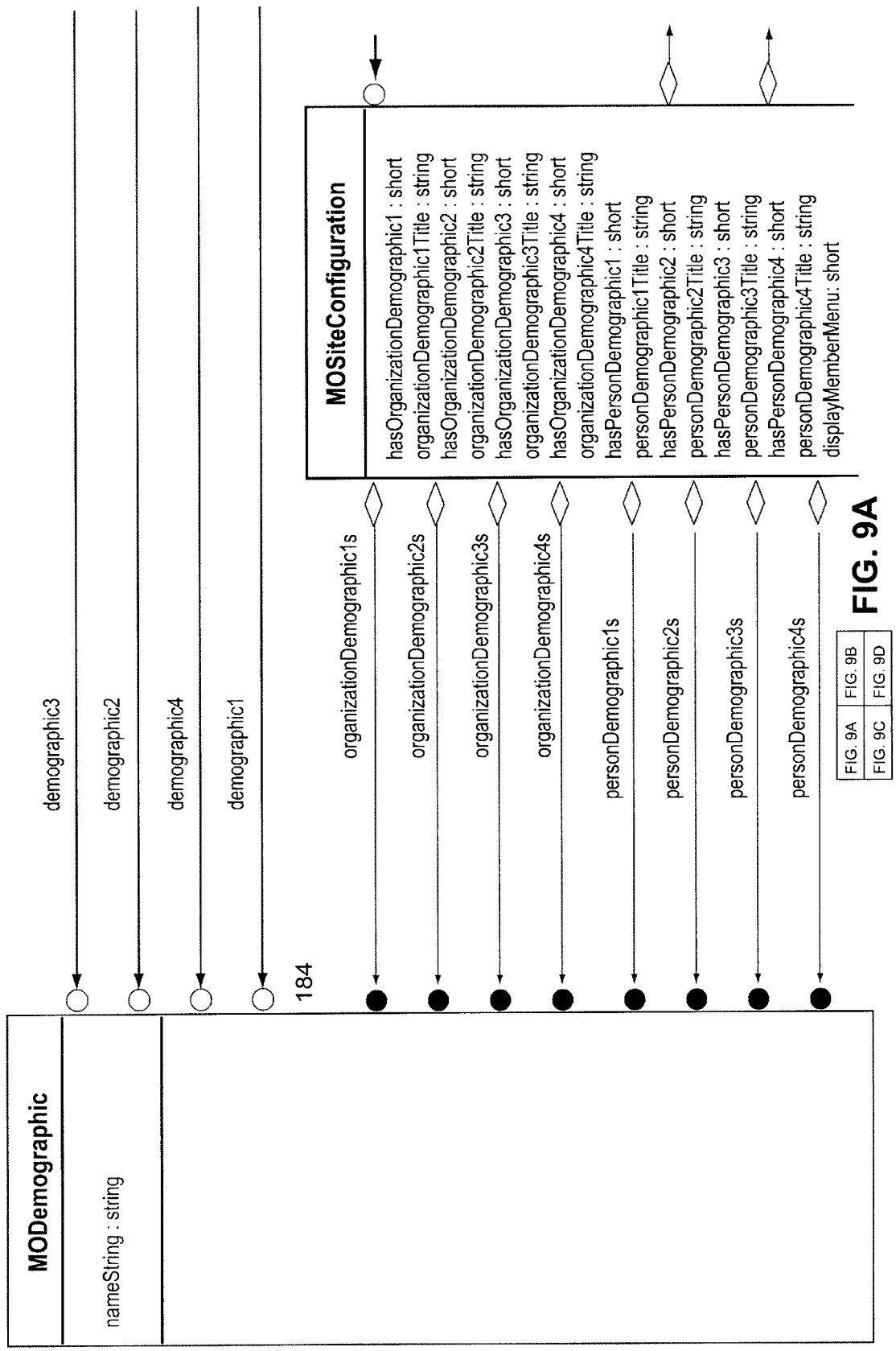
Figure 9B:
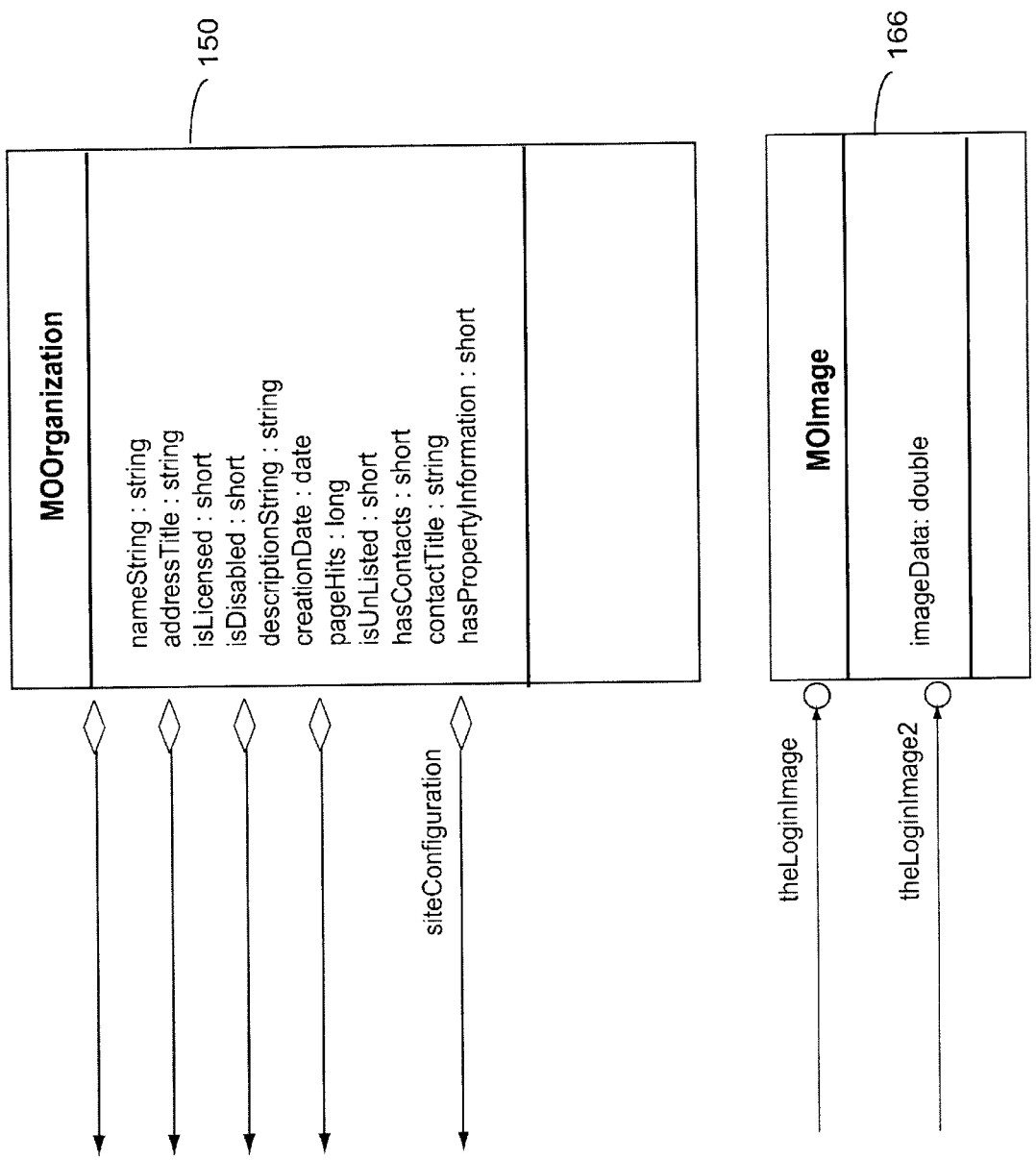
Figure 9C:
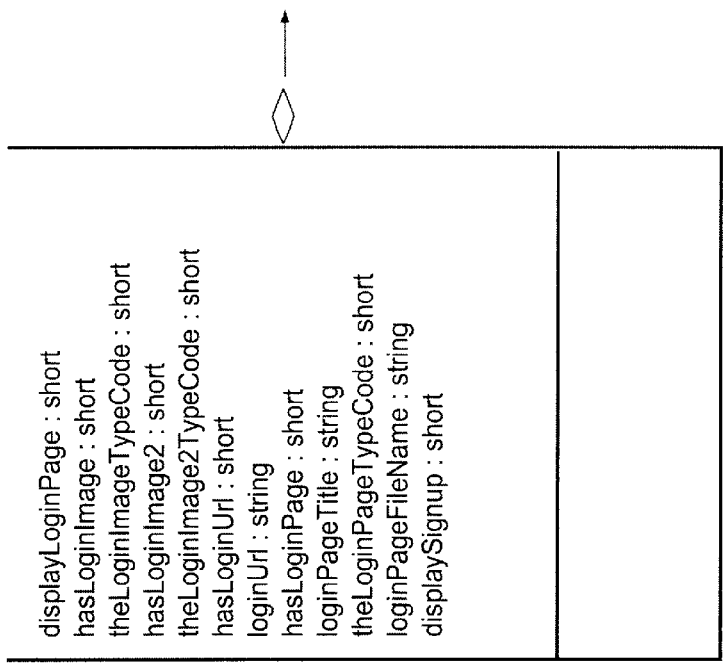
Figure 9D:
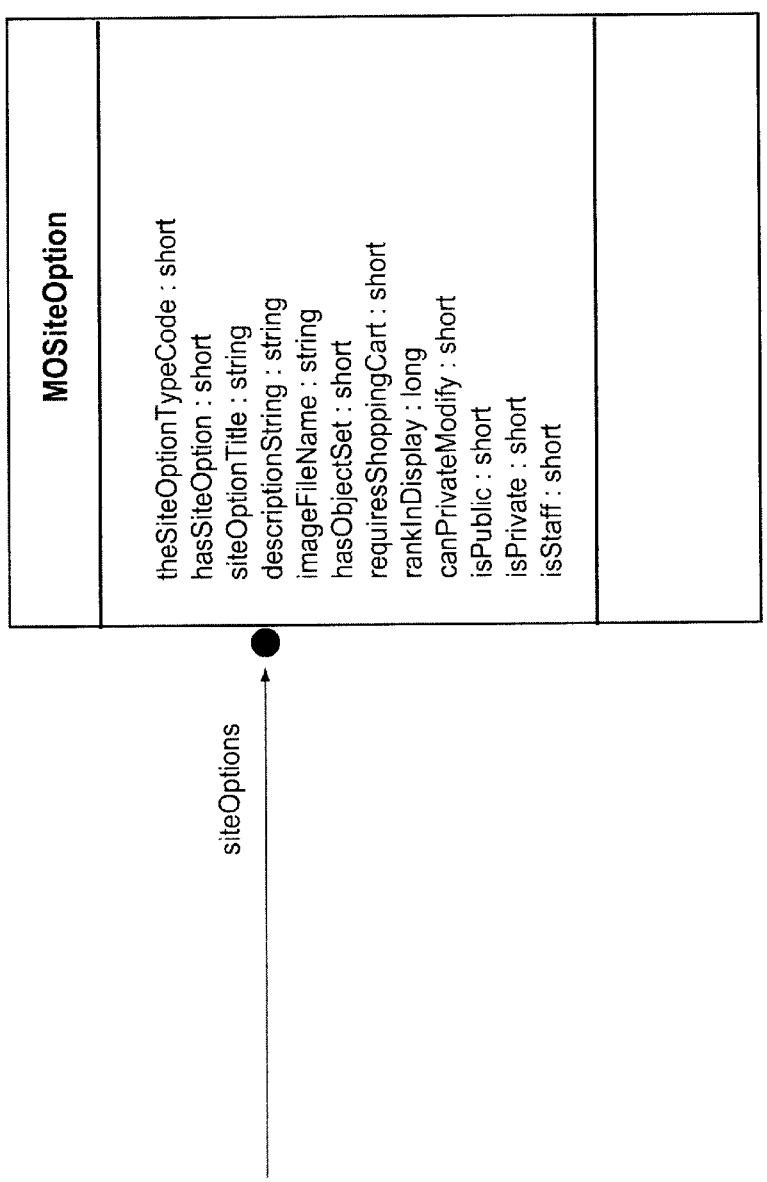
Figure 10:
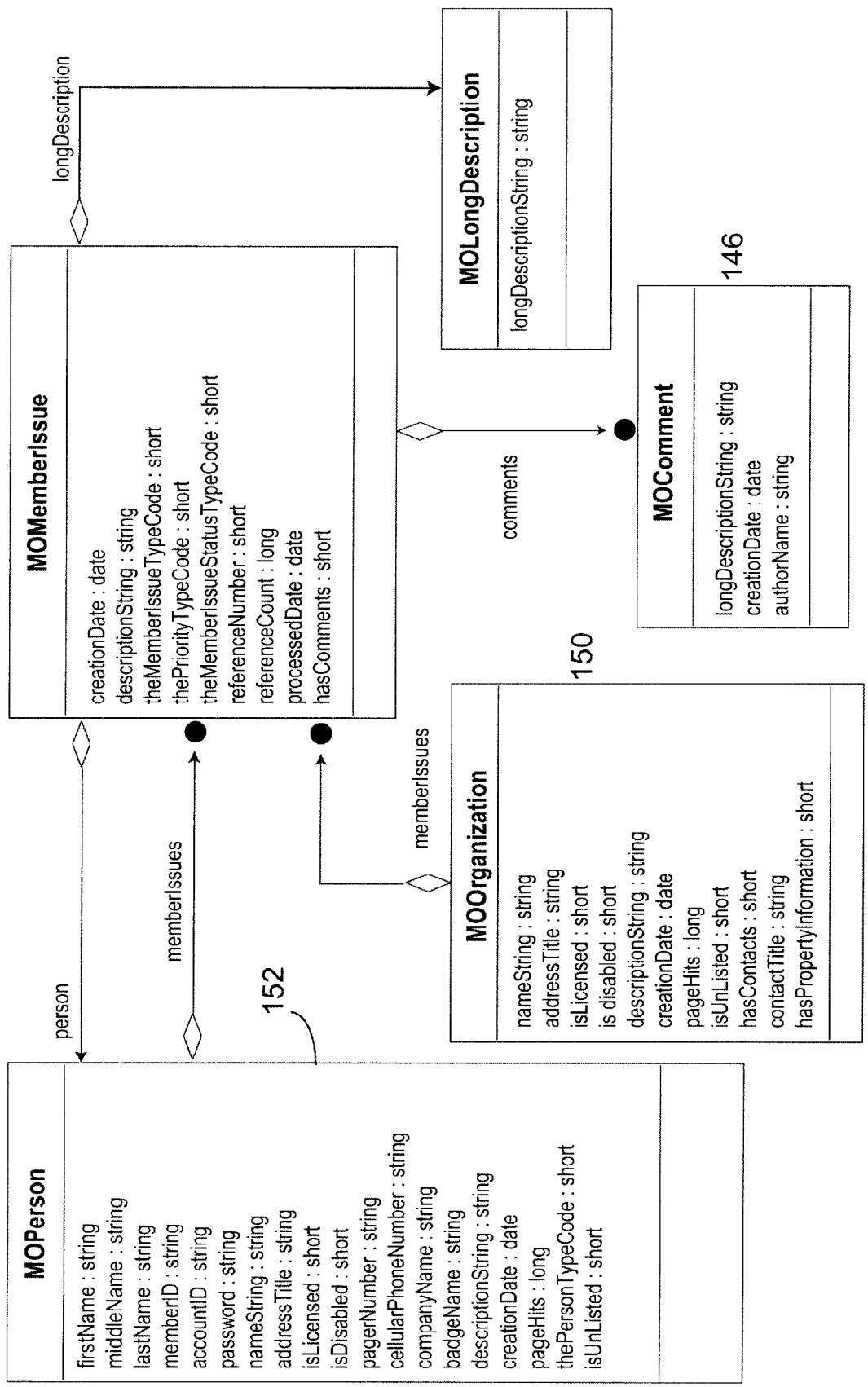
Figure 11:
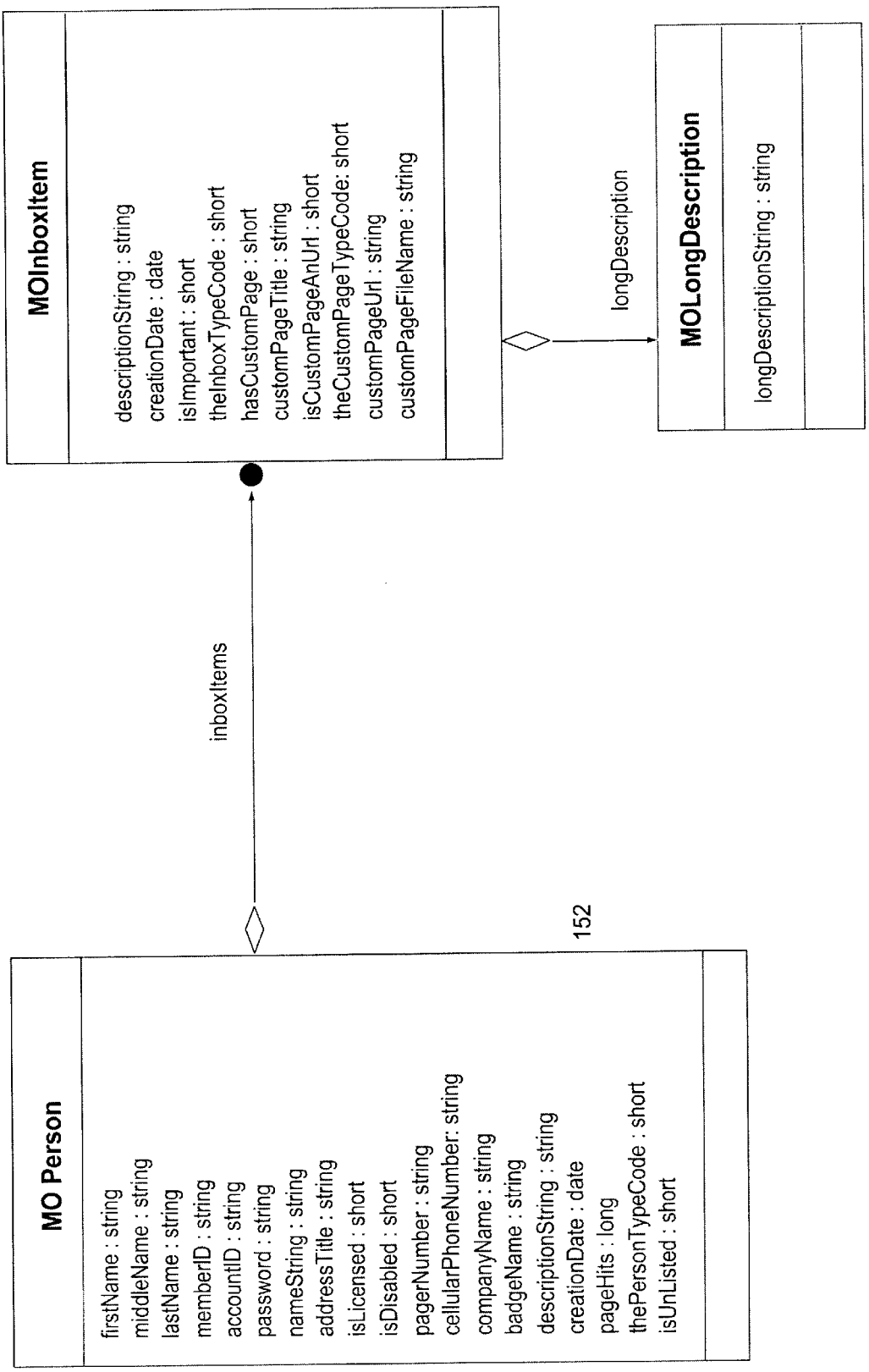
Figure 12:
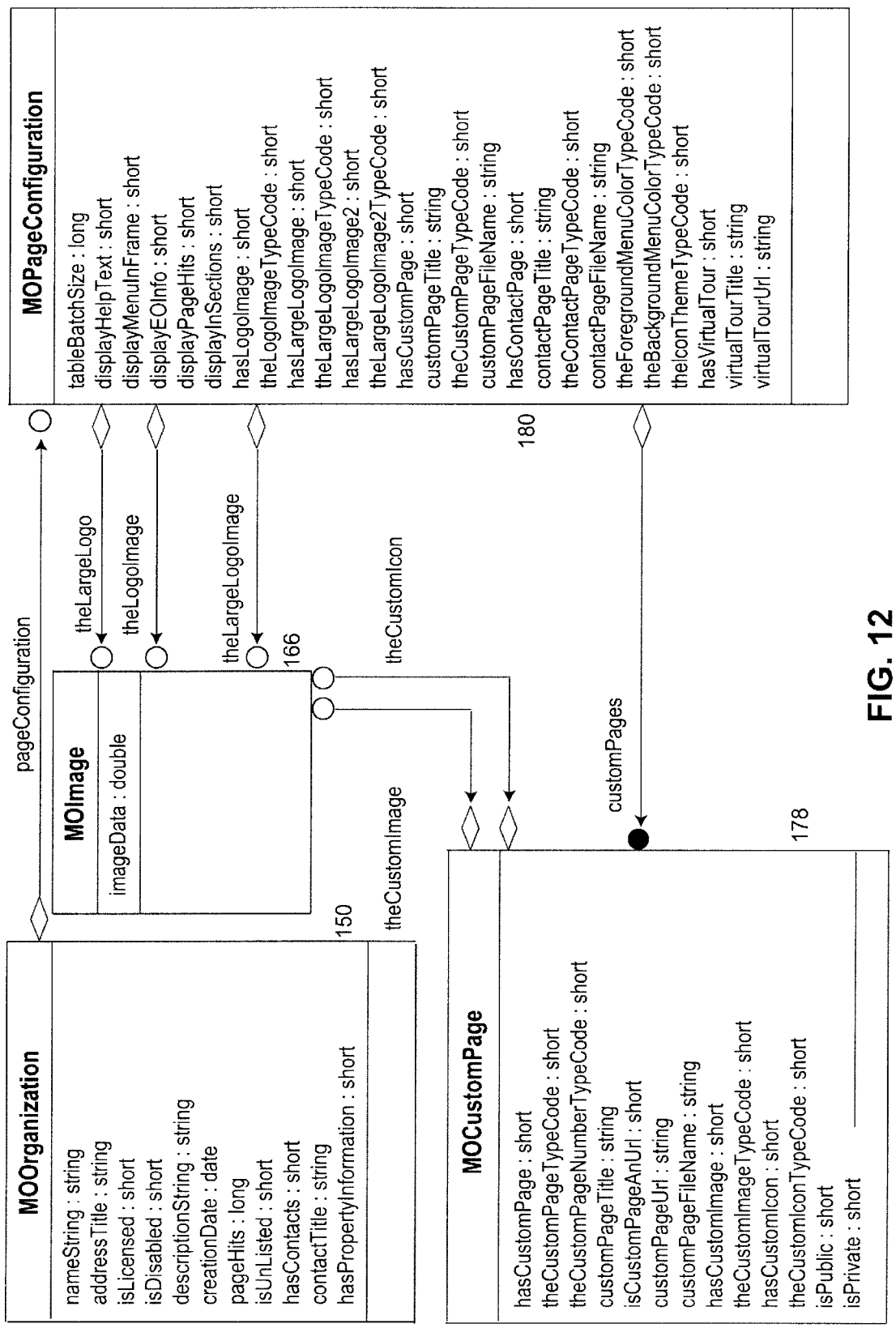
Figure 13:
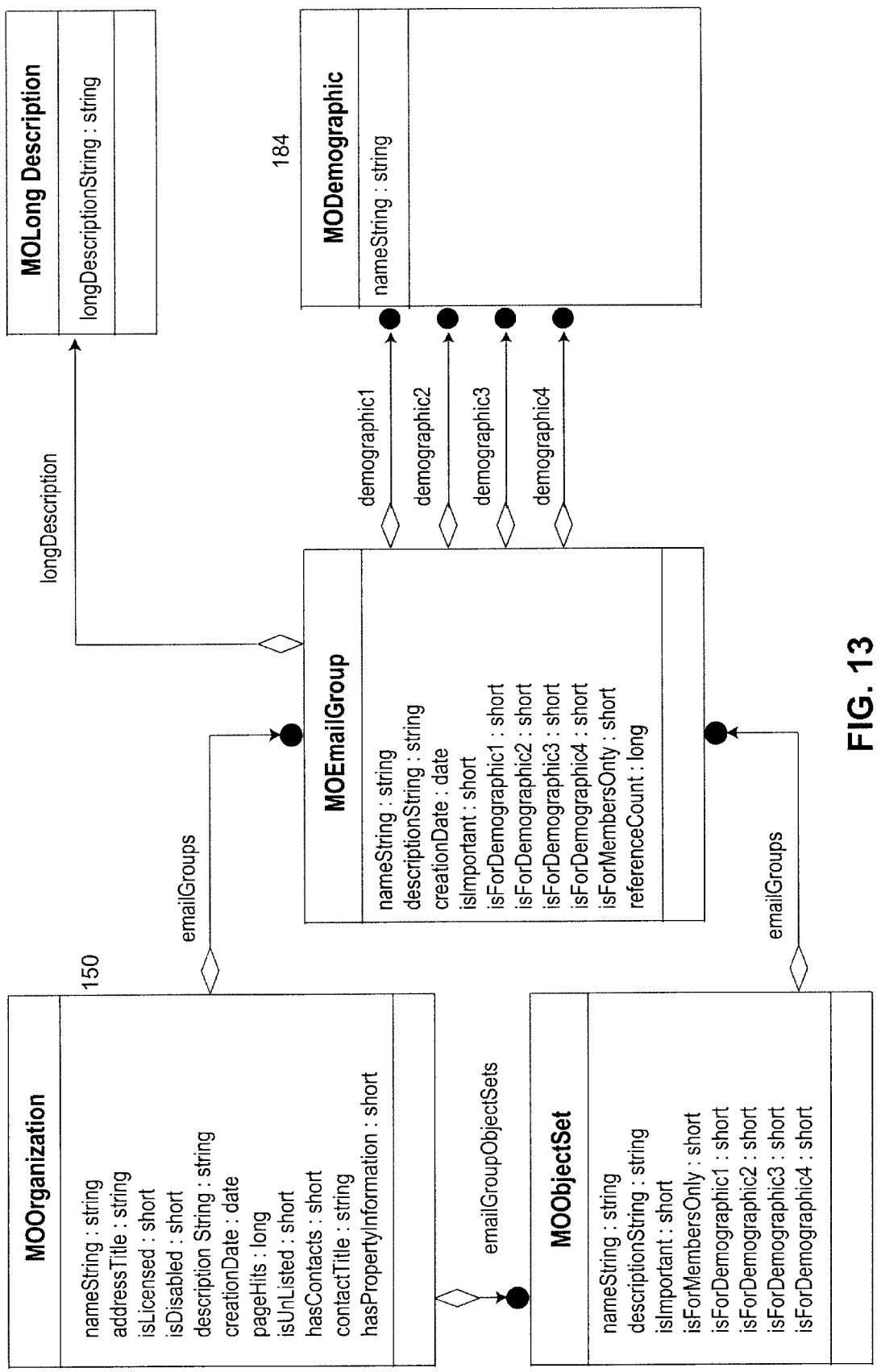
Figure 14A:
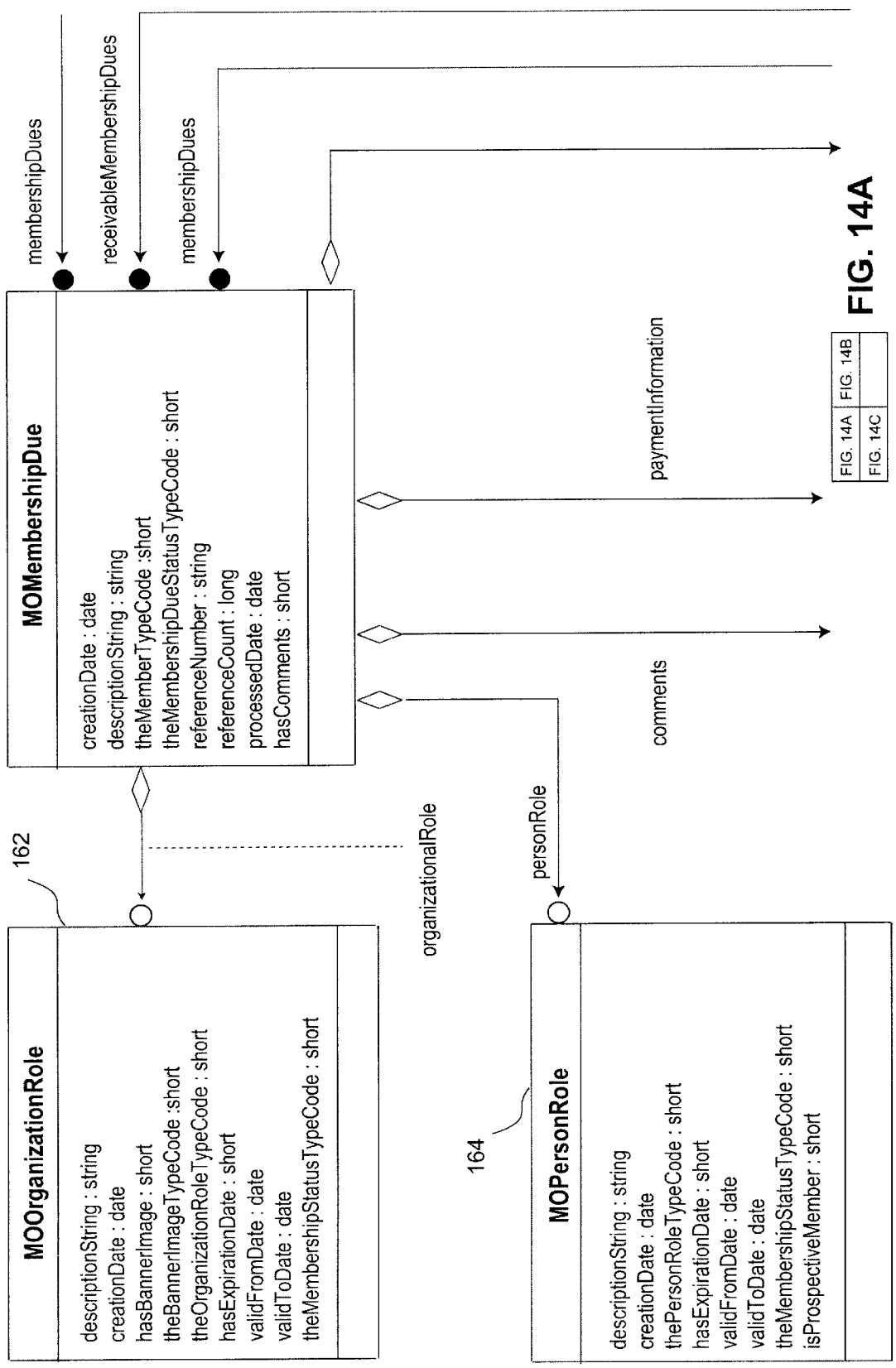
Figure 14B:
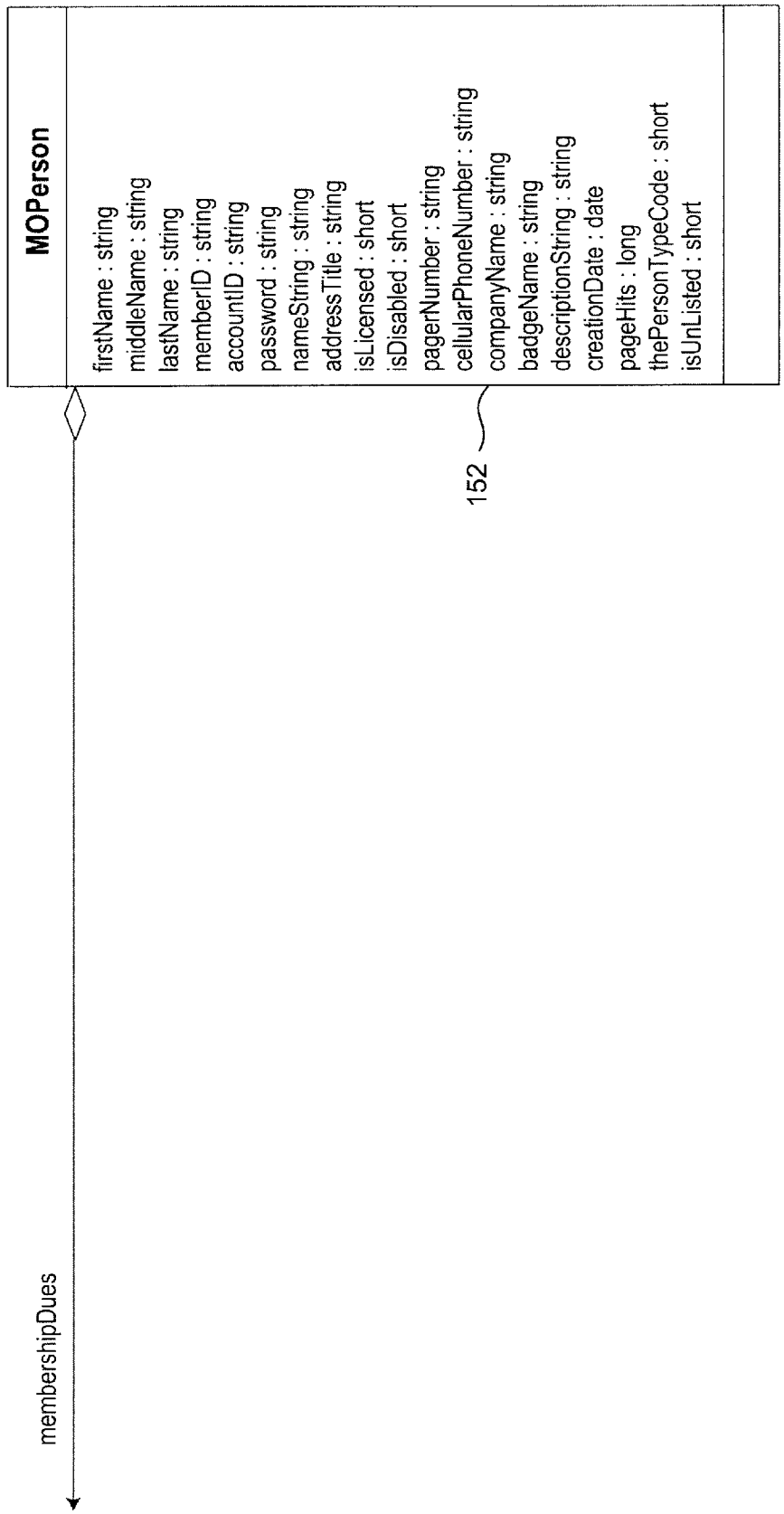
Figure 14C:
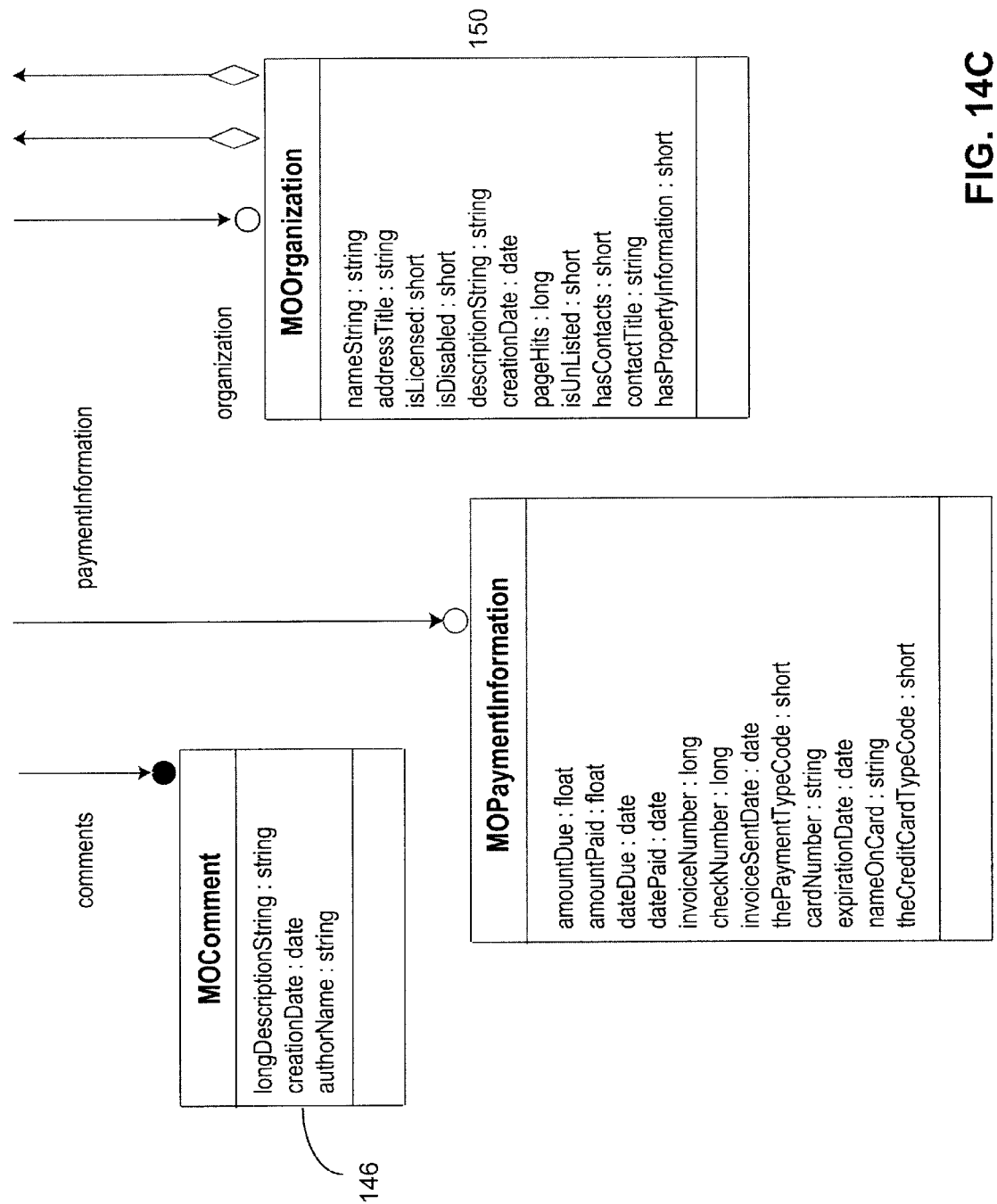

FIGS. 7–33 use standard object-oriented notational format to illustrate the preferred embodiment of object classes in a single database 42 of FIG. 2 and represent the persistent object model 154 of FIG. 7. FIG. 7 illustrates the top level class diagram of the preferred object classes 105 in the persistent object model 154. FIGS. 8–33 use standard Rational Rose object-oriented notational format to illustrate an embodiment of each object class. FIGS. 8–33 are also based on the Uniform Modeling Language, UML, according to the Object Management Group, Inc. As shown in FIG. 8, Each object class has three parts: an identifier 106, an attribute section 108 and a method section 110.

Class associations are shown with connecting lines. A plain line shows a one-to-one association. A line terminating in a solid dot shows a zero-to-many association. A line terminating in an open dot shows an optional (zero or one) association. A diamond at the start of a line shows an aggregation association, that is, the higher class contains the component class. Some methods and attributes have been omitted for clarity.

Figure 34:
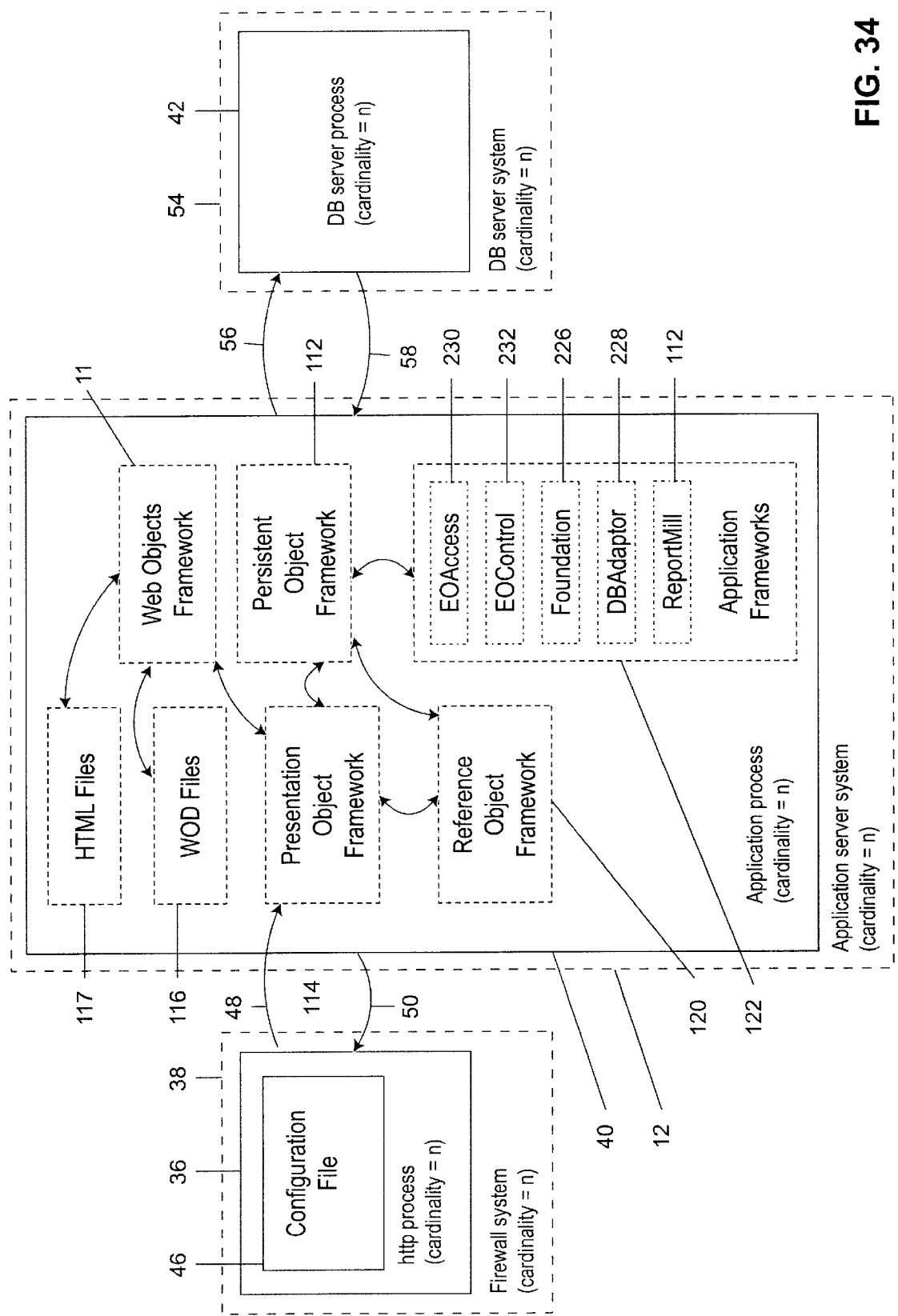
FIG. 34 is a preferred application architecture diagram of a system for generating world wide web pages based on real world data in accordance with an embodiment of the present invention.

As shown in FIG. 34, each application process 40 can have one or more frameworks. As is known in the art, a framework is a collection of classes that provide a set of services for a particular domain. Thus, a framework exports a number of individual classes and mechanisms which clients can use or adapt. Frameworks represent the reuse of resources, and can appear as major libraries.

In the preferred embodiment shown in FIG. 34, the application process 40 is composed of the following frameworks: a ModelObject framework 112, a PresentationObject framework 114, an HTML and Web Object Declaration (WOD) files 116, 117, a WebObjects framework 118, a ReferenceObject framework 120, an Applications framework 122 and a database adaptor 124.

Figure 35:
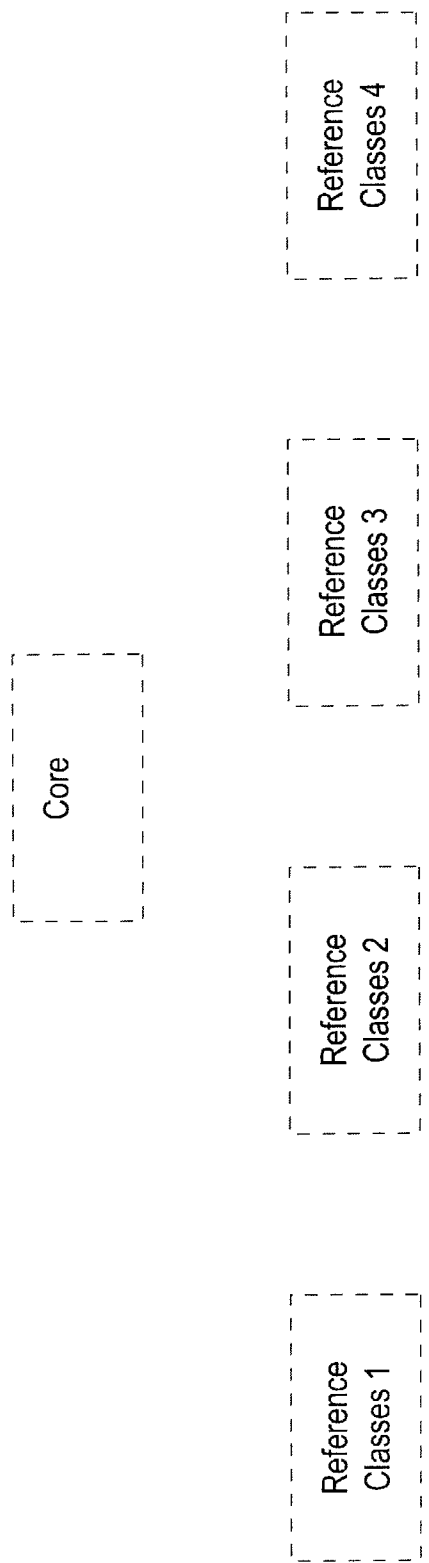
FIG. 35 shows the classes in a ReferenceObject framework.
Figure 37:
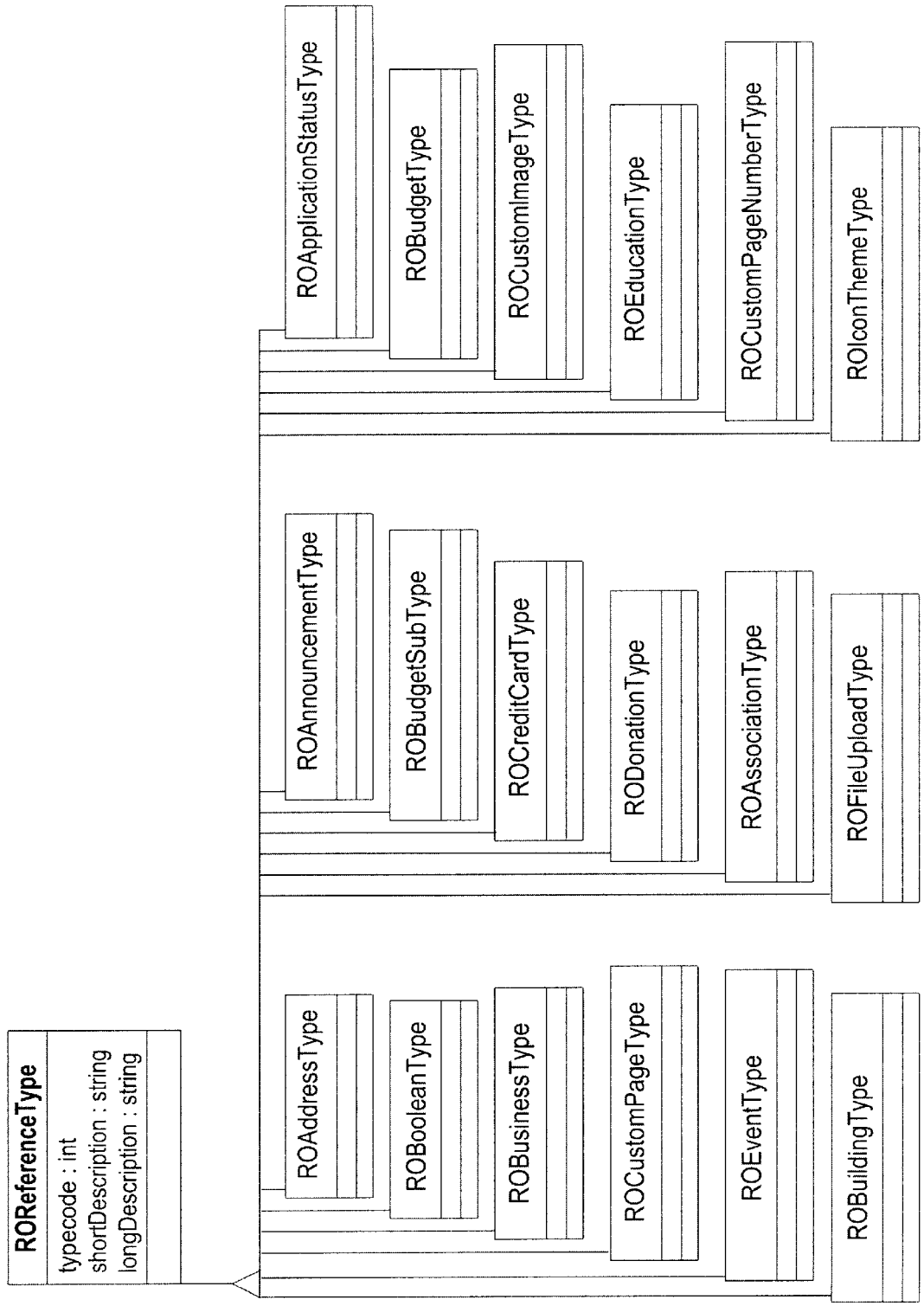
Figure 38:
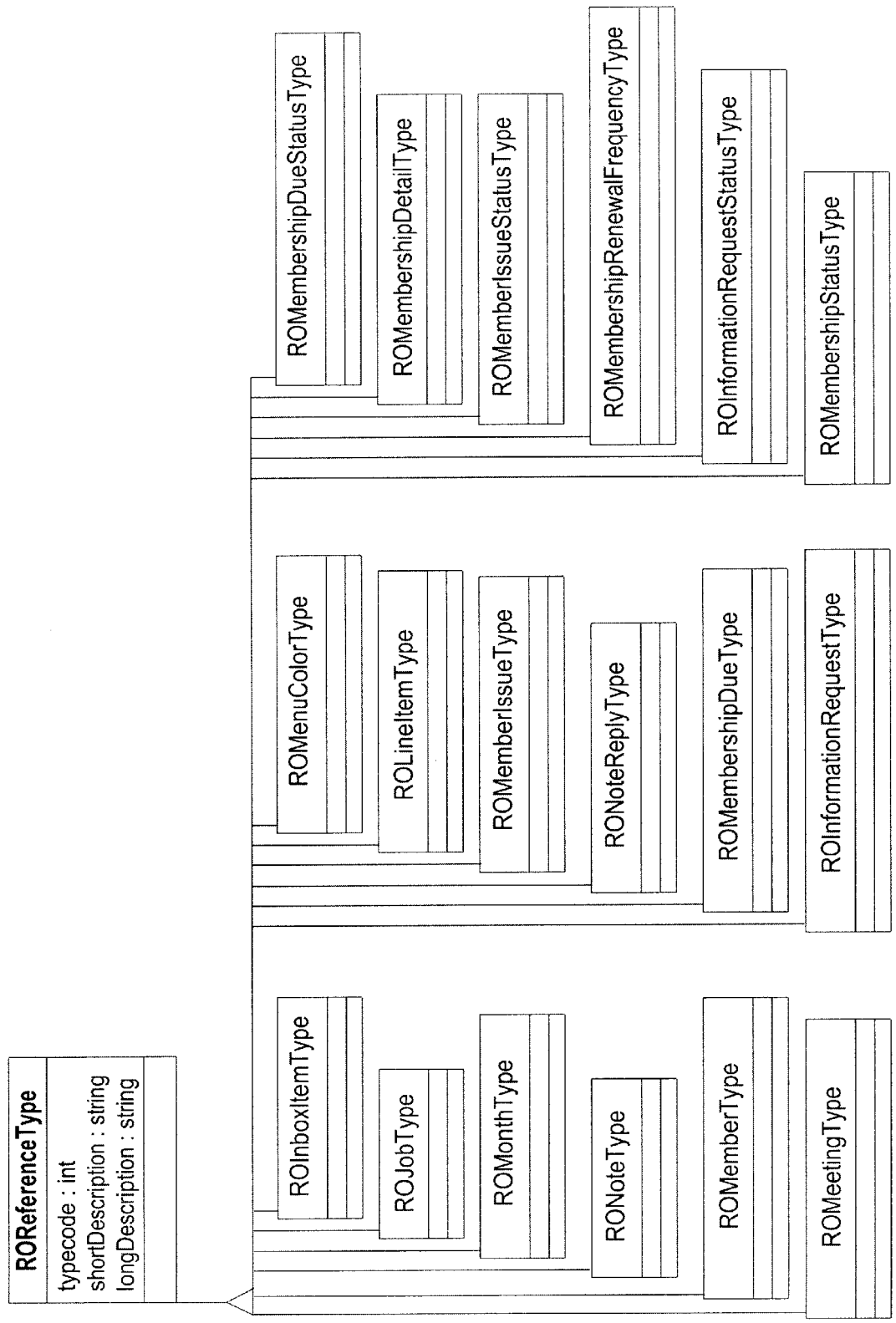
Figure 39:
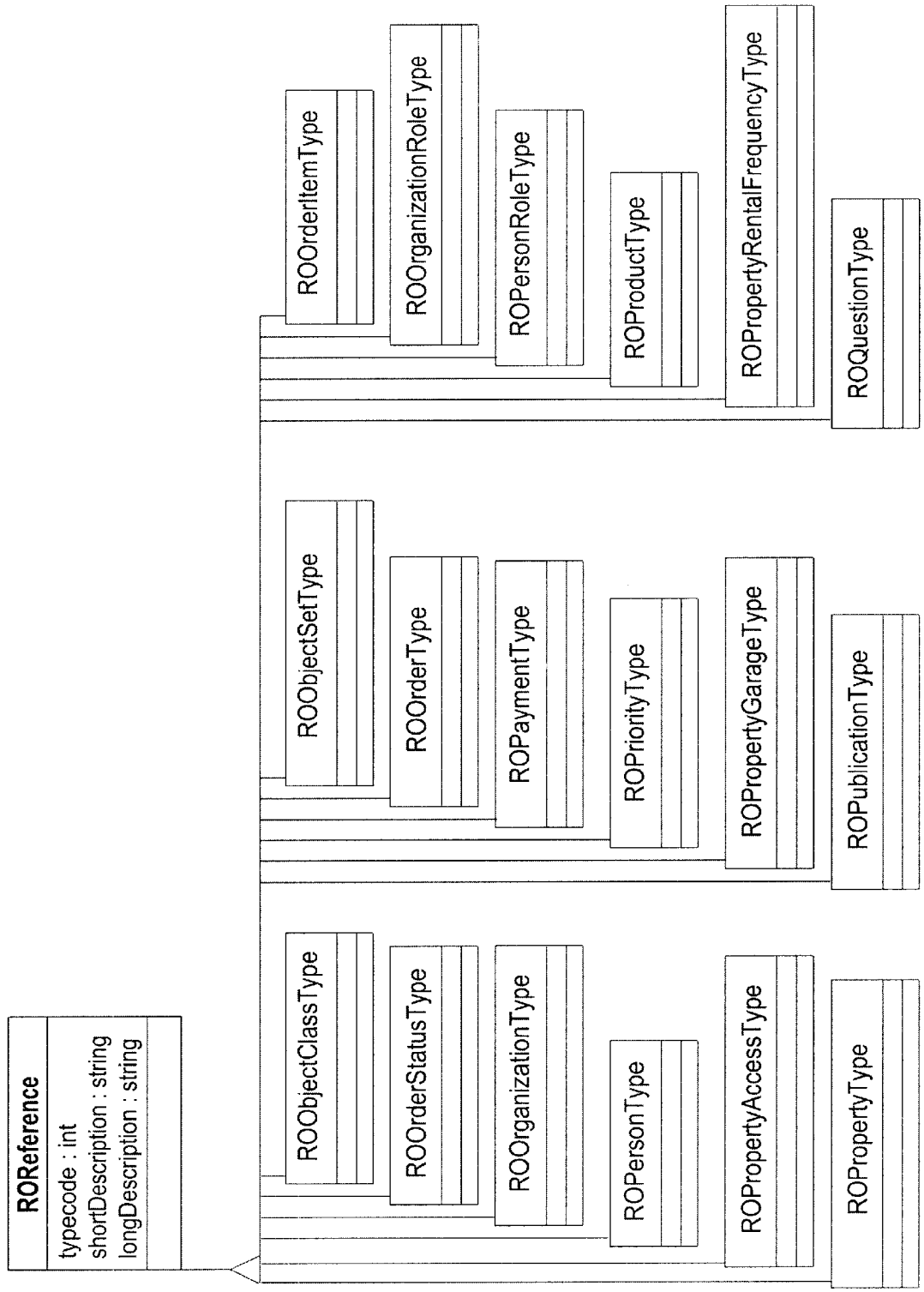
Figure 40:
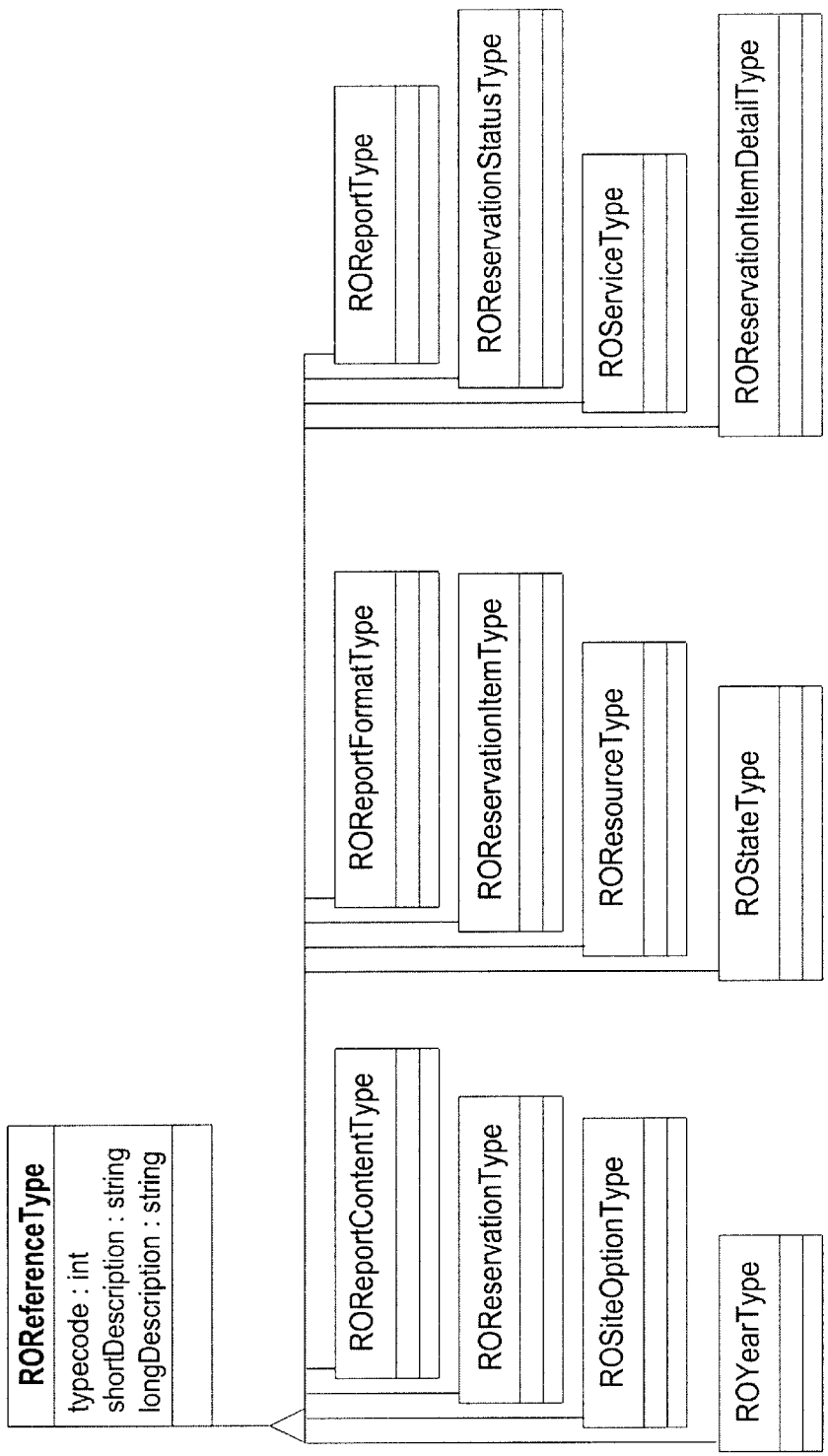

The ReferenceObject framework 120 implements objects that provide type information, for example, a list of event types. The reference object classes, shown in Rational Rose notation in FIGS. 35–40, provide type code and logical representations of the type, for example strings, and implement methods such as allInstances and instanceForCode in the application 26 of FIG. 1. Five reference type classes are shown in FIG. 35. The number of reference type classes can be adjusted according to actual application.

Reference types are the enumerated set values for an attribute of an object that identify a state, condition, or enumeration value of an object.

As seen in FIG. 36, each reference type class 126 has identifiable attributes. Reference type code 128 is an integer representation of the type instance. Reference type shortDescription 130 is a human readable string containing an acronym representation of the type instance. Reference type longDescription 132 is a human readable string containing the logical representation of the type instance.

Each reference type class 126 can implement the following methods. The method initialization 134 allocates instances of the class and assigns them into an array. The method allInstances 136 returns a list of all object instances of the type class. The method allNonNullInstances 138 is a place holder for all non null object instances at the startup of an application. The instanceForCode method 140 returns an object instance of the type class with the type code. The shortDescriptionForCode method 142 returns a short string of the reference type with the assigned code. The method longDescriptionForCode 144 returns a long string of the reference type with the assigned code.

Reference data is usually displayed as GUI pick lists in a window of the user display 14 of FIG. 1 in order to allow the end-user 32 to assign a reference value to an object or to select a reference value as search criteria for a list of object instances that match the criteria. Only the reference code value of an object is assigned to an attribute of another object. The code is used to look-up the reference object instance that contains the logical representation of the reference code.

For performance and maintenance considerations, reference data is not stored with the databases 56 of FIG. 2, but are created dynamically at runtime each time an application process 40 initializes. A shared instance list of the values for a reference class is maintained. At application startup, this shared instance is null. When the list is first accessed, since it is null, each instance of the reference class is programmatically allocated and added to the list.

An applications framework 122 of FIG. 34 provides a high level object oriented programming interface for managing persistent objects within a relational database. The applications framework 122 implements many features and functionality including:

the creation, deletion, fetching, and saving of persistent objects to a database;

the serialization to and from an object instance and a row within a database table;

maintaining the referential integrity among objects in relationships of an instance graph; and database locking and synchronization.

A directory of files that contains database connection information and a list of all the object classes is required by the applications framework 122 at runtime. For each object class, a list of attributes, types, and mappings to the actual database tables and columns is maintained. Additionally, all relationships and relationship semantics, for example to-one and by-value, is maintained.

Objects are fetched from a database 42 of FIG. 2 via the applications framework 122 of FIG. 34. A fetch specification representing a query string in standard query language, SQL, is constructed in order find an instance of some object in some database represented by an editing context. After an object instance has been fetched from the database 42, the application manages the fetching of child objects as relationships are traversed. All objects fetched from a database 42 are stored in a shared object store within the database, accessed independently via editing contexts.

Support programs can be added that perform additional tasks. For example, a support program can be added that parses the persistent object model 154 as defined in FIGS. 7–33 and generates an equivalent model object. From the model object, source code for the persistent object class templates in FIGS. 8–33 can be generated as well as the SQL that defines the database schema. Another auxiliary program can be added that generates the appropriate database indexes.

The ModelObject framework 112 of FIG. 34 implements create, modify, delete, validate, and other methods of the persistent objects as defined in the Rational Rose diagrams shown in FIGS. 7–33. The persistent objects 105 of FIG. 7 are backed to multiple persistent object stores, such as database 22. The ModelObject framework 112 provides content and configuration information of the organization or individual being addressed. The ModelObject framework 112 depends on the ReferenceObject framework 120 for specific type information, such as statuses, states, or some other logical enumeration.

The ModelObject framework 112 of FIG. 34 is responsible for implementing the data and behavior of the persistent model object 154 of FIG. 7. Application artifacts are generated from the persistent object model 154.

In the preferred embodiment, the persistent object model 154 design topics include, but are not limited to, unique identifiers, reference counting, persistent model object methods, distributed object referencing, recursive modeling, licensing, dynamically administered content, dynamically configured site, file and image upload, demographic configuration, and database considerations.

Each persistent object 105 of FIG. 7 has an identifier, or a primary key, which is unique in time and space. Each identifier consists of 12 bytes. The first four bytes represent the time in seconds since the epoch. The second four bytes represent the TCP/IP address of the computer on which it was generated. Bytes 9 and 10 represent the process ID between 0 and 32,767 of the application process in which it was generated. The last two bytes, 11 and 12, represent a random or pseudo-random number between 0 and 32,767. As long as a first application process 40 in FIG. 34 does not create more than 32,767 objects within approximately one second, each identifier is guaranteed to be unique from any other identifier created by any other process at any other time.

The applications framework 122 of FIG. 34 uses the identifier to uniquely track objects from multiple databases 42 within the same process space. In addition, the application 26 uses the string representation of the 12 byte identifier to uniquely identify a directory in a file system in which to store the custom page and images associated with an organization or individual. Customer page and image files can be stored as objects. For performance reasons, the custom page and image files which are generated are not stored in the database 42 of FIG. 2 as objects.

In the persistent object model 154 of FIG. 7, there is a distinction between by-reference and by-value relationships. In a by-value relationship, a child object is contained in a relationship by one and only one other object. For example, all MOComment objects 146 shown in FIGS. 10, 18–23, 25, and 31–33, are contained by one and only one parent object. In this case, when the parent is deleted, the child object is deleted as well, with concern for referential integrity problems of the object instance graph.

In a by-reference relationship, a child object may be contained in a relationship by more than one object. For example, in FIG. 25, MOOrder objects 148 can be contained by an MOOrganization 150 and an MOPerson 152. In such cases, when the parent is deleted, the child object cannot be automatically deleted since doing so would introduce a referential integrity problem. To resolve this, a reference count attribute is maintained on the child object and used as follows.

In this manner, a child object that is involved in a by-reference relationship is created, and a child object reference count attribute is set to zero. Whenever the child object is added to a by-reference relationship, the reference count attribute is incremented by one. Whenever the child object is removed from a relationship, the reference count attribute is decremented by one, followed by a check to see if the reference count is zero. If zero, the child object is then deleted.

The core methods implemented by the persistent object model 154 of FIG. 7 include fetchXXXForFilter, createXXX, deleteXXX, validate, loadTestData, addXXX (for by-reference relationships only), and removeXXX (for by-reference relationships only), where XXX is an object class as defined in the persistent object model 154. Other methods can be implemented depending on the object's behavior.

The fetchXXXForFilter returns a list of object instances of the XXX class based on some search criteria and data source. The method takes parameters from a dictionary containing the search criteria and an editing context representing a database store or memory an array of objects. From the dictionary, a qualifier is built representing the search criteria. If the array of objects is nil, the qualifier is applied to the editing context, which will fetch matching objects from a database. If the array of objects is not null, then the qualifier is applied to the array. In either case, an array of objects is returned representing the list of objects that match the search criteria.

For example, an editing context is passed into the fetch method when an organization is first being fetched from the database. An array of objects is passed into the fetch method when the user selects some filtering criteria in the windows of the user interface when the objects are already in memory such as after traversing a to many relationship.

To instantiate a new persistent object, for example, when the end-user 32 of FIG. 1 clicks on a Create button 76 of FIG. 5 or FIG. 6, the createXXX method is called. An object of the XXX class is allocated, assigned a unique identifier, and inserted into the editing context. Reasonable defaults are assigned the attribute values of the new instance. If the object has any mandatory relationships, for example, in FIGS. 17, 21, 25, 26, 29 and 31, an MOOrganzation 150 always has a MOAddress 156, then the mandatory child object is created and added to the relationship. When the editing contexts' saveChanges method is called, the application framework runtime will generate the SQL that inserts the new object into the database 42 in FIG. 2.

To delete a persistent object of the XXX class, for example, when the end-user clicks on a Delete button 80 shown in FIG. 5 or FIG. 6, the deleteXXX method is called. If the object has any relationships, each relationship is iterated over and the child object's deleteXXX method is called. Then, if the object has a reference count attribute of zero, or it doesn't have a reference count attribute, the object is removed from the editing context. When the editing context save changes method is called, the application framework runtime will generate the SQL that deletes the object into the database 42 of FIG. 2.

The validateXXX method is called in order to ensure that the object can be saved to the database with out errors. Possible error conditions include: required values or relationships are null, string lengths too long, invalid dates, or other semantic constraints. If the object has any relationships, each relationship is enumerated and the child objects' validateXXX method is called. This list of possible errors is returned to the caller. This method is usually called from the presentation layer before an editing contexts' save changes method is called in order to alert the end-user 32 of FIG. 1 of any error conditions prior to trying to save the changes.

For objects that have to-many, by-reference relationships, the addXXX method is called in order to increment the child objects reference count and add it to the relationship.

For objects that have by-reference relationships with other objects, the removeXXX method is called in order to decrement the child objects reference count and remove it from the relationship. In addition, the child objects' deleteXXX method is called in case the reference count is zero and should be deleted from the database 42 of FIG. 2.

For performance reasons, the persistent object model 154 of FIG. 7 does not make use of inheritance. There are many opportunities within the persistent object model 154 for inheritance, but in order to keep the number of database statements such as select and insert to a minimum, each object's data is maintained in a single table at the expense of redundant data and duplicate code. Other methodologies can be used in addition to or in place of inheritance as the programmer desires.

To support the functional goals of:
1. an individual or organization being members of multiple parent organizations,
2. data specific to an individual or organization being be stored in any database, but only once, and
3. an individual or organization being able to access information from multiple databases at the same time, references are stored in a database 42 of FIG. 2 that provides the necessary information to access an object that is shared between individuals or organizations in a remote database. The MOObjectReference object 158 shown in FIGS. 24 and 32 acts as a pointer to the real object.

MOObjectReference 158 contains the following information used to identify the remote database where the object actually resides: hostName, databaseName, userName, password, objectPID, and theObjectClassTypeCode.

MOObjectReference 158 implements the objectForObjectReference method to fetch the remote object. Once the object has been fetched from the remote database 42 of FIG. 2 though an editing context, it can be modified like any other object. Calling the editing context's saveChanges methods commits any outstanding changes to the remote database.

The persistent object model 154 is recursively designed to support the following functional goals:
1. an organization having the same functionality as its parent organization.
2. an individual having a subset of functionality as its parent organization,
3. an organization having data unique to itself,
4. an organization can either be accessed internally from the parent or externally via a domain name, and
5. a new site is created by creating a new individual or organization within another organization.

An organization object, MOOrganization 150, shown in FIGS. 9, 10, 13–19 and 21–33, can contain many organization members, MOOrganizationRole 162, or individual members, MOPersonRole 164. Each MOOrganizationRole 162 and MOPersonRole 164 object has a mandatory to-one relationship with an MOObjectReference 158 object, which points to the actual organization or individual in some other database. When an organization or individual is created, database connection dictionary information may be provided that specifies which database 42 of FIG. 2 to put the new organization or individual. By default, the organization and individual objects are created in the same database as the parent organization.

An individual or organization can either be licensed or unlicensed. This is implemented as a Boolean flag on the MOOrganization 150 or MOPerson 152 object. By default, an organization is not licensed, and an individual is licensed. When an unlicensed organization or individual is accessed via the windows of the user interface 16 shown in FIG. 1, only minimal information and functionality is available, for example, address and contact information. If an organization or individual is licensed, then all information and functionality is available, such as the ability to create site content, customizing the look and feel of their site, or uploading custom pages and images.

One master organization exists that contains all licensed individuals and organizations. Each licensed organization has some number of individual or organization members. An unlicensed organization may apply to be licensed at any time independent of its parent organization.

In order to satisfy the functional requirements of allowing an organization or individual to decide which functional components to include with the site, assign a title to the functional component, and create, modify, and delete items within a functional component, the persistent object model 154 includes MOImage objects 166, MOSiteOption objects 168 and MOSiteConfiguration objects 170 to store and access such information are shown in FIGS. 8, 9, 12, 19 and 32.

The content of the functional components of an organization's or individual's site is persistently stored in a database 42 of FIG. 2.

The methods in MOOrganization 150 and MOPerson 152 allows an organization or individual to add, remove, or modify the information associated with functional components, for example, MOJob 172, MOOrderItem 174 and MONoteConference 176, configured for the site and shown in FIGS. 9, 17, 25 and 27.

In order to satisfy the functional requirements of allowing an organization or individual to upload and download information, the persistent object model 154 uses the following objects to store and access such information: MOImage 166, MOCustomPage 178 and MOPageConfiguration 180 shown in FIGS. 8, 12, 19 and 20.

The uploadable and downloadable information can include custom images such as icons, logos, and pictures to associate with specific site content. The uploadable and downloadable information can also include documents to associate with specific site content, page content such as description and contact information and web pages, assign title to page, or link to other content icon and/or image to associate with the page.

In order to satisfy the functional requirements of allowing an organization or individual to create a list of custom values (demographics), assign demographic values to individuals, organizations, or objects within a functional component, and use demographics for search criteria and to limit access to content, the persistent object model 154 of FIG. 7 contains the following objects to store such information, specifically, MOSiteConfiguration 170 and MODemographics 184 shown in FIGS. 9, 13, 16–22, 24, 26–28 and 30.

Standard SQL is used to create the tables within a database 42, for example:

CREATE TABLE MOLngDescptn (identifier CHAR(24) NOT NULL, lngDescptnStrng VARCHAR2(2047), version NUMBER(9)).

Standard SQL is also used to create the indexes on table columns within a database 42 of FIG. 2, for example:

CREATE UNIQUE INDEX idxMOBdgtSubTt_U01 ON MOBdgtSubTot (identifier).

No other features provided by a relational database, which include stored procedures, triggers, views, and the like are required.

Figure 41:
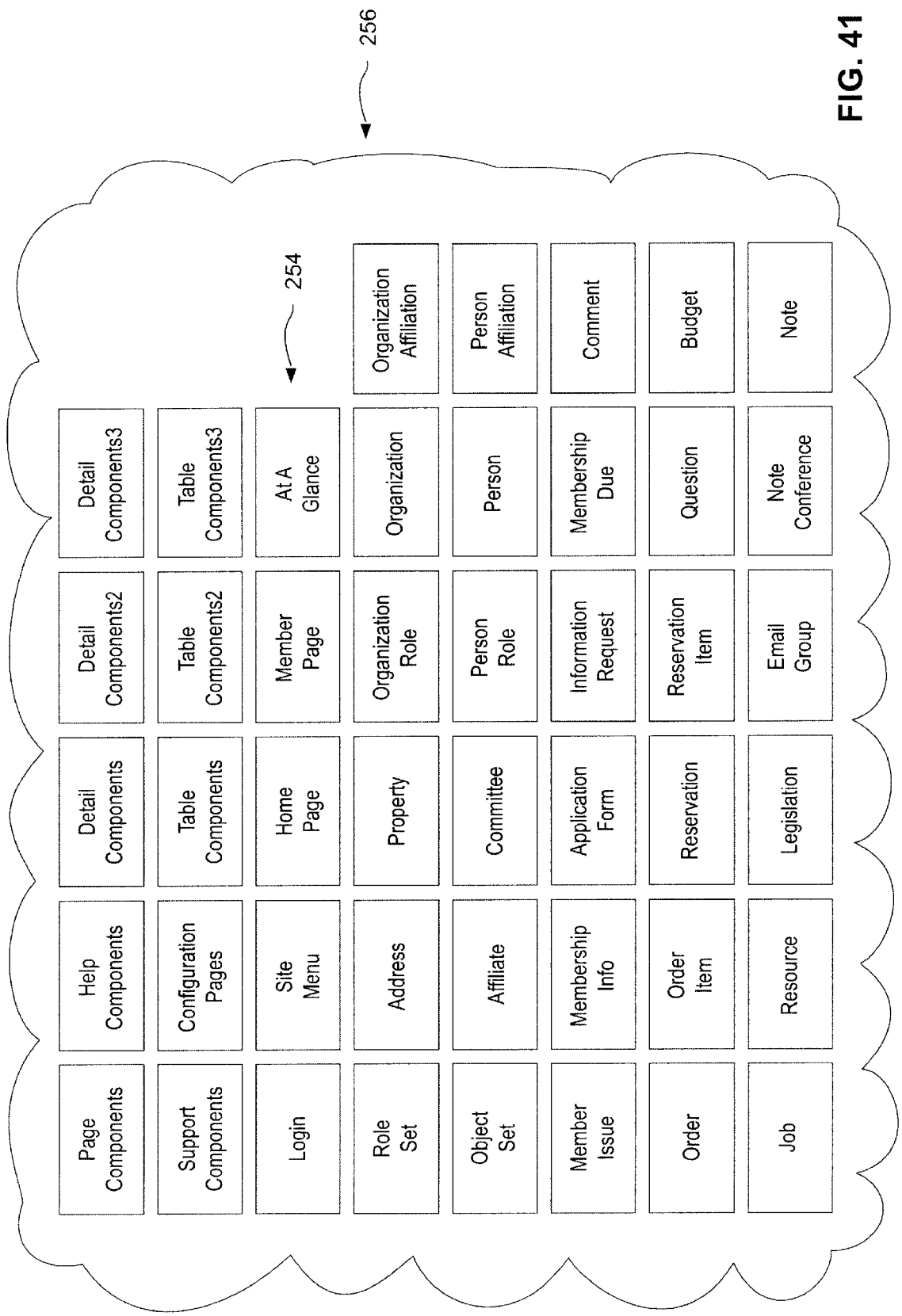
FIG. 41 shows the classes in a Presentation framework.
Figure 43:
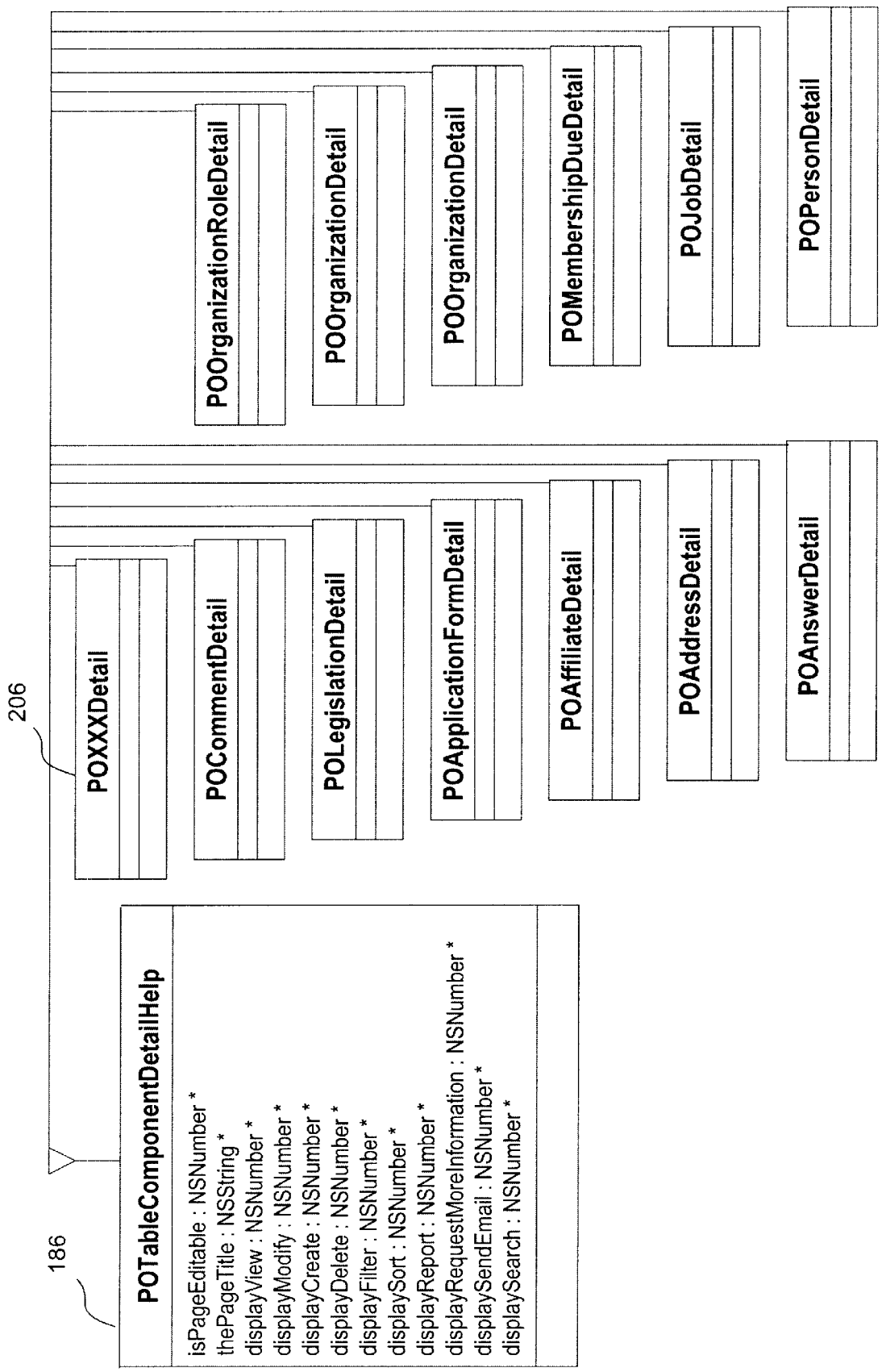
Figure 44:
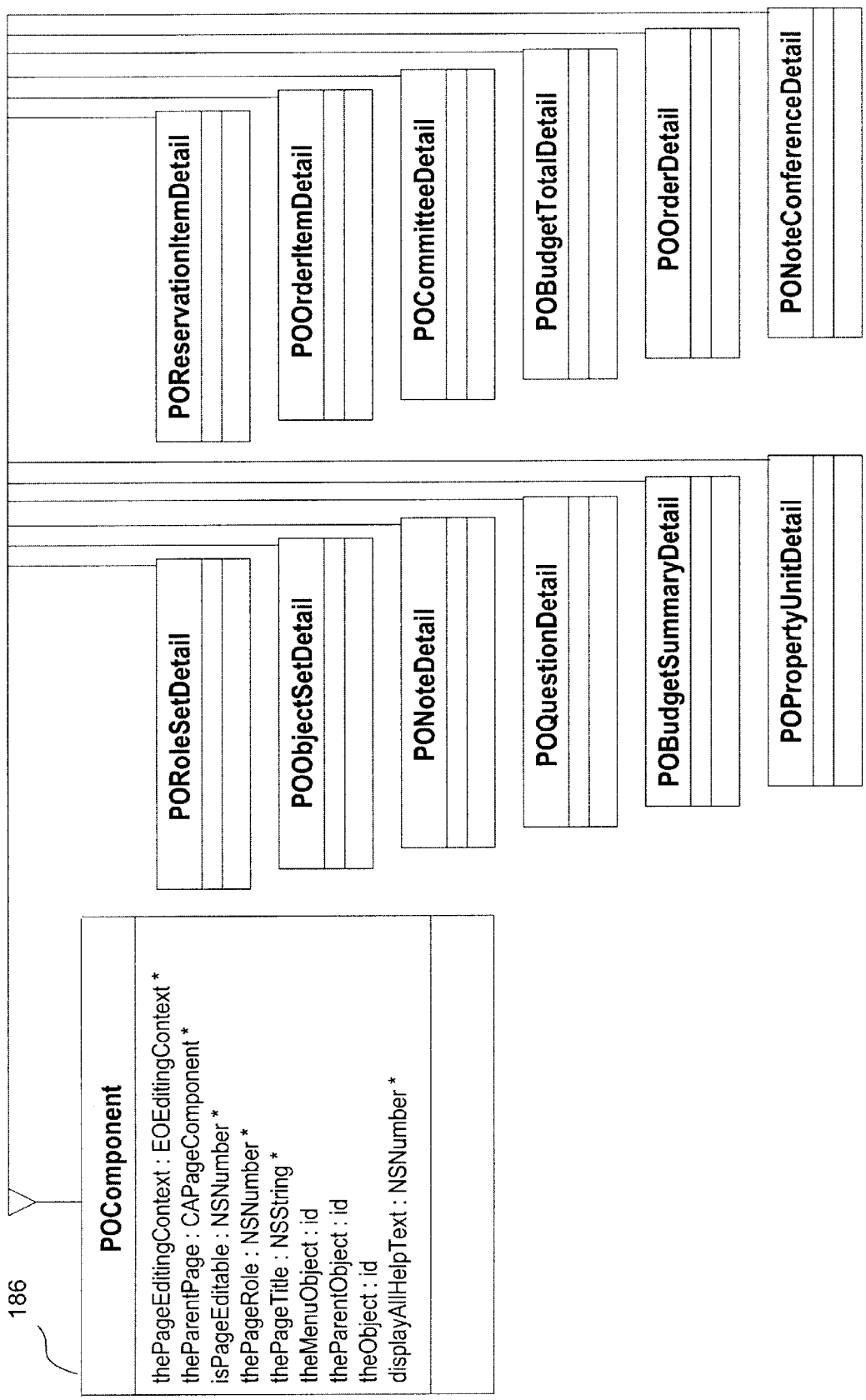
Figure 45:
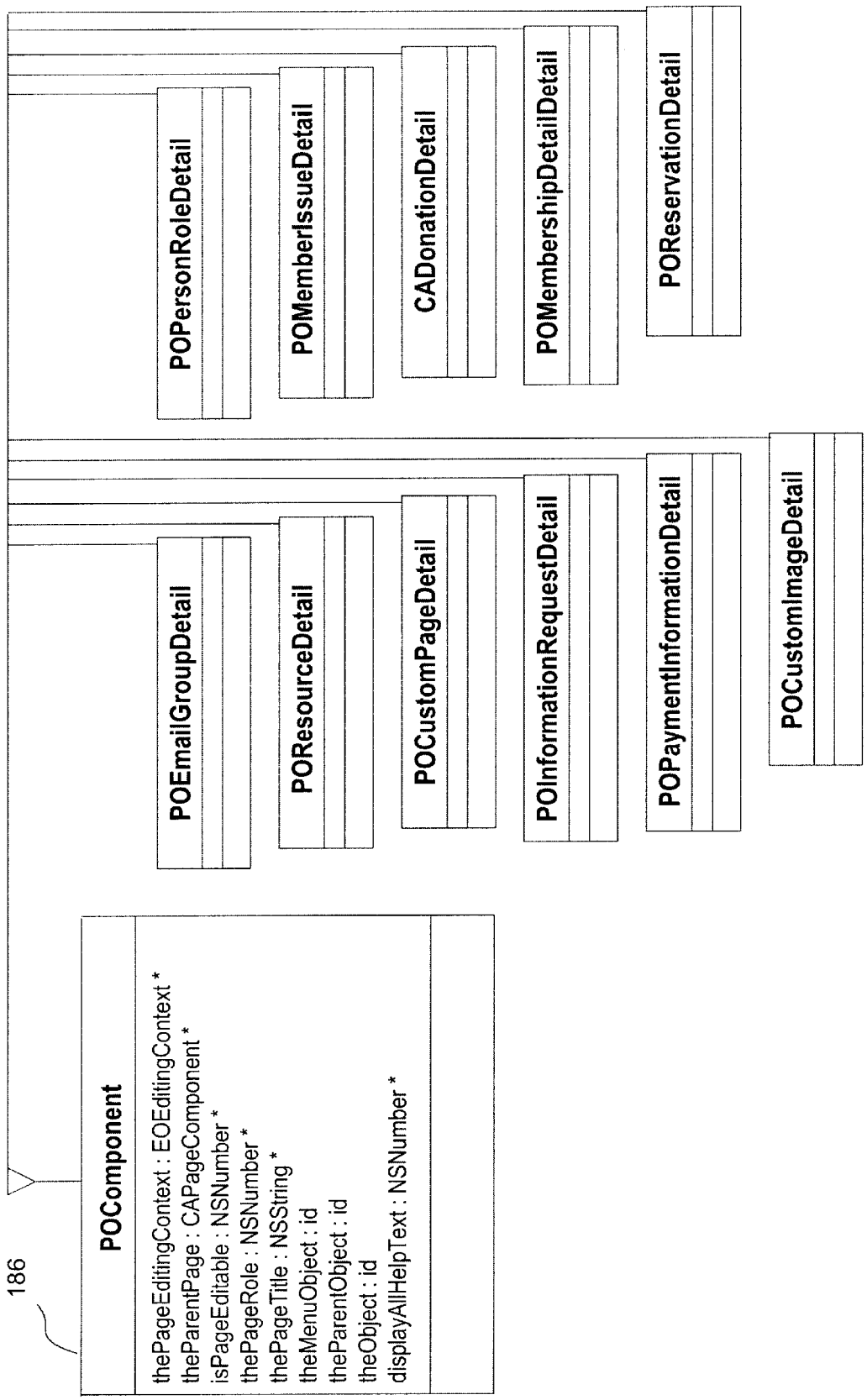

The PresentationObject framework 114 of FIG. 34 implements the presentation logic supporting each image 15 of FIG. 1. The PresentationObject framework 114 depends on the ReferenceObject framework 120 and the ModelObject framework 112 of FIG. 34. FIG. 41 illustrates the top level class diagram of the preferred object classes 254 in the presentation object model 256. The presentation objects 254 of FIG. 41 interact with persistent model objects 105 of FIG. 7 to present to the client 32 of FIG. 1 the content and configuration information and manage the client's interaction with such objects.

The presentation object model 256 of FIG. 41 is responsible for managing the behavior of the information rendered from the ModelObject framework 112 of FIG. 34, and the interaction with the end-user 32 of FIG. 1. This is accomplished in conjunction with the HTML and WOD files 116, 117, and the WebObjects framework 118 of FIG. 34. The classes 254 of the presentation object model 256 design are shown FIG. 41. FIGS. 42–86 use standard Rational Rose object-oriented notational format to illustrate an embodiment of each object class in the presentation object model 256 of FIG. 41. Each class diagram shown in FIGS. 42–86 corresponds to one or more screen displays or images 15 of FIG. 1.

Figure 83:
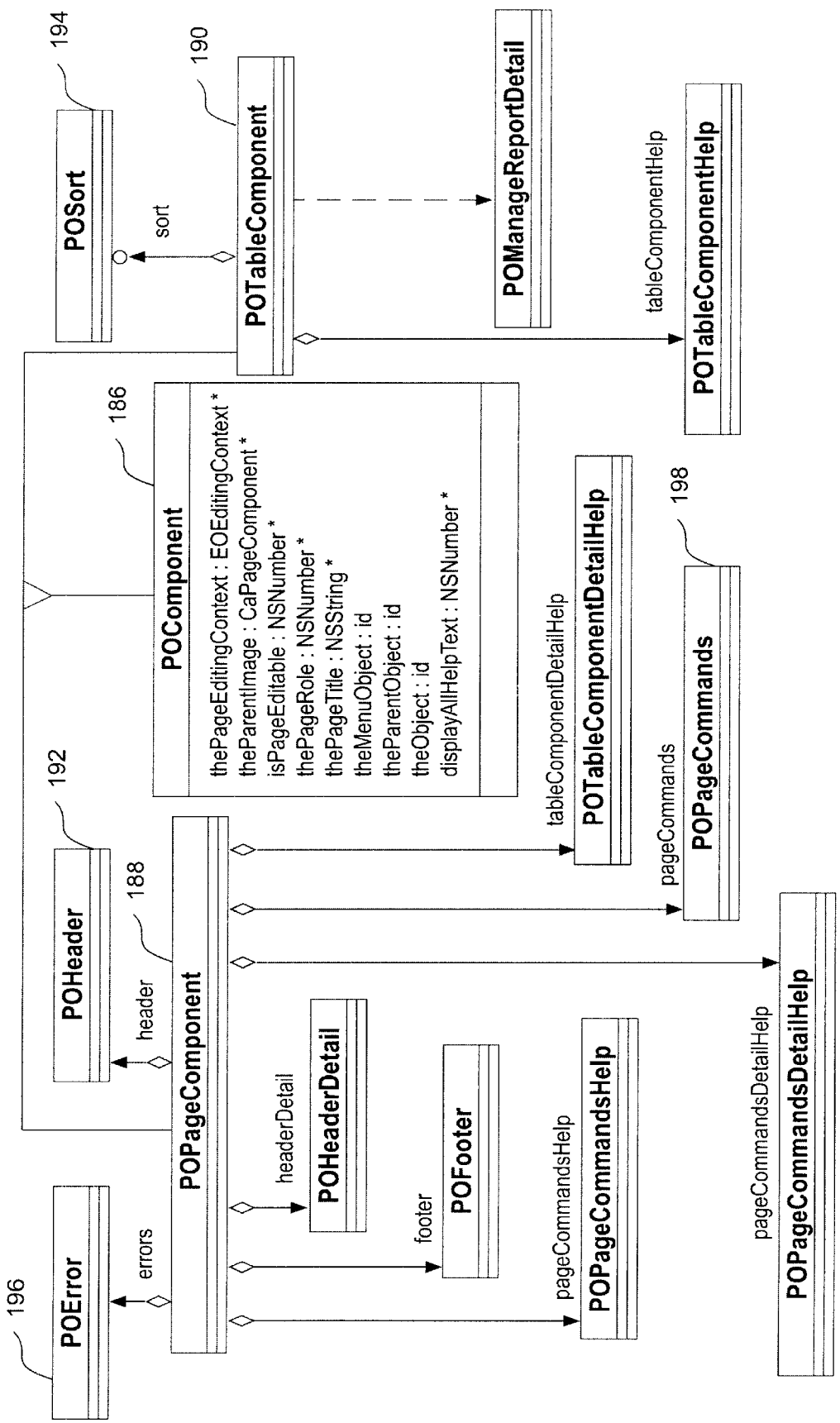

As shown in FIG. 83, the presentation model objects 254 include Component 186, PageComponent 188 and TableComponent 190. The Component 186 implements instance variables and methods common to all pages and components. The PageComponent 188 inherits from Component 186 and implements methods needed for an image. The TableComponent 190 inherits from Component 186 and implements methods needed for a table.

Other presentation model objects 254 shown in FIG. 83 include Header 192, Sort 194, Error 196, PageCommands 198, and Footer 200. The Header 192 renders the individual or organization's name. The Sort 194 implements the sorting algorithms of each table. The Error 196 renders a list of errors, if any. The PageCommands 198 implements call backs to the page to save, cancel, or reset changes. The Footer 200 renders the individual or organization's name, address, phone number, and the like.

Figure 46:
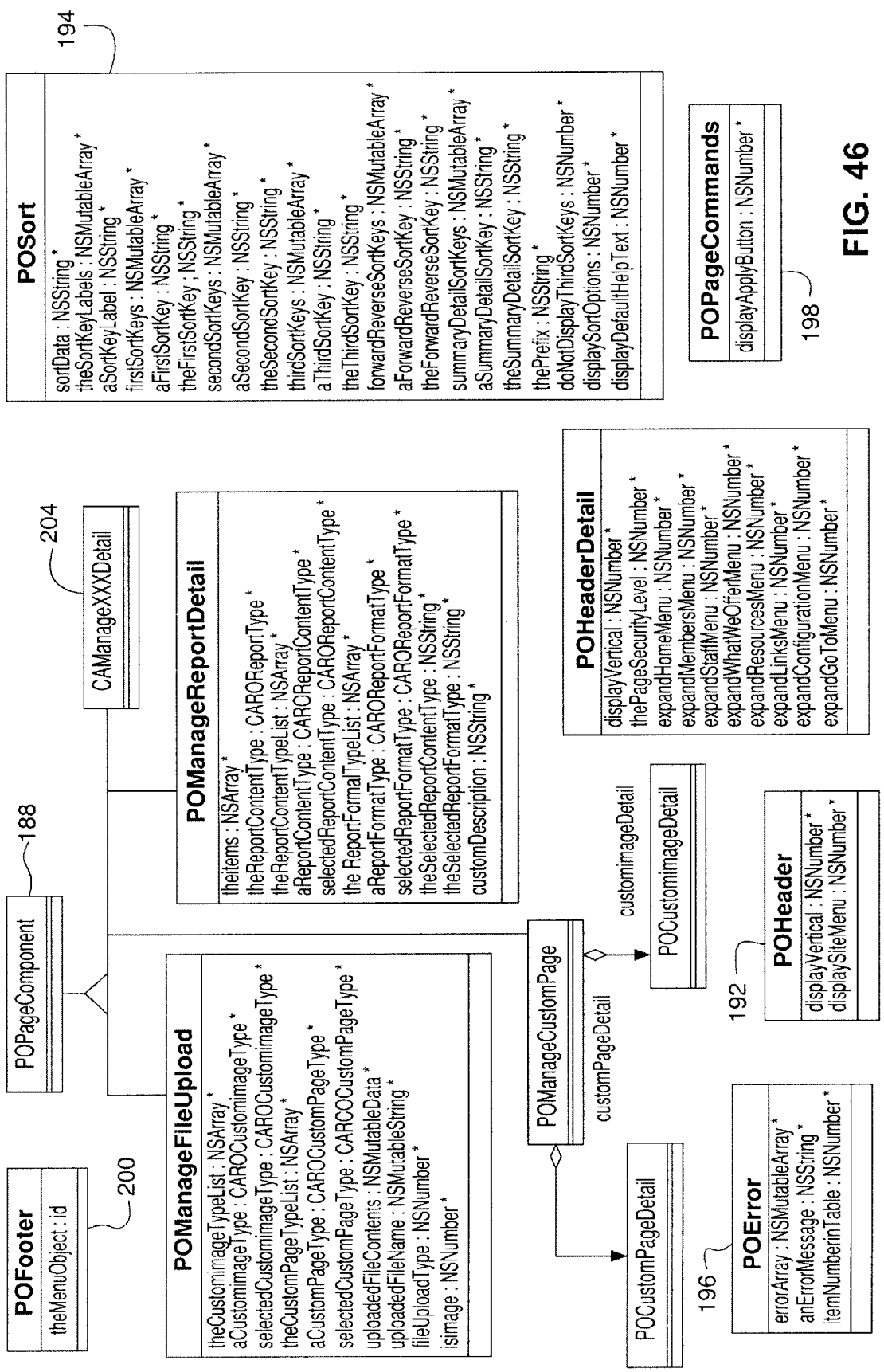
Figure 47:
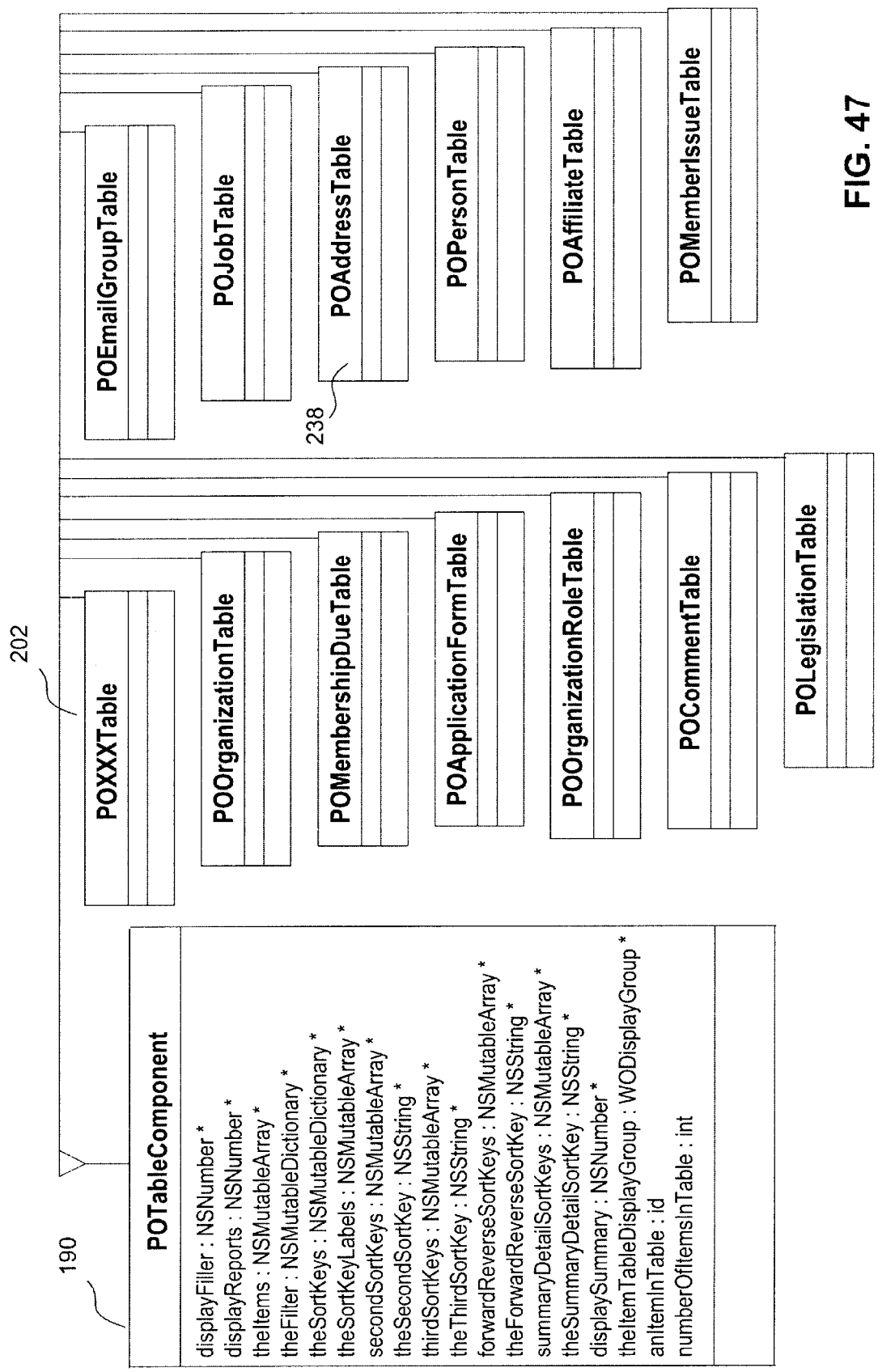
Figure 48:
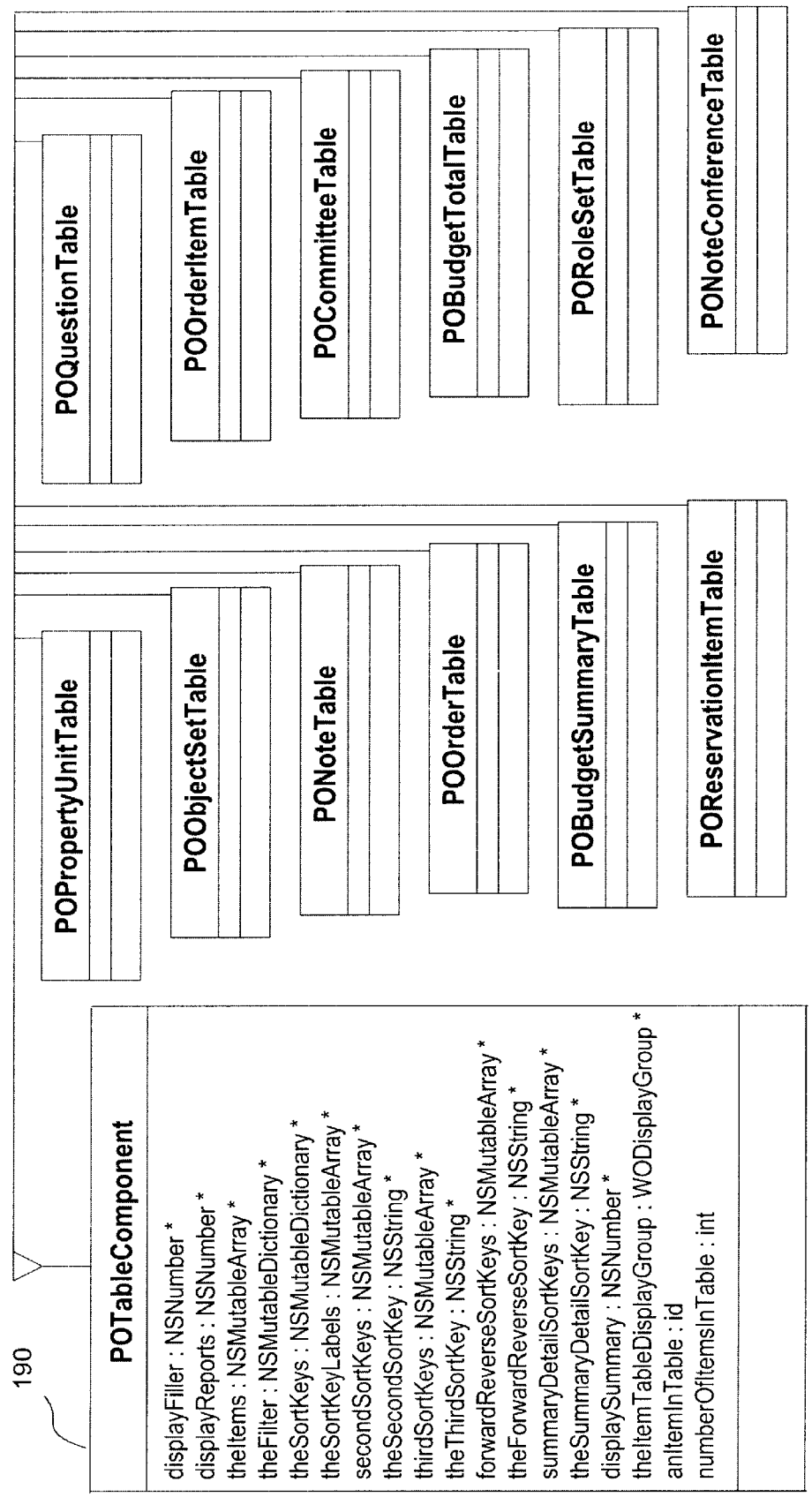
Figure 49:
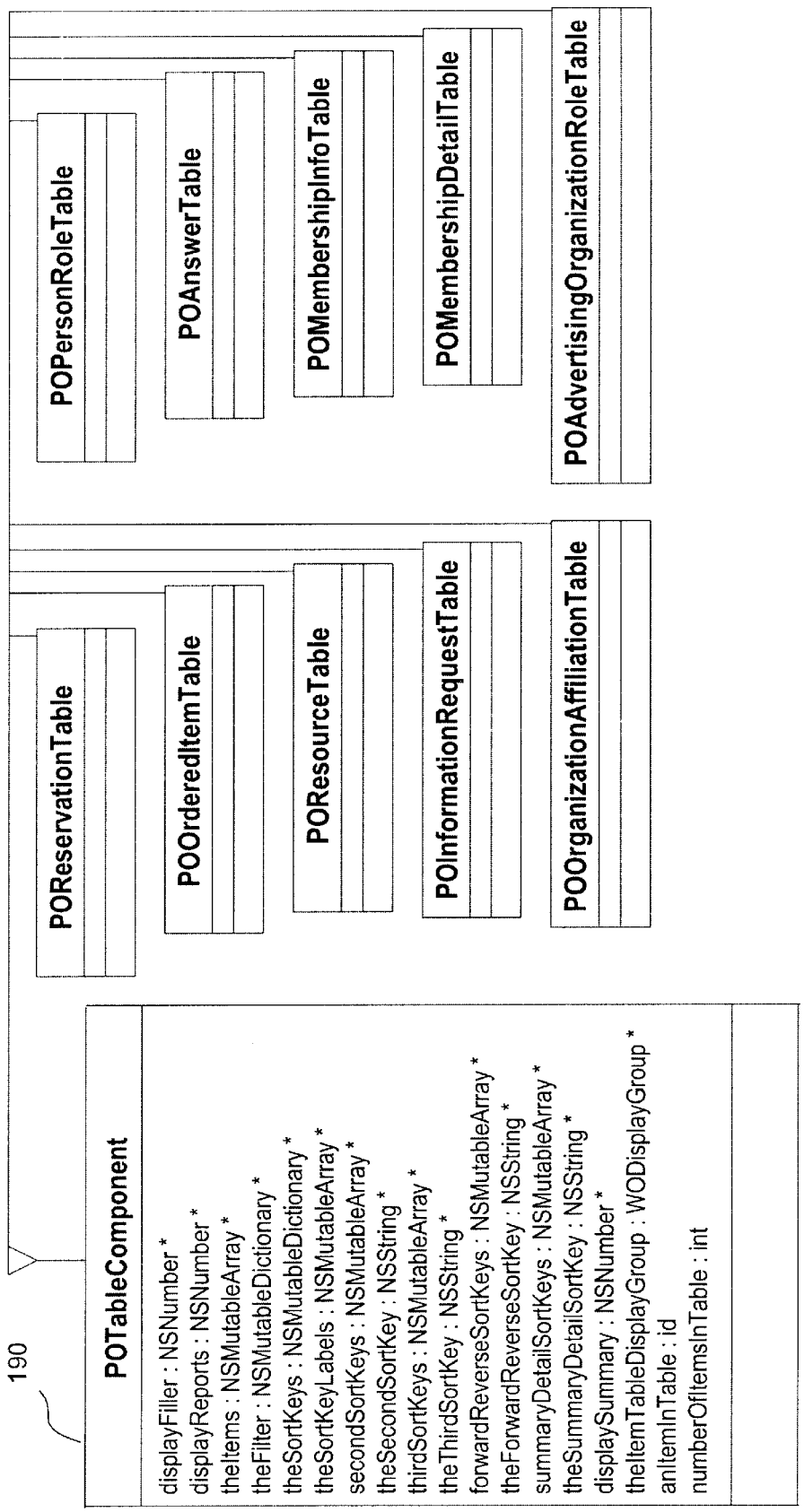
Figure 50:
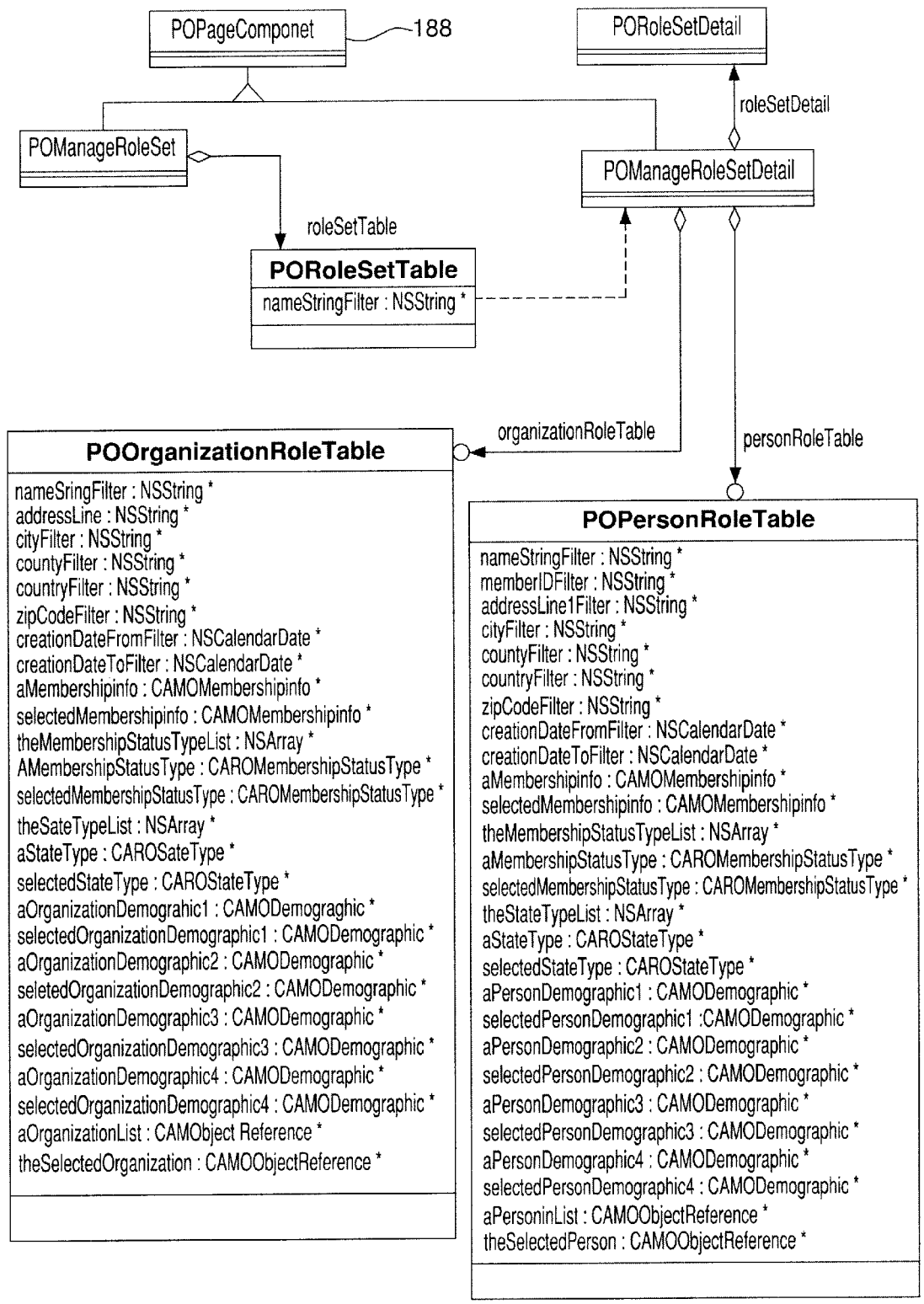
Figure 51:
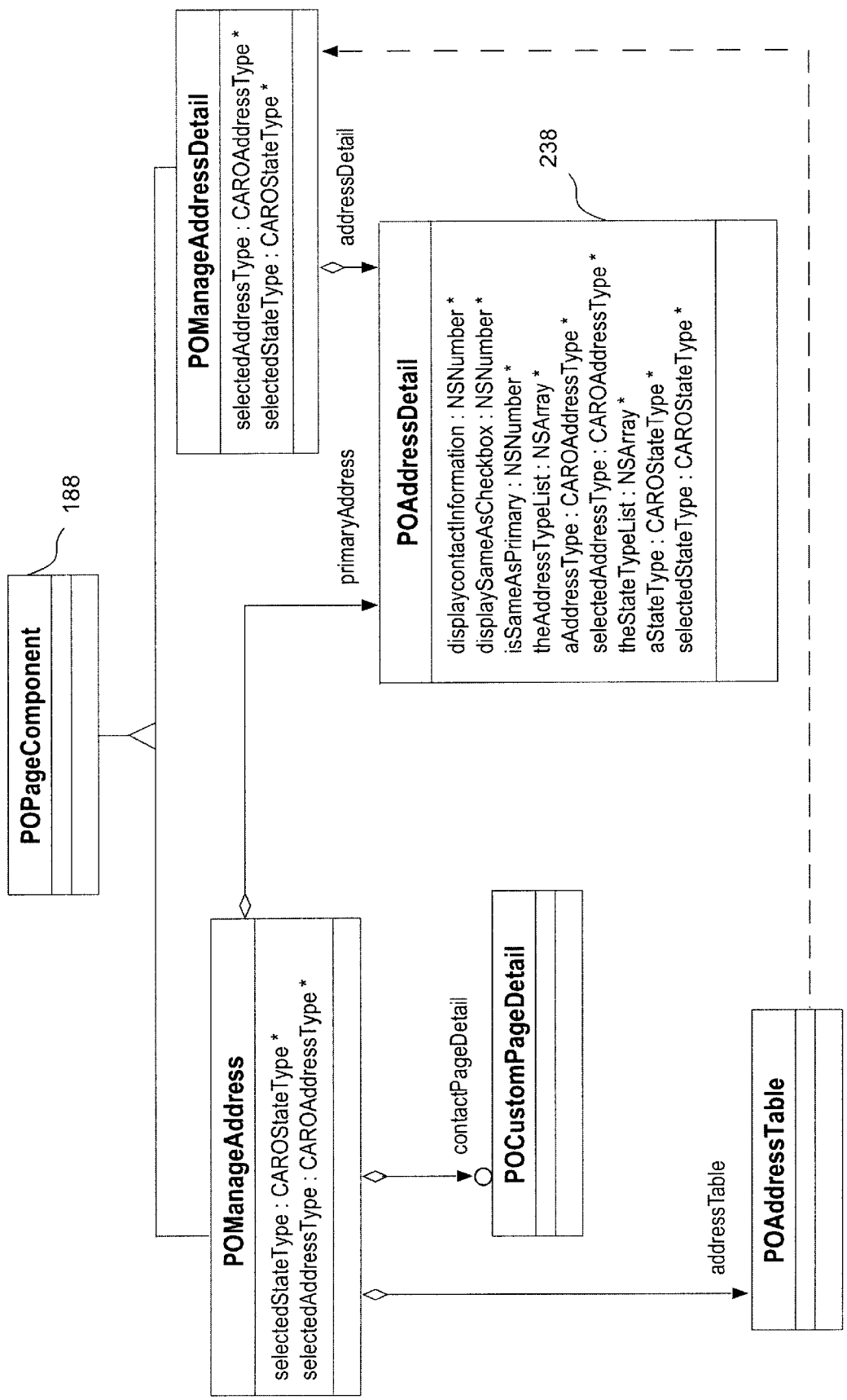
Figure 52:
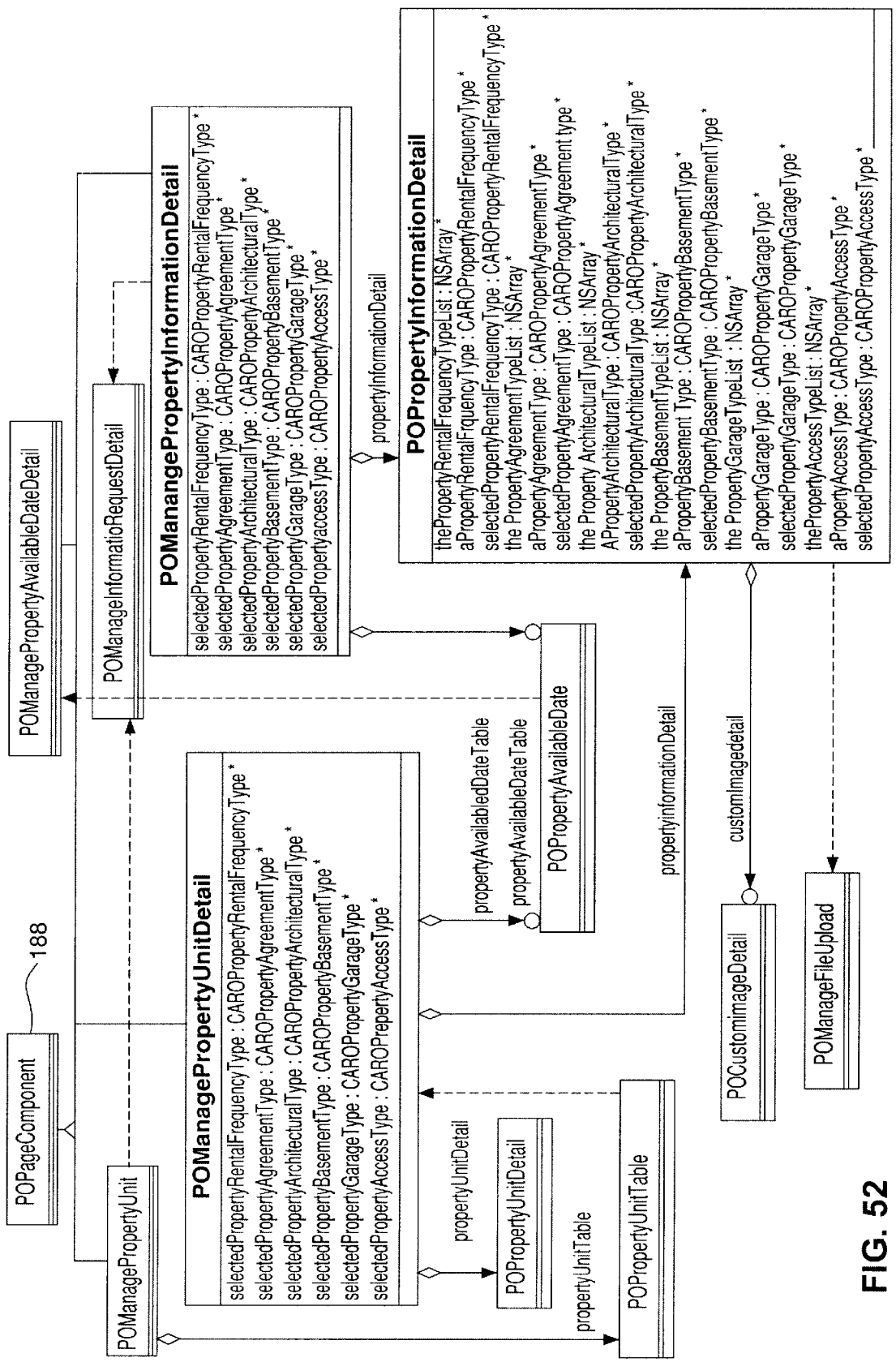
Figure 53:
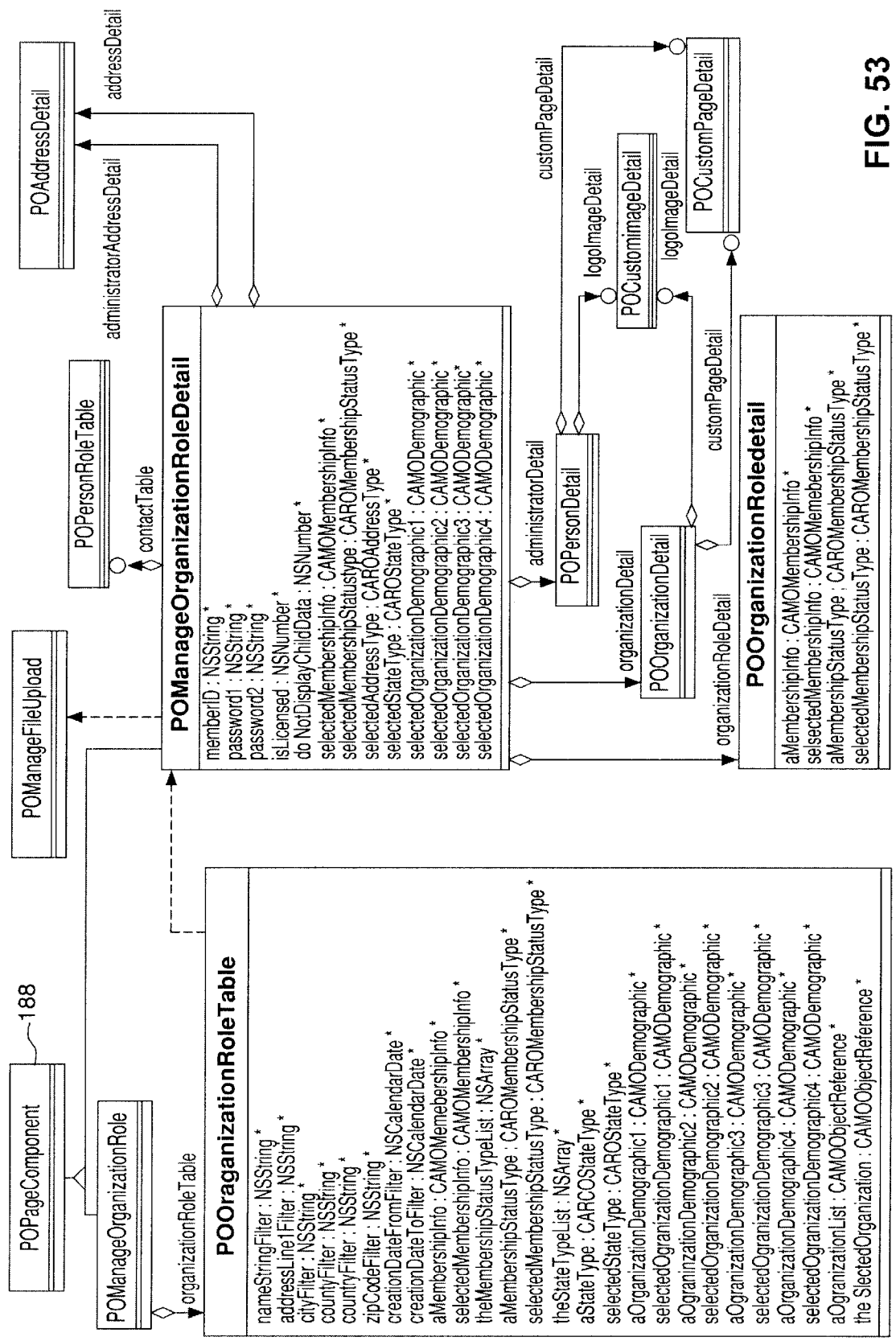
Figure 54:
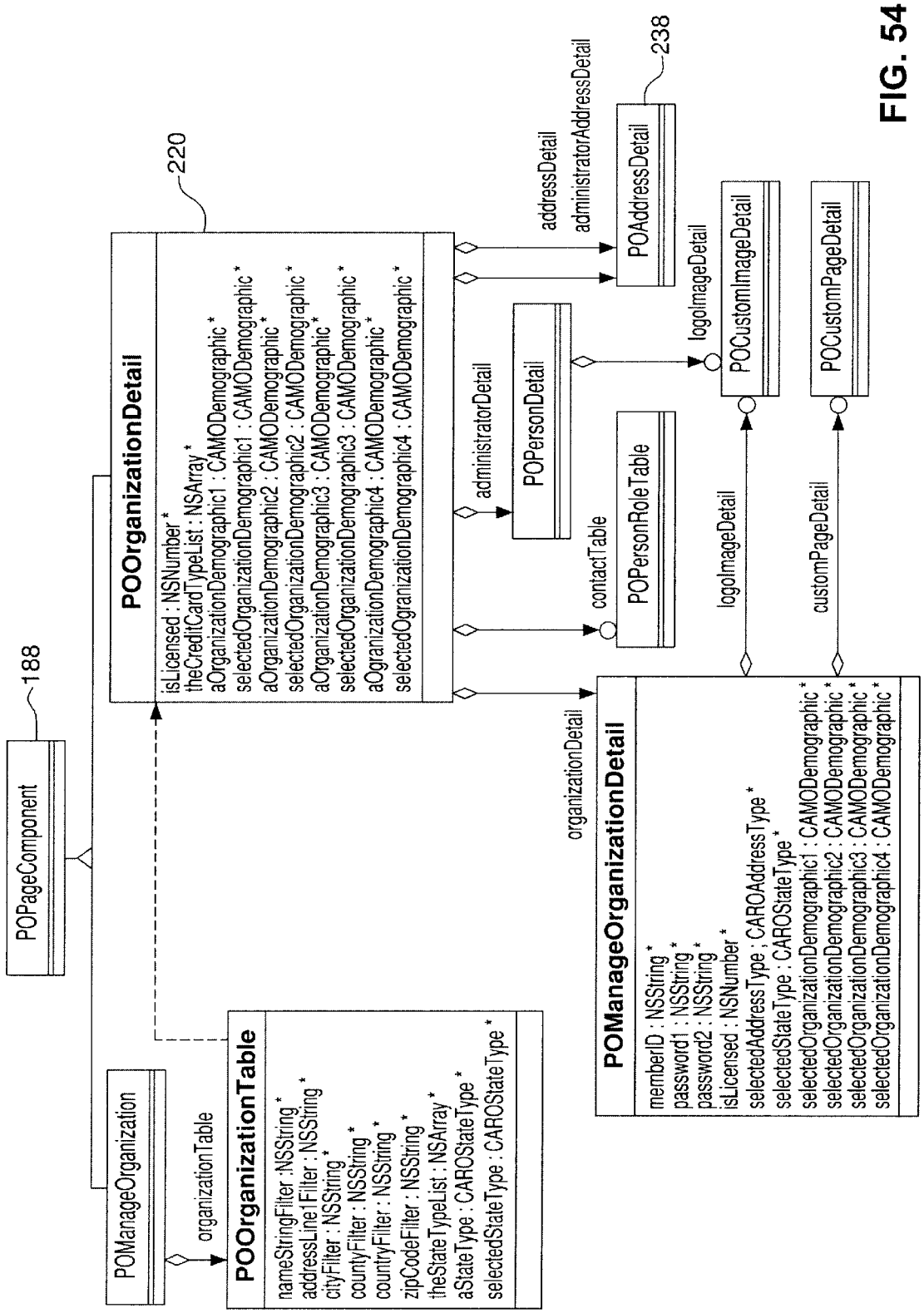
Figure 55:
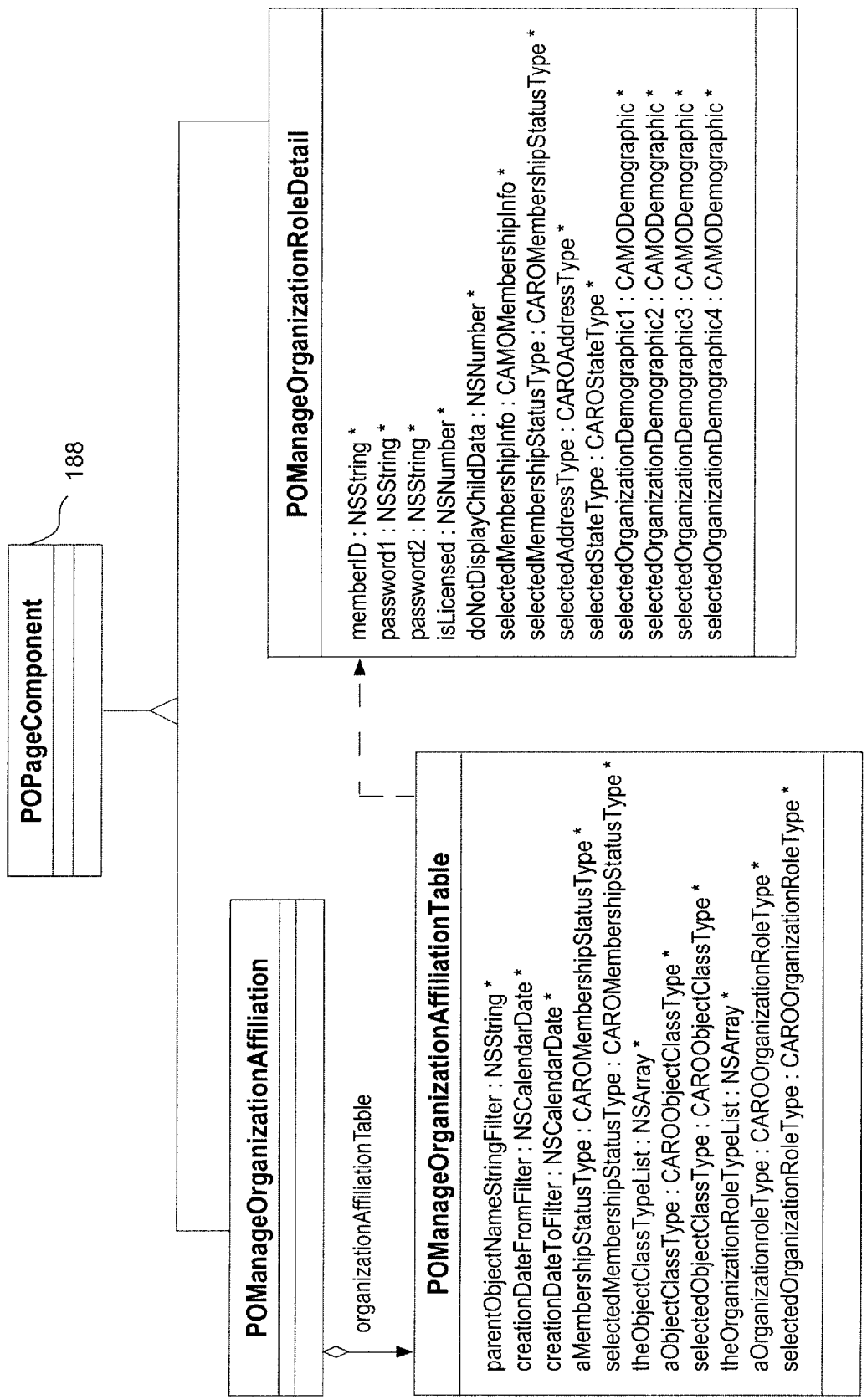
Figure 56B:
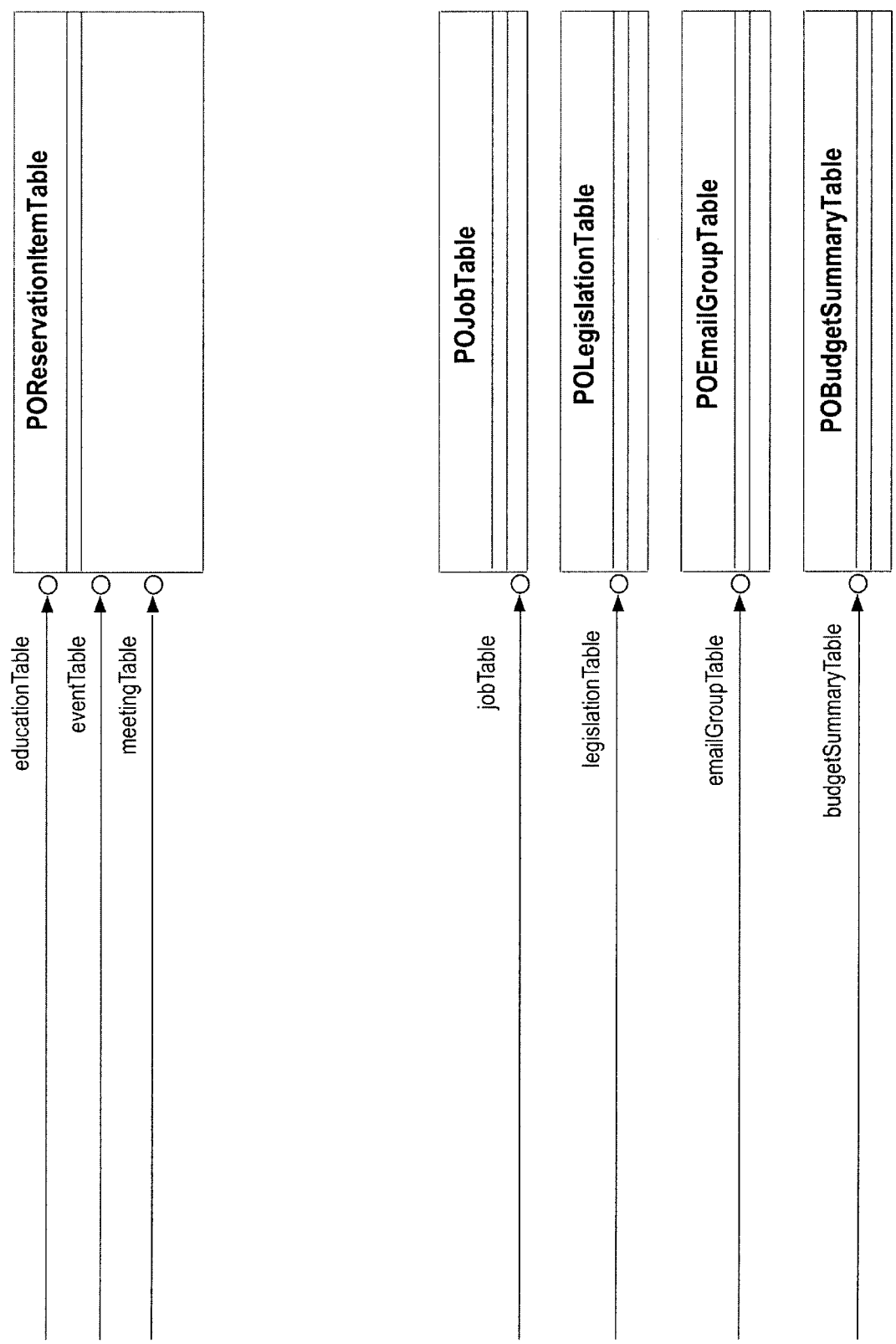
Figure 56C:
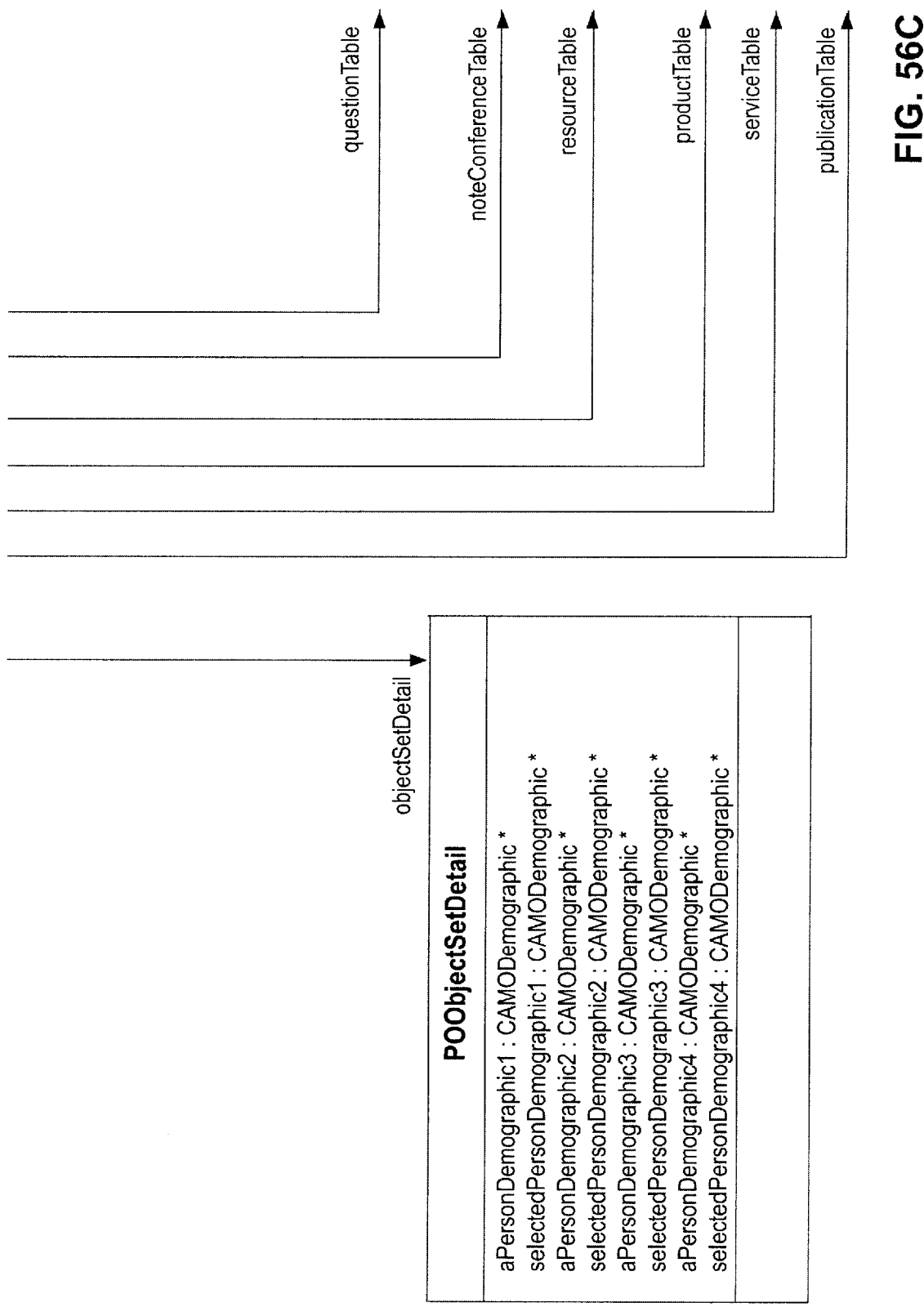
Figure 56D:
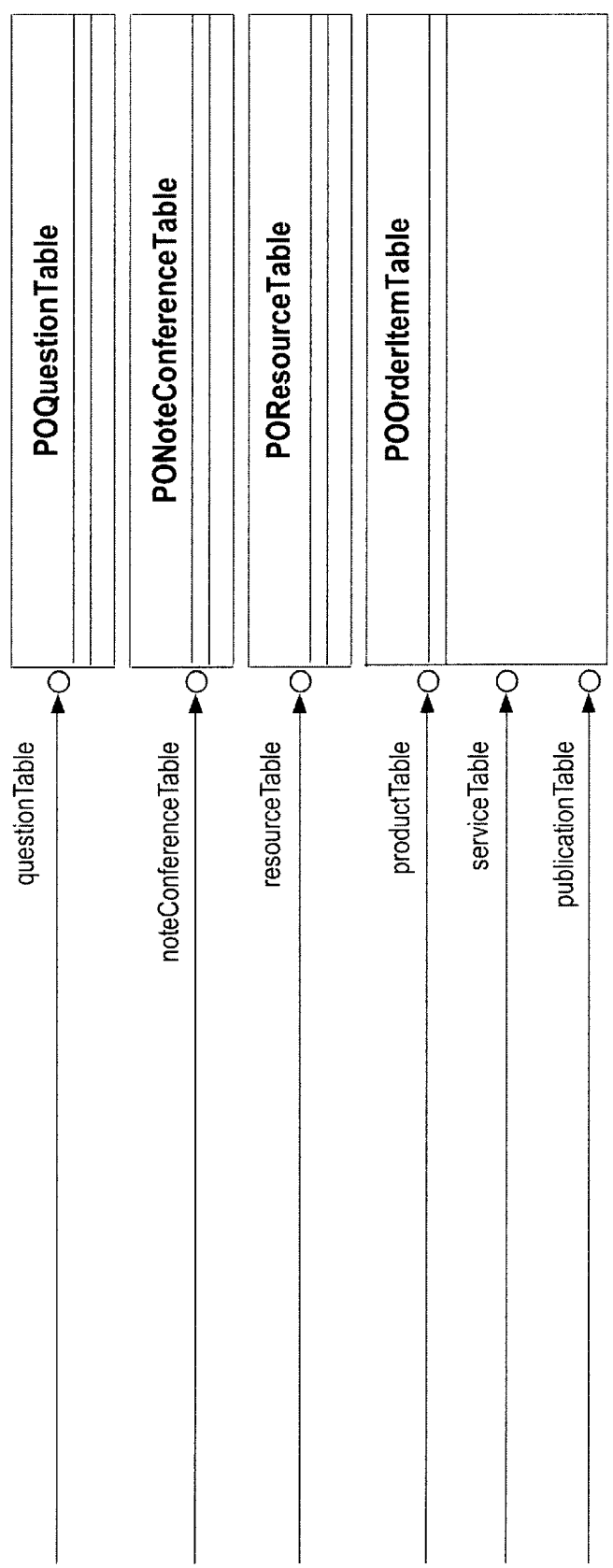
Figure 57:
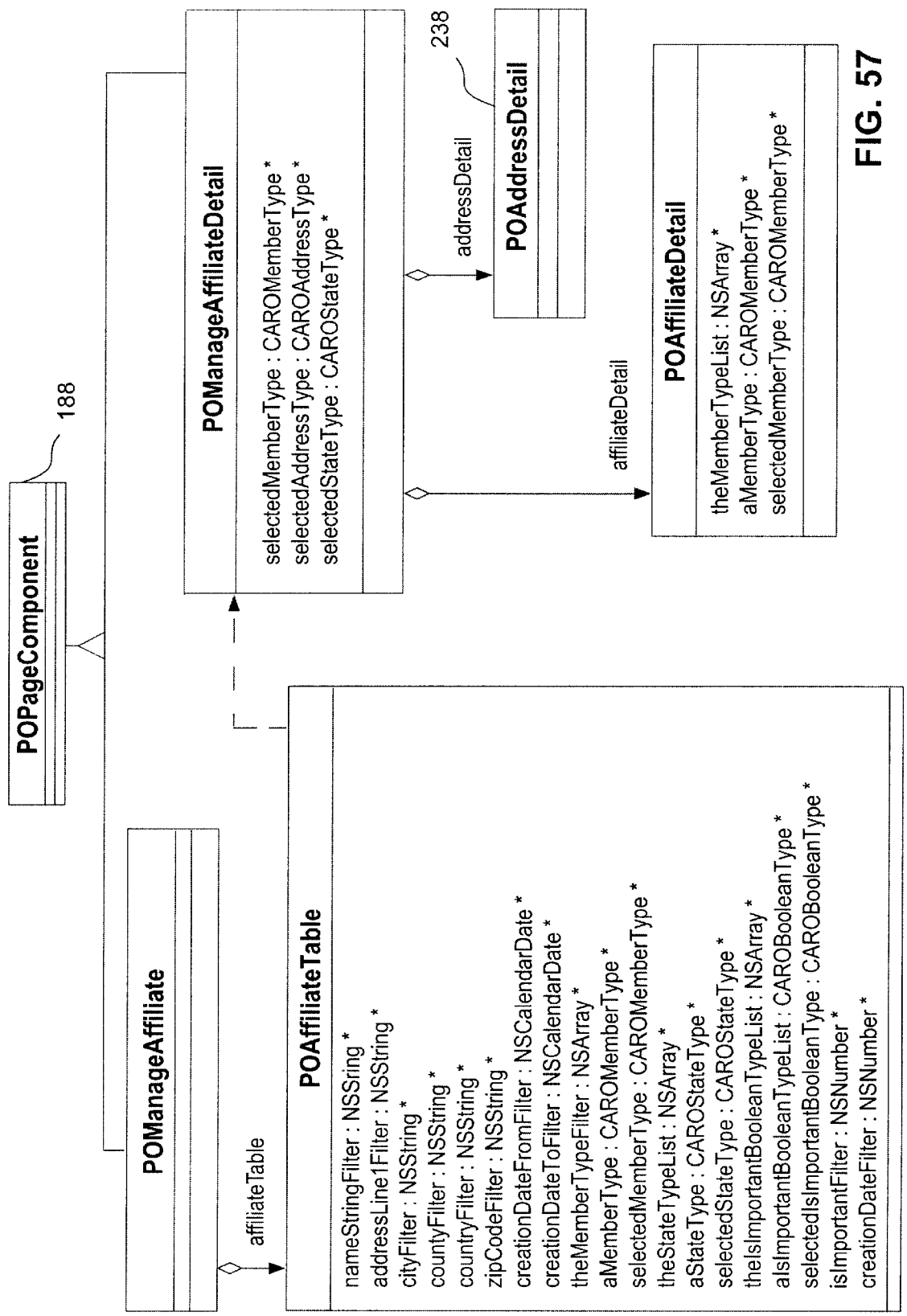
Figure 58:
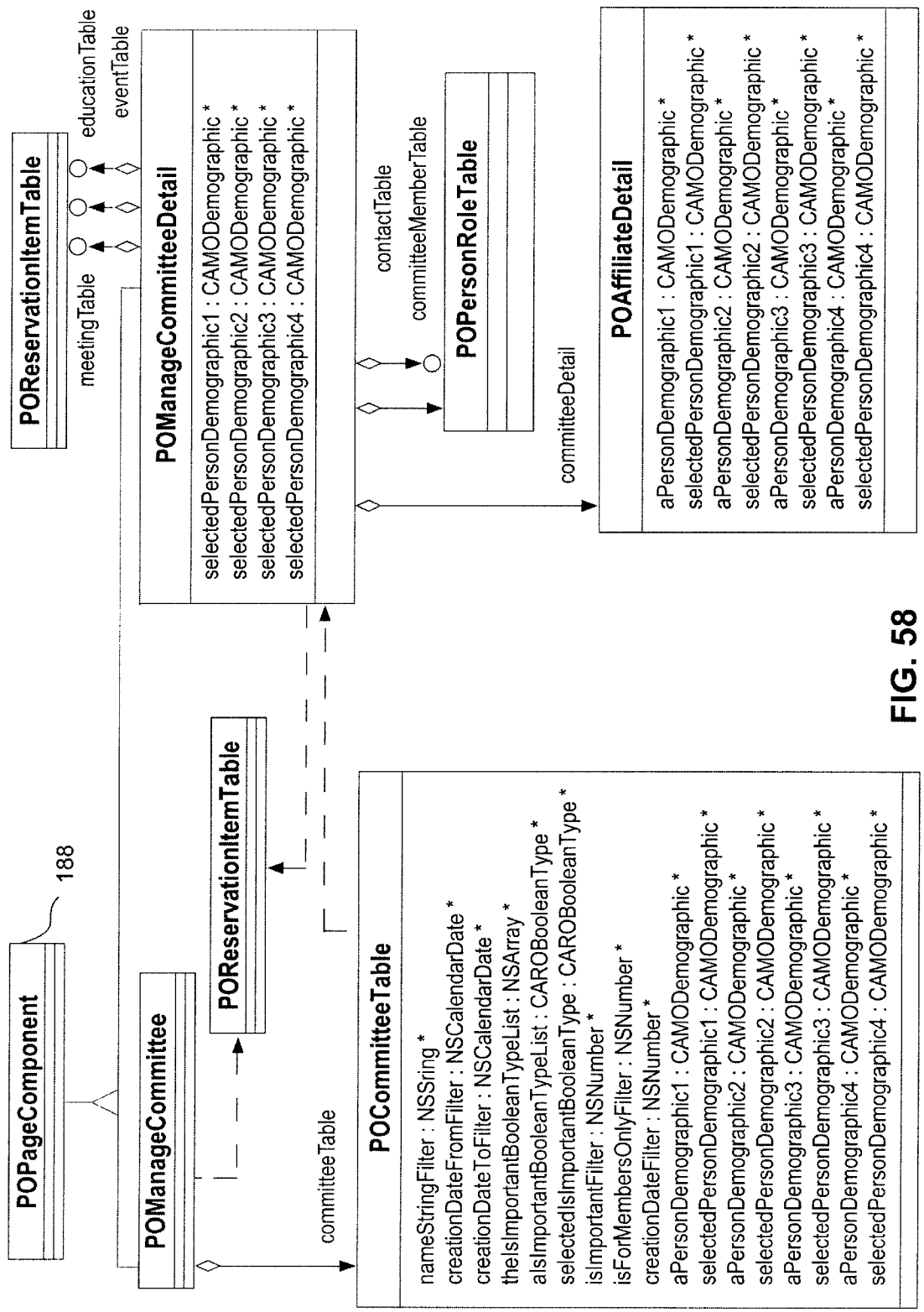
Figure 59A:
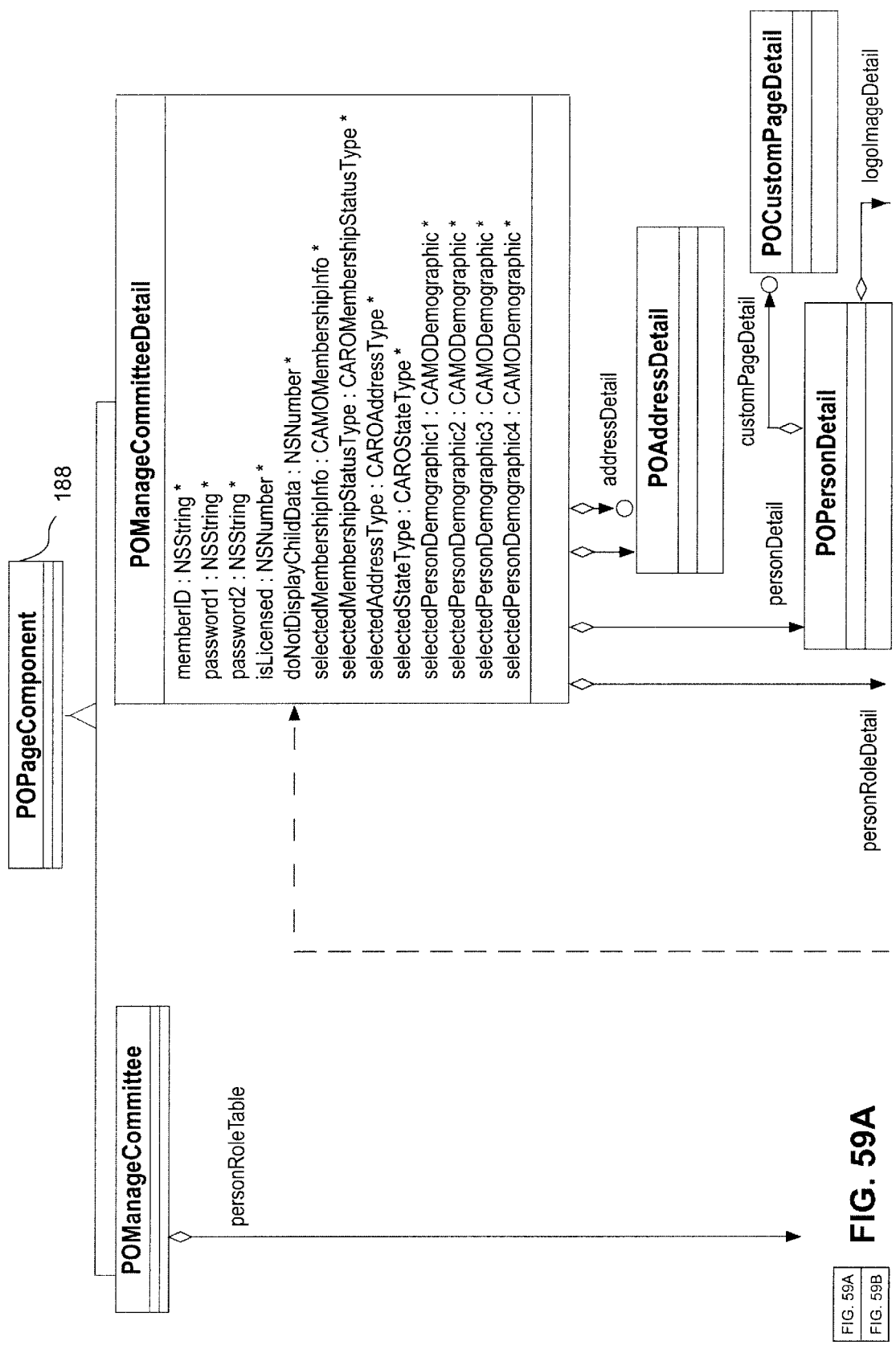
Figure 59B:
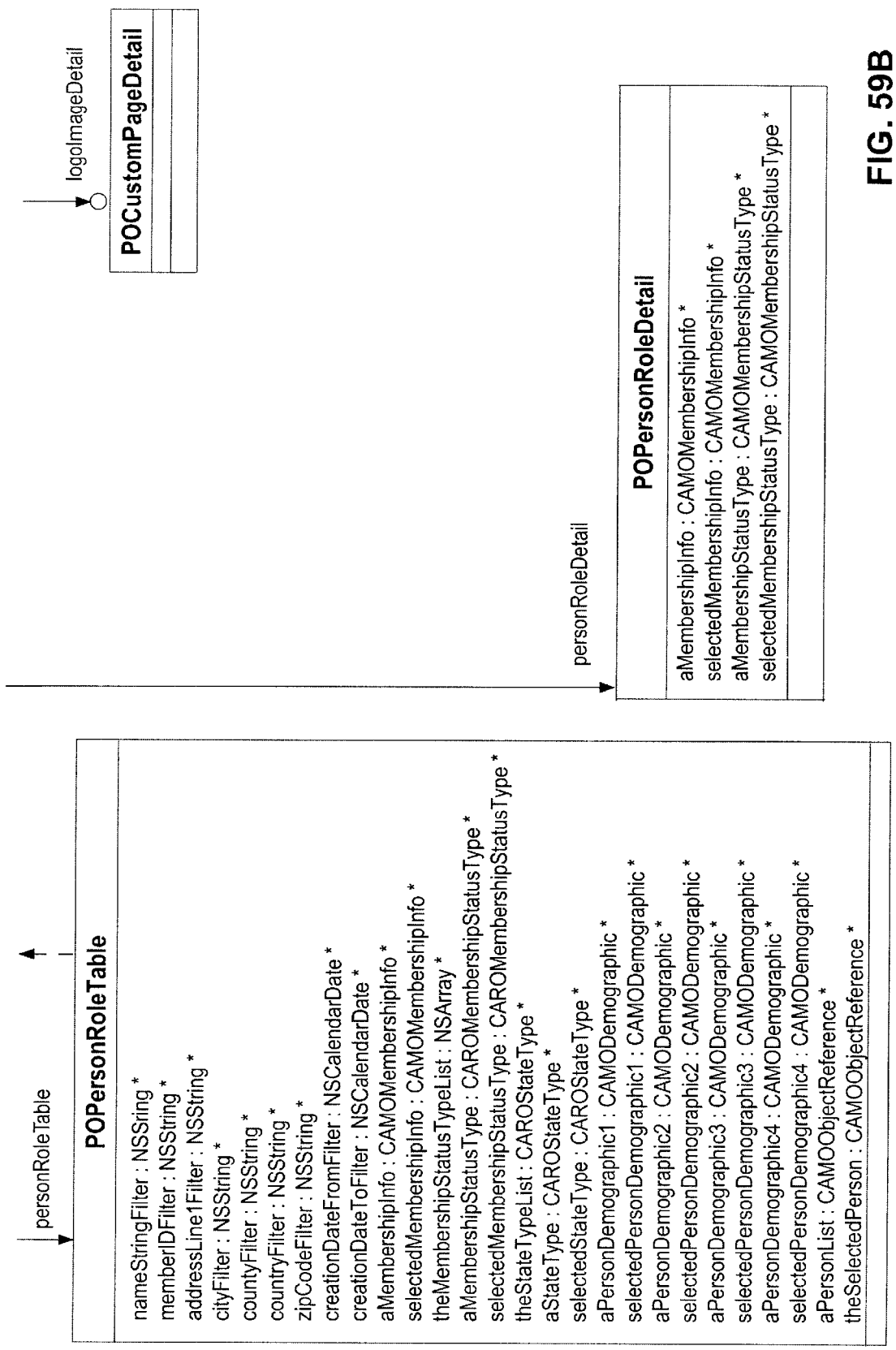
Figure 60A:
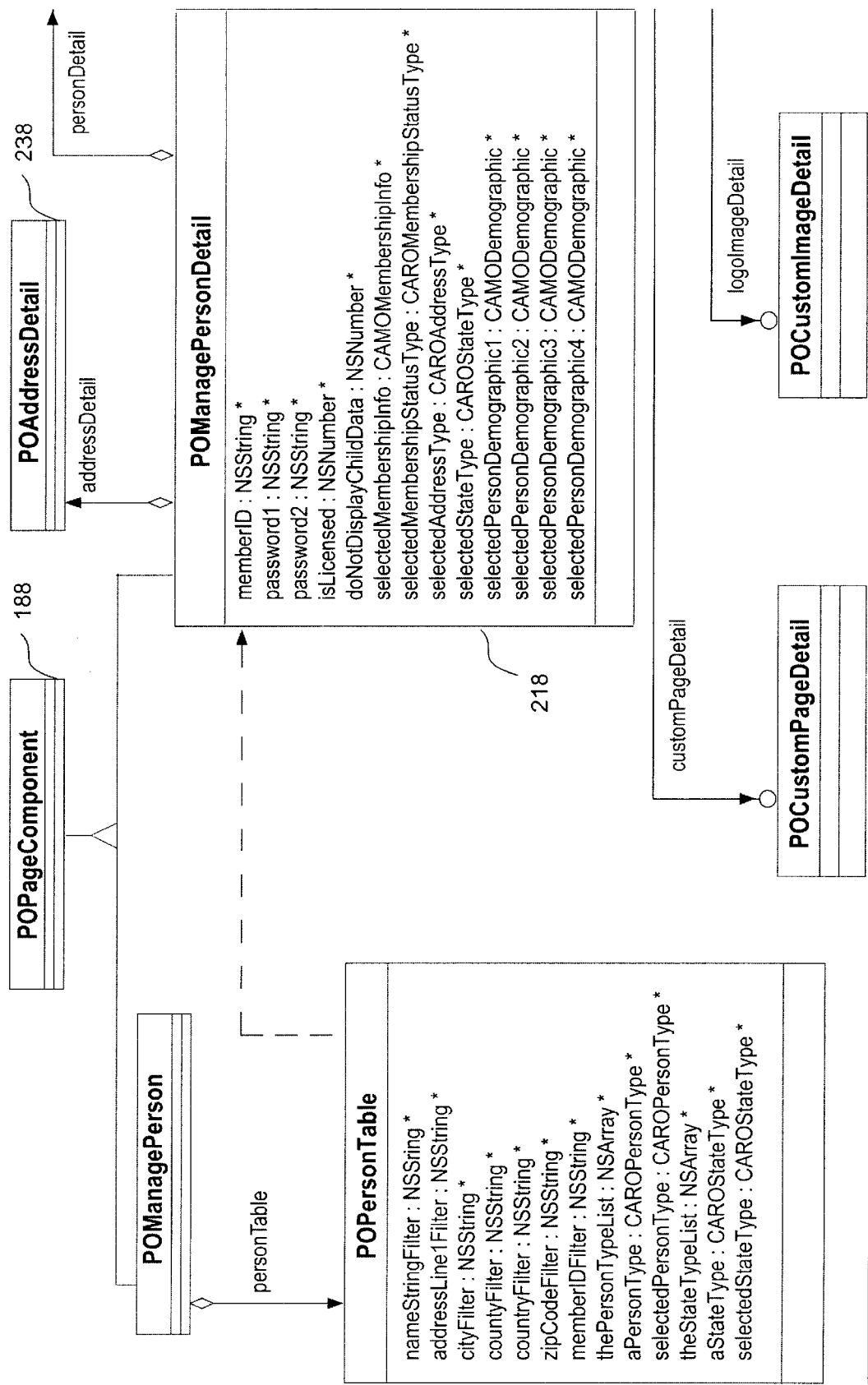
Figure 60B:
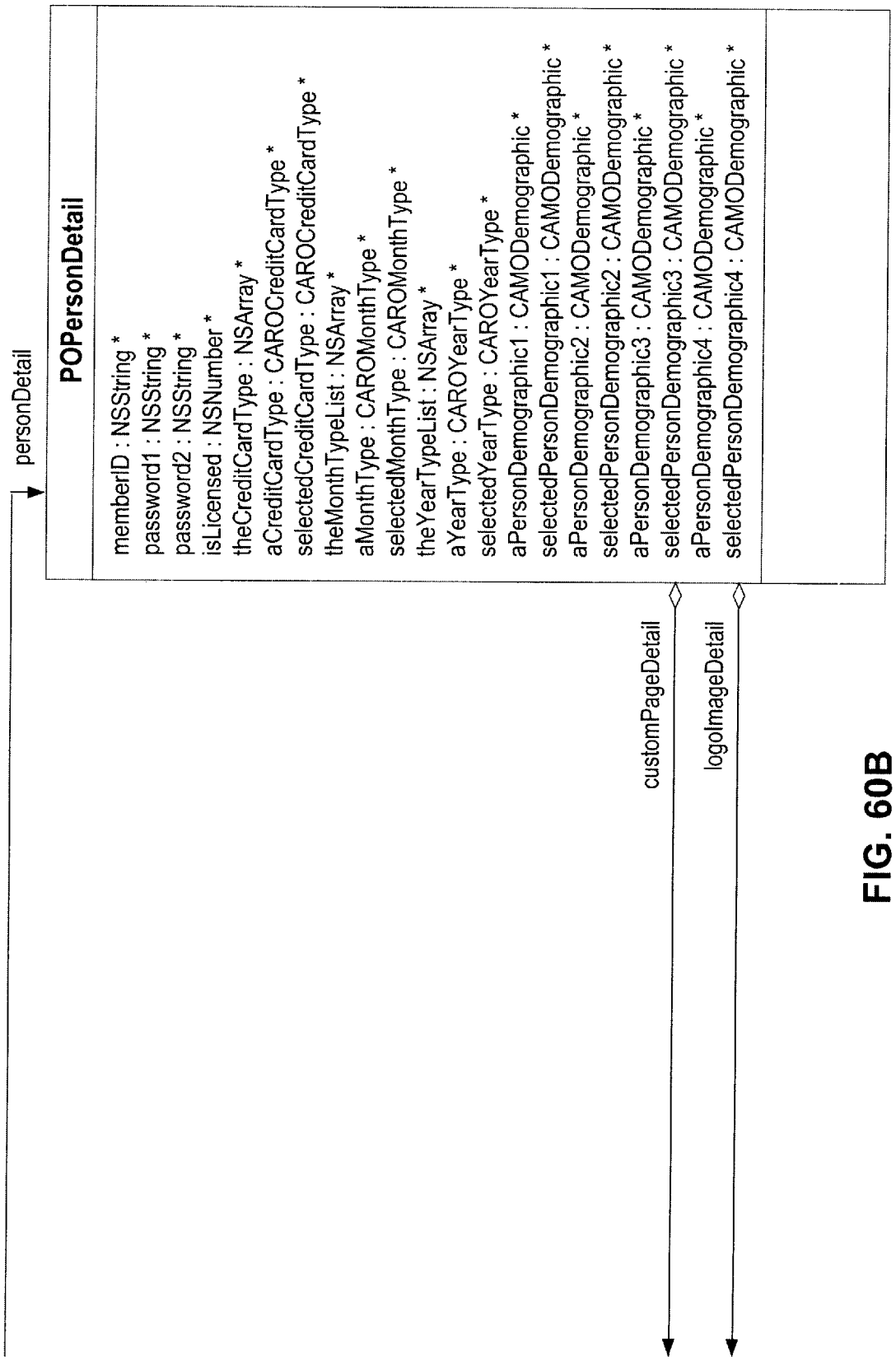
Figure 61:
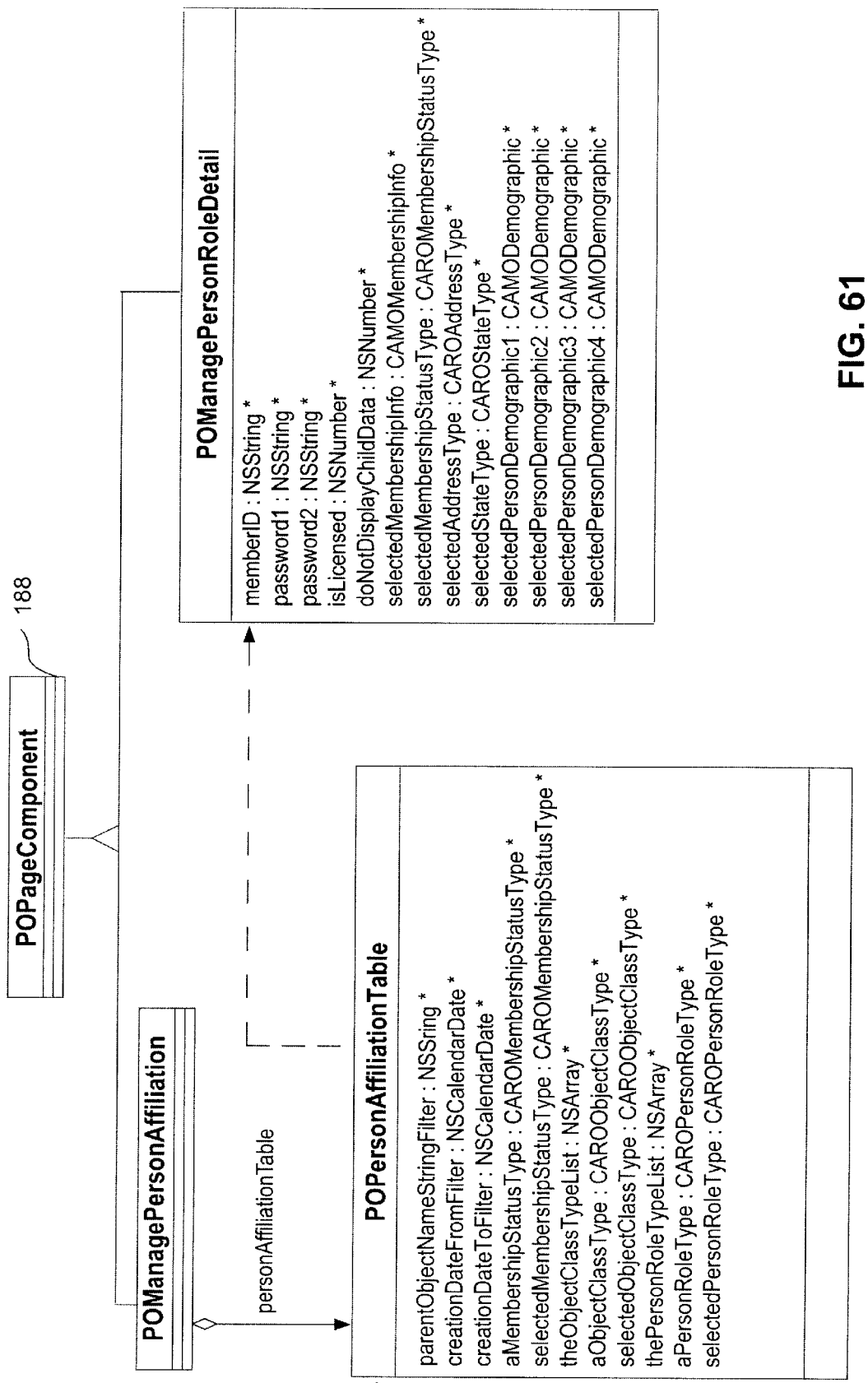
Figure 62B:
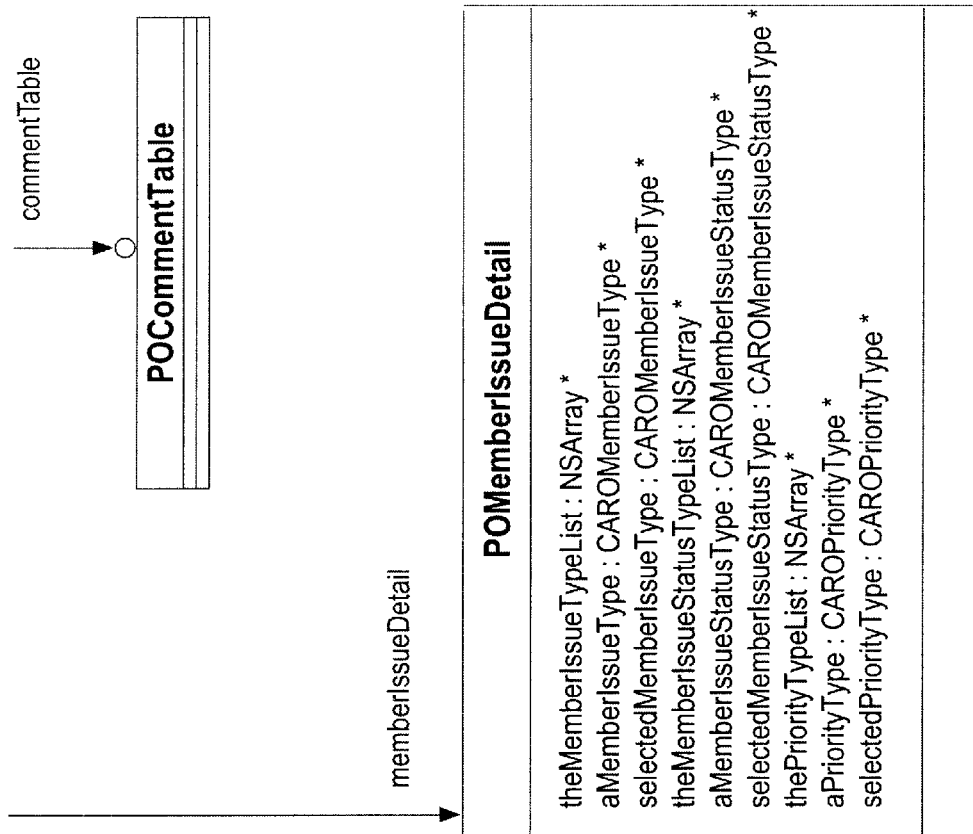
Figure 63:
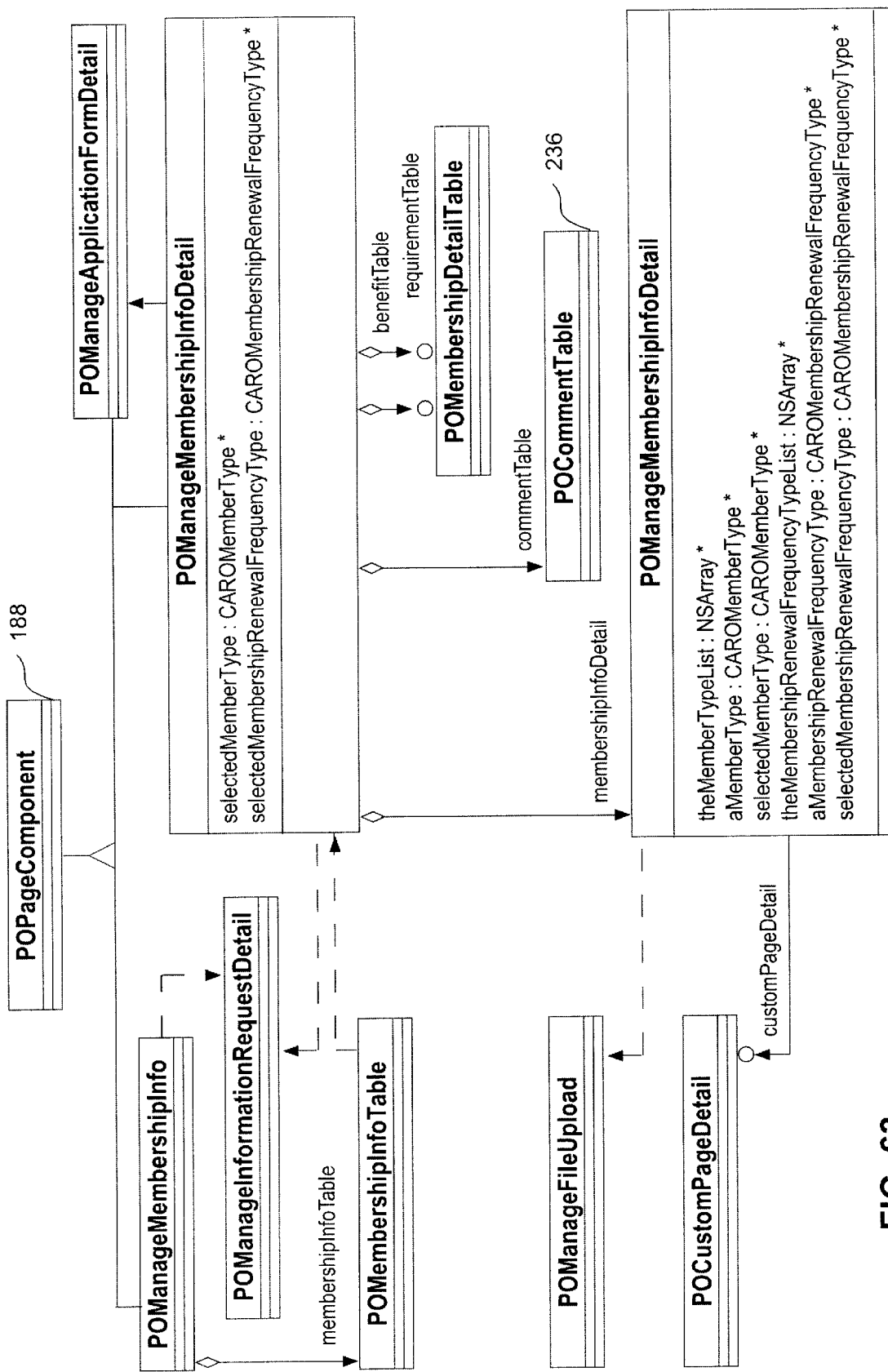
Figure 64:
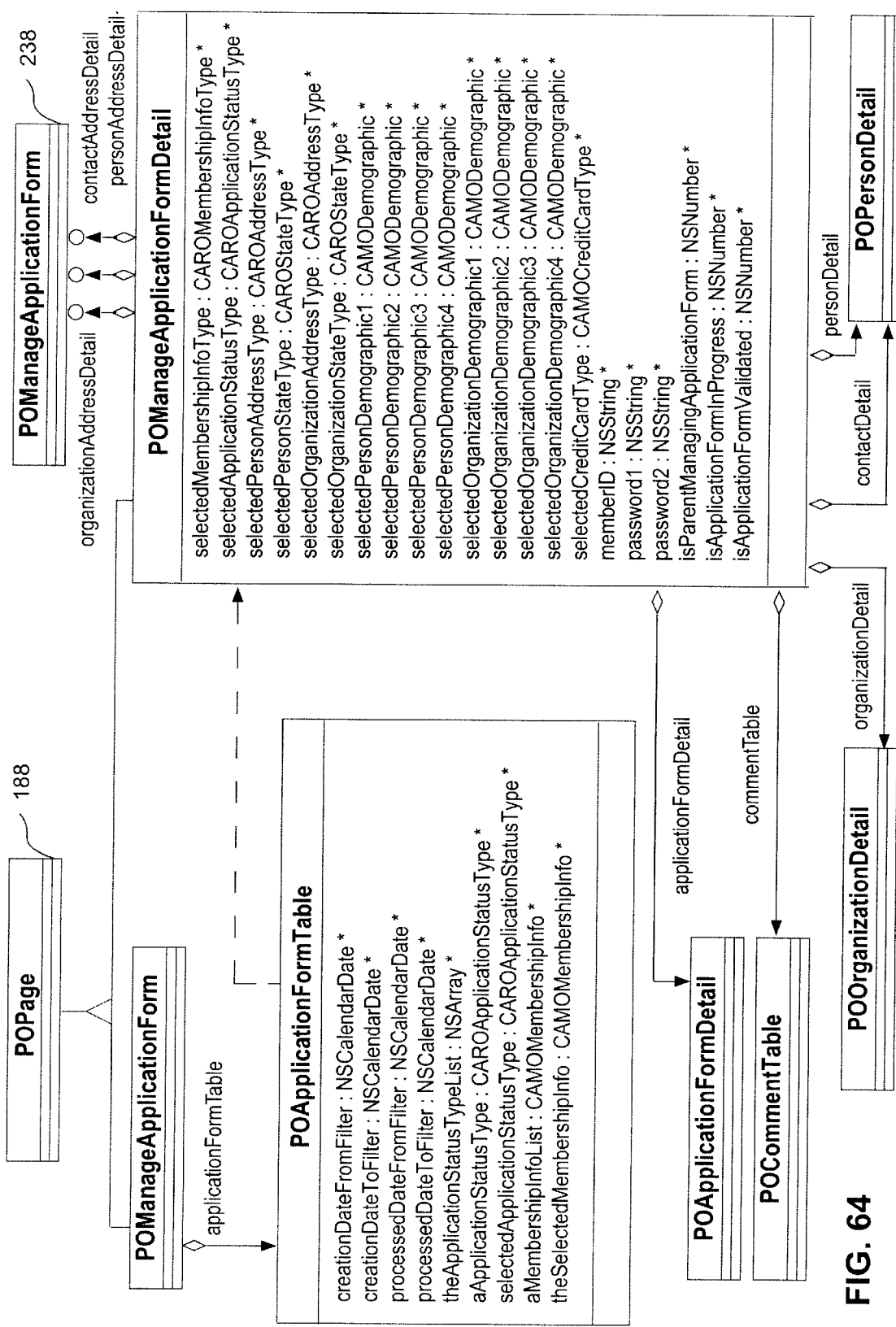
Figure 65A:
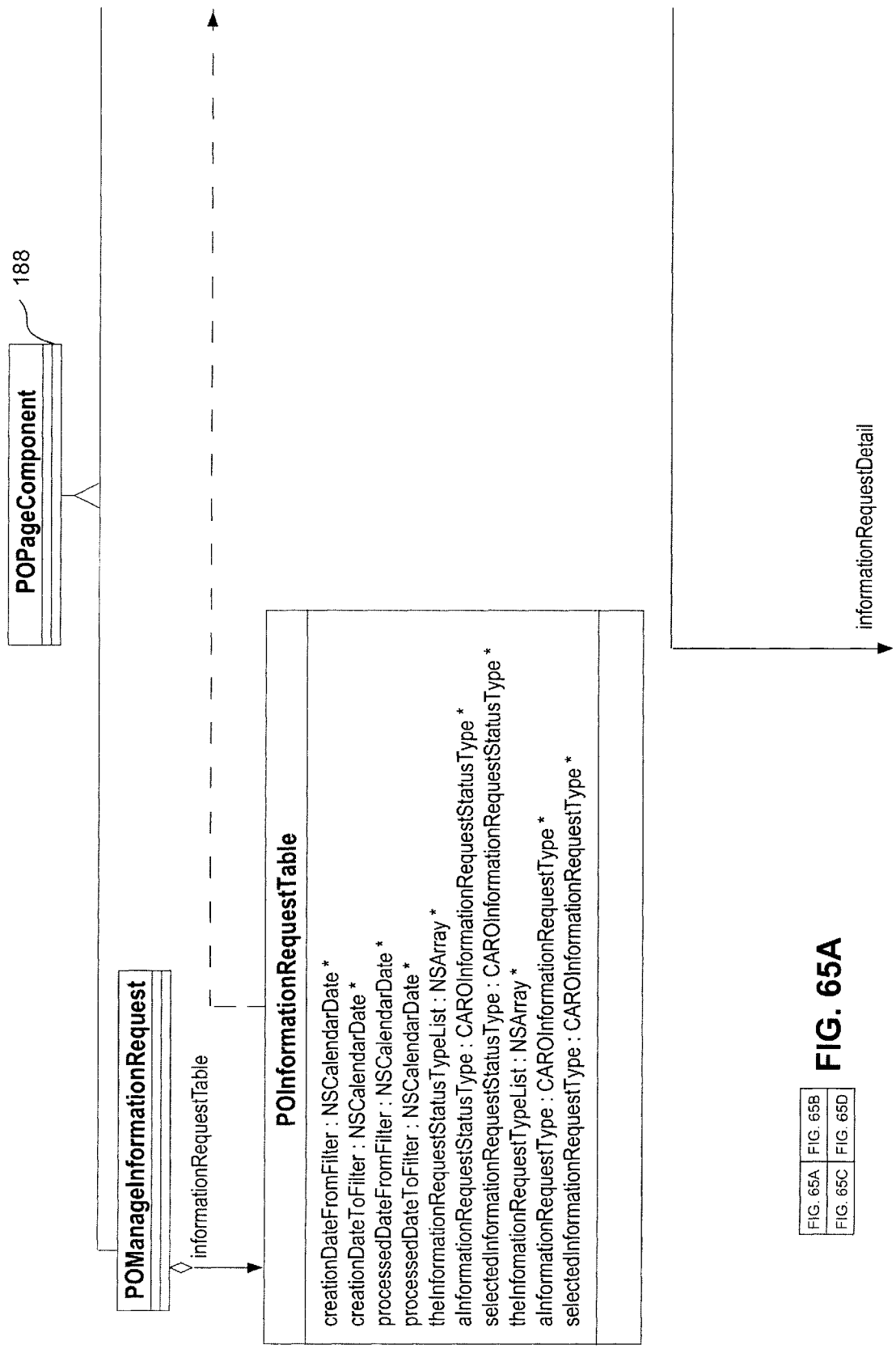
Figure 65B:
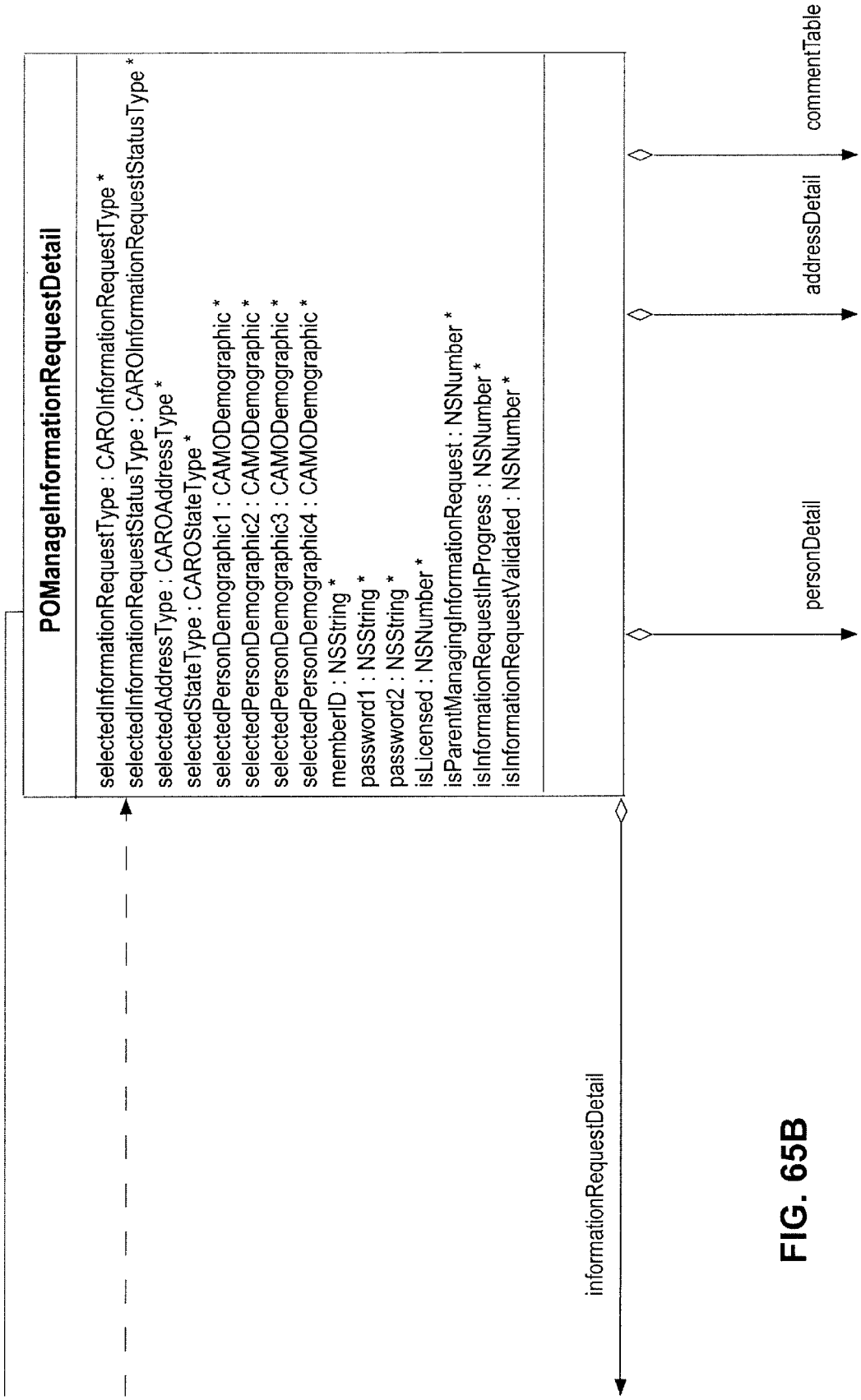
Figure 65C:
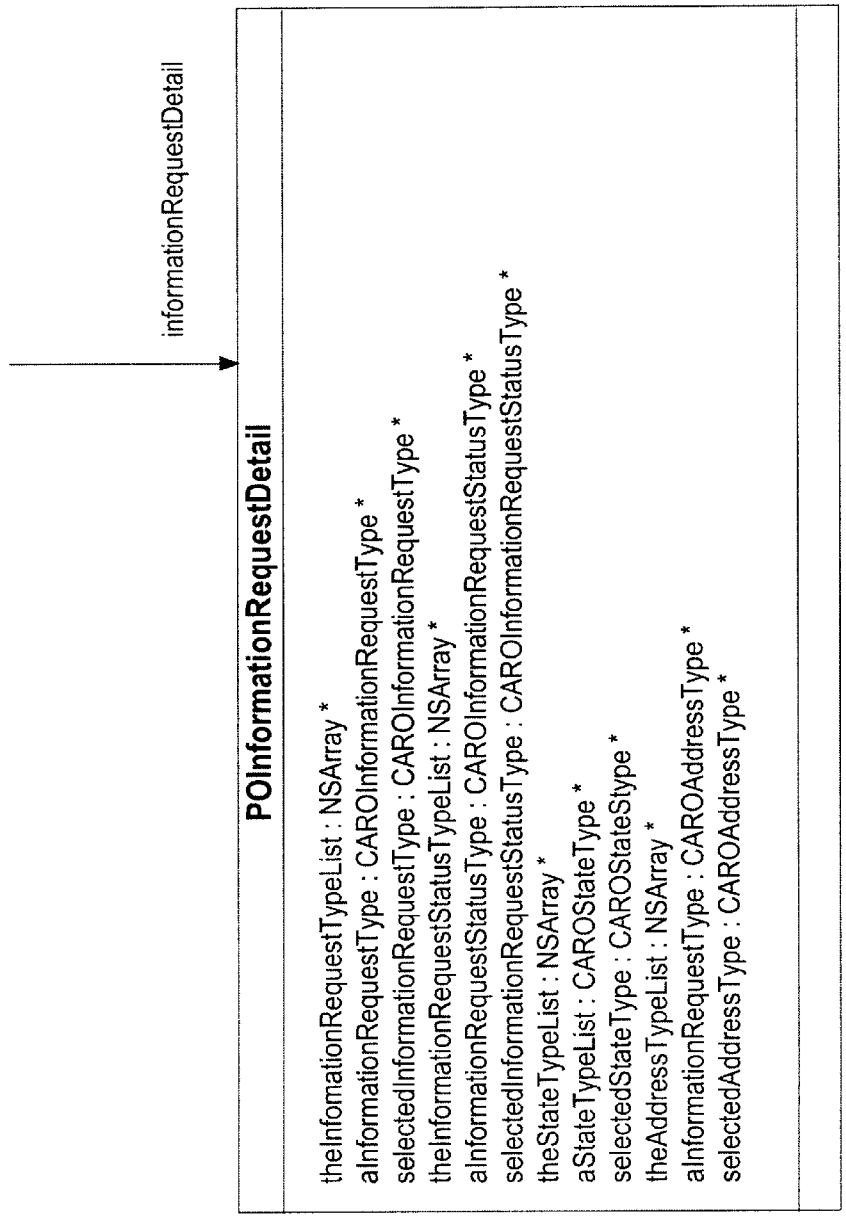
Figure 65D:
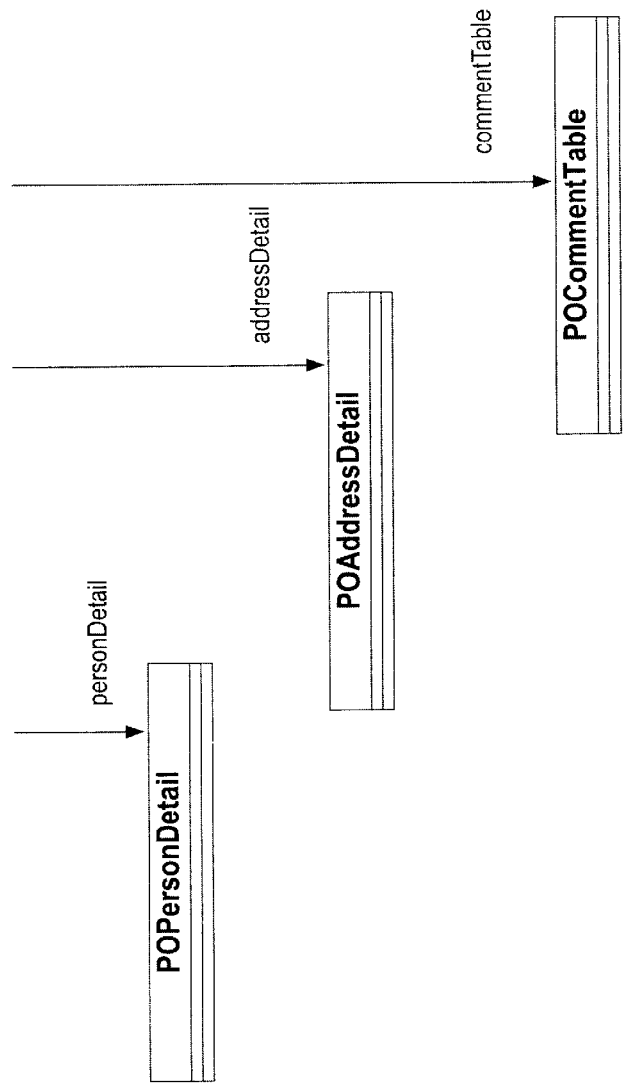
Figure 66B:
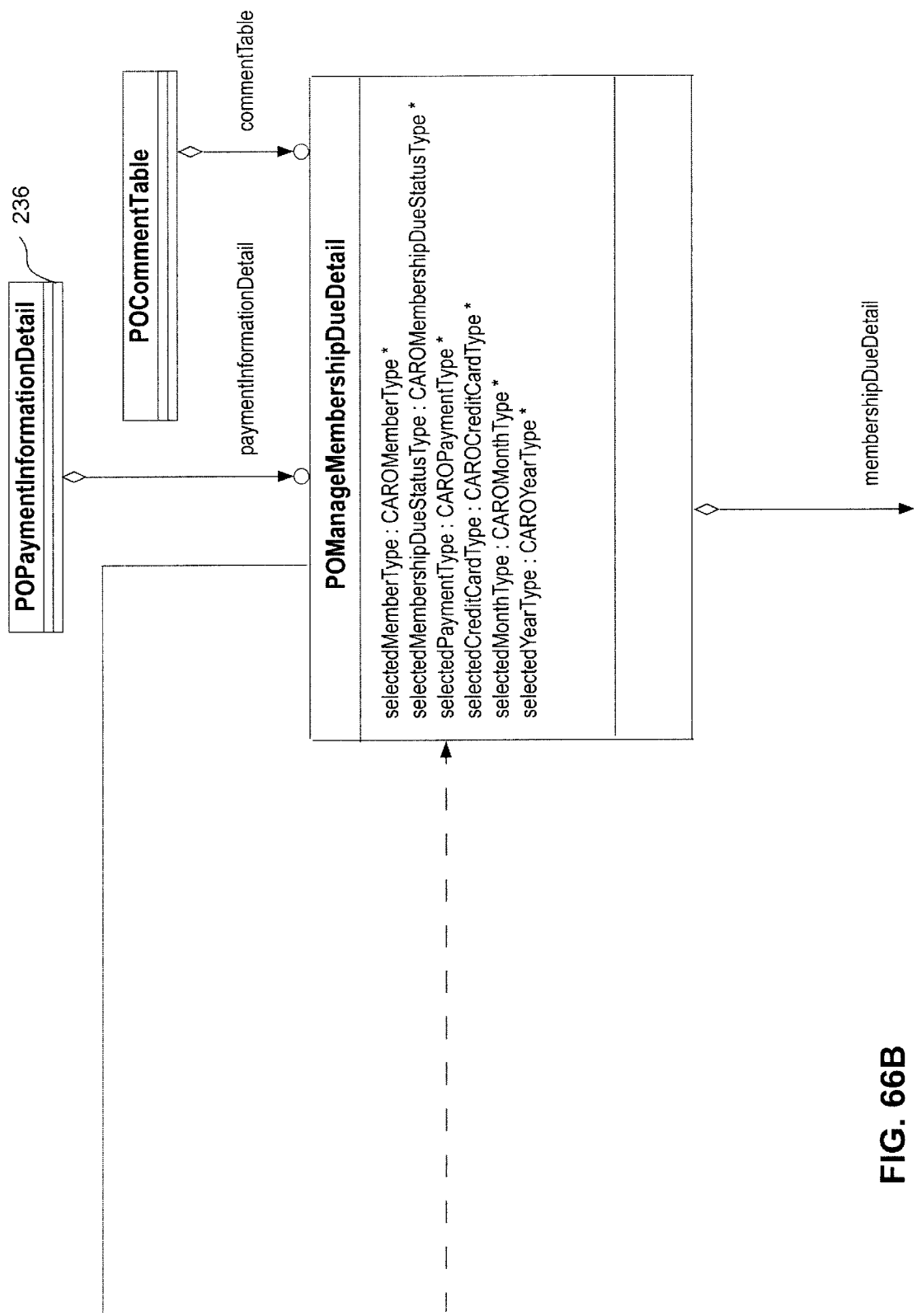
Figure 66C:
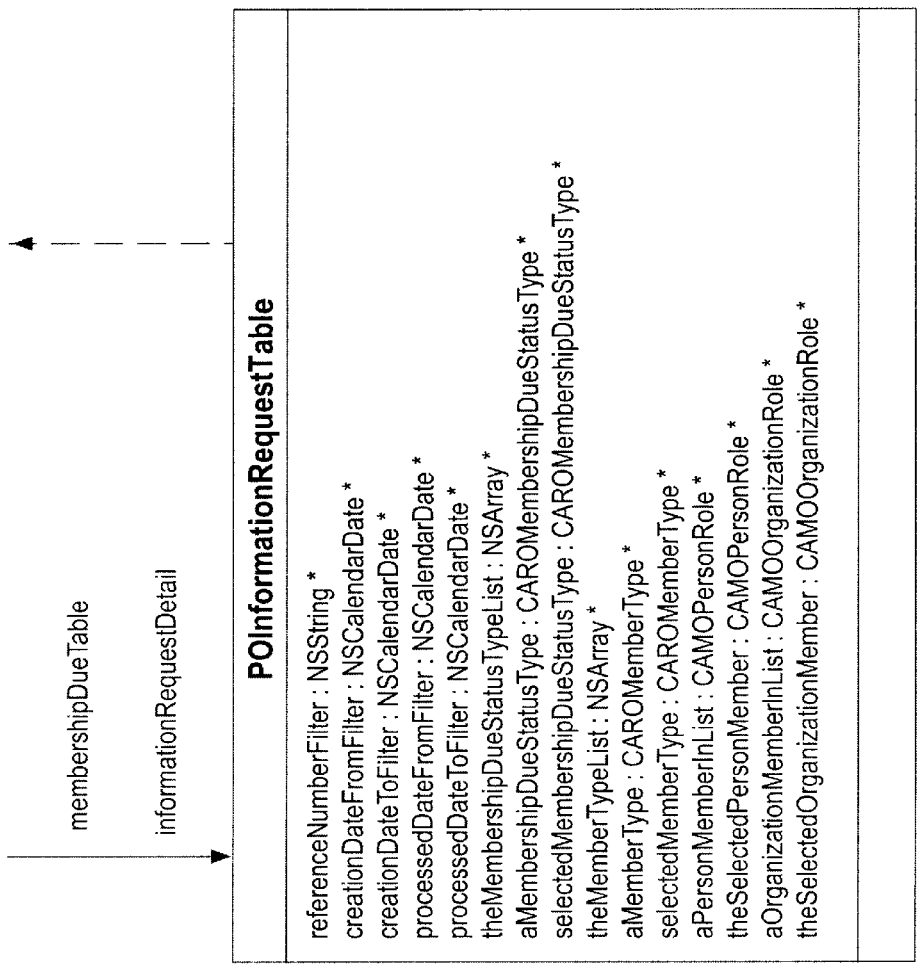
Figure 66D:
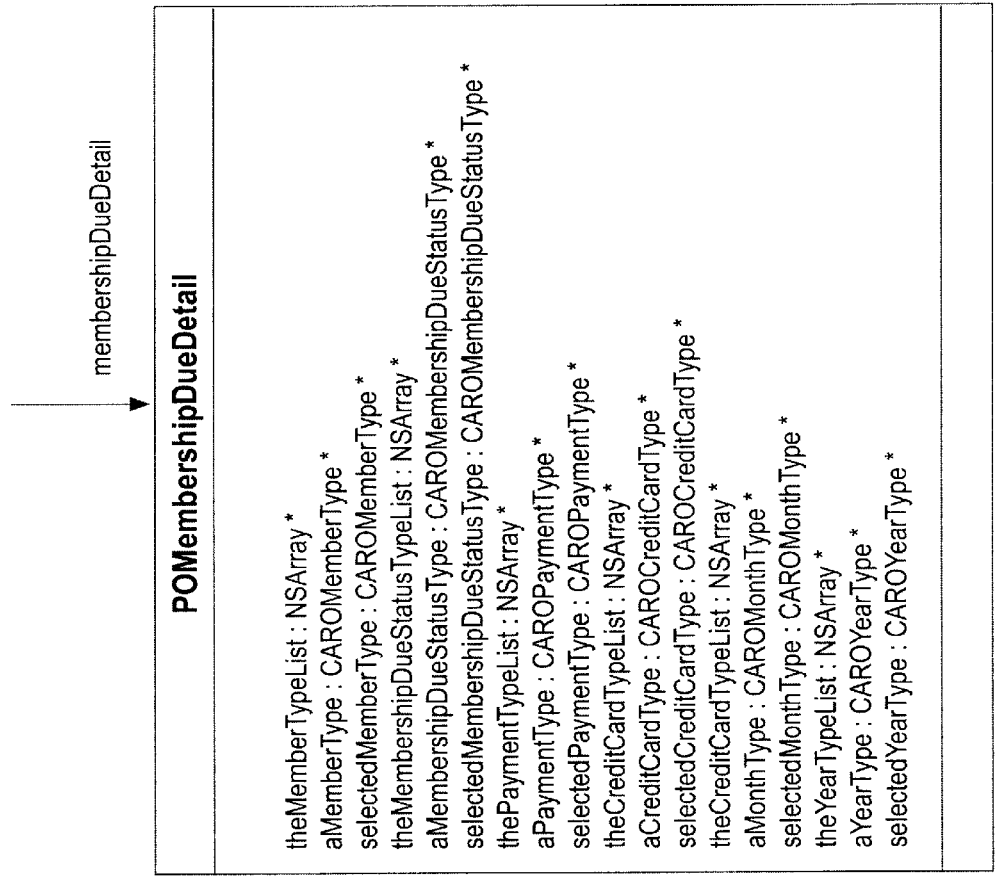
Figure 67:
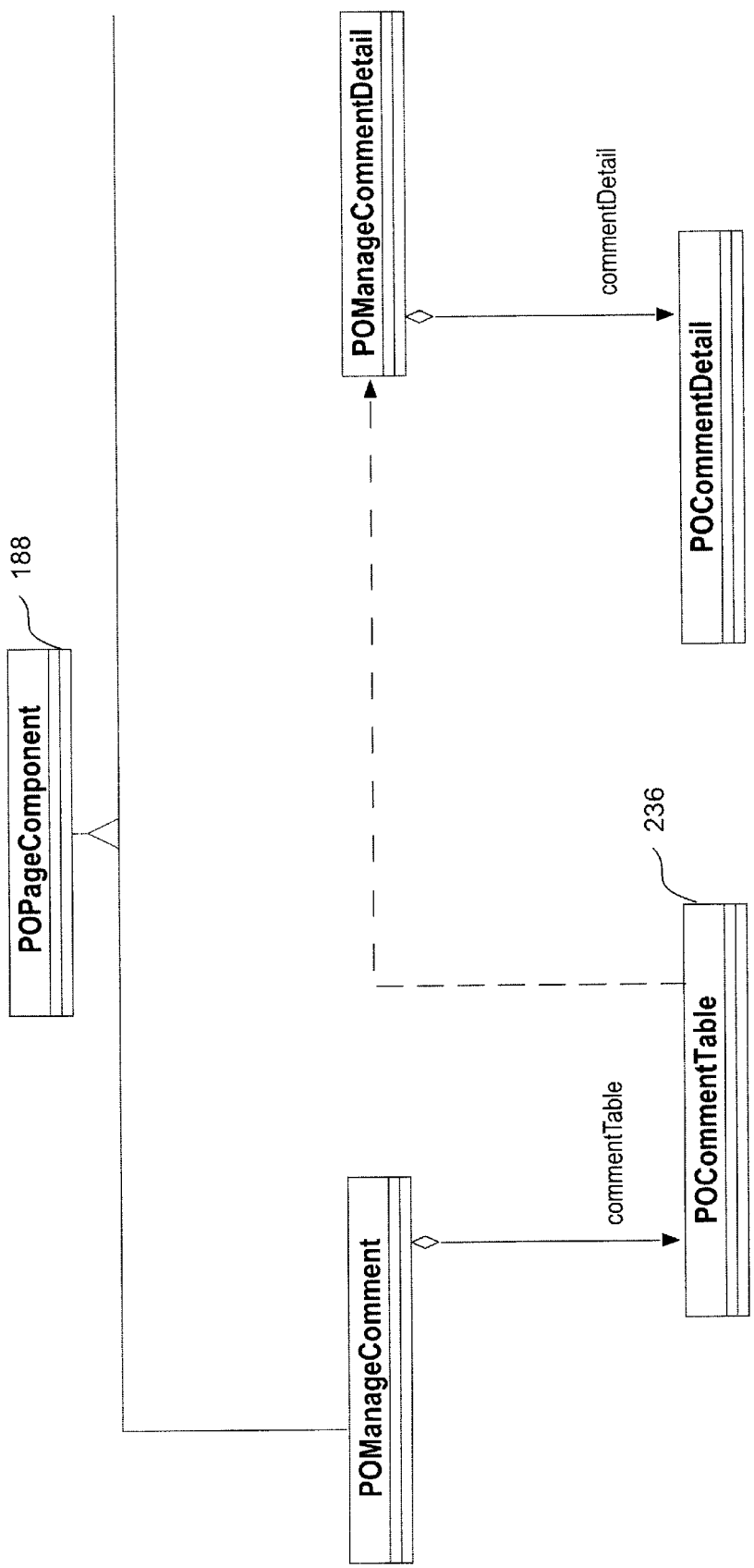
Figure 68A:
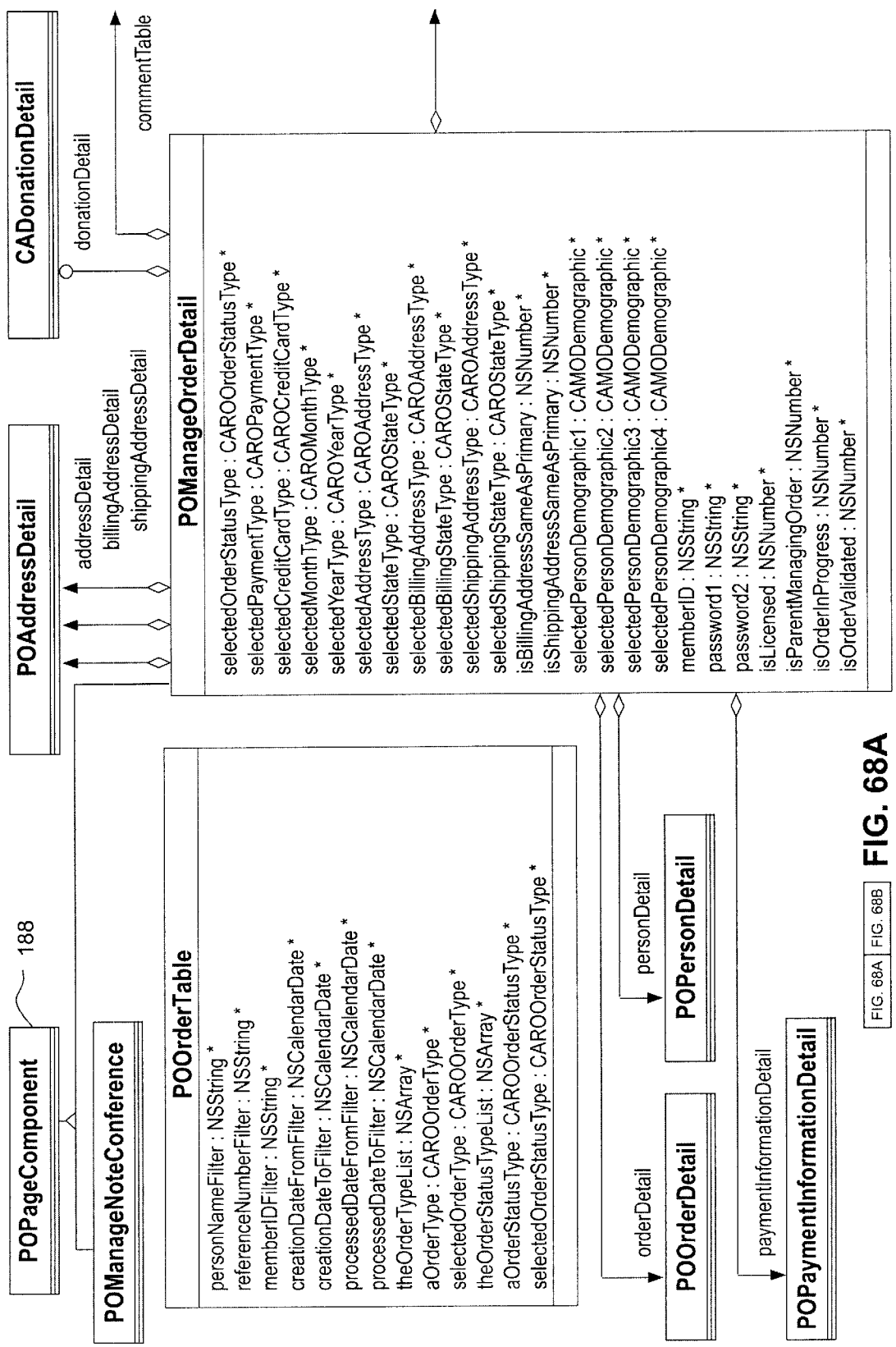
Figure 68B:
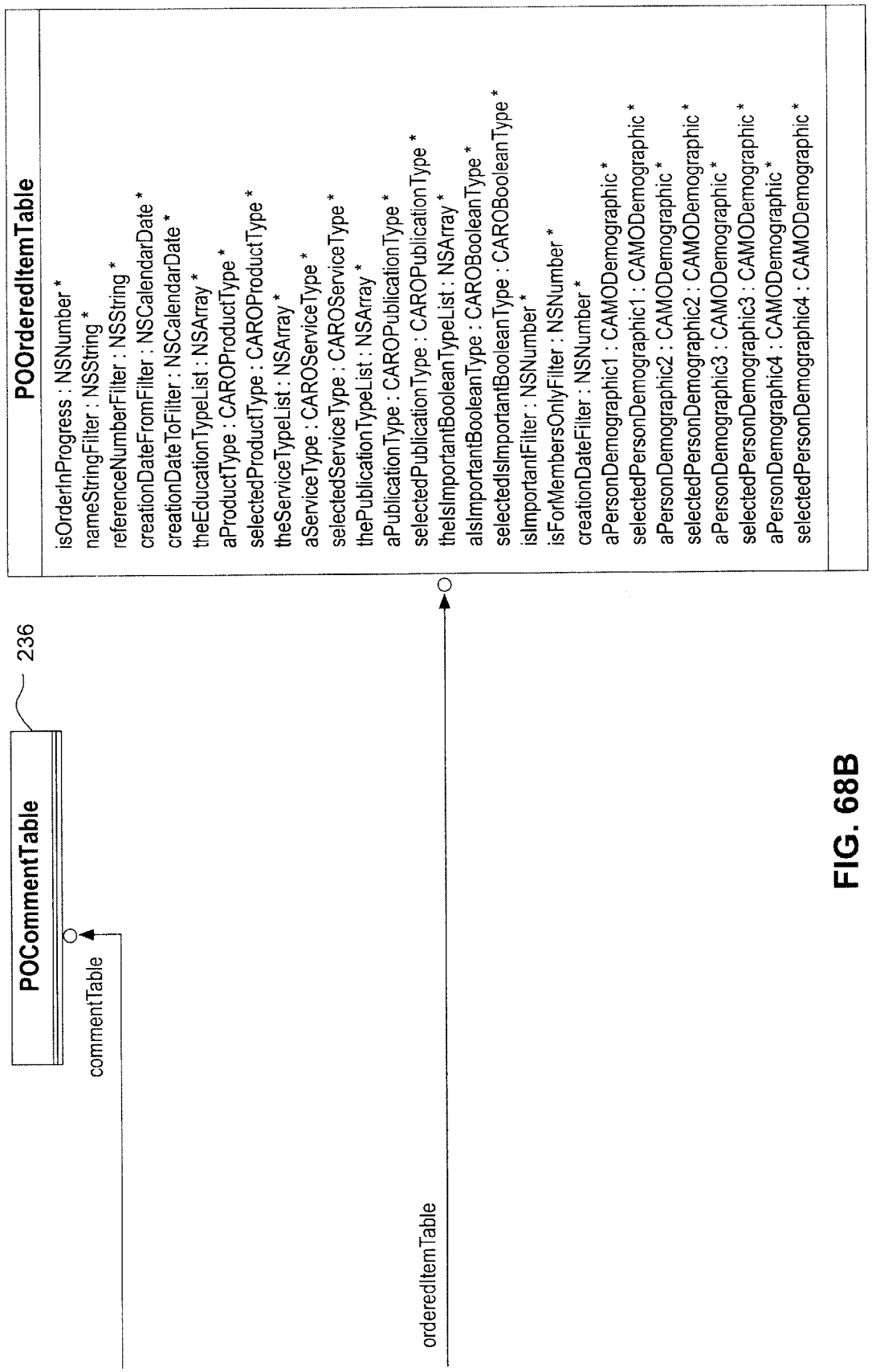
Figure 69A:
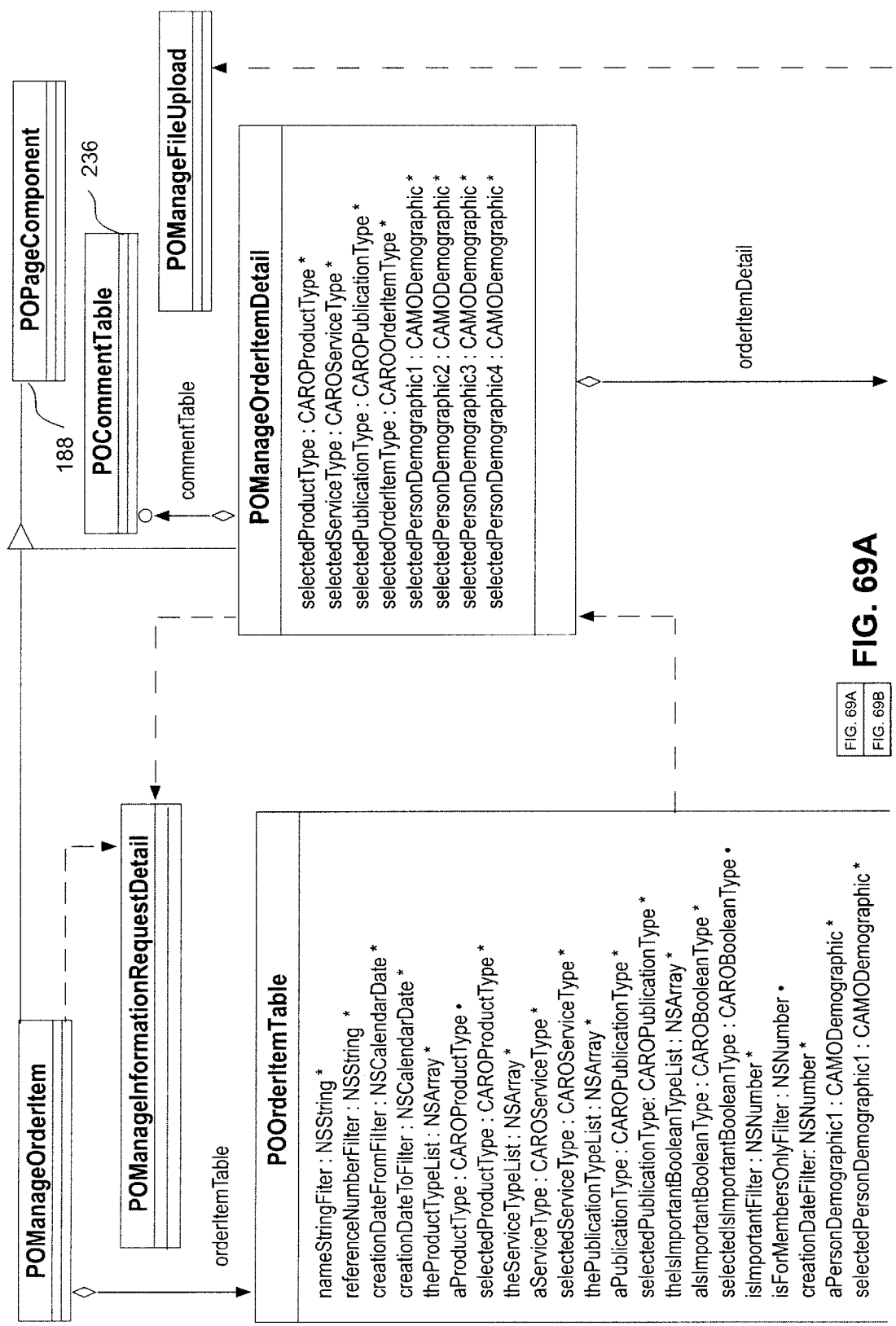
Figure 69B:
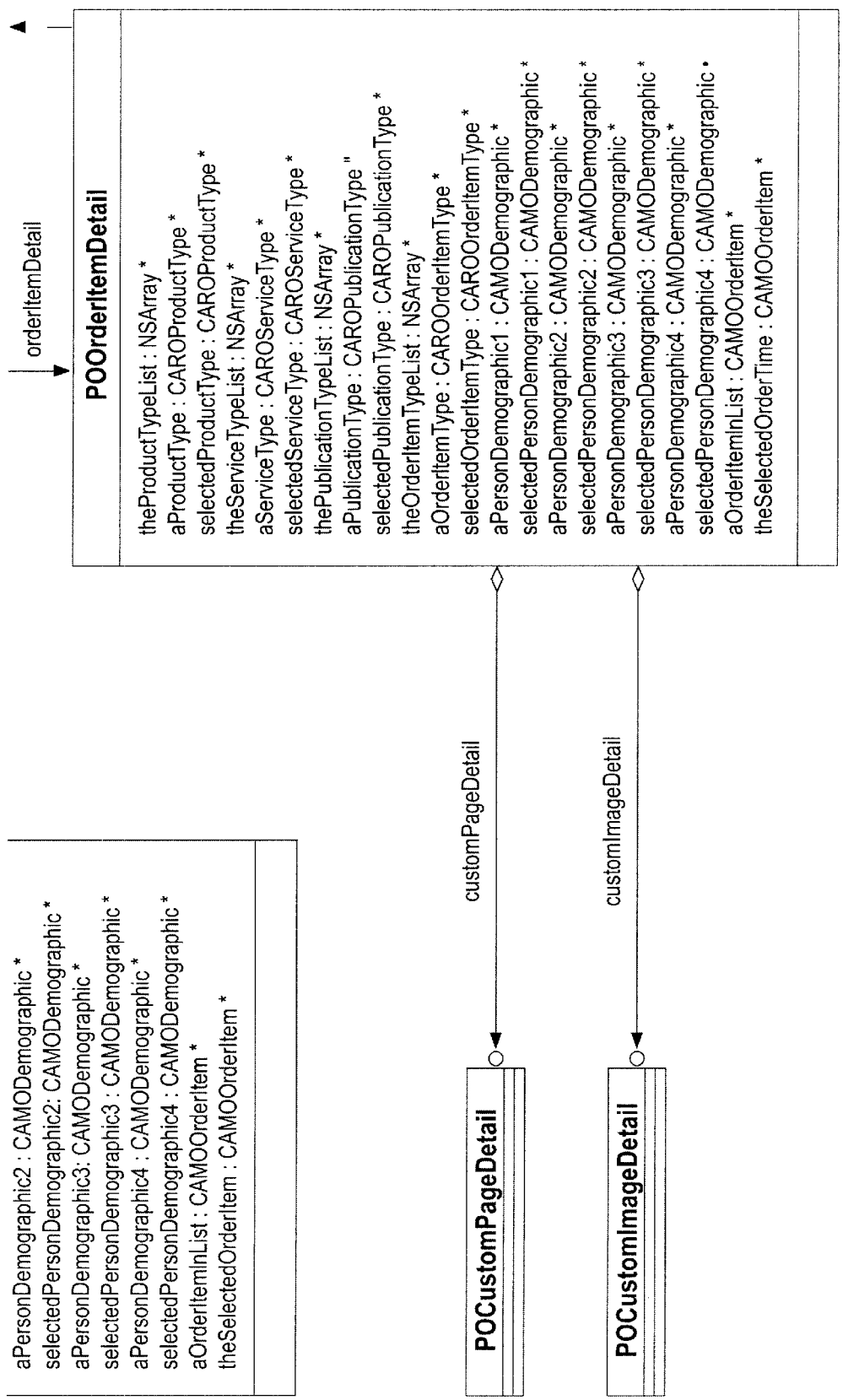
Figure 70B:
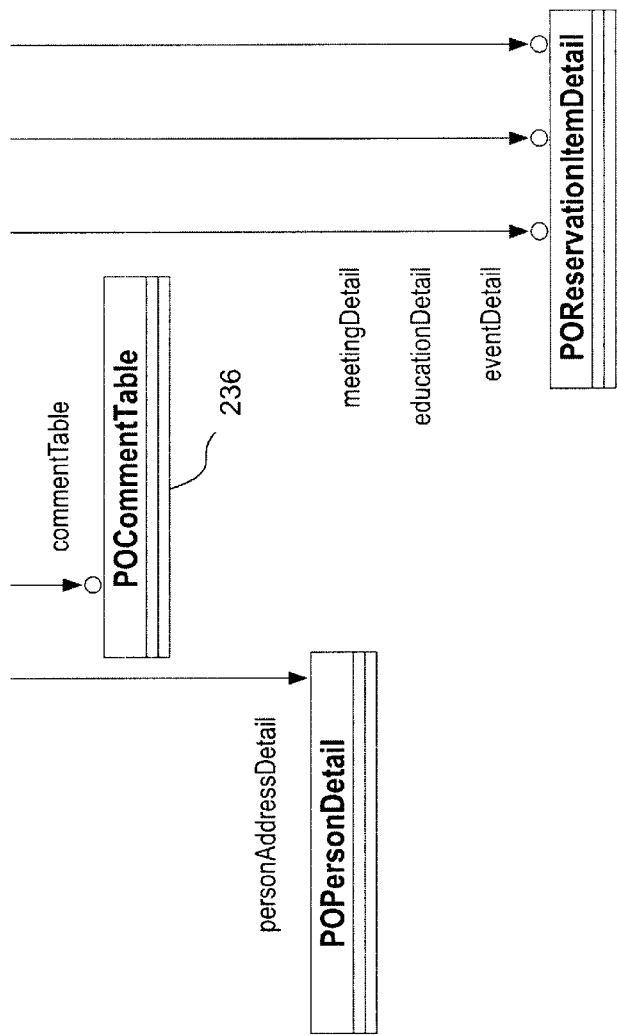
Figure 71A:
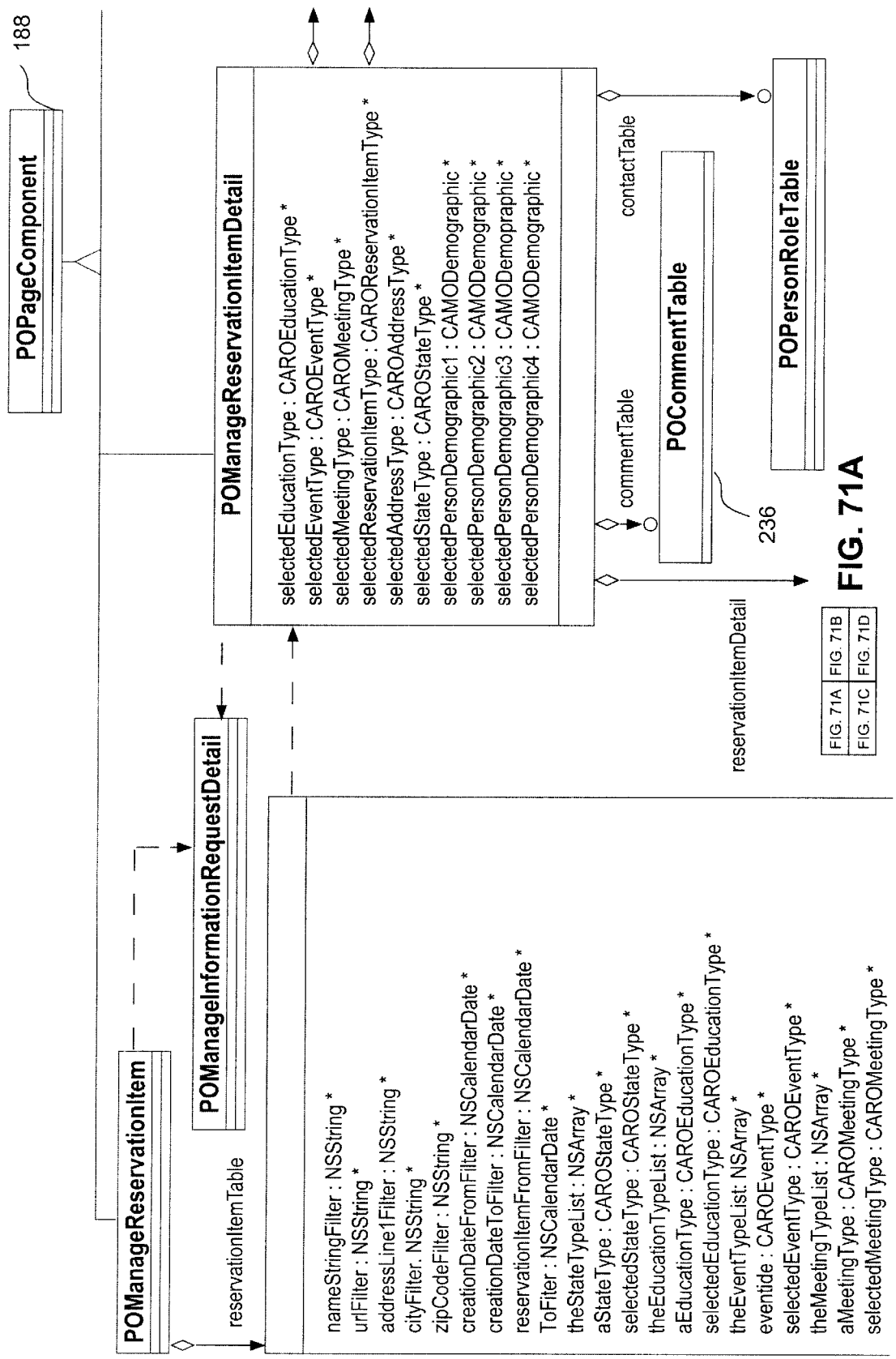
Figure 71B:
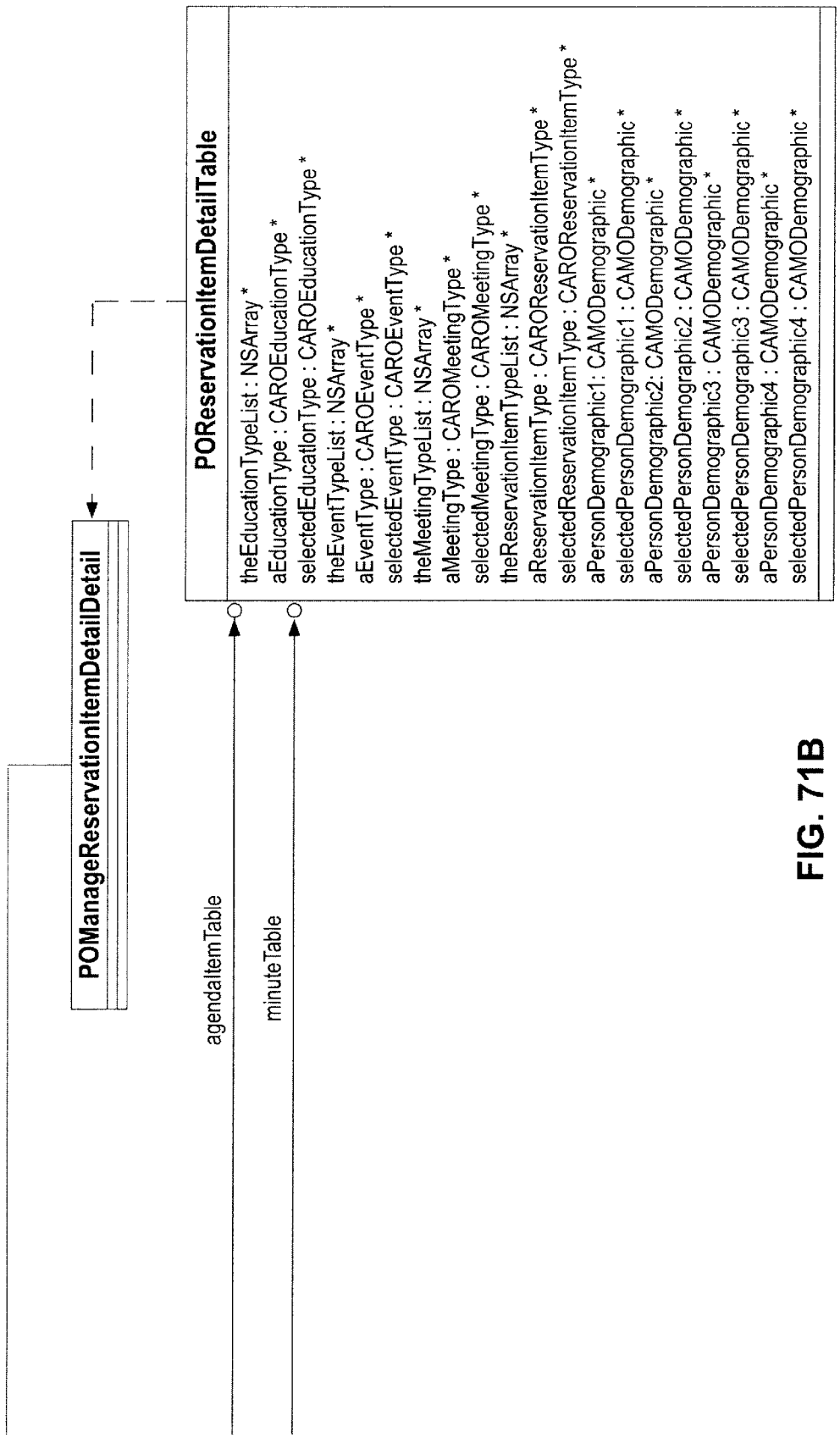
Figure 71C:
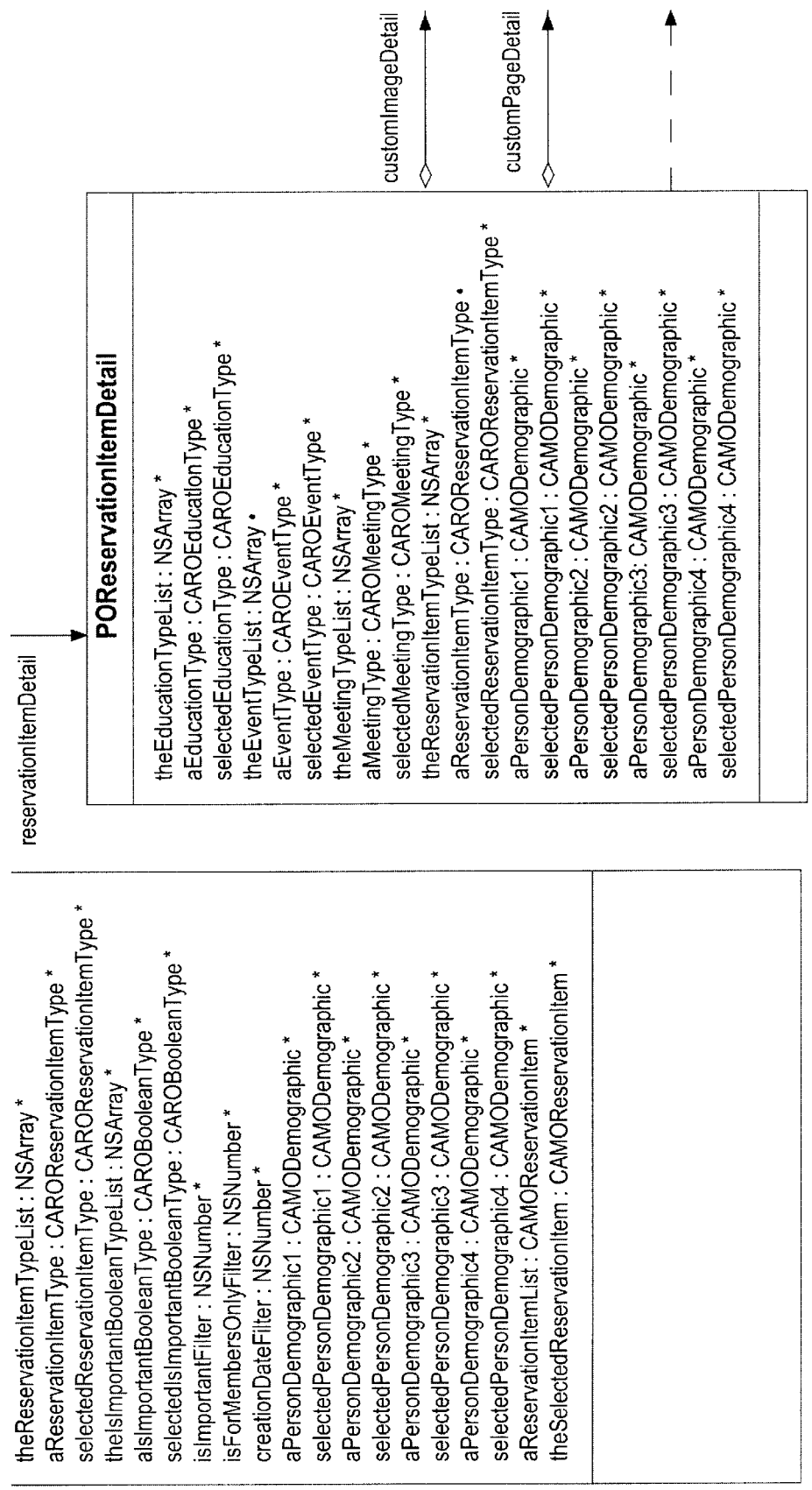
Figure 71D:
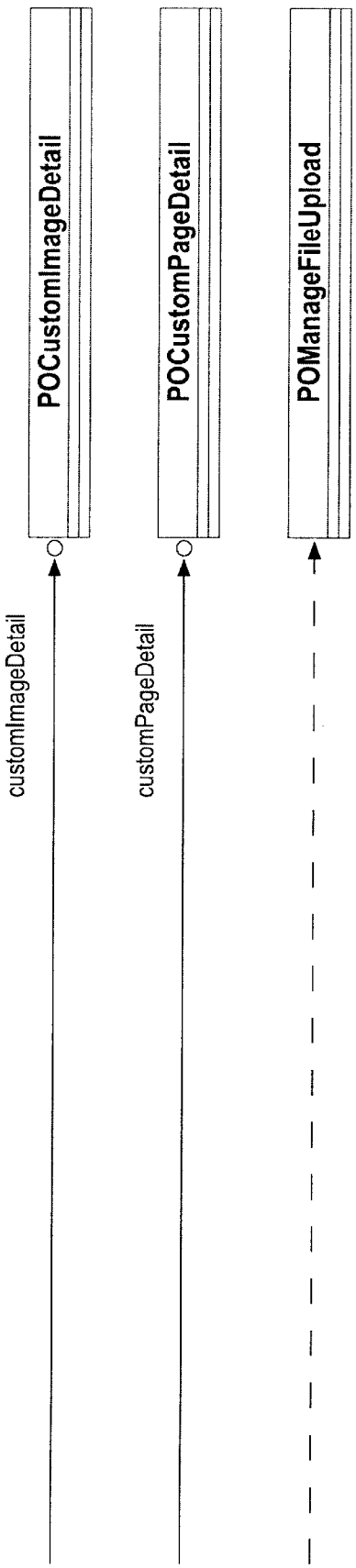
Figure 72:
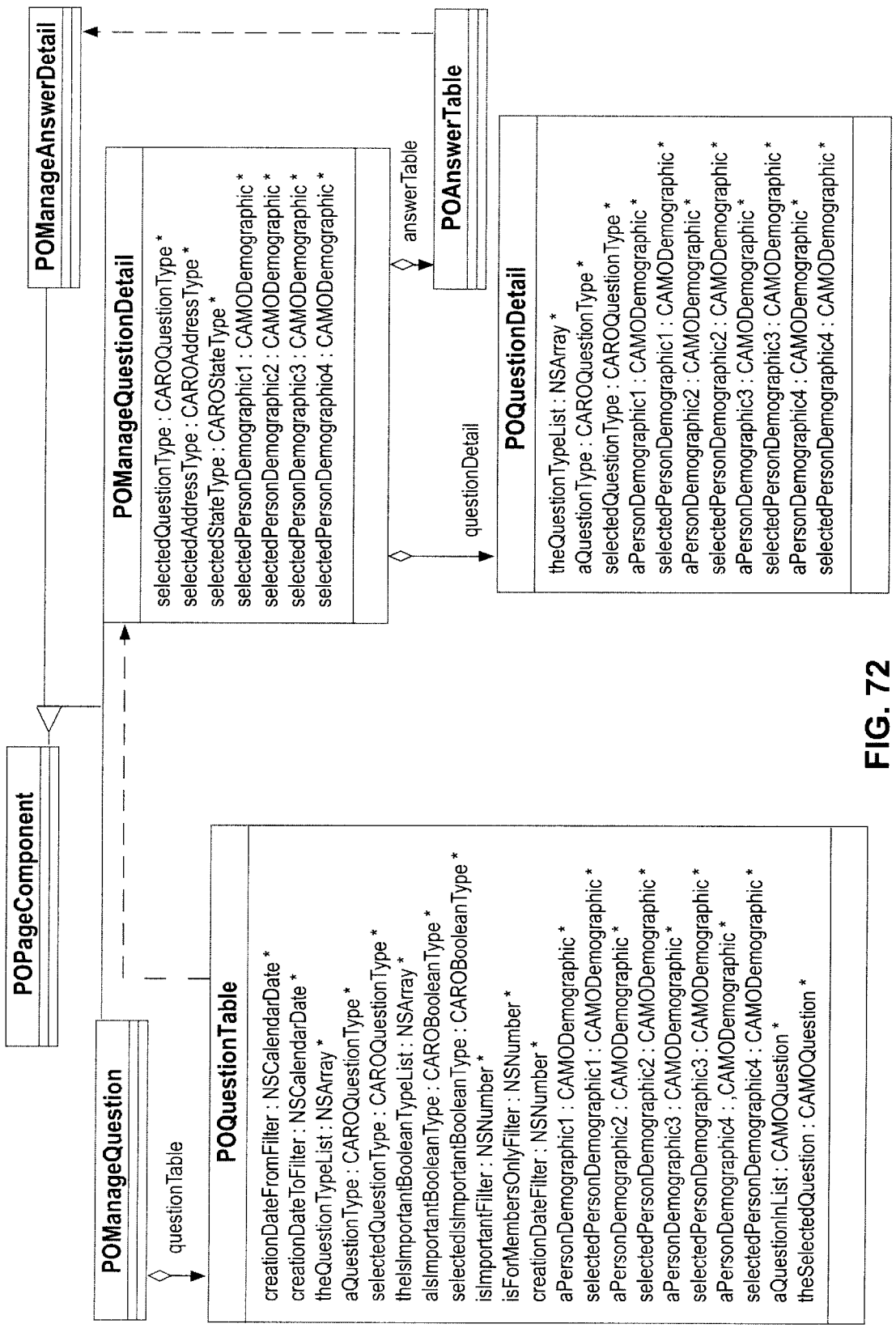
Figure 73:
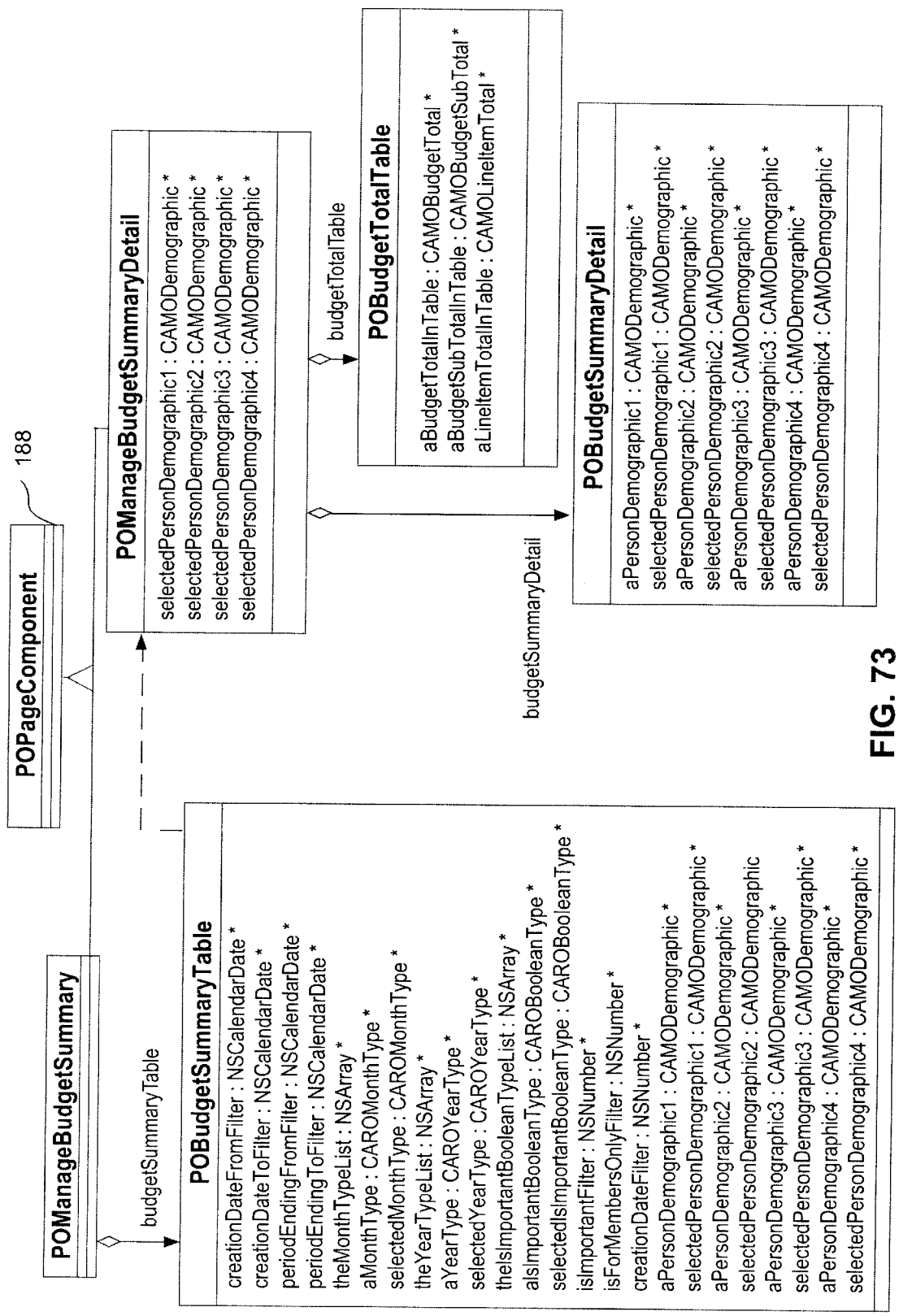
Figure 74A:
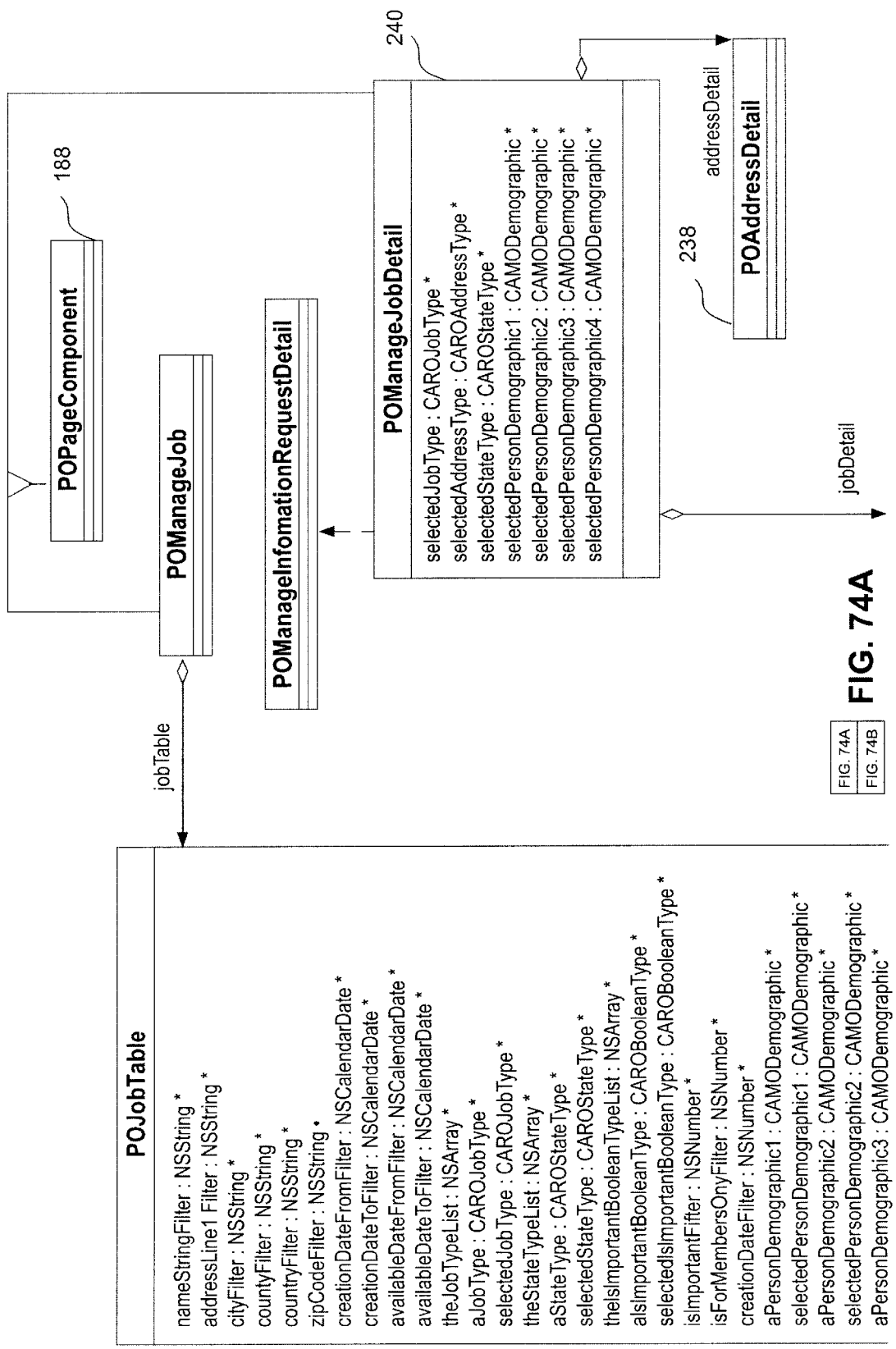
Figure 74B:
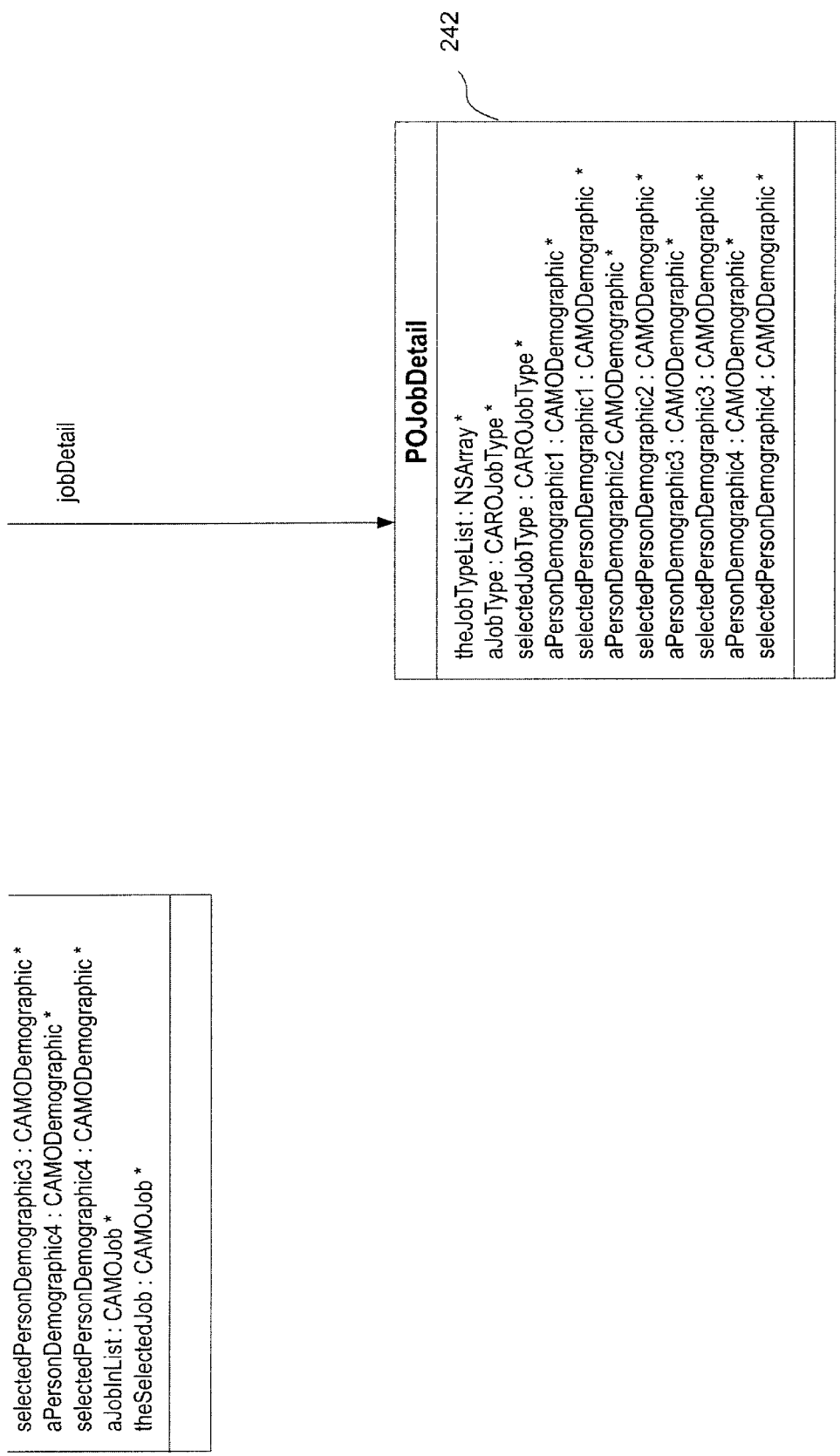
Figure 75:
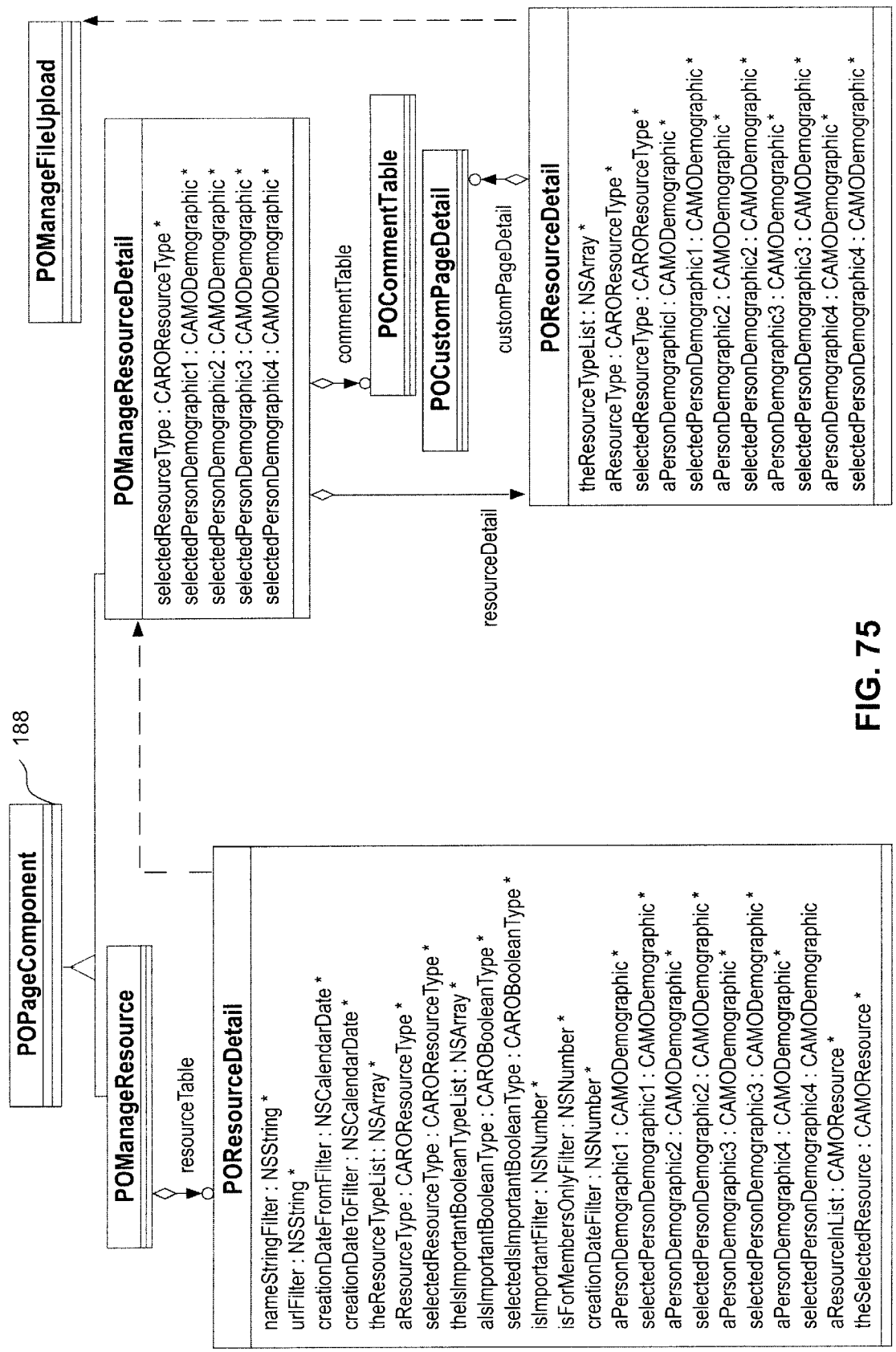
Figure 76:
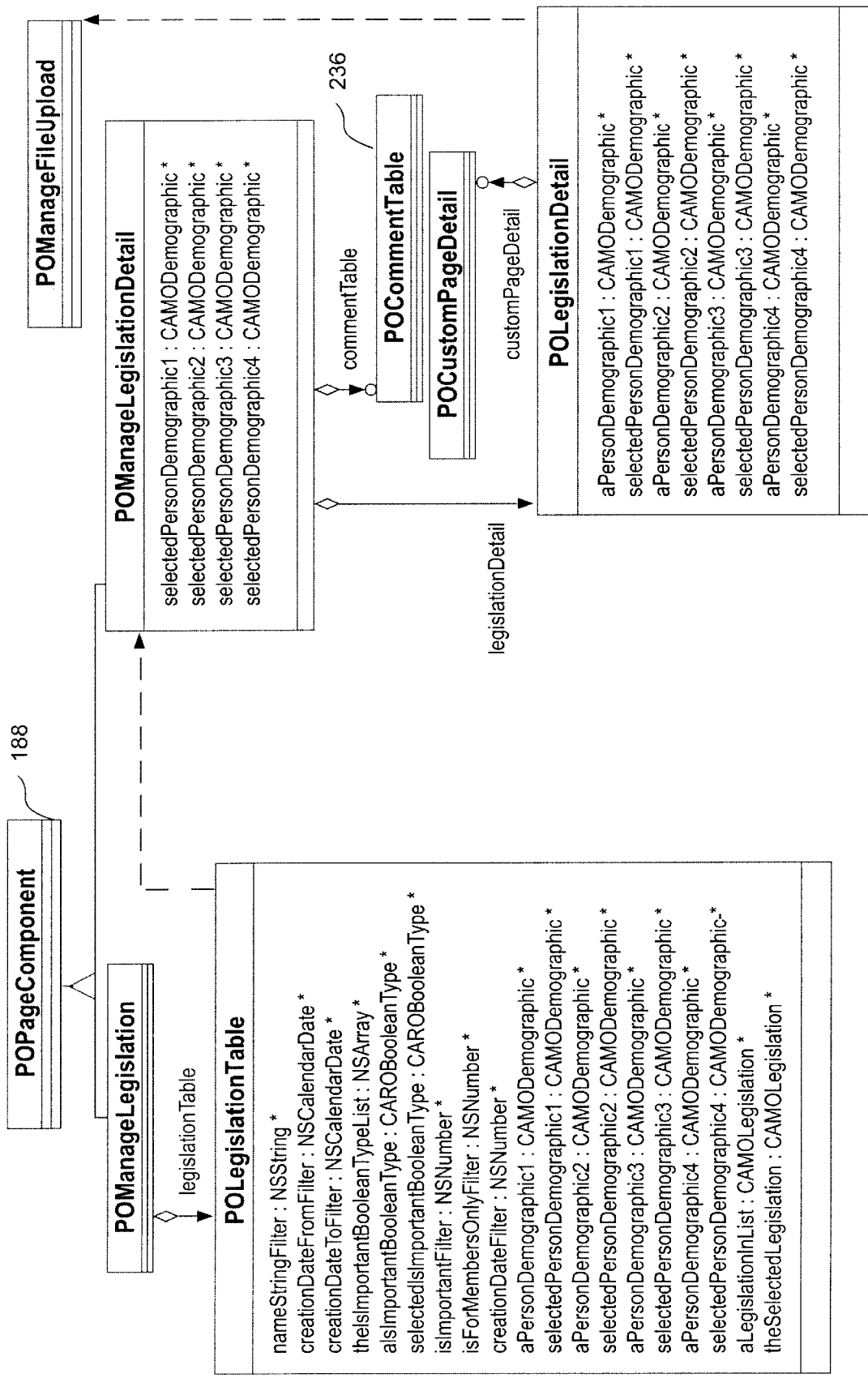
Figure 77:
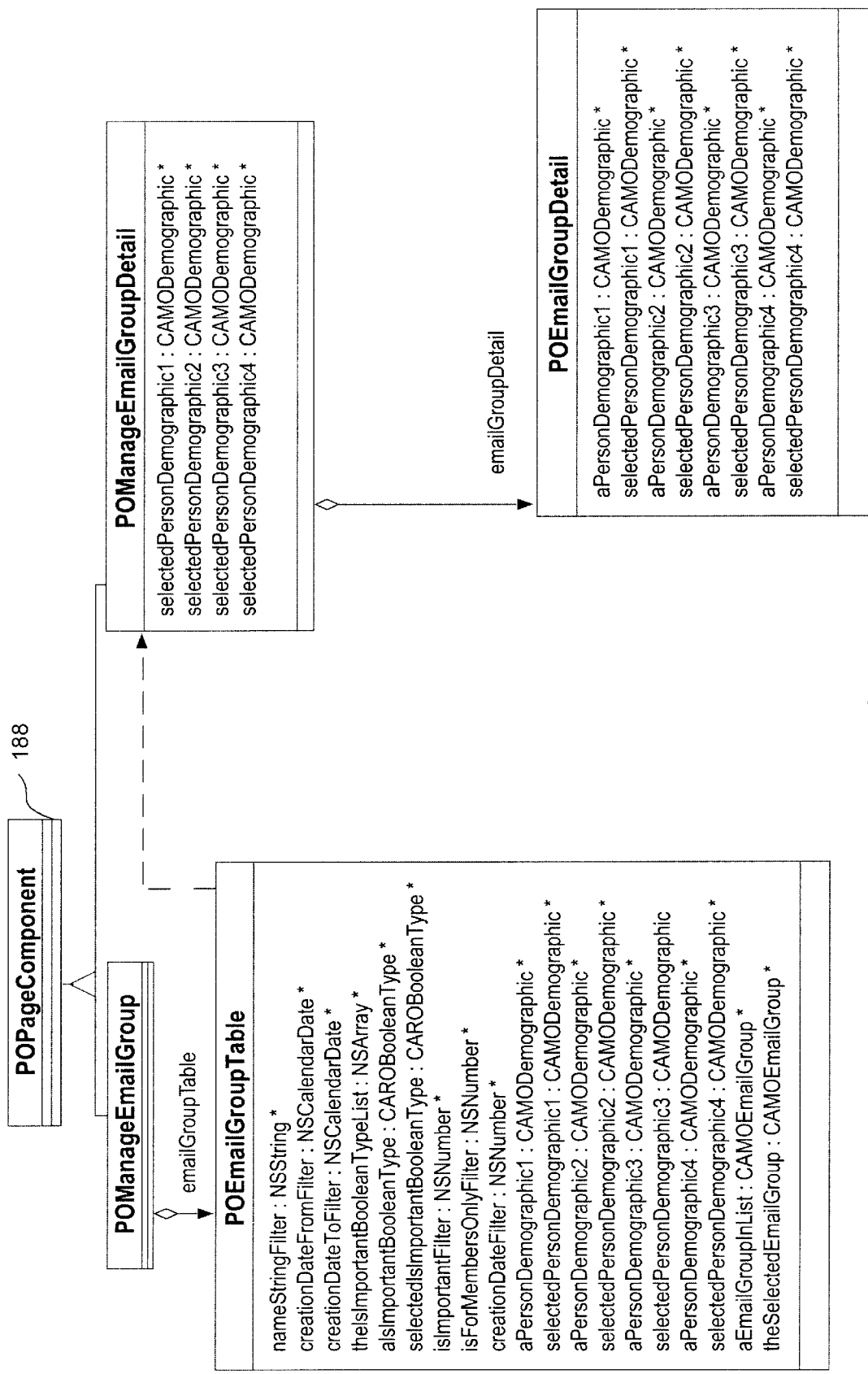
Figure 78A:
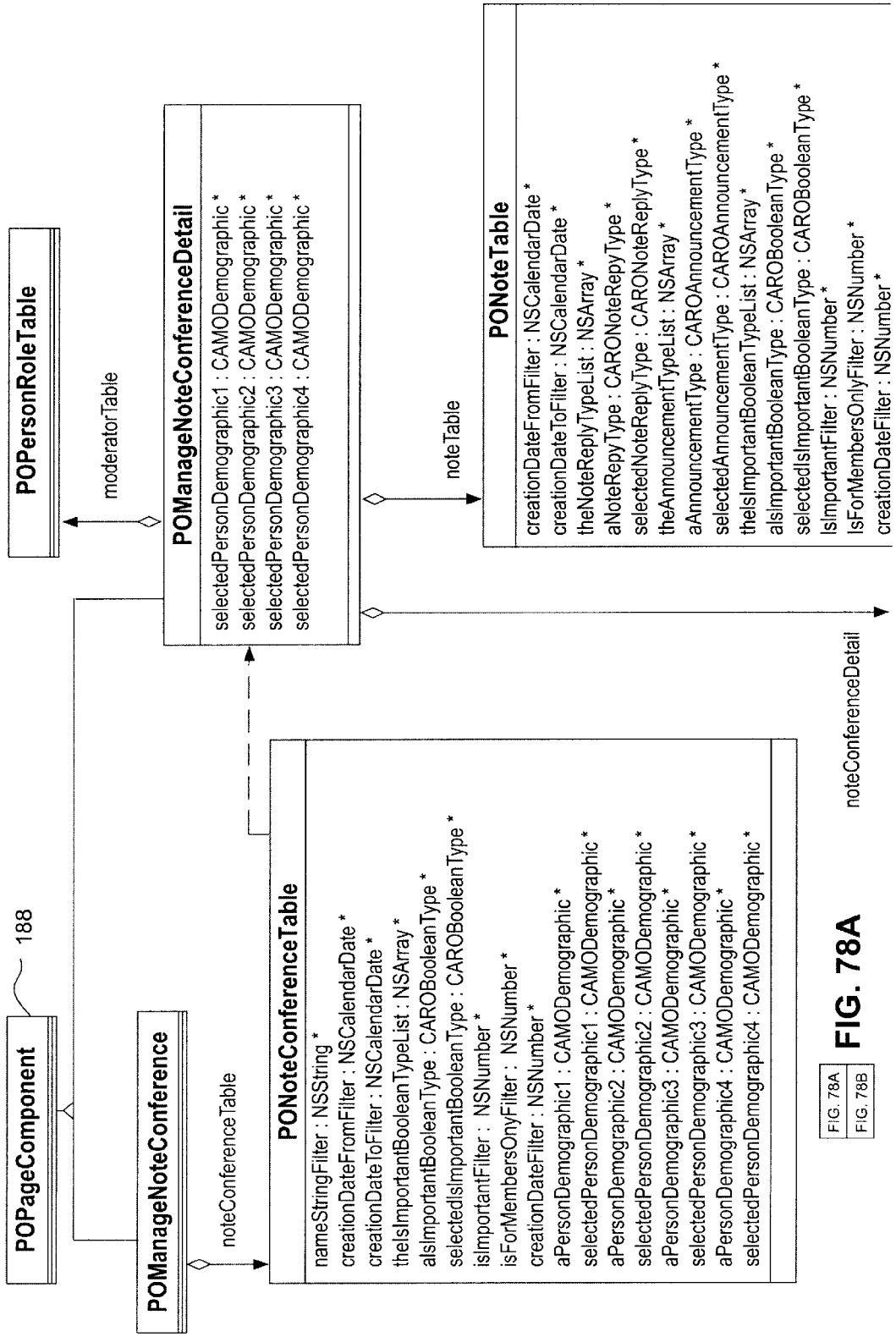
Figure 78B:
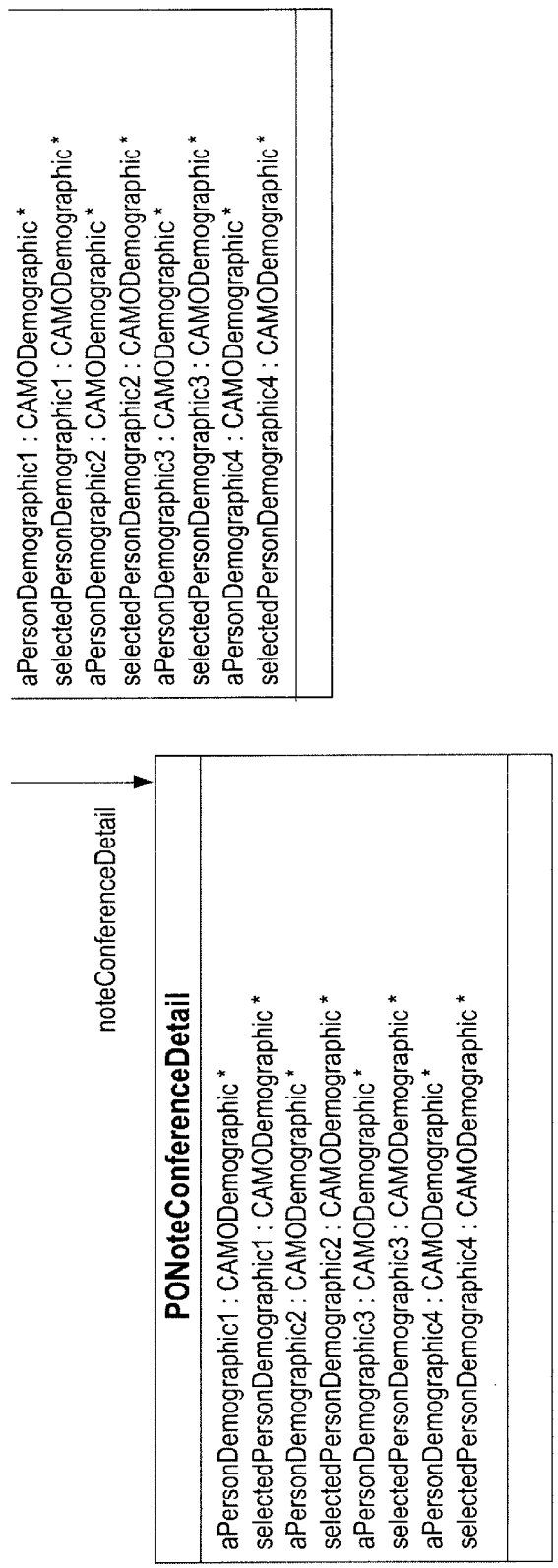
Figure 79:
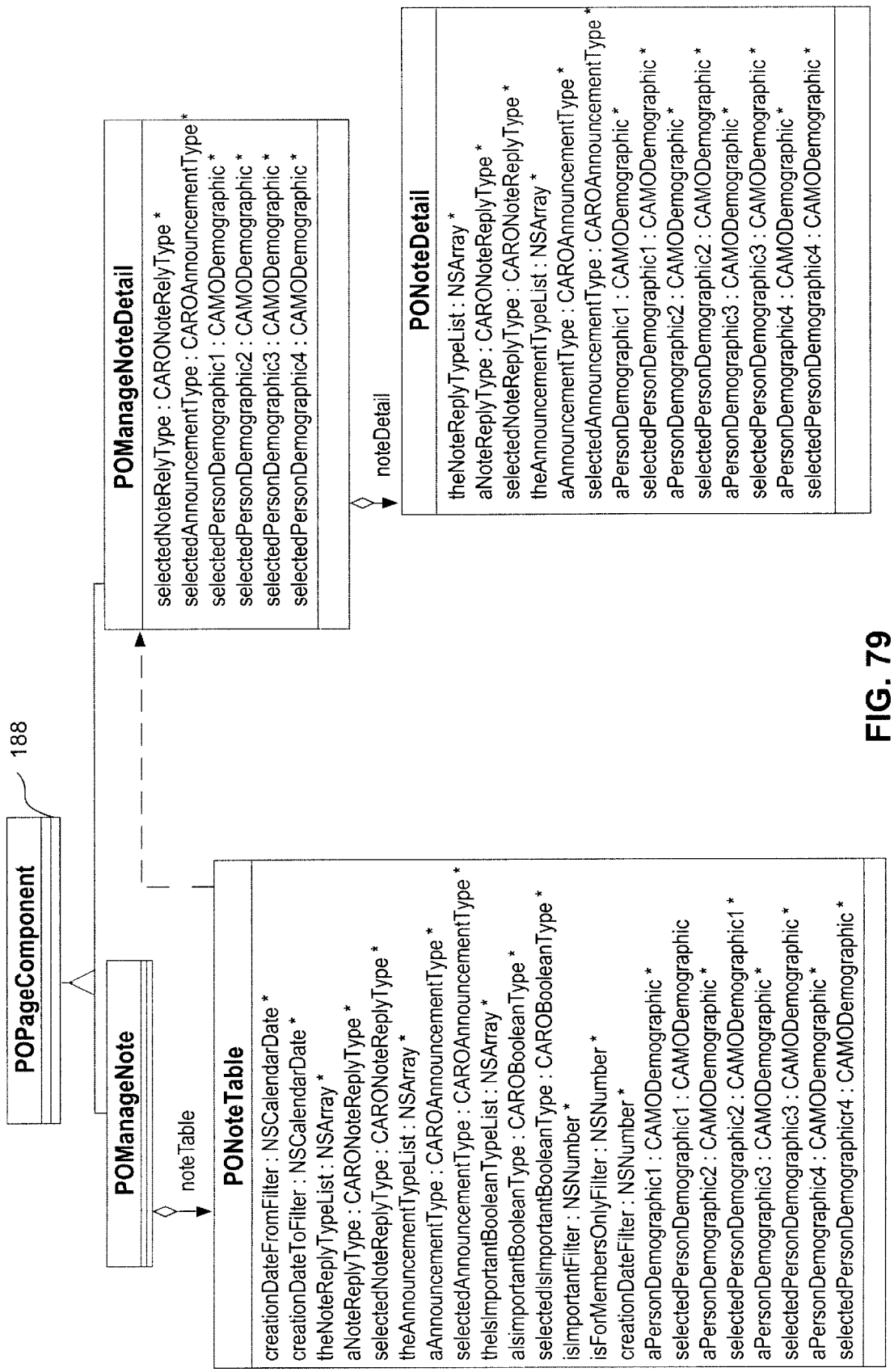
Figure 80:
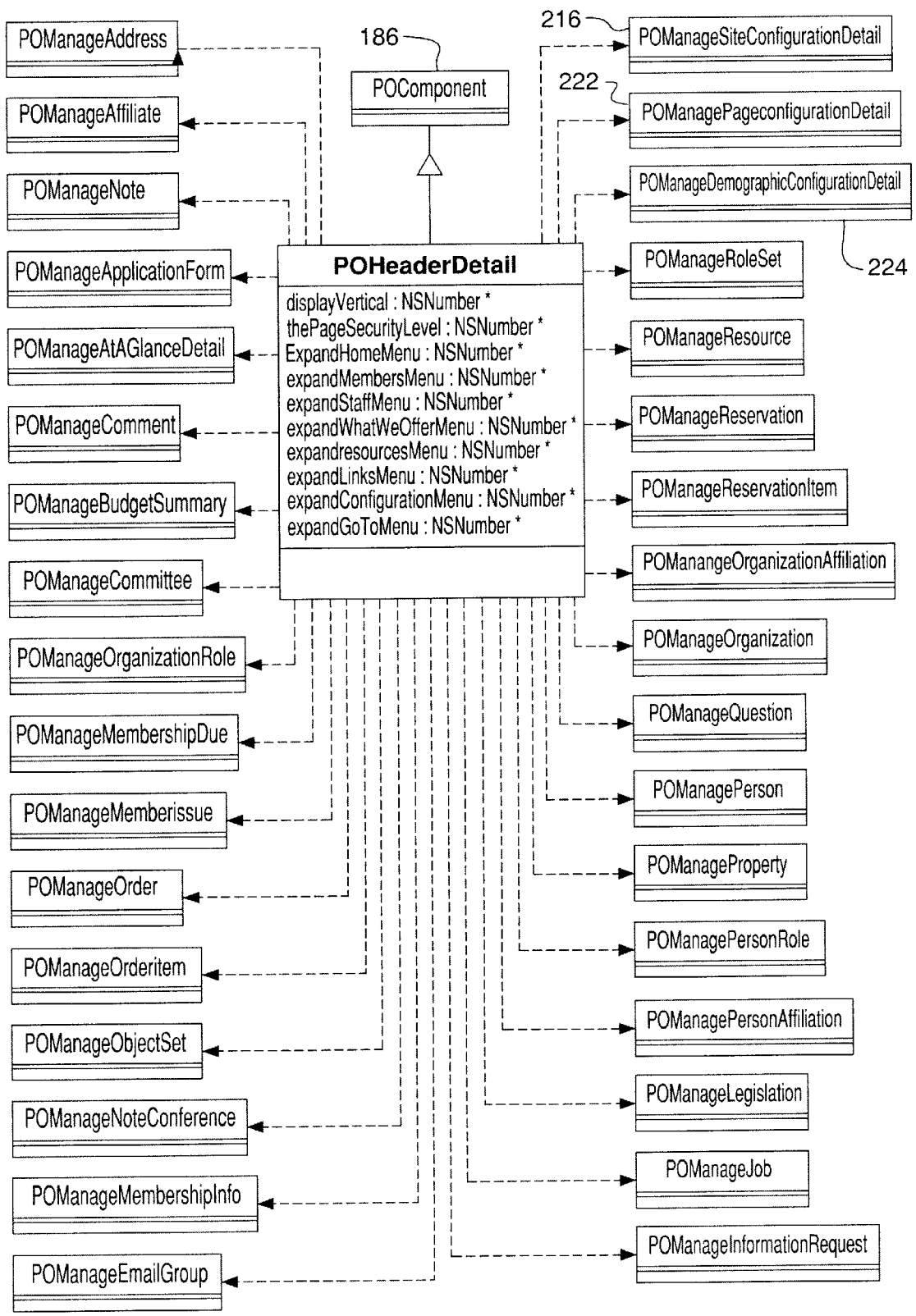
Figure 81:
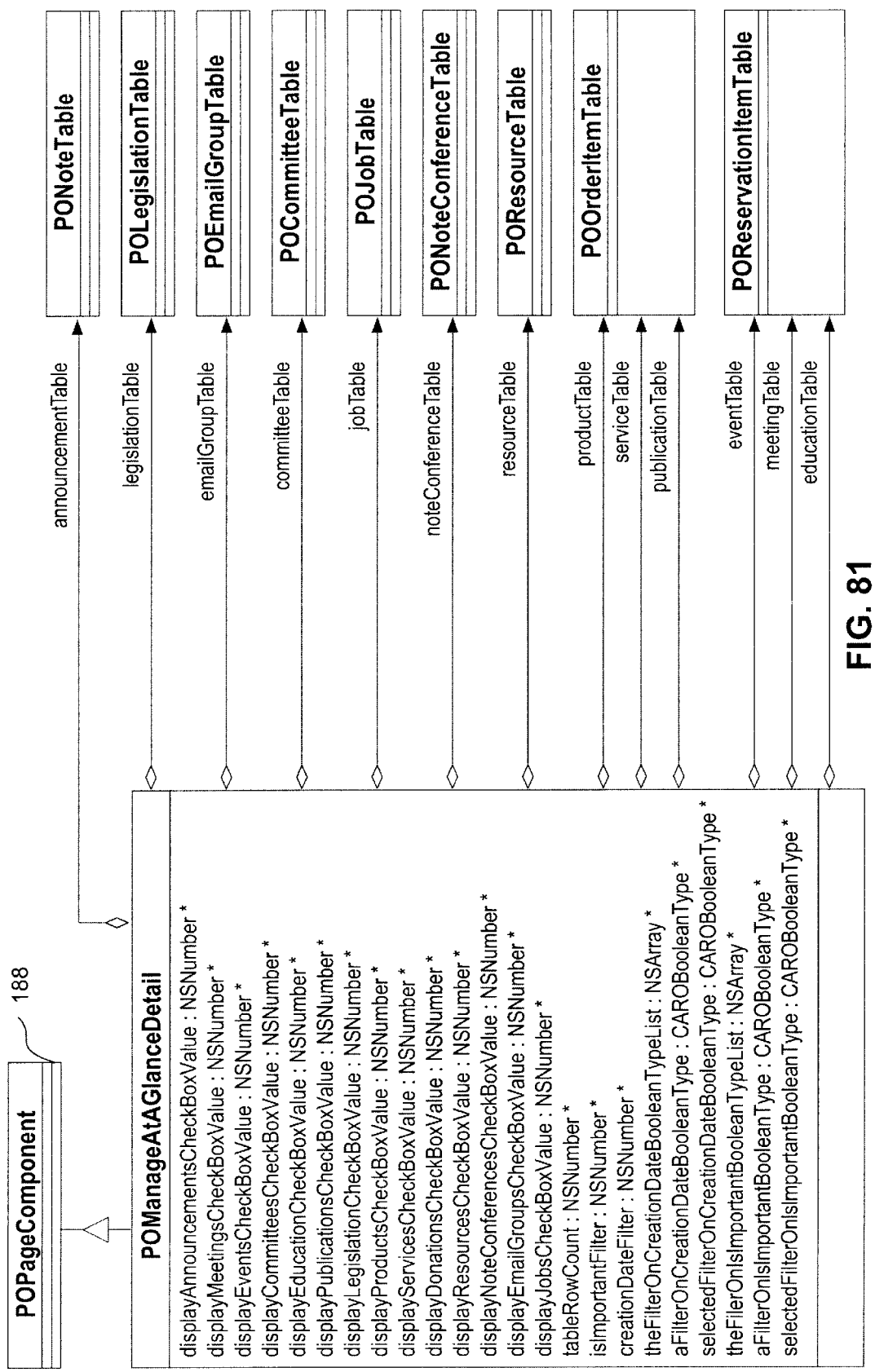

The presentation model objects 254 that render the content from the ModelObject framework 112 of FIG. 34 include XXXTable 202 of FIG. 47, ManageXXX 204 of FIG. 46, in accordance with an embodiment of the XXXTable 202 renders a list of objects of a functional component. ManageXXX 204 implements a master page and usually includes only a XXXTable 202 component. XXXDetail 206 of FIG. 43 renders the detail of a single object selected from the master page. ManageXXXDetail 208 of FIG. 51 implements a Detail page and usually includes a XXXDetail component 206. The XXX portion of the designation represents a functional component, such as Job, Note, Order Item, Reservation Item, etc. Other presentation model objects 254 of FIG. 41 implement the configuration windows of the user interface, help windows, menu system, custom pages, and the like.

The content of the functional components of an organization's or individual's site is persistently stored in a database 42 of FIG. 2 and access is through the ModelObject framework 112 of FIG. 34. Management window images 15 in FIG. 1 of the user interface available to the administrator or staff of the site allow the administrator or staff to create, modify, and delete the site's content via calling methods on objects within the PresentationObject framework 114 of FIG. 34, which in turn call methods in the ModelObject framework 112.

When a functional component is rendered in HTML, the content for the functional component is accessed via the ModelObject framework 112 shown in FIG. 34 and the appropriate HTML is returned to the end-user via the HTML and WOD files 116, 117.

Figure 15A:
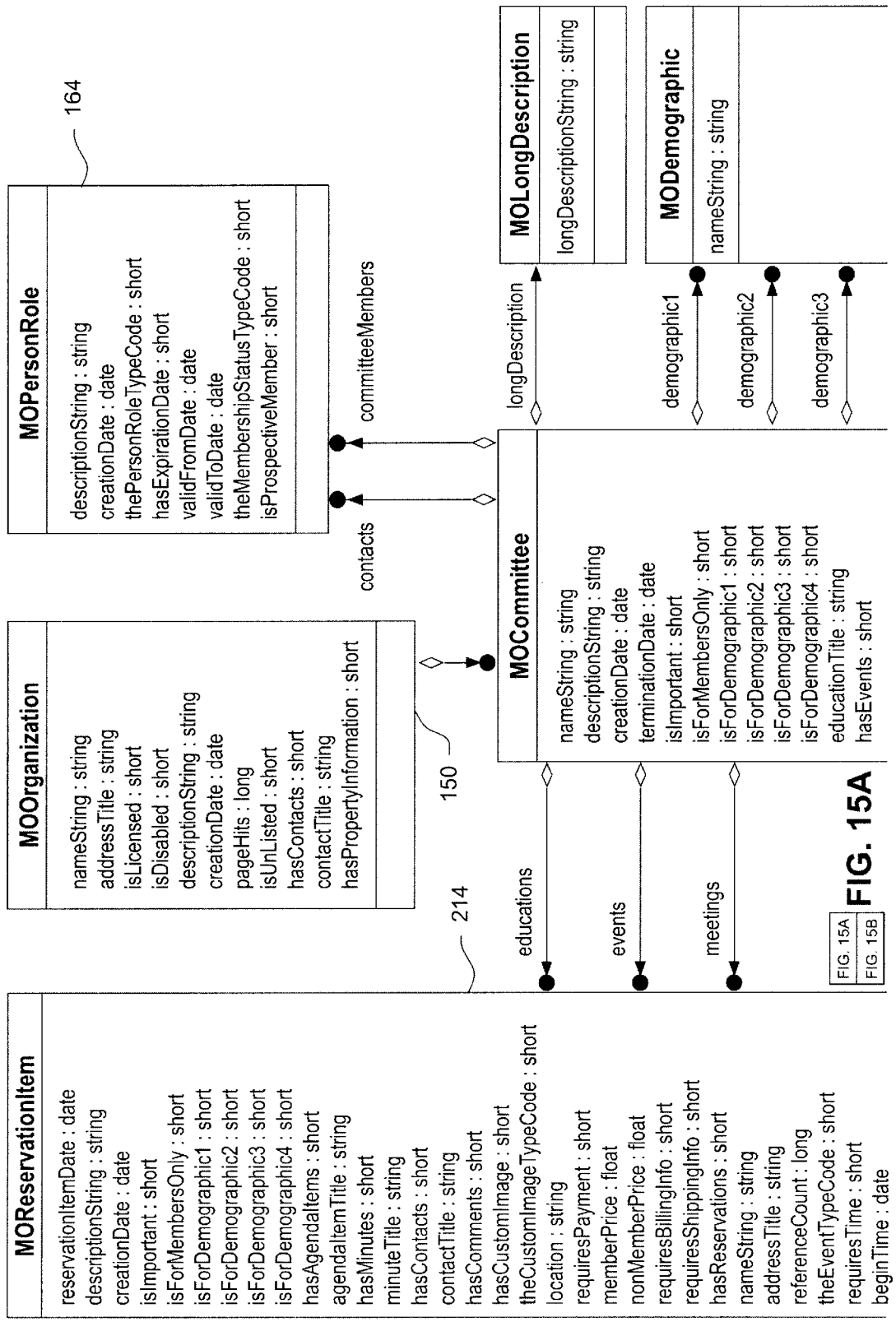
Figure 15B:
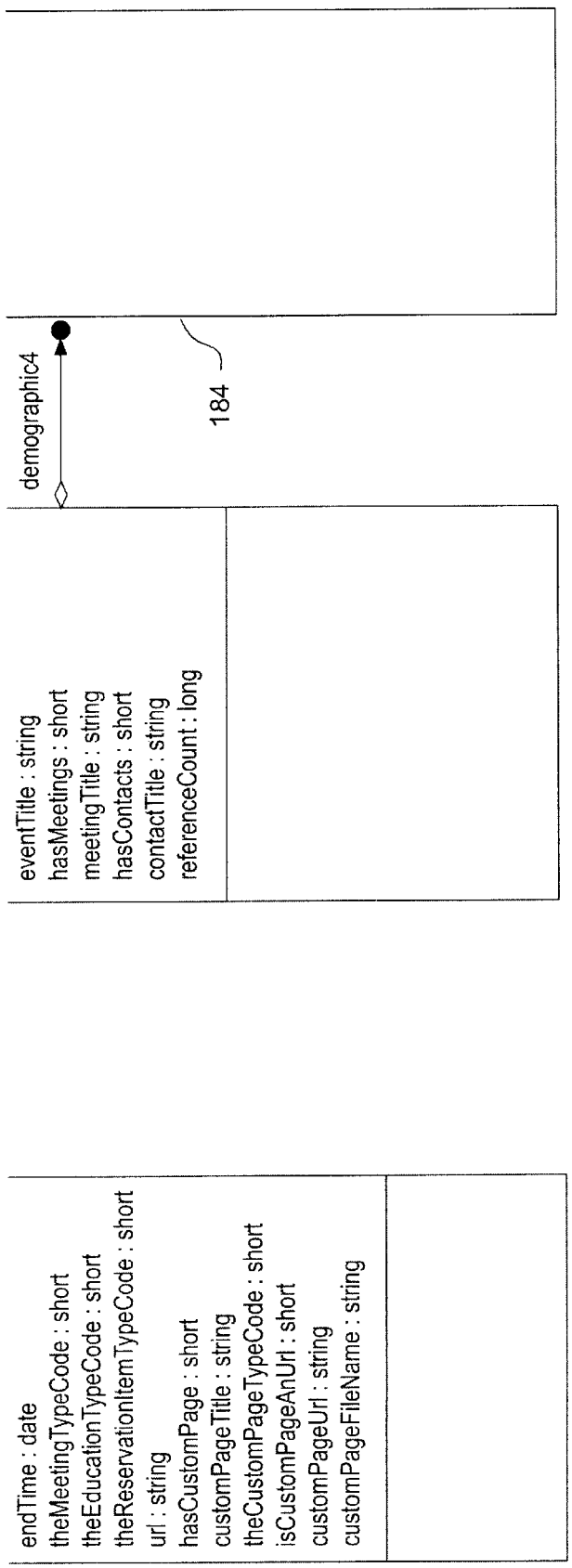
Figure 16:
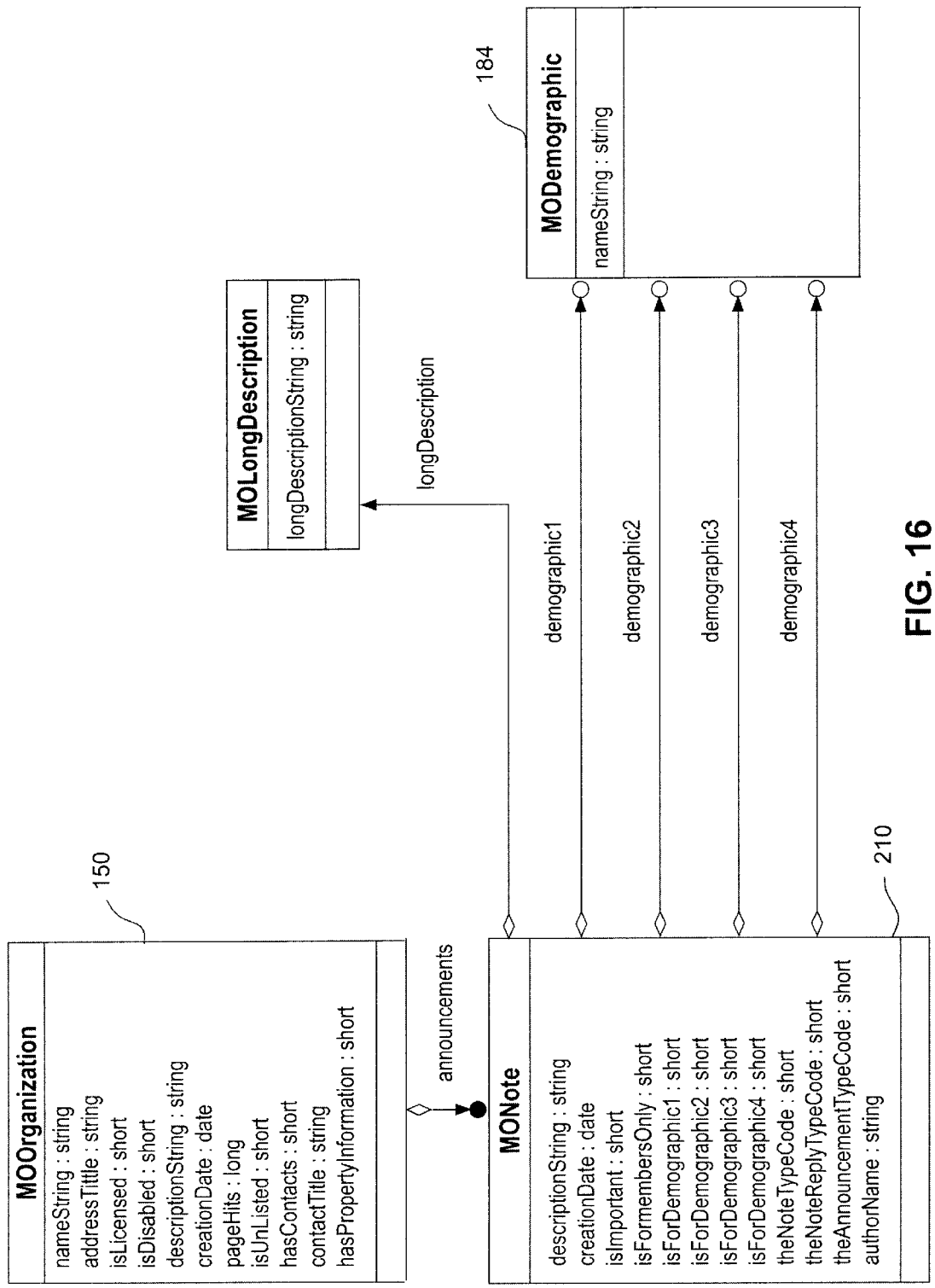
Figure 17:
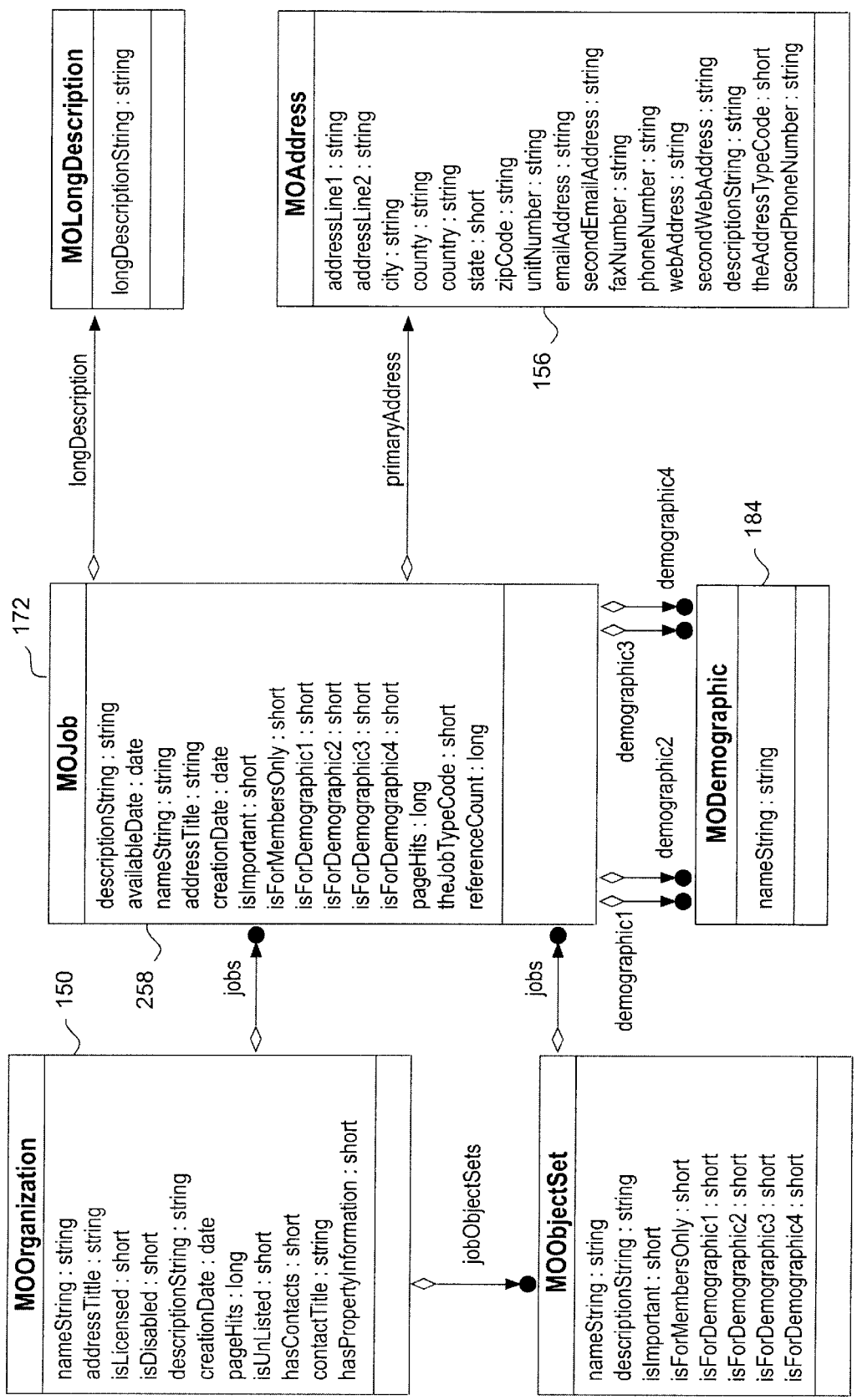
Figure 18:
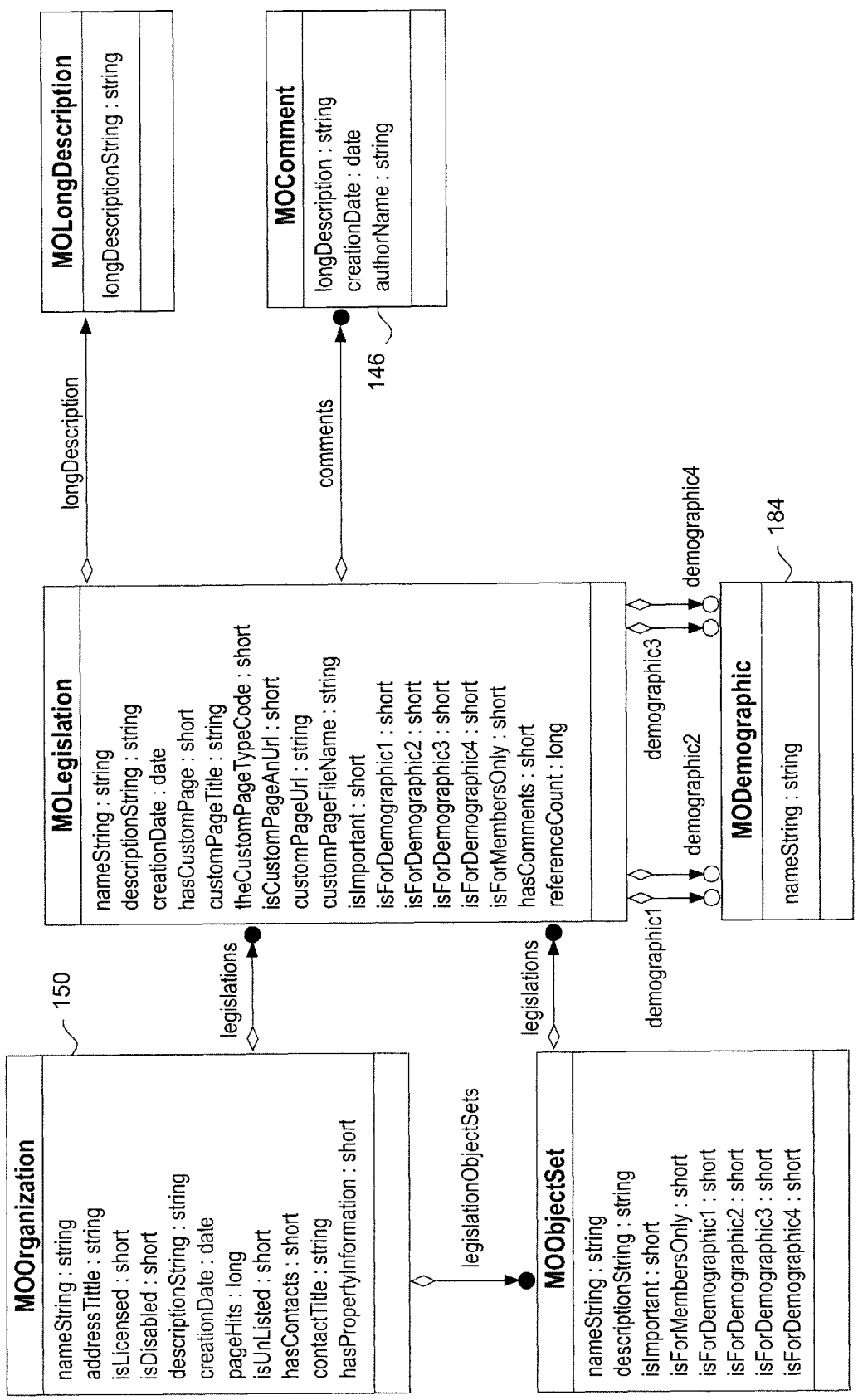
Figure 19:
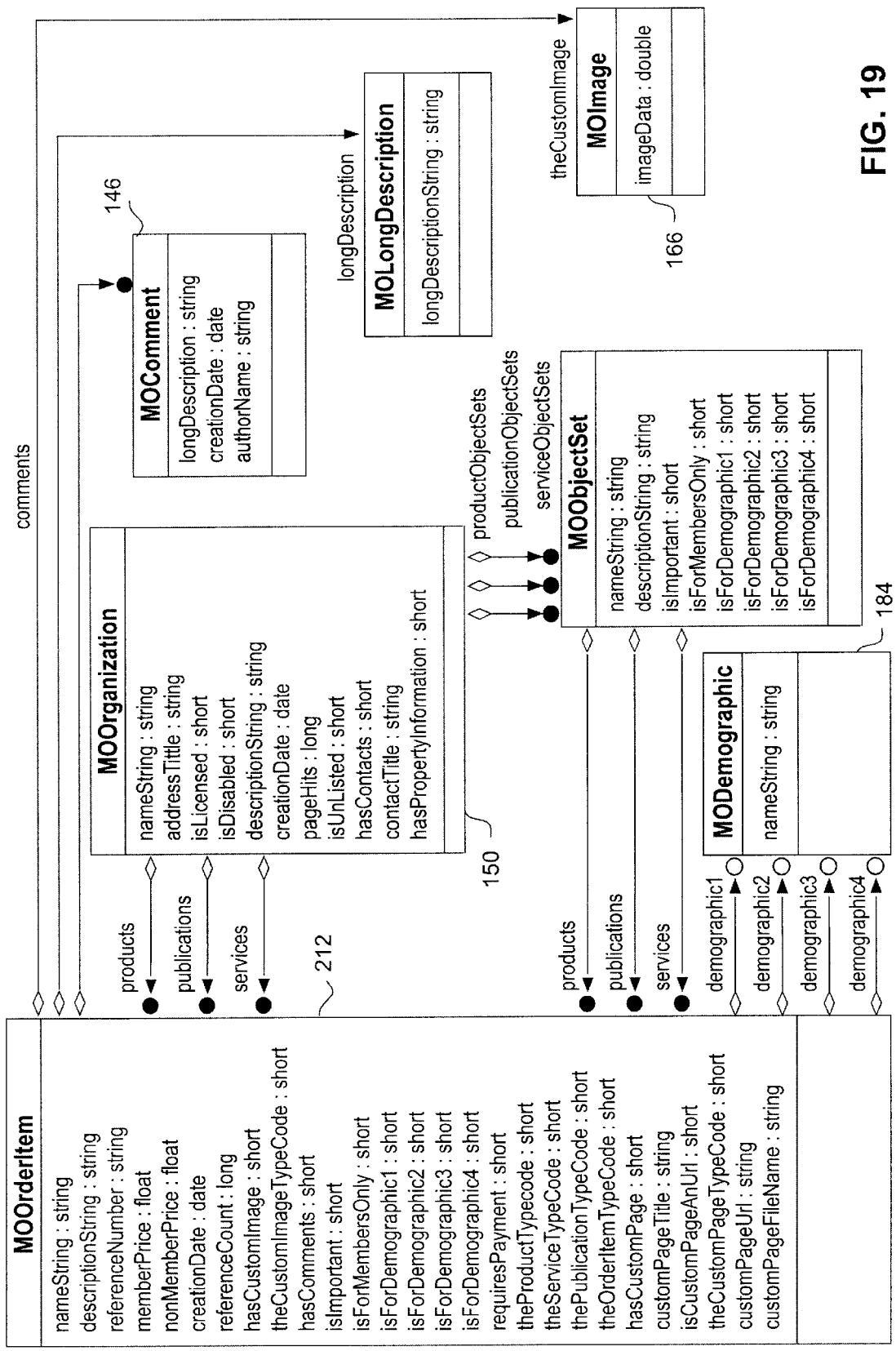
Figure 20:
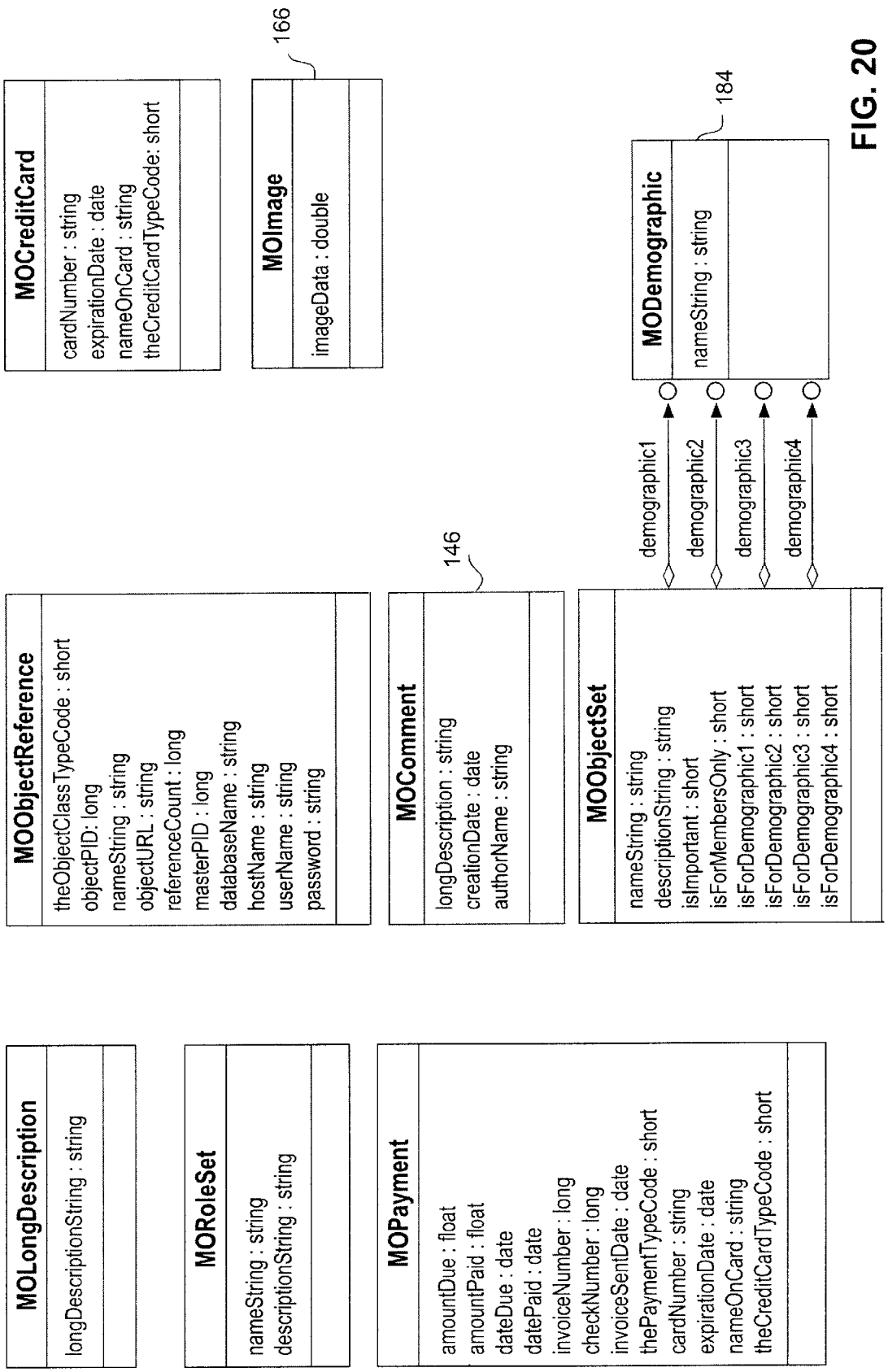
Figure 21A:
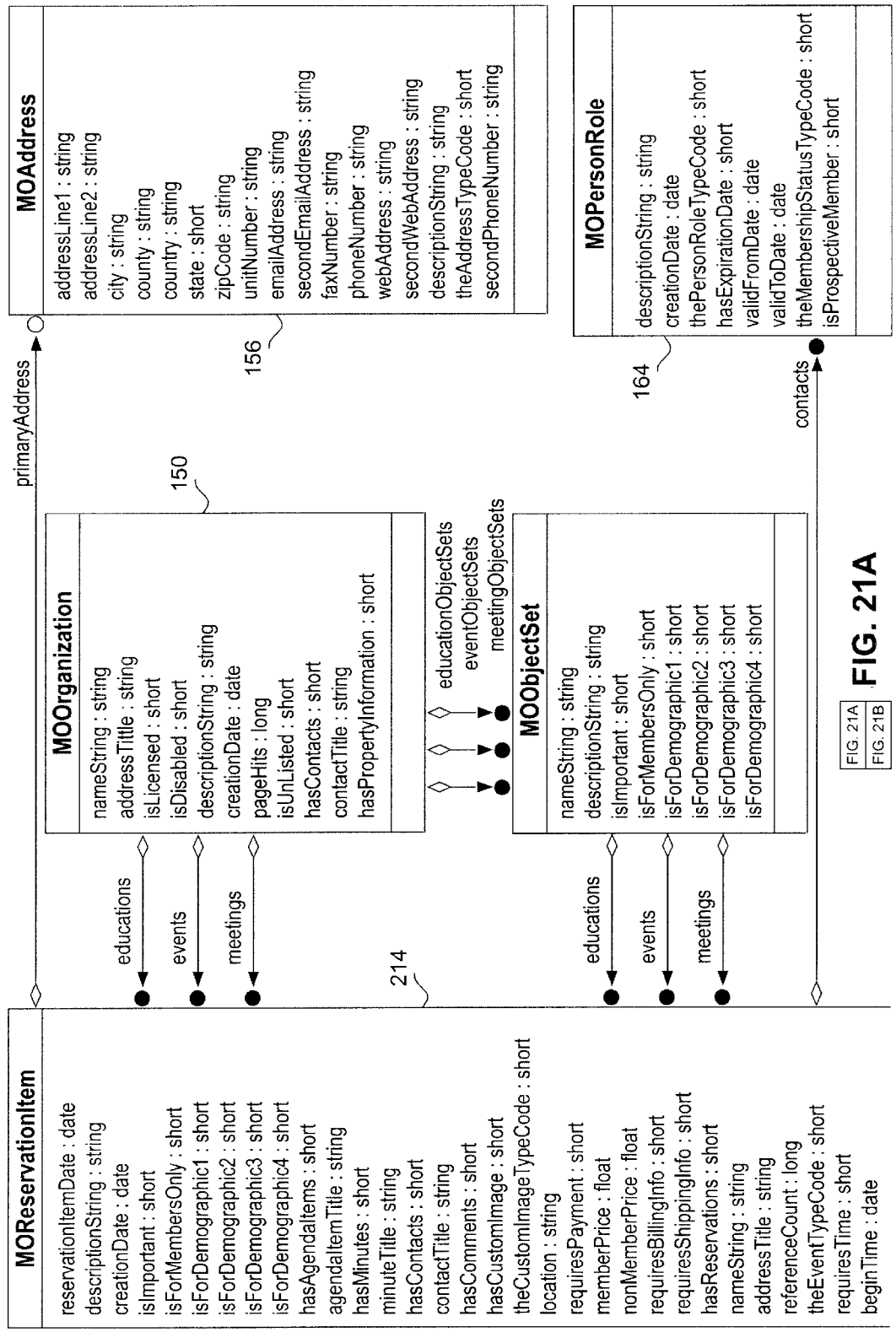
Figure 21B:
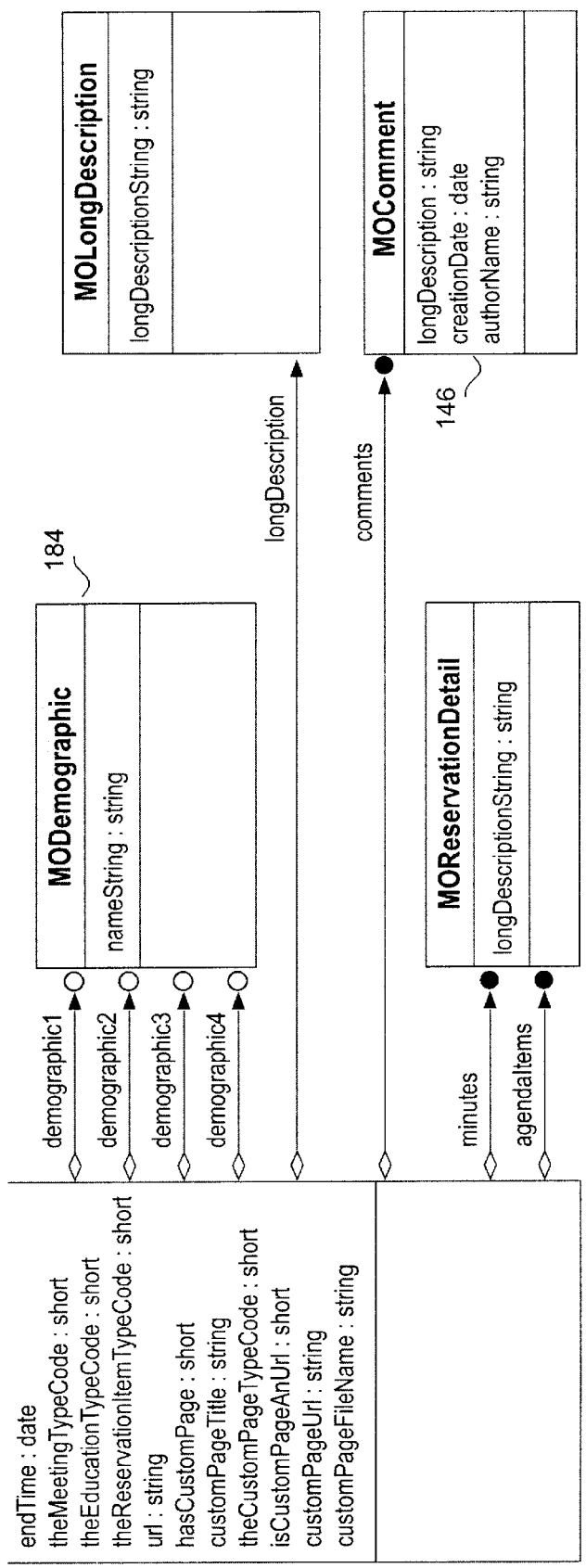
Figure 22:
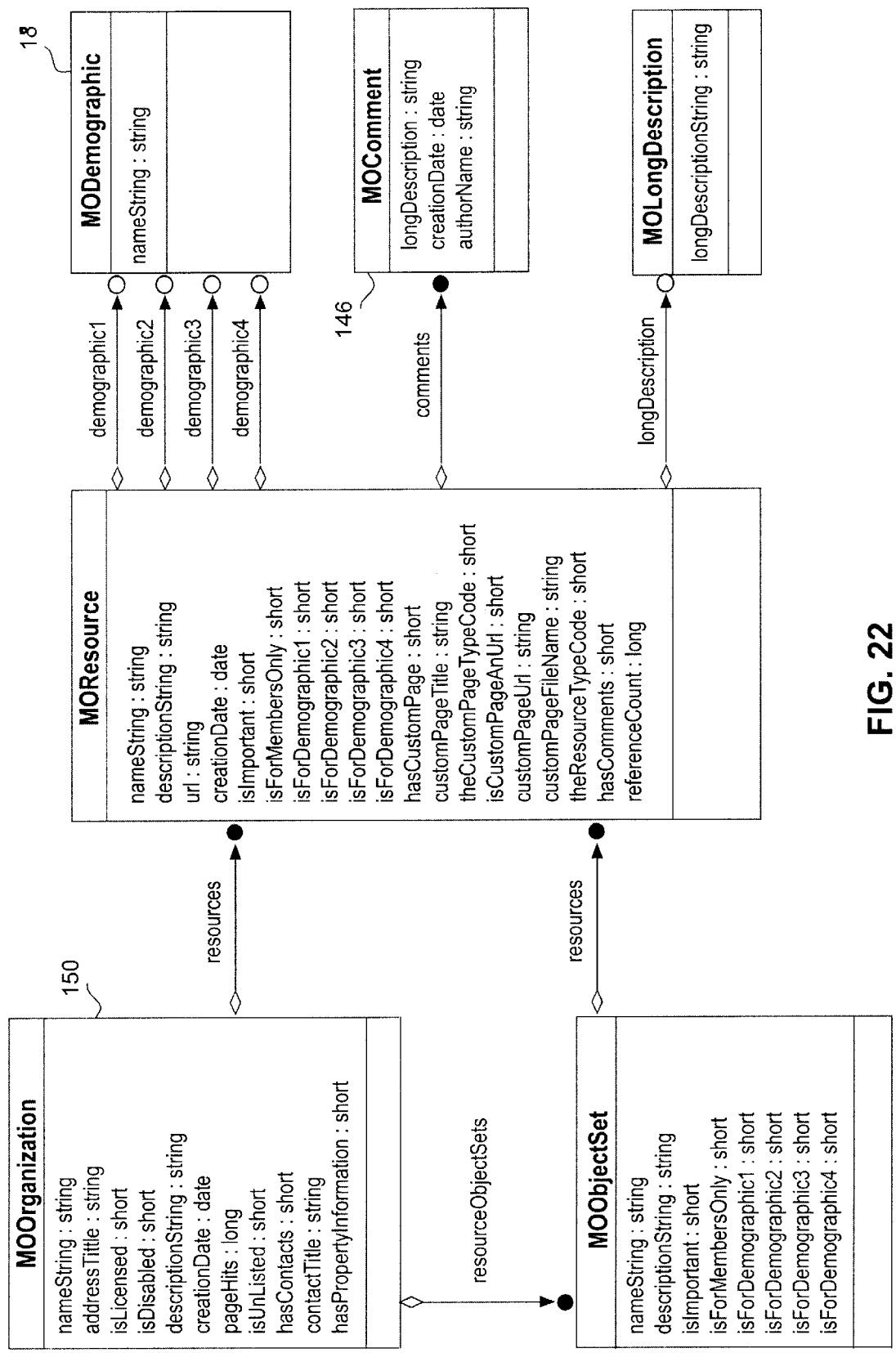
Figure 23:
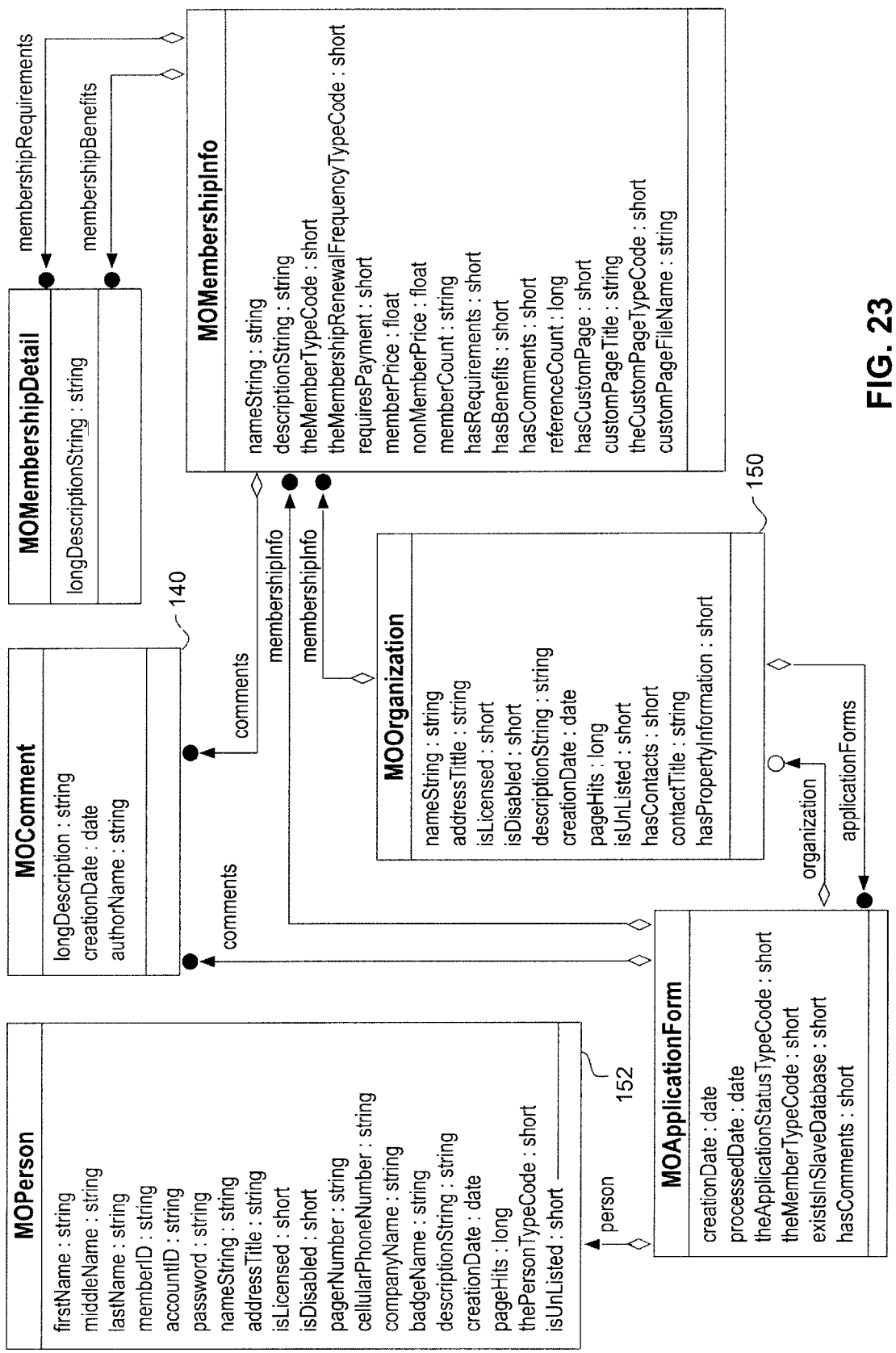
Figure 24:
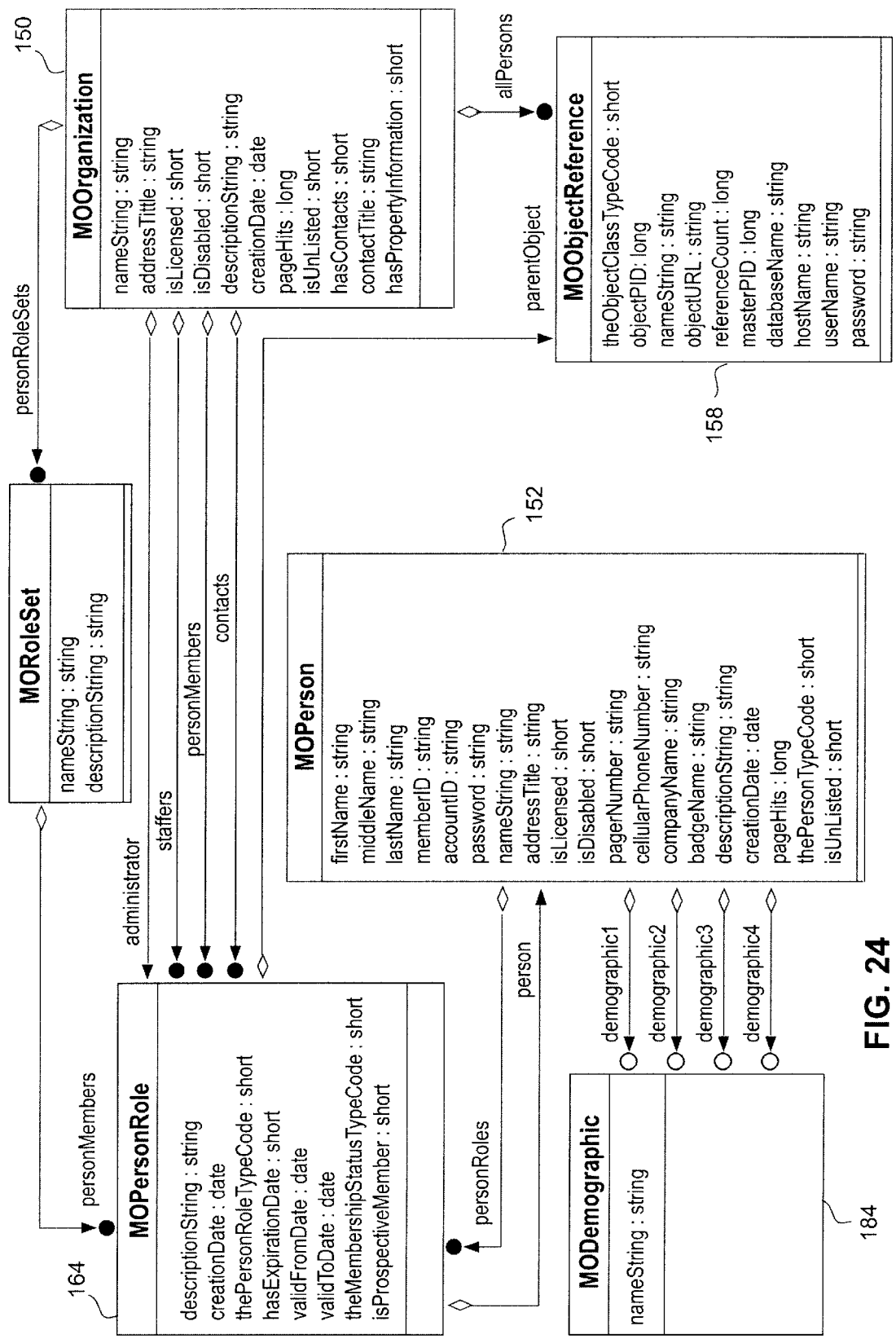
Figure 25A:
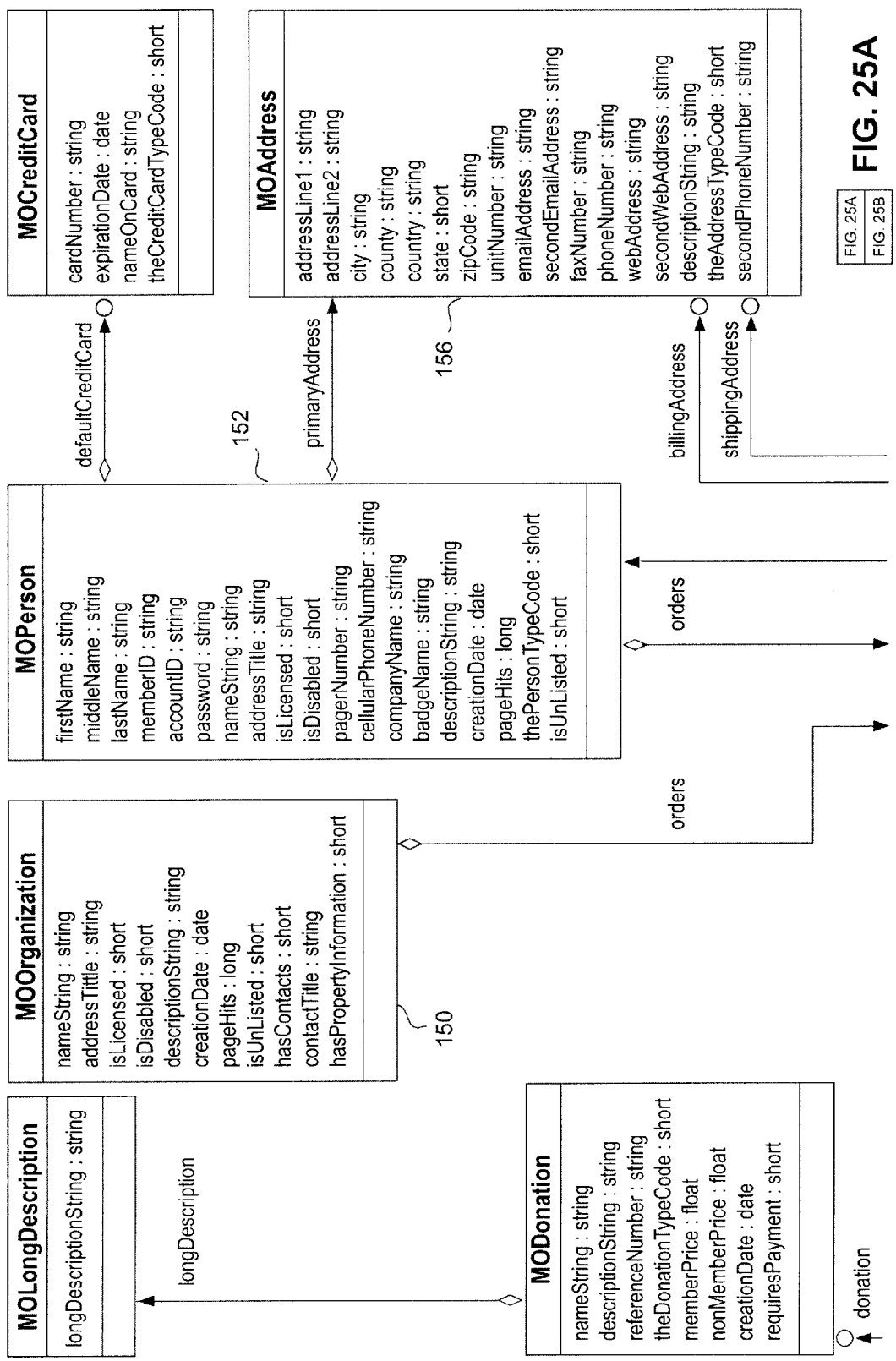
Figure 25B:
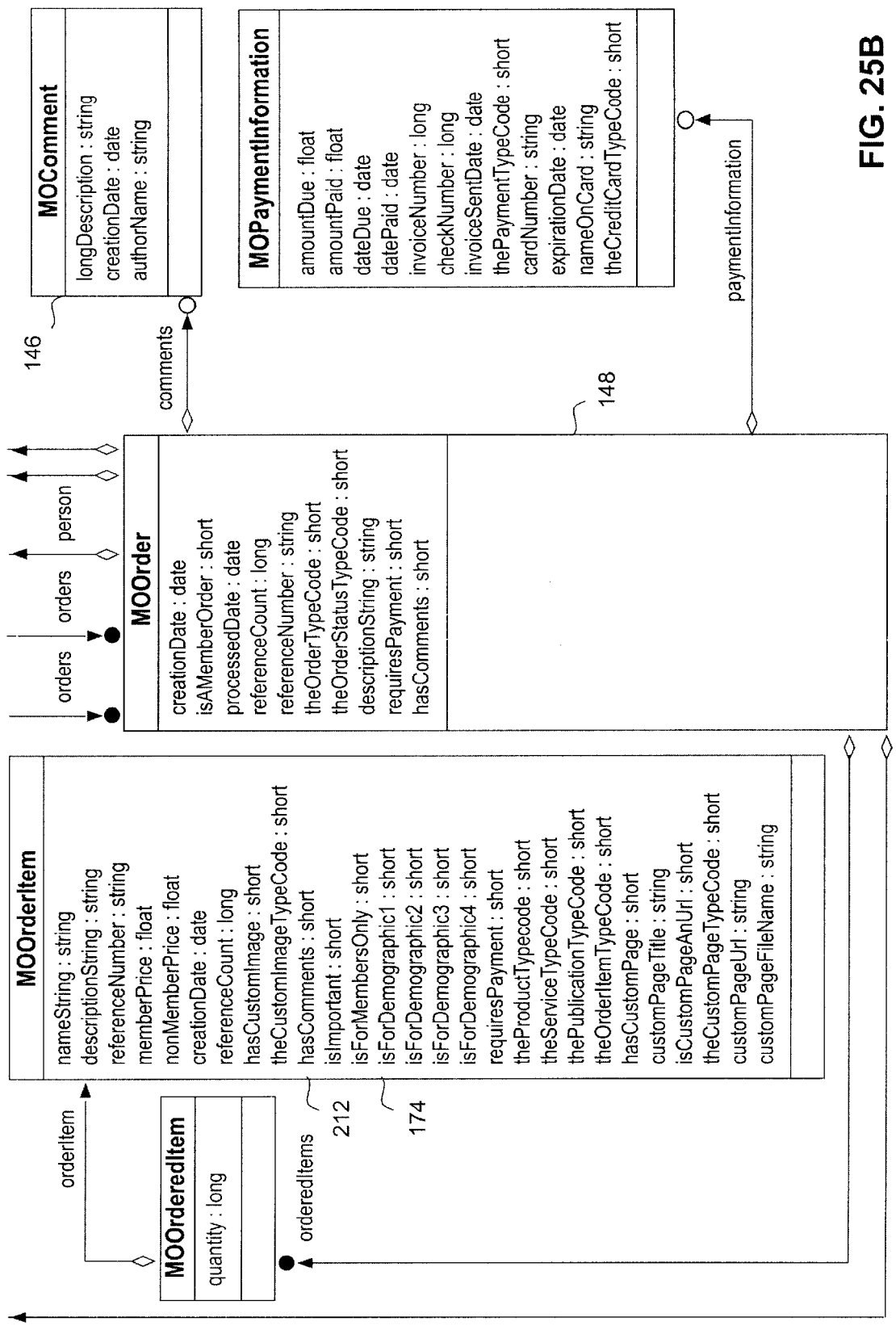
Figure 26A:
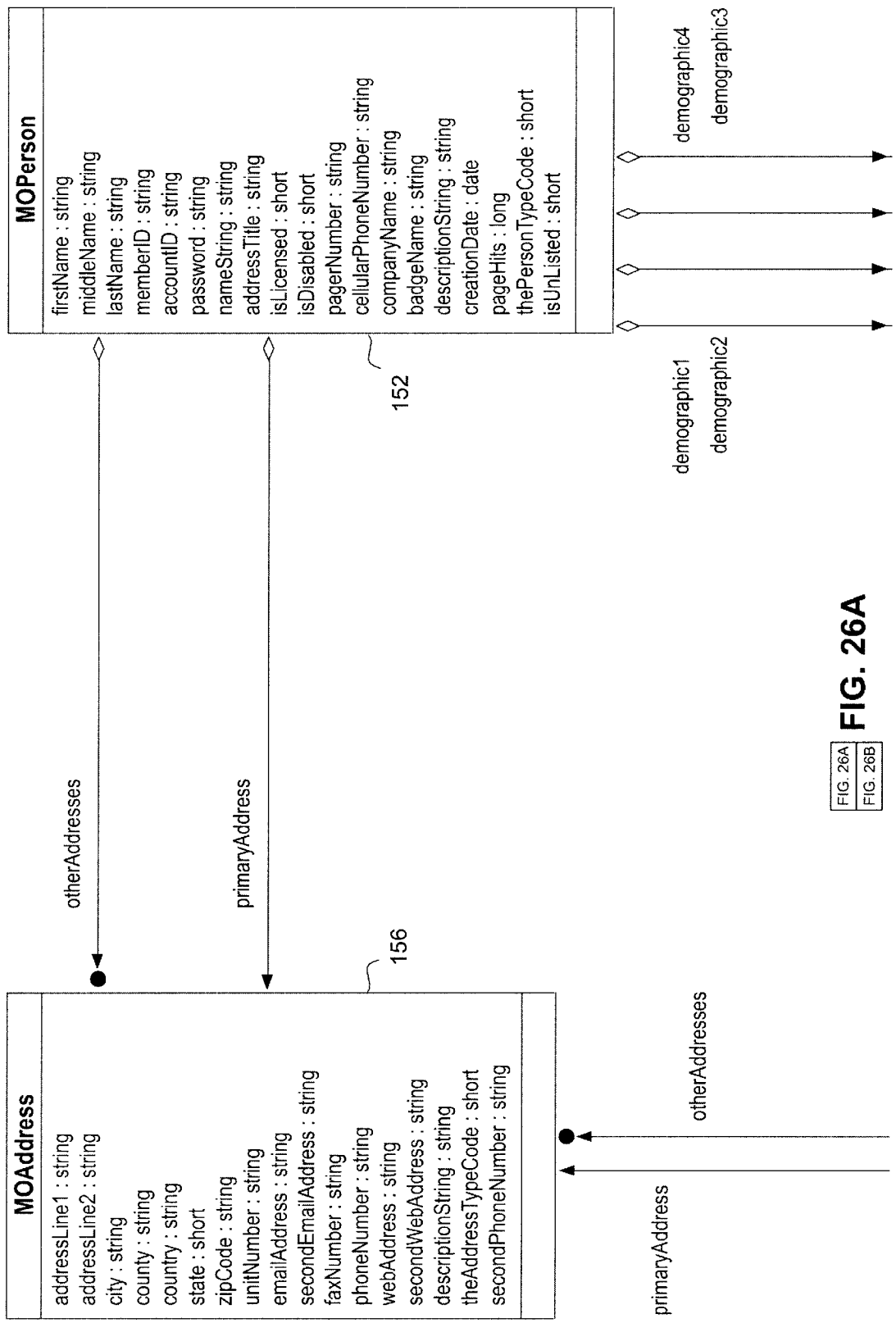
Figure 26B:
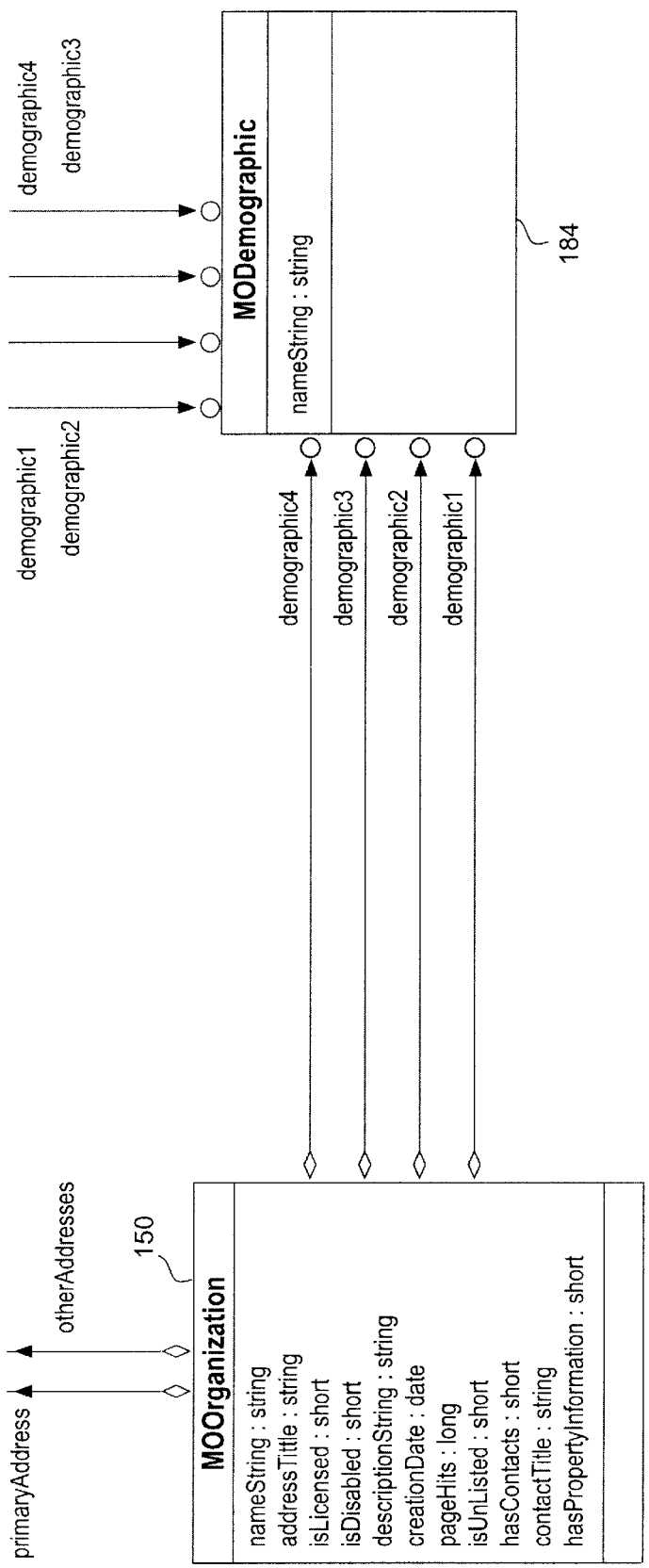
Figure 27A:
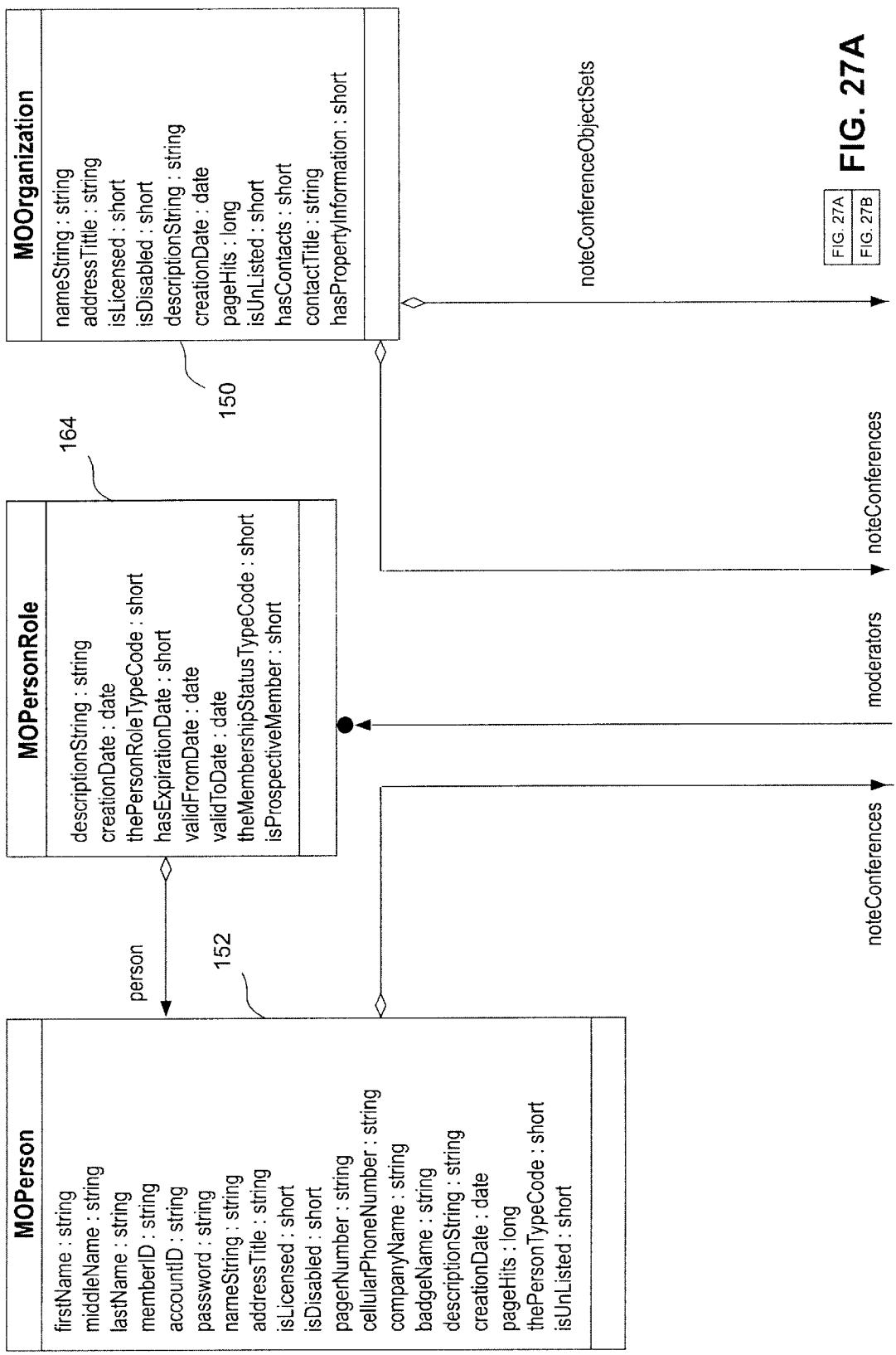
Figure 27B:
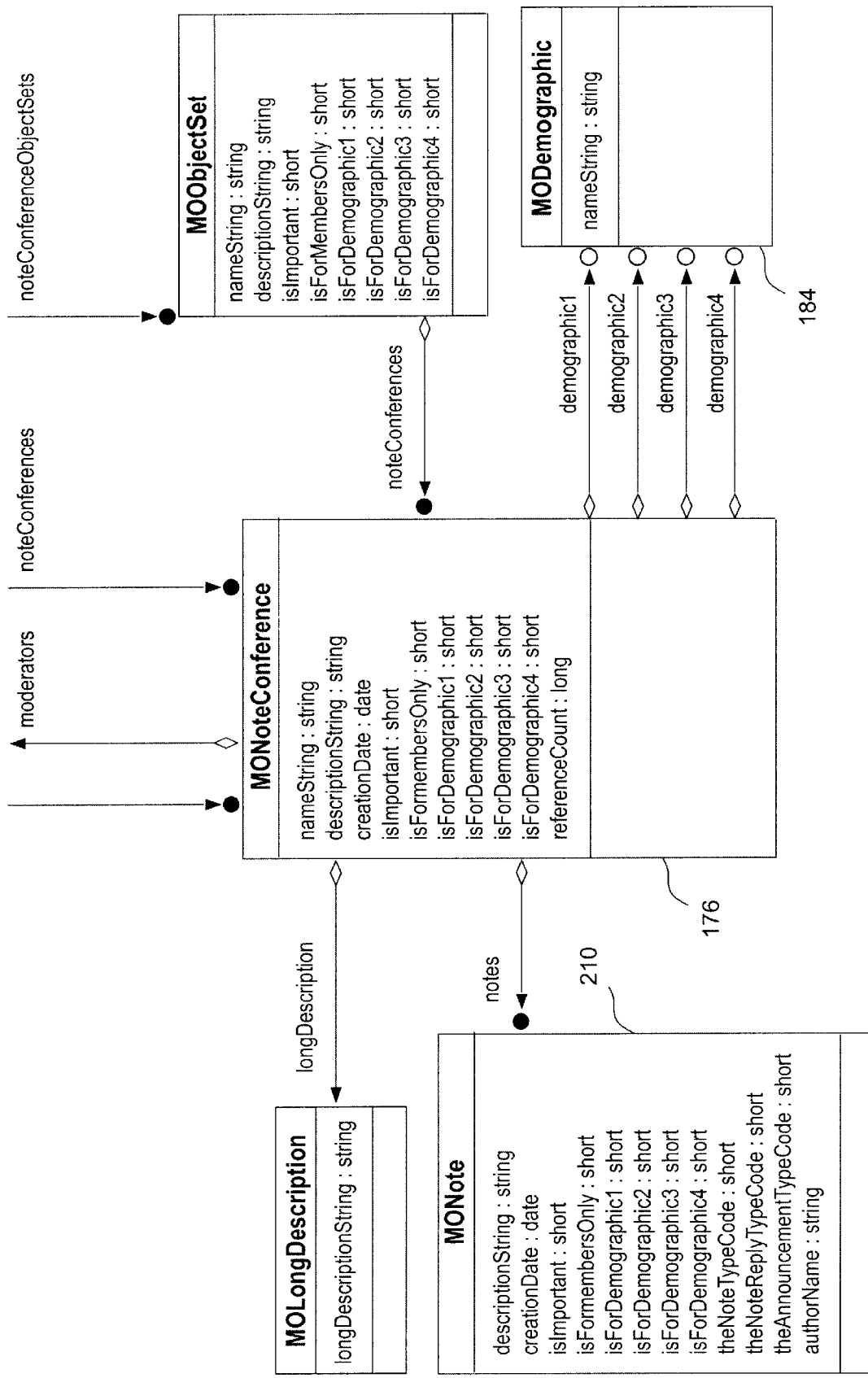
Figure 28A:
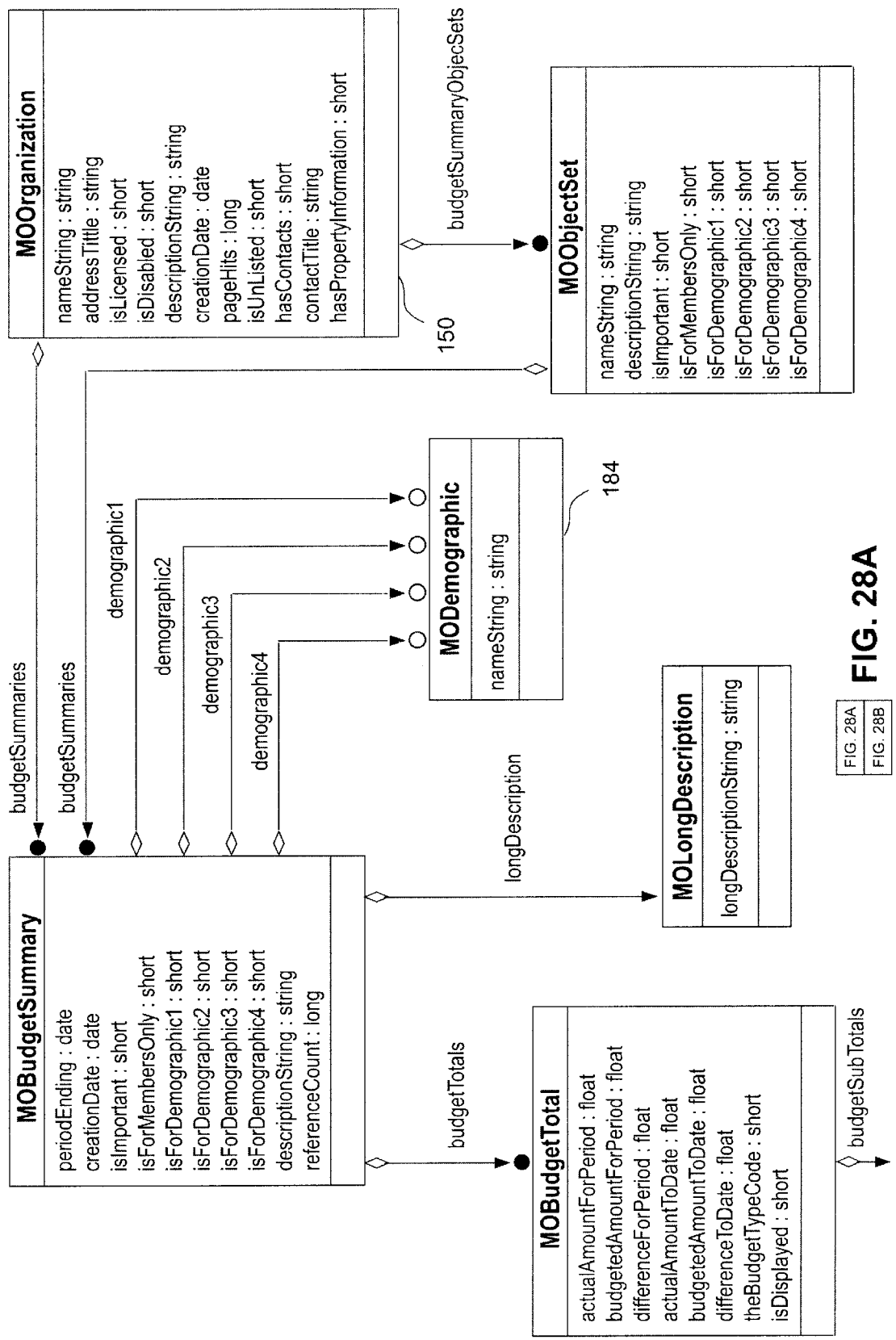
Figure 28B:
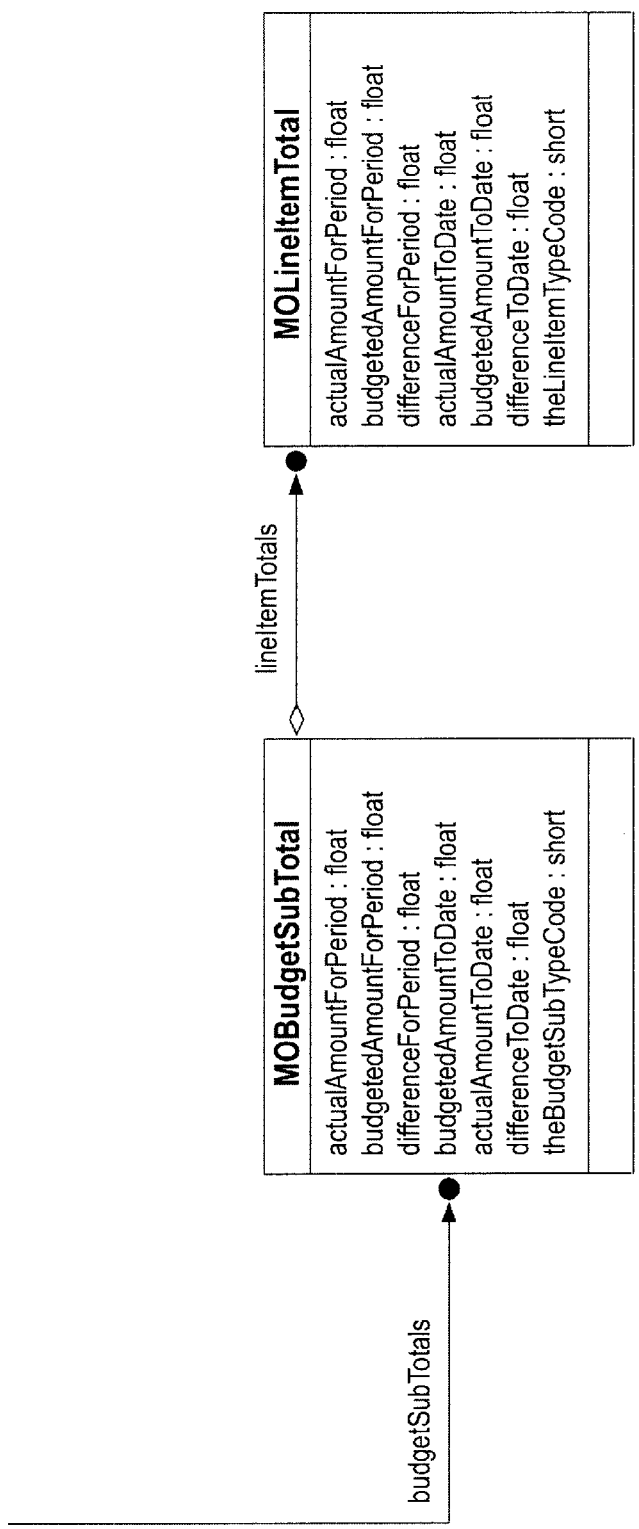
Figure 29:
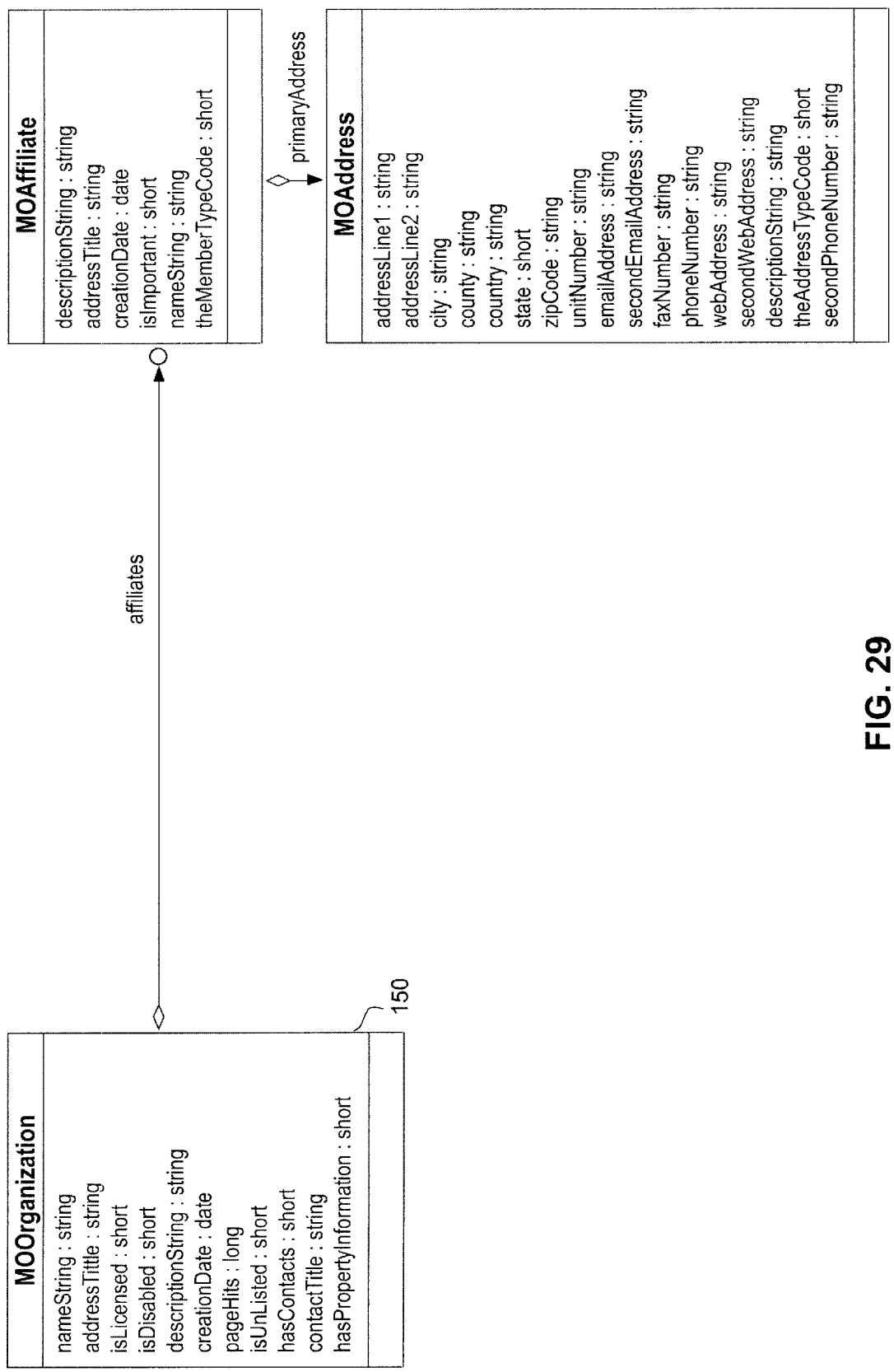
Figure 30:
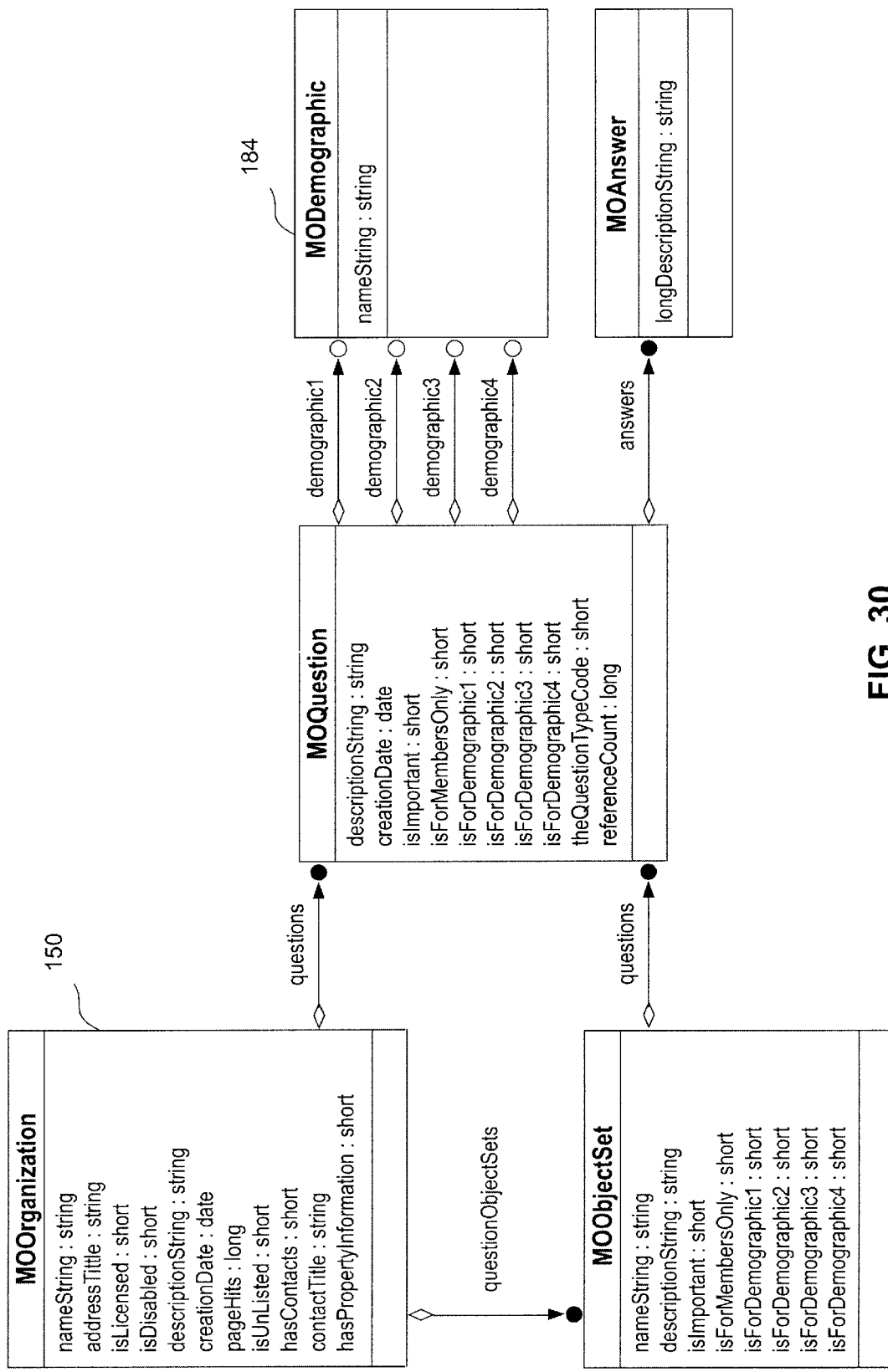
Figure 31B:
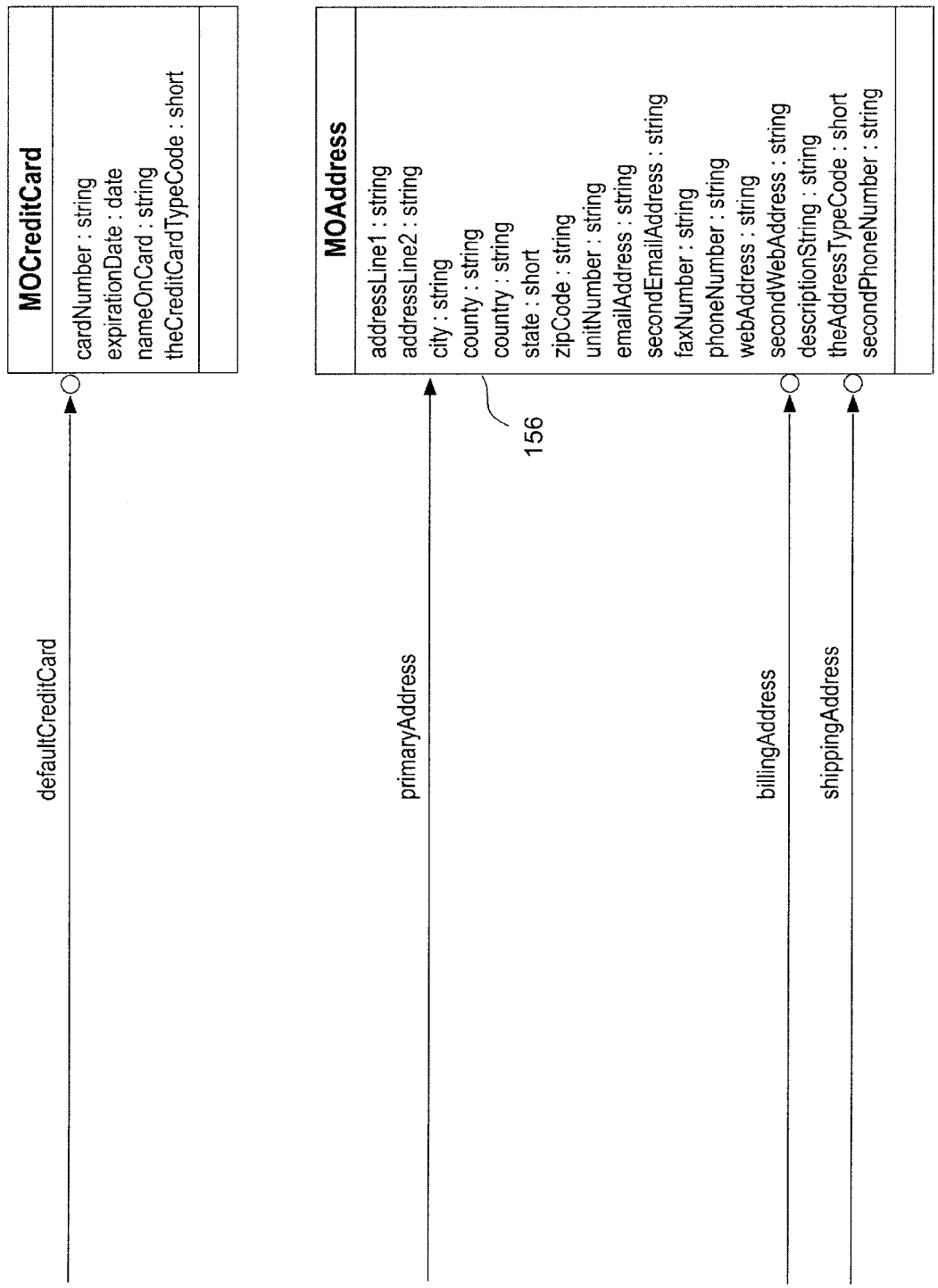
Figure 31C:
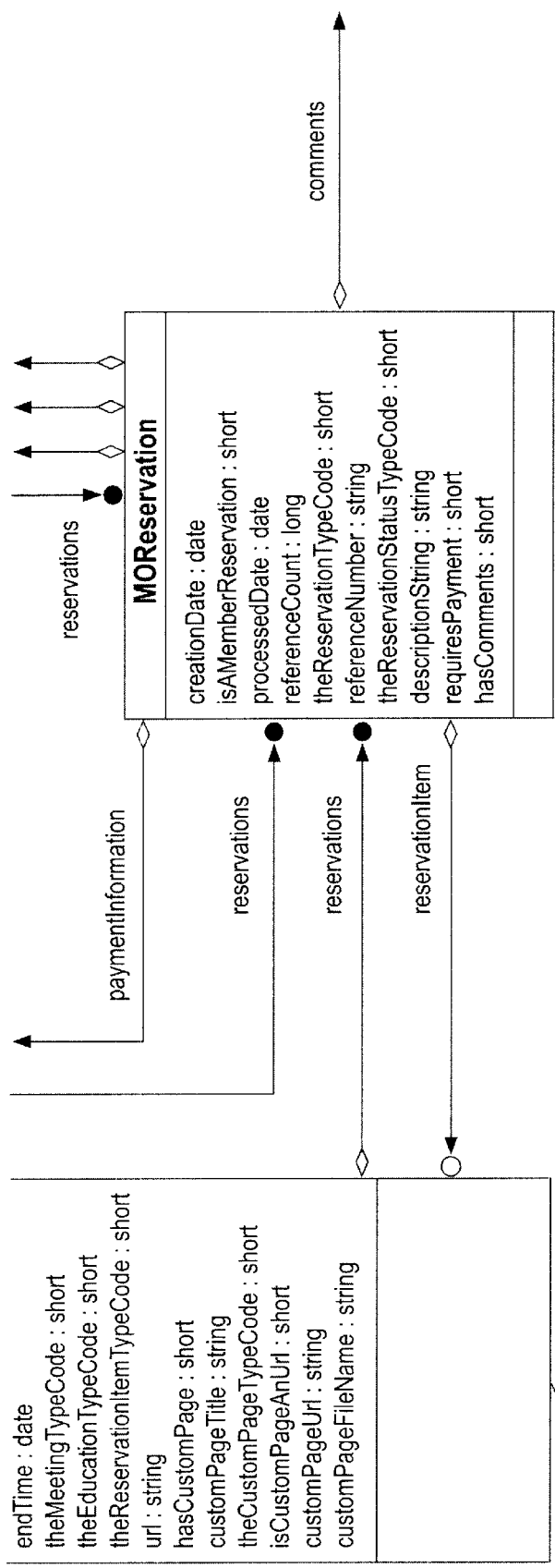
Figure 31D:
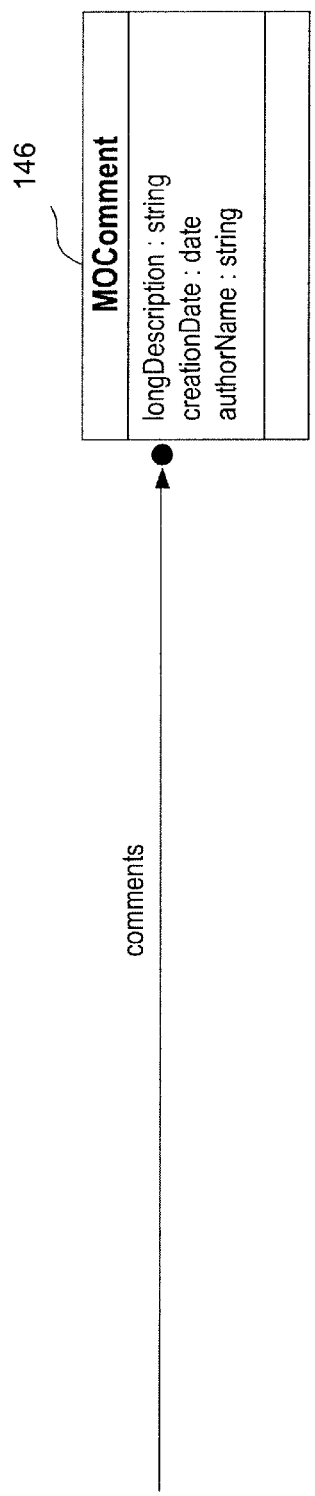
Figure 32:
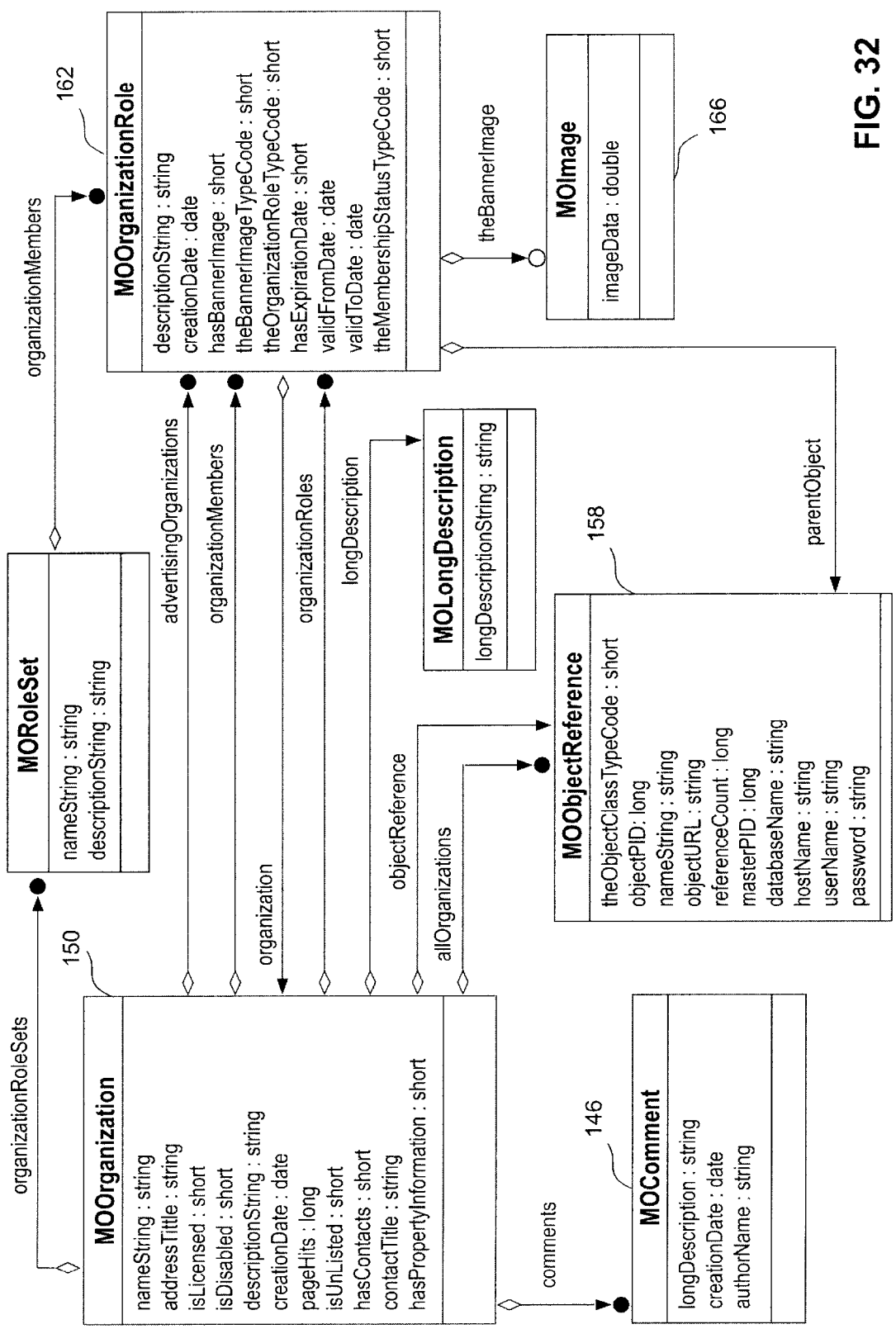
Figure 33:
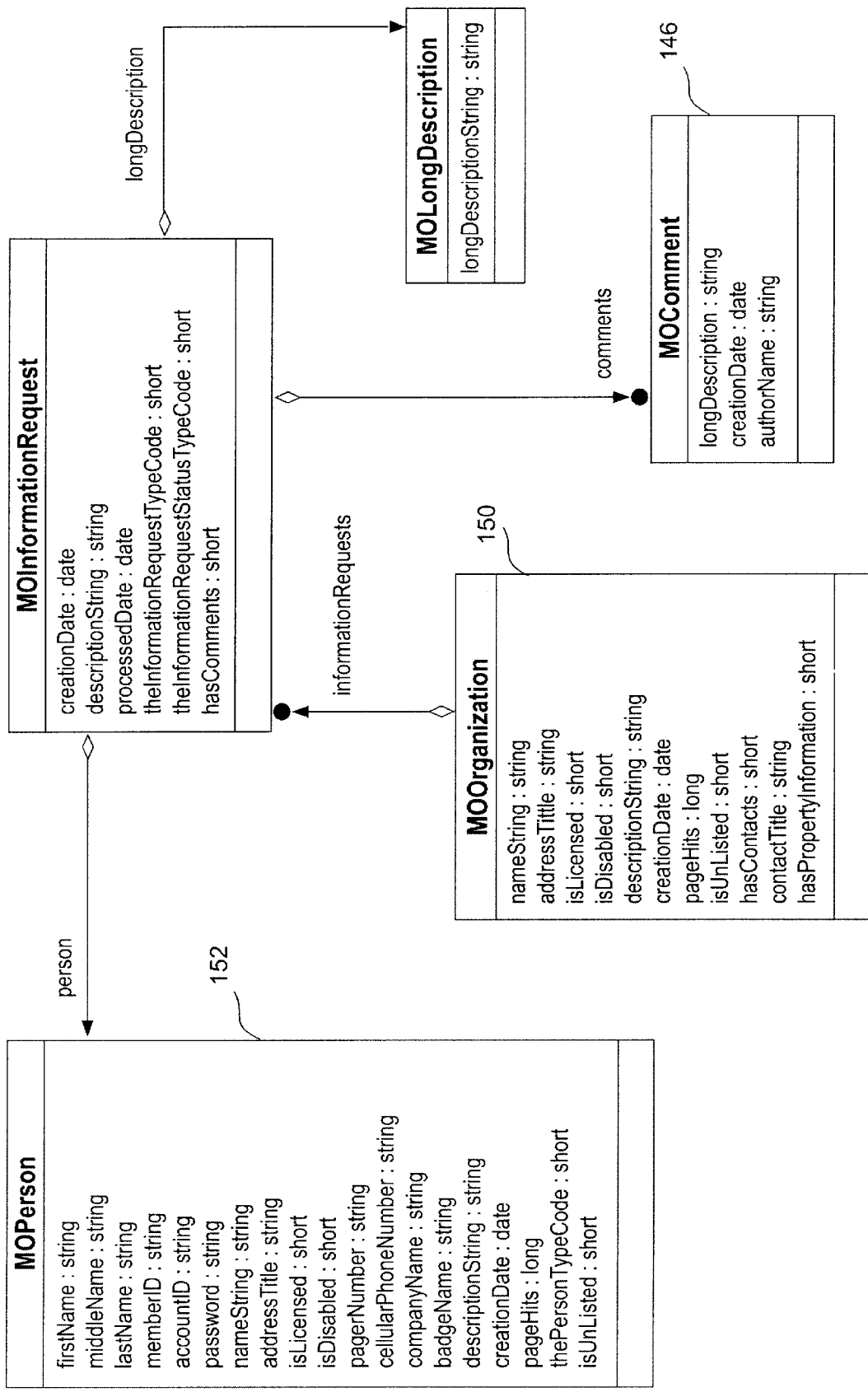

The dynamically configured functional components are implemented in the persistent object model 154 of FIG. 7 by objects such as MOJob 172 of FIG. 17, MONote 210 of FIGS. 16 and 27, MOOrderItem 212 of FIGS. 19 and 25, or MOReservationItem 214 of FIGS. 15, 21 and 31. These persistent objects 105 of FIG. 7 provide the content for the images 15 of FIG. 1 of the user interface, while the presentation objects 254 of FIG. 41 provide the behavior of the information to the end-user 32 of FIG. 1.

Figure 82A:
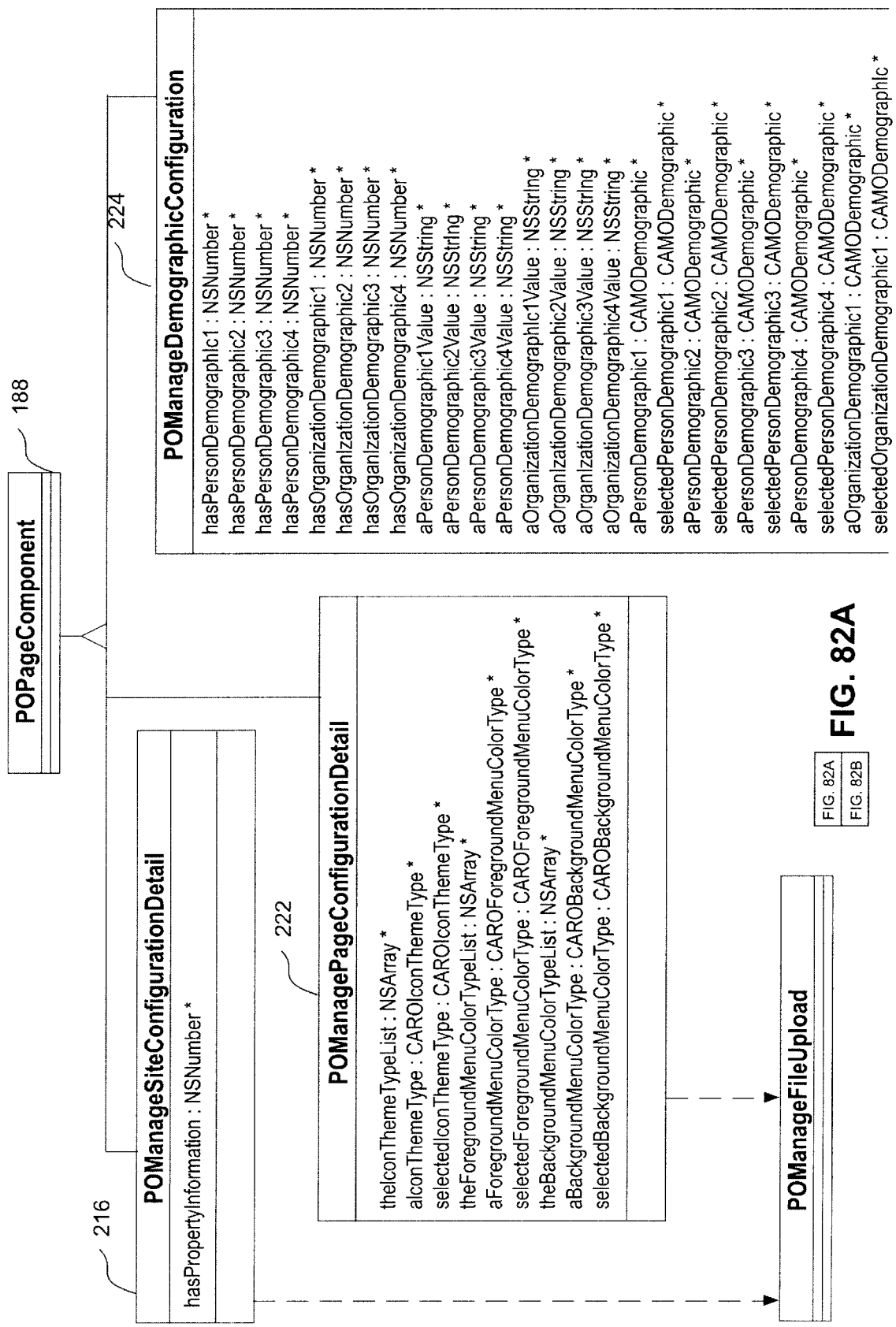

The ManageSiteConfigurationDetail 216 of FIG. 82 allows the administrator, for example, to choose which components to display on the site, provide a title for the component, decide which audience can access the component, and decide whether to enable categories within the component. ManageXXX 204 of FIG. 46 and XXXTable 202 of FIG. 47 work in conjunction with one another to allow the administrator or authorized user to view an item from the table, modify an item from the table, create a new item, delete an item from the table, generate a report of the items, send email to the entire list of items, and custom sort and display the list of items. ManageXXXDetail 208 of FIG. 51 and XXXDetail 206 of FIG. 43 work in conjunction with one another to allow the administrator to view or modify the detailed information of the functional component, and create or delete items associated with detail.

The data that describes the site configuration for an organization or individual is persistently stored in a database 42 of FIG. 2 with the other information that defines an organization or individual. Configuration windows of the user interface are available to the administrator. This allows the administrator of the site to modify the configuration meta-data. When a site is rendered in HTML, the meta-data about the organization or individual is retrieved from the database and the appropriate HTML is returned to the end-user based the values the administrator has set.

For example, the administrator can change the value of the background color of the menu system by selecting a value from a pick list in the page configuration window of the user interface. After saving the configuration changes and when the menu is next rendered, the background color for the menu is the value last assigned and saved by the administrator.

Several presentation configuration objects allow the administrator to set the look and feel for the windows, or images 15 of FIG. 1, of the user interface that present the content to the end-user 32 via objects. They are ManageSiteConfigurationDetail 216 of FIGS. 80 and 82, ManagePersonDetail 218 of FIG. 60, ManageOrganizationDetail 220 of FIG. 54, ManagePageConfigurationDetail 222 of FIGS. 80 and 82, and ManageDemographicConfigurationDetail 224 of FIGS. 80 and 82.

The ManageSiteConfigurationDetail 216 window of the user interface image 15 of FIG. 1 allows the administrator to display a login page, upload and display login page images, and incorporate links to external URLs from the login page.

The ManagePersonDetail 218 window of the user interface image 15 of FIG. 1 allows the administrator to set parameters about an individual, such as name and description, login id and password, demographic information, credit card information, address and contact information.

The ManageOrganizationDetail 220 window of the user interface image 15 of FIG. 1 allows the administrator to set parameters about the organization, such as name and description, demographic information, address and contact information, and administrator information.

The ManagePageConfigurationDetail 222 window of the user interface image 15 of FIG. 1 allows the administrator to perform other various functions, including the upload and display of a custom description page, the upload and display of a custom address page, the upload and display of a logo, and the upload and display of home page images. Other functions that can be performed include setting the foreground and background color, assigning an icon from a selection list to a function, setting up and using frames to display the menu system, displaying online help text, displaying a footer and displaying the number of site visits or site visit counter.

In order to satisfy the functional requirements of allowing an organization or individual to create a list of custom values, or demographics, assign demographic values to individuals, organizations, or objects within a functional component, and use demographics for search criteria and to limit access to content, presentation demographic components must be provided.

Several demographic components provide the content for the windows of the user interface and are rendered to the end-user 32 of FIG. 1 via presentation objects. The presentation demographic objects include ManageDemographicConfigurationDetail 224 of FIGS. 80 and 82, XXXTable 202 of FIG. 47 and XXXDetail 206 of FIG. 43, where XXX represents a functional component, such as Job, Note Conference, Order Item, Reservation Item, etc.

The ManageDemographicConfigurationDetail 224 window of the user interface image 15 of FIG. 1 allows the administrator to display a Demographic X toggle, enter a value in the Title field, and add a new or remove an existing demographic value.

In each of the table and detail components that support demographics, HTML and WOD elements are used to render the demographic type and values as needed. For table components, the demographics are used to search for items with matching demographics values. For detail components, the administrator or staff can assign a demographic value to the item.

Each of the above presentation objects has a corresponding HTML that renders the information from the ModelObject framework 112 of FIG. 34 to the end-user 32 of FIG. 1 and a WOD file 116 of FIG. 34 that binds the presentation and model object's instance variables and methods to the HTML files 117 of FIG. 34.

The persistent object model 154 contains separate objects to store information to satisfy various functional requirements. These functional requirements include allowing an organization or individual to upload custom images such as icons, logos, and pictures, to associate with specific site content, upload/download documents to associate with specific site content, upload page content such as description and contact information, upload web pages, assign a title to a page, or link to other content, and upload an icon or an image to associate with a page.

Additionally, online help objects for all identified objects can also be generated and made available to a user.

The HTML files 117 of FIG. 34 format the actual presentation to the client 32 of FIG. 1, while, as shown in FIG. 34, the Web Object Declaration files, WOD 116 bind the HTML elements to the values and methods of the objects defined in the PresentationObject framework 114 and the ModelObject framework 112. The WebObjects framework 118 implements translation between the HTML and WOD files 116, 117 and the PresentationObject framework 114. The WebObjects framework 118 translates embedded tags in an HTML file 117, binds the tags to their declarations with a corresponding WOD file 116, and binds the values and actions declared in the WOD file 116 to the instance variables and methods of the PresentationObject framework 114 and the ModelObject framework 112. The WebObjects framework 118 also implements an event/response loop within the framework (event driven), whenever a client 32 make a request to the application 26.

The HTML files used to render information from the persistent model objects 105 of FIG. 7 are standard and are known in the art. However, special begin and end tags can be inserted in the HTML file. At runtime when the page is rendered to the end-user, the tags are replaced by dynamically generated HTML that represents the form and content of the tags declaration.

In FIG. 34, each HTML file 117 has a corresponding WOD file 116. Each tag contained in the HTML files is declared in the corresponding WOD file 116. The declaration specifies what HTML element the tag implements, for example, string, text field, list, and button, and what to bind to the values or actions of the element. The bindings can be either to instance variables or methods of the ModelObject 112 or PresentationObject 114 frameworks.

For example, the value of a WOTextField, not shown, can be bound to the namestring 258 attribute of a MOJob 172 instance of FIG. 17, which then would allow the end-user 32 of FIG. 1 to edit a job title. Similarity, a WOSubmitButton (not shown) action method can be bound to a method on POJobDetail 242 of FIG. 74 to manage the interaction in creating a new instance of an MOJob 172 of FIG. 17.

The following HTML snippet displays a row within a table that renders two dates:

```
<TR>
<TH ALIGN=LEFT NOWRAP><FONT SIZE=2 FACE=ARIAL>Available Date:</FONT></TH>
  <TD><FONT SIZE=2 FACE=ARIAL>
    <WEBOBJECT
NAME=AvailableDate></WEBOBJECT>
  </FONT></TD>
<TH ALIGN=LEFT NOWRAP><FONT SIZE=2 FACE=ARIAL>Date Posted:</FONT></TH>
  <TD><FONT SIZE=2 FACE=ARIAL>
    <WEBOBJECT NAME=CreationDate></
       WEBOBJECT>
  </FONT></TD>
</TR>
```

The following WOD snippet displays the bindings between an instance of MOJob availableDate and creationDate attributes and the corresponding WOTextFields:

AvailableDate: WOTextField
{
   dateformat="%m/%d/%Y";
   size=15;

```
value=theObject.availableDate;
}
CreationDate: WOTextField
{
    dateformat="%m/%d/%Y";
    value=theObject.creationDate;
}
```

Other core system frameworks known in the art can be used within the application process 40 of FIG. 34, including Foundation 226, OracleDBAdapter 228, Access 230, Control 232, and ReportMill 234 frameworks.

The Foundation framework 226 implements objects representing widely used data structures and algorithms, such as lists, strings, decimal numbers, and files. All frameworks are dependent upon the base classes defined in the Foundation 226 in order to implement a robust object-oriented system.

The OracleDBAdapter framework 228 implements a database adapter layer that specifically knows how to interact with an Oracle database server. Other database adapter frameworks are available, such as Sybase and Informix.

The Access framework 230 implements a low-level relational database abstraction such as inserting or deleting rows. The Access framework 230 allows an application to connect to multiple heterogeneous database adapters concurrently while maintaining referential integrity and transaction semantics. The Access framework 230 depends on the OracleDBAdapter 228, or other database adapter frameworks.

The Control framework 232 implements a high level object-oriented database abstraction, such as editing contexts and object stores. The Control framework 232 allows the ModelObject framework 112 to interact with a persistent object store, or database 22 without directly translating in memory 18 objects to and from rows within a relational database. The ModelObject framework 112 depends on the Control framework 232, which depends on the Access framework 230.

The ReportMill framework 234 is another third party framework, and is used to generate pre-formatted PDF, HTML, or ASCII reports based on the persistent object model. As discussed above, the persistent object model refers to the one of the multiple object models that implement the data which was stored persistently.

As discussed earlier, to promote reuse, shared components are used. A shared component is composed of an HTML file, a WOD file, and a presentation object that implements the variables and methods of the component.

In the persistent object model 154 of FIG. 7, most to-many relationship have a corresponding shared component that renders the items in the to-many relationship to the end-user. Methods on a table component implement the view, modify, create, delete sort, filter, report, and other options of the presentation model object, which in turn call methods on the persistent object model. For example, whenever a persistent model object 105 has a to-many relationship with MOComment 146 of FIGS. 10, 14, 19–23, 25, 31 and 32–33, the list of comments is rendered in the shared component, POCommentTable 236 of FIG. 63–71 and 76. The POCommentTable 236 can be included in the user interface wherever a list of comments needs to be rendered.

Similarly, persistent model objects 105 of FIG. 7 can have a shared presentation component that renders the detail of the item, including any other detail relationships as needed, to the end-user 32 of FIG. 1. For example, whenever a persistent model object 105 has a to-one relationship with MOAddress 156 of FIGS. 17, 21, 25–26, 29 and 31, the address detail is rendered by the shared component, POAddressDetail 238 of FIGS. 43, 47, 51, 54, 57, 59–60, 62, 64–65 and 74.

Each of the shared components, such as table and detail, can be included in windows of the user interface image 15 of FIG. 1 as needed to render information and expose the component's methods to the end-user 32. For example, the ManageJobDetail 240 of FIG. 74 contains a JobDetail 242 component that renders the job information from a MOJob 172 of FIG. 17, and an AddressDetail 238 component displaying the address information from the to-one relationship to a MOAddress 156 associated with the job.

Figure 84:
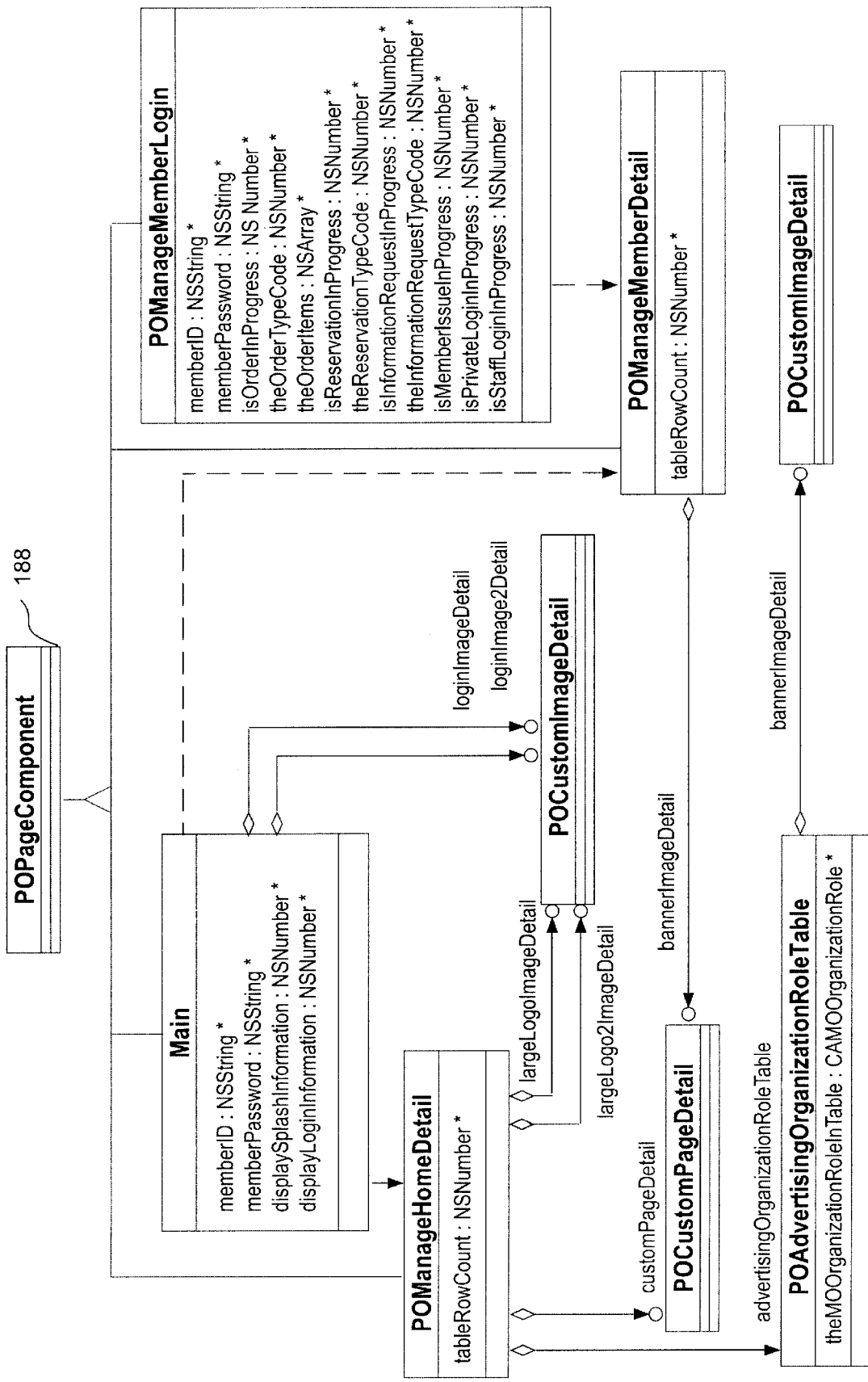
Figure 85:
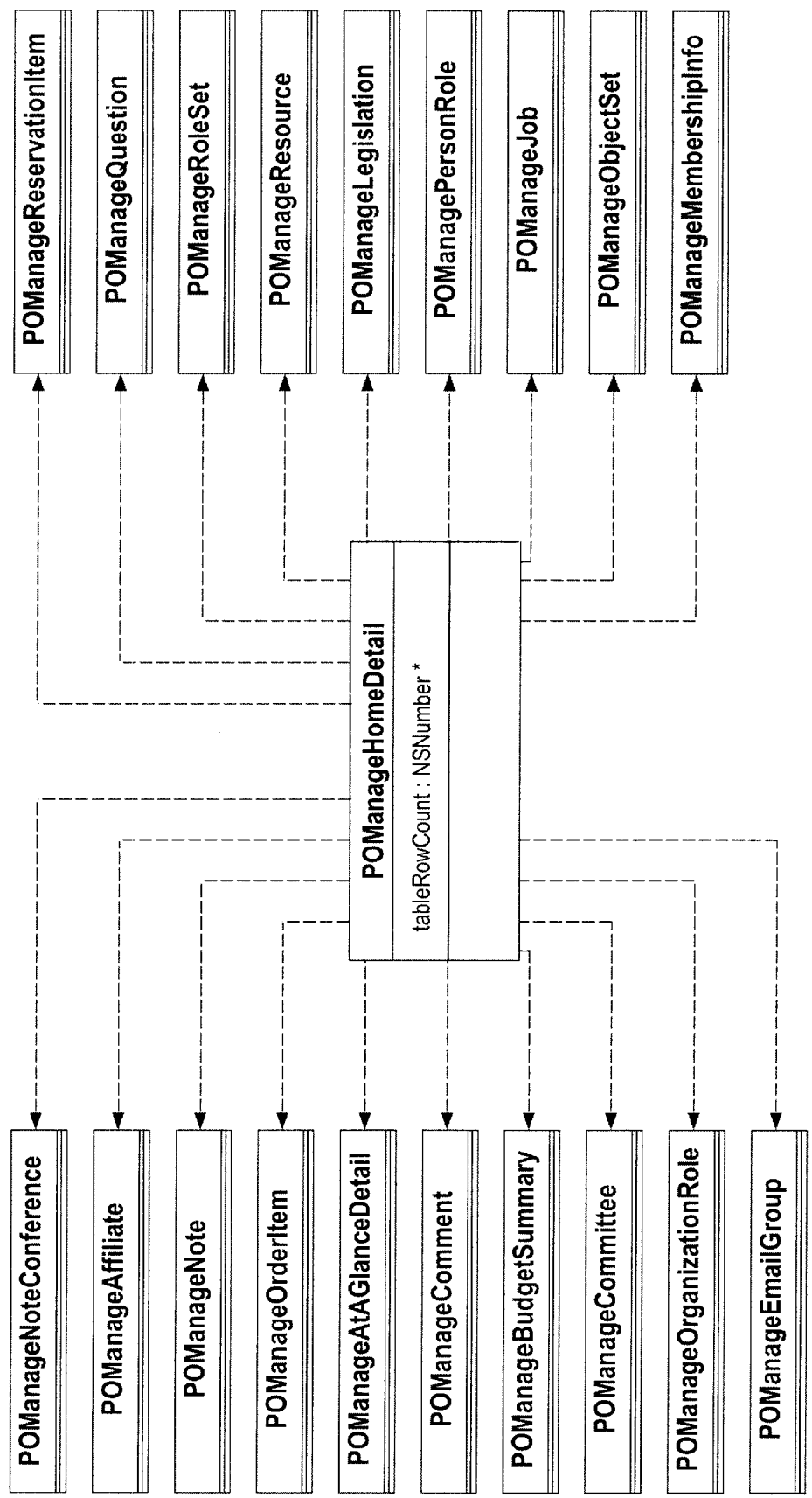
Figure 86:
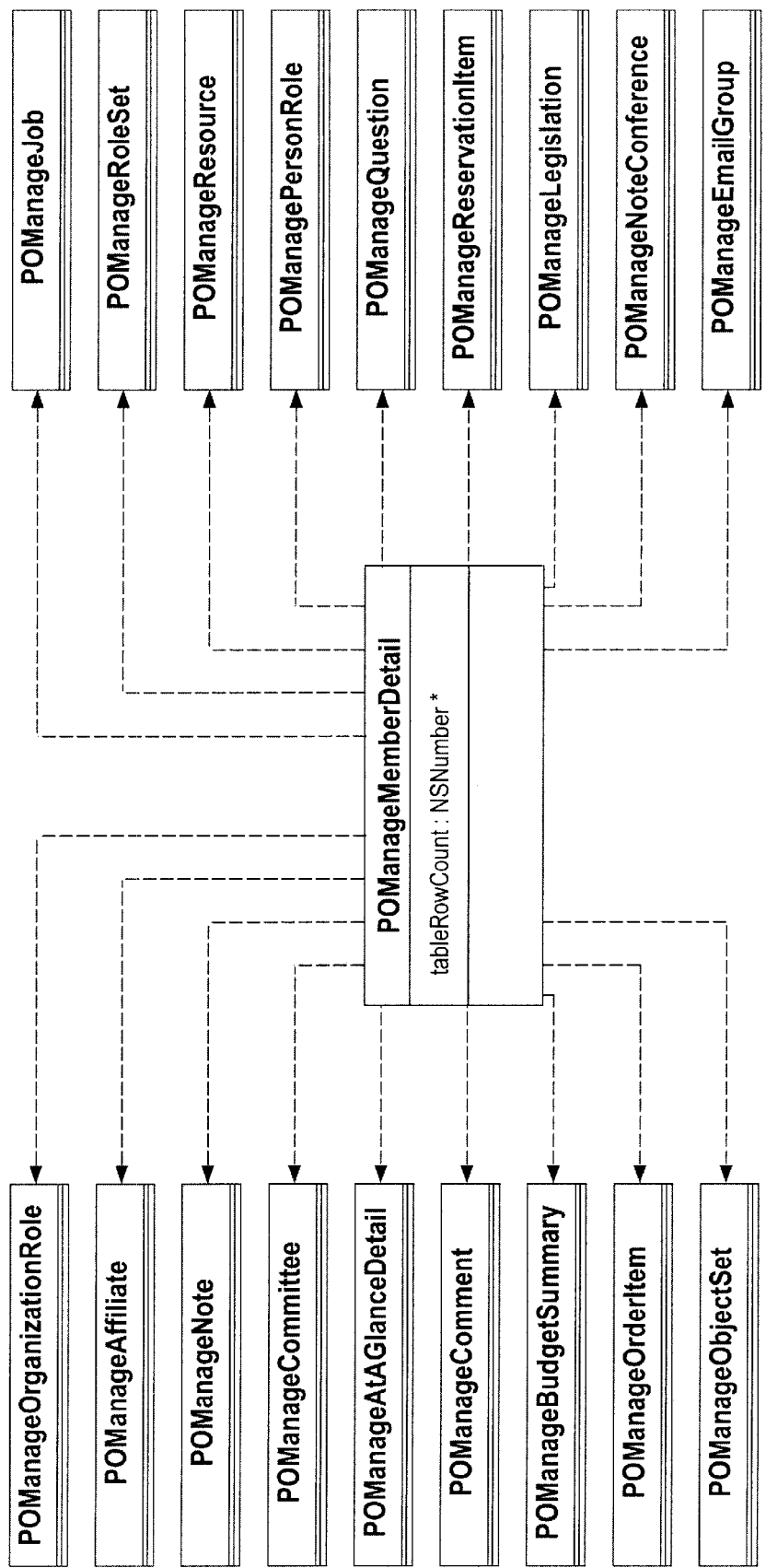
Figure 87:
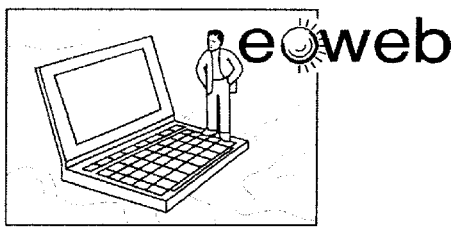
FIG. 87 is a login web page created in accordance with an embodiment of the present invention that is displayable on a visual display device.
Figure 89A:
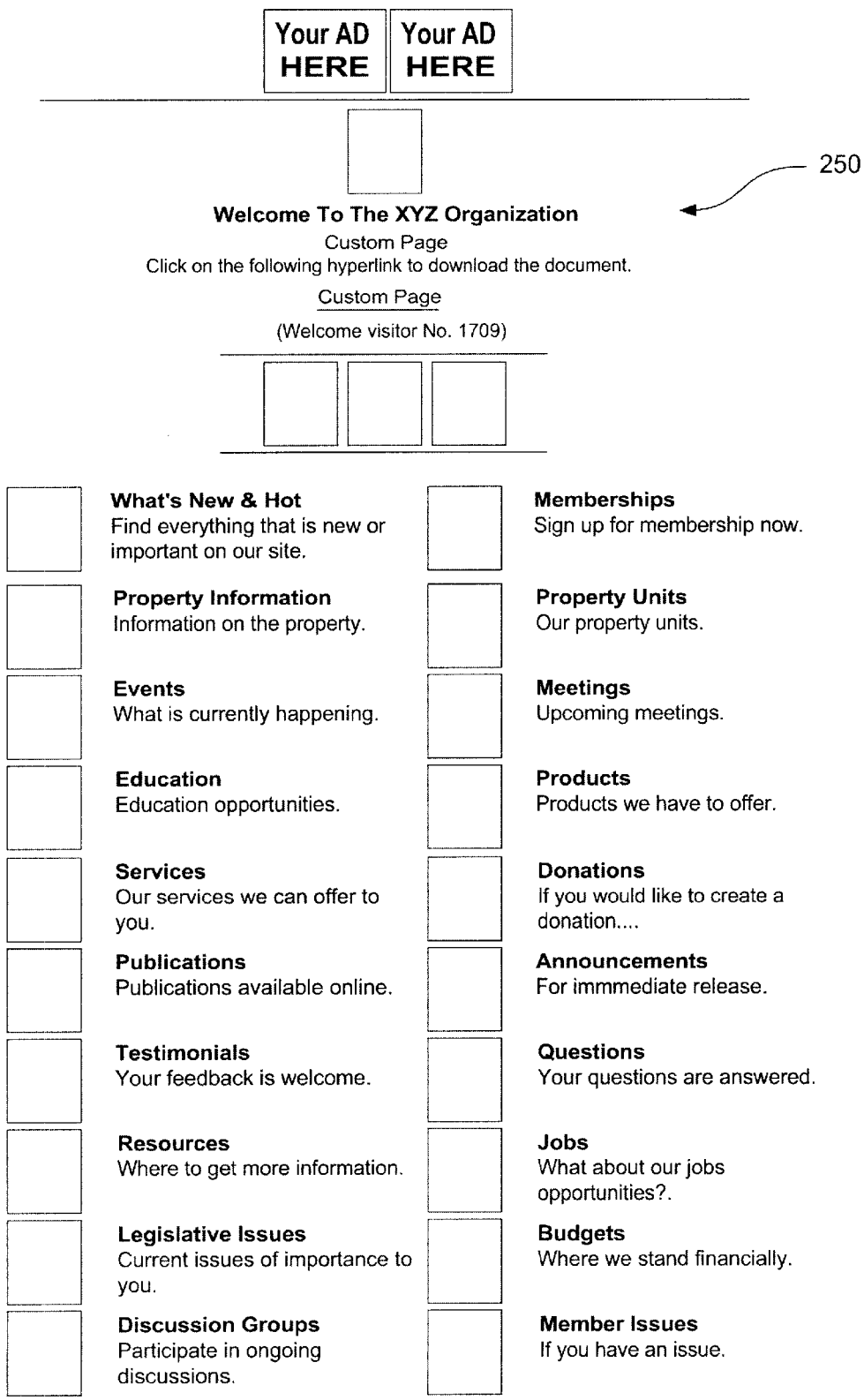

The following are examples of the correlation between images 15 of FIG. 1 and presentation frameworks 114 of FIG. 34. FIGS. 87 and 88 are images 15 of two login pages 246, 248, and FIG. 84 shows the corresponding presentation class diagram. FIGS. 89A and 89B are images 15 of the main home page 250, and FIG. 85 is the corresponding presentation class diagram. FIGS. 90A and 90B are images 15 of a member home page 252, and FIG. 86 is the corresponding presentation class diagram. In general there will be an image, or web page corresponding to every presentation class.

FIGS. 91A–91F are images 15 of a web site configuration page 260, and FIG. 82 shows the corresponding presentation class diagram. FIGS. 92A–92D are images 15 of a page and image configuration page 262, and FIG. 82 shows the corresponding presentation class diagram.

FIGS. 93A–93D are images 15 of a party information page 264. Party information is another term for event or reservation item, and FIG. 71 shows the corresponding presentation class diagram. FIGS. 94A–94B are images 15 of a demographic information page 266, and FIG. 82 shows the corresponding presentation class diagram.

While advantageous embodiments have been chosen to illustrate the invention, it will be understood by those skilled in the art that various changes and modifications can be made therein without departing from the scope of the invention, as defined in the appended claims. For example, the web page generator can be written using any program language, whether linear or objective. The number and type of web pages are not limited to those shown in the figures, and can have any desired layout, content and icons. Level of access and type of security can vary with the operating environment and the amount and type of damage that can be tolerated in the event of a breach. Different levels of administrators and members can also be created.

What is claimed is:

1. A method for generating web pages comprising the steps of:

communicating with a node of a distributed system;

determining a client user access level;

retrieving a web page template from said distributed system;

displaying said template at a client;

selecting a first data type using a graphical user interface;

entering first data type data into said template;

storing said first data type data in a memory of the node;

dynamically generating a first web page based on said client user access level, said template and said first data type data in response to a request by a remote user for said web page; and transmitting said dynamically generated web page to said remote user.

2. The method of claim 1, further comprising:

retrieving said template and said first data type data from said memory;

selecting a second data type using a graphical user interface;

entering said second data type data into said template;

storing said second data type data in said memory; and generating a second web page based on said client user access level, said template, said first data type data, and said second data type data.

3. The method of claim 1, further comprising:

logging into said node; and determining level of user access.

4. The method of claim 3, further comprising the step of limiting user access to said node based on said level of user.

5. The method of claim 3, further comprising the step of limiting user access to said memory based on said level of user.

6. The method of claim 3, further comprising the step of limiting user access to said first web page based on said level of user.

7. A method for generating web pages comprising the steps of:

accessing a web page generating program;

determining a client user access level;

running said web page generating program;

retrieving a web page template;

entering data into said template;

storing said data in memory;

requesting said web page generating program to dynamically generate a web page based on said client user access level, said template and said data in response to a request by a remote user for said web page; and transmitting said dynamically generated web page to said remote user.

8. The method of claim 7, further comprising the step of logging into said program; and determining a level of user access.

9. The method of claim 8, further comprising the step of limiting user access to said memory based on said level of user access.

10. The method of claim 8, further comprising the step of limiting user access to said web page based on said level of user access.

11. A system for automatically generating a web page for use in a distributed network, comprising:

a data input device for receiving input data;

a memory for storing said input data;

a processor for determining a client user access level and for processing said input data;

a display device for displaying a web page template retrieved from said distributed network; and a program adapted to dynamically generate said web page based on said client user access level, said template and said input data in response to a request for said web page from a remote user.

12. The system of claim 11, wherein said data is real world domain data.

13. The system of claim 11, wherein said web page has an attribute suitable for use by a first membership association.

14. The system of claim 13, wherein said first membership association is one of an organization, a business, a sports team, a homeowners association, a club, a fraternal organization, a government agency, and a non-governmental organization.

15. The system of claim 13, wherein members in said first membership association are one of people, property and a second membership association.

16. The system of claim 13, wherein web pages generated for said first membership association have at least a first level of member access.

17. The system of claim 16, wherein said first level of member access is for members of said first membership association for viewing predetermined portions of said web page.

18. The system of claim 16, further comprising a second level of member access, said second level of access granting the member of said first membership association greater access privileges to said web page than said first level of member access.

19. The system of claim 13, wherein a second web page is generated for a second membership association.

20. The system of claim 19, wherein said web page generated for said first membership association has a similar look and feel to said second web page.

21. The system of claim 11, wherein said program is written in an object-oriented programming language.

22. The system of claim 11, said system further comprising a graphical user interface.

* * * * *